United States Patent
Kwak et al.

(10) Patent No.: US 10,582,274 B2
(45) Date of Patent: Mar. 3, 2020

(54) APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

(71) Applicant: LG ELECTRONICS INC., Seoul (KR)

(72) Inventors: Minsung Kwak, Seoul (KR); Jangwon Lee, Seoul (KR); Woosuk Kwon, Seoul (KR); Woosuk Ko, Seoul (KR); Kyoungsoo Moon, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 255 days.

(21) Appl. No.: 15/119,315

(22) PCT Filed: Mar. 8, 2016

(86) PCT No.: PCT/KR2016/002295
§ 371 (c)(1),
(2) Date: Aug. 16, 2016

(87) PCT Pub. No.: WO2016/144083
PCT Pub. Date: Sep. 15, 2016

(65) Prior Publication Data
US 2017/0373918 A1 Dec. 28, 2017

Related U.S. Application Data

(60) Provisional application No. 62/129,933, filed on Mar. 8, 2015, provisional application No. 62/130,612, filed
(Continued)

(51) Int. Cl.
G06F 15/16 (2006.01)
H04N 21/6437 (2011.01)
(Continued)

(52) U.S. Cl.
CPC ..... *H04N 21/6437* (2013.01); *H04L 29/0809* (2013.01); *H04N 21/235* (2013.01);
(Continued)

(58) Field of Classification Search
None
See application file for complete search history.

(56) References Cited

U.S. PATENT DOCUMENTS

2006/0165173 A1   7/2006  Kim et al.
2006/0221178 A1   10/2006 Yun et al.
(Continued)

FOREIGN PATENT DOCUMENTS

EP   2 200 210 A2   6/2010
EP   2 707 974       3/2014
(Continued)

OTHER PUBLICATIONS

Sohn et al., "Design of MMT-based Broadcasting System for UHD Video Streaming over Heterogeneous Networks," JBE, vol. 20, No. 1, Jan. 2015, pp. 16-25, with an English translation of the abstract.

*Primary Examiner* — Brian Whipple
*Assistant Examiner* — Gregory P Tolchinsky
(74) *Attorney, Agent, or Firm* — Birch, Stewart, Kolasch & Birch, LLP

(57) ABSTRACT

A method of processing transmission of a broadcast signal includes generating broadcast data for one or more broadcast services, generating first level signaling information including information for describing attribute for the one or more broadcast services, generating second level signaling information including information for listing the one or more
(Continued)

broadcast services, generating link layer packets including the encoded broadcast data, the first level signaling information, and the second level signaling information, and generating a broadcast signal including the generated link layer packets.

16 Claims, 119 Drawing Sheets

Related U.S. Application Data on Mar. 10, 2015, provisional application No. 62/133,963, filed on Mar. 16, 2015, provisional application No. 62/151,374, filed on Apr. 22, 2015.

(51) Int. Cl.

| | | |
|---|---|---|
| *H04L 29/08* | (2006.01) | |
| *H04N 21/2362* | (2011.01) | |
| *H04N 21/242* | (2011.01) | |
| *H04N 21/462* | (2011.01) | |
| *H04N 21/235* | (2011.01) | |
| *H04N 21/236* | (2011.01) | |
| *H04H 60/07* | (2008.01) | |
| *H04N 21/43* | (2011.01) | |
| *H04N 21/27* | (2011.01) | |

(52) U.S. Cl.
CPC ....... *H04N 21/236* (2013.01); *H04N 21/2362* (2013.01); *H04N 21/242* (2013.01); *H04N 21/462* (2013.01); *H04H 60/07* (2013.01); *H04L 29/08018* (2013.01); *H04N 21/27* (2013.01); *H04N 21/4302* (2013.01)

(56) References Cited

U.S. PATENT DOCUMENTS

| | | | |
|---|---|---|---|
| 2008/0305757 A1 | 12/2008 | Jang et al. | |
| 2009/0178082 A1 | 7/2009 | Zhang et al. | |
| 2009/0219918 A1 | 9/2009 | Lee et al. | |
| 2009/0292767 A1 | 11/2009 | Wen | |
| 2010/0131823 A1* | 5/2010 | Song | H03M 13/271 714/758 |
| 2011/0103300 A1* | 5/2011 | Vare | H04N 21/6112 370/328 |
| 2011/0165865 A1* | 7/2011 | Gao | H04W 72/005 455/414.1 |
| 2012/0117160 A1 | 5/2012 | Bickson et al. | |
| 2012/0288031 A1 | 11/2012 | Väre et al. | |
| 2012/0324521 A1 | 12/2012 | Rhyu et al. | |
| 2013/0081088 A1 | 3/2013 | Hwang et al. | |
| 2013/0097470 A1 | 4/2013 | Hwang et al. | |
| 2013/0205344 A1* | 8/2013 | Lee | H04H 20/93 725/54 |
| 2013/0290814 A1* | 10/2013 | Hwang | H04L 1/004 714/776 |
| 2014/0125780 A1 | 5/2014 | Suh et al. | |
| 2014/0129859 A1* | 5/2014 | O'Malley | G06F 1/3209 713/323 |
| 2014/0195879 A1 | 7/2014 | Hong et al. | |
| 2014/0317674 A1* | 10/2014 | Hwang | H04N 21/631 725/118 |
| 2015/0032845 A1* | 1/2015 | Bouazizi | H04L 67/06 709/217 |
| 2016/0205158 A1 | 7/2016 | Lo et al. | |
| 2016/0254936 A1 | 9/2016 | Hong et al. | |
| 2017/0019431 A1* | 1/2017 | Kitahara | H04N 21/4385 |
| 2017/0134764 A1 | 5/2017 | Yamagishi et al. | |
| 2017/0347134 A1* | 11/2017 | Bae | H04N 21/238 |

FOREIGN PATENT DOCUMENTS

| | | |
|---|---|---|
| KR | 10-2009-0002818 A | 1/2009 |
| WO | WO 2011/136574 A2 | 11/2011 |
| WO | WO 2012/036429 A2 | 3/2012 |
| WO | WO 2012/077987 A2 | 6/2012 |
| WO | WO 2012/152989 A1 | 11/2012 |

\* cited by examiner

FIG. 2

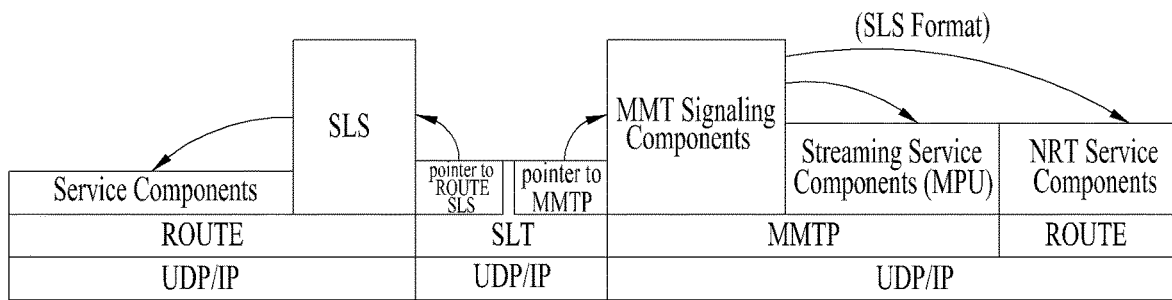

FIG. 3

| Element or Attribute Name | Use |
|---|---|
| SLT | |
|   @bsid | 1 |
|   @sltSectionVersion | 1 |
|   @sltSectionNumber | 0..1 |
|   @totalSltSectionNumbers | 0..1 |
|   @language | 0..1 |
|   @capabilities | 0..1 |
|   InetSigLoc | 0..1 |
|   Service | 1..N |
|     @serviceId | 1 |
|     @SLT serviceSeqNumber | 1 |
|     @protected | 0..1 |
|     @majorChannelNo | 1 |
|     @minorChannelNo | 1 |
|     @serviceCategory | 1 |
|     @shortServiceName | 1 |
|     @hidden | 0..1 |
|     @sls ProtocolType | 1 |
|     BroadcastSignaling | 0..1 |
|     @slsPlpId | 0..1 |
|     @slsDestinationIpAddress | 0..1 |
|     @slsDestinationUdpPort | 0..1 |
|     @slsSourceIpAddress | 0..1 |
|     @slsMajorProtocolVersion | 0..1 |
|     @SlsMinorProtocolVersion | 0..1 |
|     @serviceLanguage | 0..1 |
|     @broadbandAccessRequired | 0..1 |
|     @capabilities | 0..1 |
|     InetSigLoc | 0..1 |

FIG. 5

| Element or Attribute Name | | | | Use |
|---|---|---|---|---|
| bundleDescription | | | | |
| | userServiceDescription | | | |
| | | @serviceId | | M |
| | | @atsc: serviceId | | M |
| | | @atsc: serviceStatus | | OD |
| | | @atsc: fullMPDUri | | M |
| | | @atsc: sTSIDUri | | M |
| | | name | | 0..N |
| | | | lang | CM |
| | | serviceLanguage | | 0...N |
| | | atsc: capabilityCode | | 0...1 |
| | | deliveryMethod | | 1..N |
| | | | r12: broadcastAppService | 1..N |
| | | | | basePattern | 1..N |
| | | | r12: unicastAppService | 0..N |
| | | | | basePattern | 1..N |

FIG. 6

| Element and Attribute Names | | | | Use |
|---|---|---|---|---|
| S - TSID | | | | |
| | @serviceId | | | O |
| | RS | | | 1..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

FIG. 7

| Element or Attribute Name | | | | | Use |
|---|---|---|---|---|---|
| bundleDescription | | | | | |
| | userServiceDescription | | | | |
| | | @serviceId | | | M |
| | | @atsc: serviceId | | | M |
| | | Name | | | 0..N |
| | | | Lang | | CM |
| | | serviceLanguage | | | 0..N |
| | | atsc: capabilityCode | | | 0..1 |
| | | atsc: Channel | | | 1 |
| | | | @atsc: majorChannelNo | | M |
| | | | @atsc: minorChannelNo | | M |
| | | | @atsc: serviceLang | | O |
| | | | @atsc: serviceGenre | | O |
| | | | @atsc: serviceIcon | | M |
| | | | atsc: ServiceDescription | | 0..N |
| | | | | @atsc: serviceDescrText | M |
| | | | | @atsc: serviceDescrLang | O |
| | | atsc:mpuComponent | | | 0..1 |
| | | | @atsc: mmtPackageId | | M |
| | | | @atsc: next MmtPackageId | | O |
| | | atsc: routeComponent | | | 0..1 |
| | | | @atsc: sTSIDUri | | M |
| | | | @slsPlpId | | OD |
| | | | @slsDestinationIpAddress | | OD |
| | | | @slsDestinationUdpPort | | M |
| | | | @slsSourceIpAddress | | M |
| | | | @slsMajorProtocolVersion | | OD |
| | | | @SlsMinorProtocolVersion | | OD |
| | | atsc: broadbandComponent | | | 0..1 |
| | | | @atsc: fullfMPDUri | | M |
| | | atsc: ComponentInfo | | | 1..N |
| | | | @atsc: component Type | | M |
| | | | @atsc: component Role | | M |
| | | | @atsc: component ProtectedFlag | | OD |
| | | | @atsc: component Id | | M |
| | | | @atsc: component Name | | O |

FIG. 13
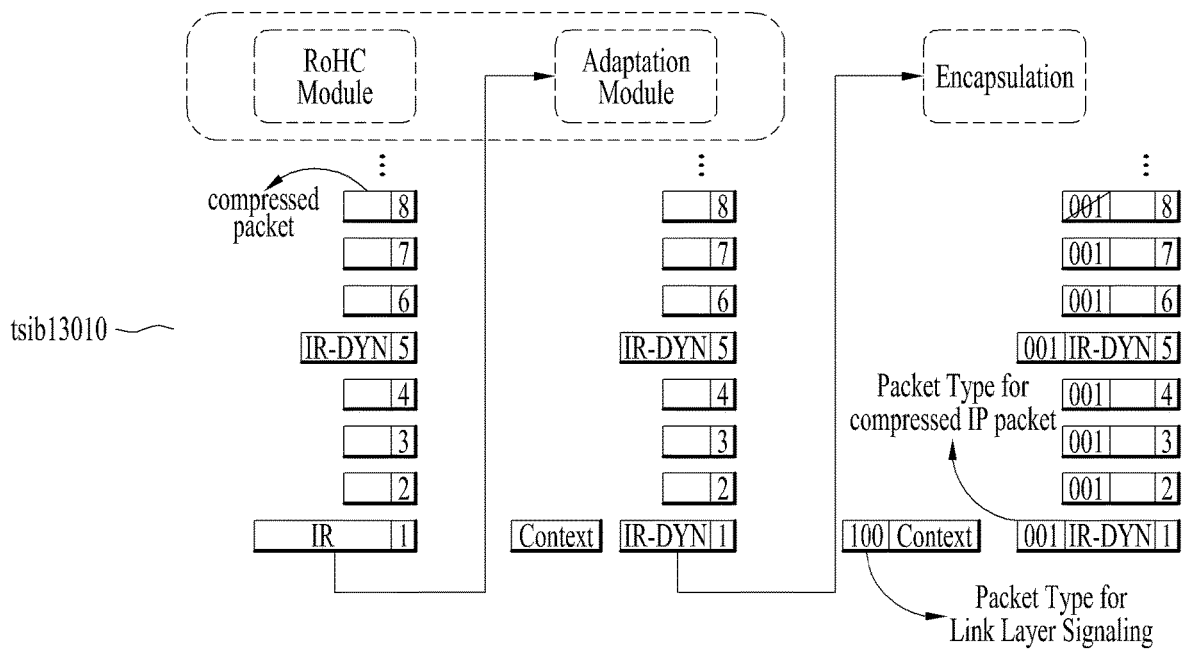
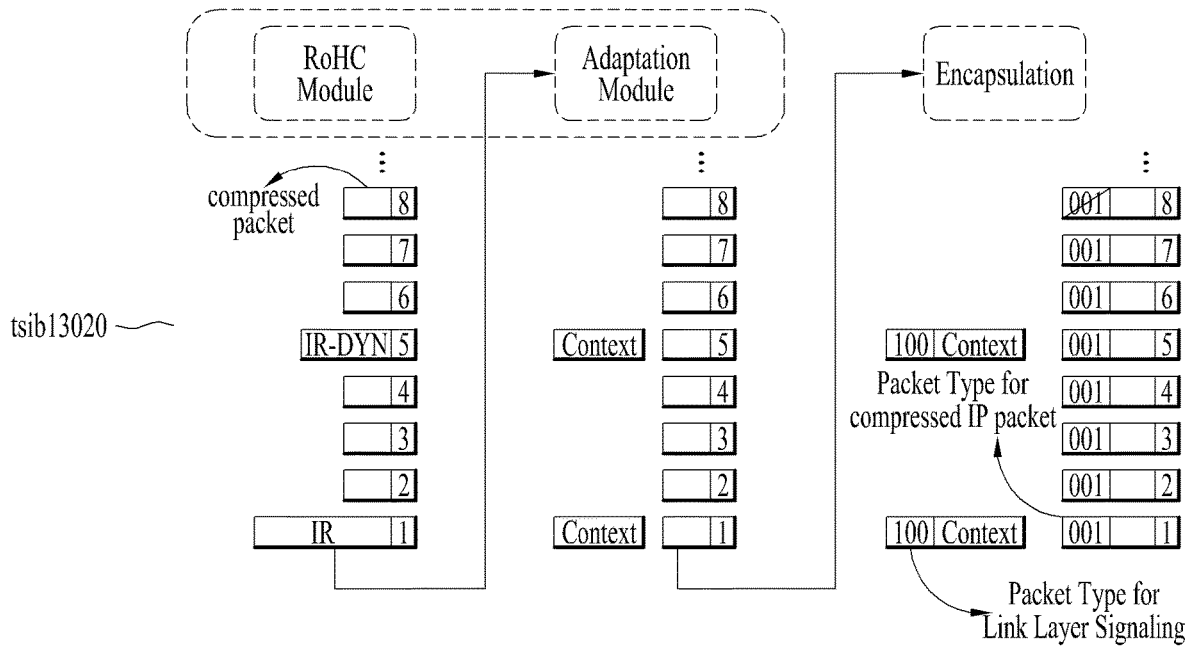

FIG. 14

Link_Mapping_Table (tsib14010):

| Syntax | Number of bits | Mnemonic |
|---|---|---|
| Link_Mapping_Table() { | | |
| signaling_type | 8 | "0x01" |
| PLP_ID | 6 | uimsbf |
| Reserved | 2 | |
| num_session | 8 | uimsbf |
| for(i = 0 ; i < num_session ; i ++) { | | |
| src_IP_add | 32 | uimsbf |
| dst_IP_add | 32 | uimsbf |
| src_UDP_port | 16 | uimsbf |
| dst_UDP_port | 16 | uimsbf |
| SID_flag | 1 | bslbf |
| compressed_flag | 1 | bslbf |
| reserved | 6 | '000000' |
| if(SID_flag == "1") { | | |
| SID | 8 | uimsbf |
| } | | |
| if(compressed_flag == "1") { | | |
| context_id | 8 | uimsbf |
| } | | |
| } | | |
| } | | |

ROHC-U_description_table (tsib14020):

| Syntax | Number of bits | Mnemonic |
|---|---|---|
| ROHC-U_description_table { | | |
| signaling_type | 8 | "0x02" |
| PLP_ID | 6 | uimsbf |
| adaptation_mode | 2 | uimsbf |
| context_config | 2 | bslbf |
| reserved | 6 | bslbf |
| context_id | 8 | uimsbf |
| context_profile | 8 | uimsbf |
| if (context_config = 0x01) { | | |
| context_length | 8 | uimsbf |
| static_chain_byte () | var | uimsbf |
| } | | |
| else if (context_config = 0X02) { | | |
| context_length | 8 | uimsbf |
| dynamic_chain_byte () | var | uimsbf |
| } | | |
| else if (context_config = 0x03) { | | |
| context_length | 8 | uimsbf |
| static_chain_byte () | var | uimsbf |
| dynamic_chain_byte () | var | uimsbf |
| } | | |
| } | | |

(a)
$$S_{demux\_in}(i) = \{b_i(0), b_i(1), b_i(2), \ldots, b_i(\eta_{MOD}-1)\},$$
$$S_{demux\_out}(i) = \{c_i(0), c_i(1), c_i(2), \ldots, c_i(\eta_{MOD}-1)\},$$
$$c_i(1) = b_i(i\%\eta_{MOD}), c_i(2) = b_i((i+1)\%\eta_{MOD}), \ldots, c_i(\eta_{MOD}-1) = b_i((i+1)\%\eta_{MOD})$$

(b)
a) Bit-Interleaving Output b) Bit-Demultiplexer Output

FIG. 24

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 25

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE = IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID | 6 |
| | DP_START | 15 (or13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |

FIG. 33

The main-PRBS generator is defined based on the $(N_a-1)$-bit binary word sequence $R_n$ with $N_a = \log_2 N_{max}$ $0 \leq n < 2$
$\quad R_n[N_a-2, N_a-3, \ldots, 1, 0] = 0, 0, , \ldots, 0, 0$
$n = 2$
$\quad R_n[N_a-2, N_a-3, \ldots, 1, 0] = 0, 0, , \ldots, 0, 1$
$2 < n < N_{max}$
$\quad R_n[N_a-3, N_a-4, \ldots, 1, 0] = R_n[N_a-2, N_a-3, \ldots, 2, 1]$
where
$R_n[N_a-2]$ is defined as:

in 8K FFT mode: $R_n[11] = R_{n-1}[0] \oplus R_{n-1}[1] \oplus R_{n-1}[4] \oplus R_{n-1}[6]$
in 16K FFT mode: $R_n[12] = R_{n-1}[0] \oplus R_{n-1}[1] \oplus R_{n-1}[4] \oplus R_{n-1}[5] \oplus R_{n-1}[9] \oplus R_{n-1}[11]$
in 32K FFT mode: $R_n[13] = R_{n-1}[0] \oplus R_{n-1}[1] \oplus R_{n-1}[2] \oplus R_{n-1}[12]$ (a)

| FFT mode | Nmax |
|---|---|
| 8K | 8192 |
| 16K | 16384 |
| 32K | 32768 |

The sub-PRBS generator is defined based on the $(N_b-1)$-bit binary word sequence $G_k$ with $N_b = \log_2(0.5 N_{max})$ $0 \leq k < 4$
$\quad G_k[N_b-2, N_b-3, \ldots, 1, 0] = 0, 0, \ldots, 0, 0$
$k = 4$
$\quad G_k[N_b-2, N_b-3, \ldots, 1, 0] = 1, 1, \ldots, 1, 1$
$4 < k < N_{max}$
$\quad G_k[N_b-3, N_b-4, \ldots, 1, 0] = G_k[N_b-2, N_b-3, \ldots, 2, 1]$ where
$\quad G_k[N_b-2]$ is defined as:

in 8K FFT mode: $G_k[10] = G_{k-1}[0] \oplus G_{k-1}[2]$
in 16K FFT mode: $G_k[11] = G_{k-1}[0] \oplus G_{k-1}[1] \oplus G_{k-1}[4] \oplus G_{k-1}[6]$
in 32K FFT mode: $G_k[12] = G_{k-1}[0] \oplus G_{k-1}[1] \oplus G_{k-1}[4] \oplus G_{k-1}[5] \oplus G_{k-1}[9] \oplus G_{k-1}[11]$ (a)

$p = 0;$
for $(n = 0; n < N_{max}; n = n+1)$
$\quad \{T(n) = (n \bmod 2) \cdot 2^{N_a - 1} + \sum_{i=0}^{N_a - 2} (2^i\, ?R_n[i]);$
$\quad S_l(n) = (T(n) + A_{\lfloor l/2 \rfloor}) \bmod N_{max};$
$\quad \text{if } S_l(n) < N_{data}$
$\quad\quad \{H_l(p) = S_l(n);$
$\quad\quad\; p = p+1; \}$
$\}$ $(n \bmod 2) \cdot 2^{N_a - 1}$ denotes 1-bit toggling, i.e., $R_n[N_a - 1] = 0, 1, 0, 1, \ldots$ and the cyclic-shifting value $A_{\lfloor l/2 \rfloor}$ is calculated for every OFDM symbol pair (b)

FIG. 35

FIG. 36
| PLP_NUM | 1 | >1 |
|---|---|---|
| Interleaving type | CI | CI+BI |
FIG. 37
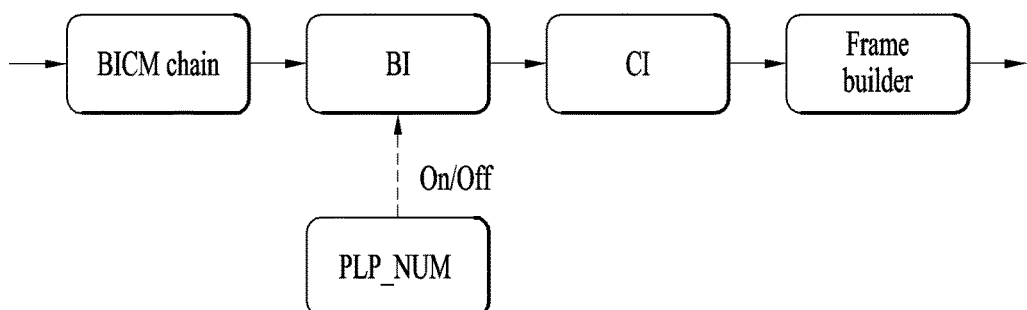
<Hybrid TI structure: example-1>
FIG. 38
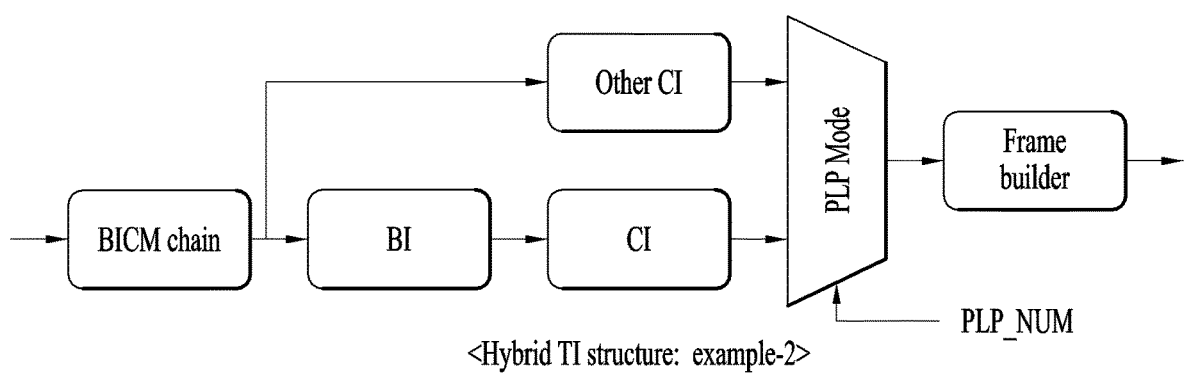
<Hybrid TI structure: example-2>

<Hybrid TI structure: example-1>

<Hybrid TI structure: example-2>

FIG. 47

| Link Layer Organization Type | Logical Data Path | | |
|---|---|---|---|
| | Normal Data Path | Base Data Pipe | Dedicated Channel |
| Organization Type 1 | O | X | X |
| Organization Type 2 | O | O | X |
| Organization Type 3 | O | X | O |
| Organization Type 4 | O | O | O |

FIG. 53

| Synrax | No. Bits | Format |
|---|---|---|
| Fast_Information_Table(){ | | |
|     table_id | 8 | uimsbf |
|     section_syntax_indicator | 1 | '0' |
|     private_indicator | 1 | '1' |
|     reserved | 2 | '11' |
|     section_length | 12 | uimsbf |
|     table_id_extension | 16 | uimsbf |
|     reserved | 2 | '11' |
|     FIT_data_version | 5 | uimsbf |
|     current_next_indicator | 1 | bslbf |
|     section_number | 8 | uimsbf |
|     last_section_number | 8 | uimsbf |
|     number_broadcast | 8 | uimsbf |
|     for(i=0;i<num_brdadcast;i++){ | | |
|         broadcast_id | 16 | uimsbf |
|         delivery_system_id | 16 | uimsbf |
|         base_DP_id | 8 | uimsbf |
|         base_DP_version | 5 | uimsbf |
|         reserved | 3 | '111' |
|         num_service | 8 | uimsbf |
|         for(i=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for(k=0;k<num_component;k++){ | | |
|                 component_id | 8 | bslbf |
|                 DP_id | 8 | bslbf |
|                 RoHC_init_descriptor(){ | | |
|                     context_id | 8 or 16 | |
|                     context_profile | 8 | uimsbf |
|                     max_cid | 8 | uimsbf |
|                     large_cid | 8 | bslbf |
|                 } | | |
|             } | | |
|         } | | |
|     } | | |
| } | | |

FIG. 54

| Synrax | No. Bits | Format |
|---|---|---|
| Emergency_Alert_Table (){ | | |
|     table_id | 8 | uimsbf |
|     section_synax-indicator | 1 | '0' |
|     private_indicator | 1 | '1' |
|     reserved | 2 | '11' |
|     secion_length | 12 | uimsbf |
|     table_id_extension { | | |
|         EAT_protocol_version | 8 | 0X0 |
|         reserved | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     automatic_thing_flag | 1 | bslbf |
|     num_EAS_messages | 7 | uimsbf |
|     IF(automatic_tuning_flag==0X01) { | | |
|         automatic_tuning_channel_number | 8 | uimsbf |
|         automatic_tuning_DP_id | 8 | uimsbf |
|         automatic_tuning_service_id | 16 | uimsbf |
|     } | | |
|     for (m=0; m<num_EAS_messages; m++) { | | |
|         EAS_message_id | 32 | uimsbf |
|         EAS_IP_version_flag | 1 | bslbf |
|         EAS_message_transfer_type | 3 | uimsbf |
|         EAS_message_encoding_type | 3 | uimsbf |
|         EAS_NRT_flag | 1 | bslbf |
|         if(EAS_message_transfer_type==0X02) { | | |
|             reserved | 4 | '1111' |
|             EAS_message_length/*N*/ | 12 | uimsbf |
|             EAS_message_bytes() | 8*N | var |
|         } | | |
|         else if (EAS_message_transfer_type==0X003) { | | |
|             IP_address | 32 or 128 | uimsbf |
|             UDP_port_num | 16 | uimsbf |
|             DP_id | 8 | uimsbf |
|         } | | |
|         if(EAS_NRT_flag==0X01){ | | |
|             EAS_NRT_service_id | 16 | uimsbf |
|         } | | |
|     } | | |
| } | | |

FIG. 58

| Syntax | Bits | Format |
|---|---|---|
| FIC_payload( ){ | | |
|     FIC_protocol_version | 8 | |
|     transport_stream_id | 16 | |
|     num_partitions | 8 | |
|     for (i= 0 ; i<num_partitions ; i++) { | | |
|         partition_id | 8 | uimsbf |
|         partition_protocol_version | 8 | uimsbf |
|         num_services | 8 | uimsbf |
|         for (j= 0 ; j<num_services ;j++) { | | |
|             service_id | 8 | uimsbf |
|             service_data_version | 8 | uimsbf |
|             service_channel_number | 8 | uimsbf |
|             service_category | 8 | uimsbf |
|             service_status | 3 | uimsbf |
|             service_distribution | 2 | uimsbf |
|             sp_indicator | 1 | bslbf |
|             IP_version_flag | 1 | bslbf |
|             SSC_source_IP_address_flag | 1 | bslbf |
|             if( SSC_source_IP_address_flag) | | |
|                 SSC_source_IP_address | 32 or 128 | uimsbf |
|             SSC_destination_IP_address | 32 or 128 | uimsbf |
|             SSC_destination_UDP_port | 16 | uimsbf |
|             SSC_TSI | 16 | uimsbf |
|             SSC_DP_ID | 8 | uimsbf |
|         } | | |
|         num_partition_level_descriptors | 8 | uimsbf |
|         for (k= 0 ; k< num_partition_level_descriptors ; k++ | | |
|             partition_level_descriptor( ) | var | |
|     } | | |
|     num_FIC_level_descriptors | 8 | uimsbf |
|     for (n= 0 ; n<num_FIC_level_descriptors ; n++) | | |
|         FIC_level_descriptor() | var | |
| } | | |

FIG. 59
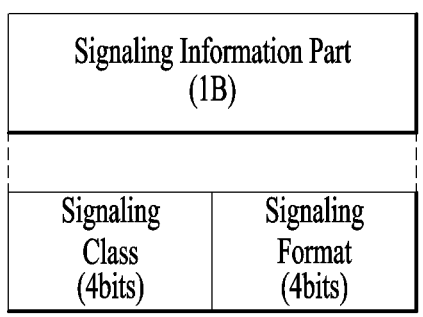
(a)
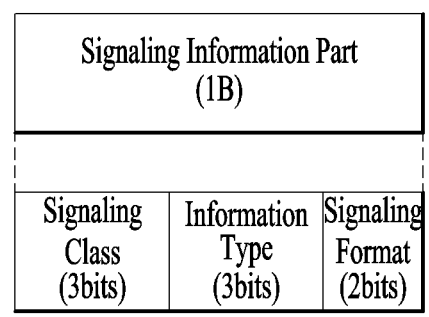
(b)

FIG. 61

| Flag | | Operation | | PHY Input Format |
|---|---|---|---|---|
| HCF | EF | Header Compression | Encapsulation | |
| 1 | 1 | Enable | Enable | Link Layer Packet with Compressed IP payload |
| 1 | 0 | Enable | Disable | Not used |
| 0 | 1 | Disable | Enable | Link Layer Packet with IP payload |
| 0 | 0 | Disable | Disable | IP Packet direct input |

FIG. 62

| Syntax | No. Bits | Format |
|---|---|---|
| Link_Layer_mode_control_descriptor() { | | |
|     descriptor_tag | 8 | uimsbf |
|     descriptor_length | 8 | uimsbf |
|     num_DP | 8 | uimsbf |
|     for(i=0;i<num_dp;i++) { | | |
|         DP_id | 8 | uimsbf |
|         HCF | 1 | bslbf |
|         EF | 1 | bslbf |
|         reserved | 6 | uimsbf |
|     } | | |
| } | | |

FIG. 65

| Index | Field value | Encapsulation Mode |
|---|---|---|
| 0 | 00 | None (Bypass) |
| 1 | 01 | Encapsulation 1 (Default) |
| 2 | 10 | Encapsulation 2 |
| 3 | 11 | Encapsulation 3 |

FIG. 66

| Index | Field value | Header Compression Mode |
|---|---|---|
| 0 | 000 | None (No Compression) |
| 1 | 001 | RoHC (default) |
| 2 | 010 | Header Compression 2 |
| 3 | 011 | Header Compression 3 |
| 4 | 100 | Reserved |
| 5 | 101 | Reserved |
| 6 | 110 | Reserved |
| 7 | 111 | Reserved |

FIG. 67

| Index | Field value | Packet Reconfiguration Mode |
|---|---|---|
| 0 | 00 | None (No Reconfiguration) |
| 1 | 01 | Reconfiguration 1 (default) |
| 2 | 10 | Reconfiguration 2 |
| 3 | 11 | Reconfiguration 3 |

FIG. 68

| Index | Field value | Context Transmission Mode |
|---|---|---|
| 0 | 000 | Transmission Mode 1 |
| 1 | 001 | Transmission Mode 2 |
| 2 | 010 | Transmission Mode 3 |
| 3 | 011 | Transmission Mode 4 |
| 4 | 100 | Transmission Mode 5 |
| 5 | 101 | Reserved |
| 6 | 110 | Reserved |
| 7 | 111 | Reserved |

FIG. 69

| Syntax | No. Bits | Format |
|---|---|---|
| RoHC_Initialization_in_link( ){ | | |
|     link_id | 8 | uimsbf |
|     max_cid | 16 | uimbf |
|     large_cids | 1 | bslbf |
|     reserved | 3 | 111 |
|     num_profiles | 4 | uimsbf |
|     for(j= 0;j<num_profiles ; j++) { | | |
|         profiles( ) | 8 | uimsbf |
|     } | | |
|     num_IP_stream | 8 | uimsbf |
|     for(k= 0;k<num_IP_stream ; k++) | | |
|     { | | |
|         IP_address() | 32 | uimsbf |
|     } | | |
| } | | |

FIG. 70

| Index | Field value | Signaling path | Priority |
|---|---|---|---|
| 0 | 000 | None (No signaling path) | - |
| 1 | 001 | Dedicated Data Pipe | 1 |
| 2 | 010 | Specific signaling channel (FIC) | 2 |
| 3 | 011 | Specific signaling channel (EAC) | 3 |
| 4 | 100 | Reserved | 4 |
| 5 | 101 | Reserved | 5 |
| 6 | 110 | Reserved | 6 |
| 7 | 111 | Reserved | 7 |

FIG. 71

| Bit position | Field value | Signaling path mapping |
|---|---|---|
| b0 (MSB) | | Dedicated Data Pipe |
| b1 | 0 : disable | Specific signaling channel (FIC) |
| b2 | 1 : enable | Specific signaling channel (EAC) |
| b3(LSB) | | Specific signaling channel (other) |

FIG. 74

| Syntax | No. Bits | Format |
|---|---|---|
| Link_Layer_Initialization_descriptor( ) { | | |
|     descriptor_tag | 8 | uimsbf |
|     descriptor_length | 8 | uimsbf |
|     num_link | 8 | uimsbf |
|     for(i= 0 ; i<num_link ; i++) { | | |
|         link_id | 8 | uimsbf |
|         encapsulation_mode | 2 | bslbf |
|         if (encapsulation_mode==0) { | | |
|             reserved | 6 | bslbf |
|         } | | |
|         else { | | |
|             header_compression_mode | 3 | bslbf |
|             if (header_compression_mode ==0) { | | |
|                 reserved | 3 | |
|             } | | |
|             else { | | |
|                 packet_reconfiguration_mode | 2 | |
|                 context_transmission_mode | 3 | bslbf |
|                 reserved | 1 | bslbf |
|                 max_cid | 16 | uimbf |
|                 large_cids | 1 | bslbf |
|                 num_profiles | 4 | uimsbf |
|                 for(j= 0 ; j<num_profiles ; j++) { | | |
|                     profiles( ) | | |
|                 } | 8 | uimsbf |
|             } | | |
|         } | | |
|     } | | |
| } | | |

FIG. 75

| Syntax | No. Bits | Format |
|---|---|---|
| Link_Layer_Initialization_descriptor( ) { | | |
|     descriptor_tag | 8 | uimsbf |
|     descriptor_length | 8 | uimsbf |
|     num_link | 8 | uimsbf |
|     for(i=0;i<num_link;i++){ | | |
|         link_id | 8 | uimsbf |
|         encapsulation_mode | 2 | bslbf |
|         if(encapsulation_mode ==0) { | | |
|             reserved | 6 | bslbf |
|         } | | |
|         else { | | |
|             header_compression_mode | 3 | bslbf |
|             if(header_compression_mode ==0) { | | |
|                 reserved | 3 | |
|             } | | |
|             else { | | |
|                 packet_reconfiguration_mode | 2 | bslbf |
|                 context_transmission_mode | 3 | bslbf |
|                 reserved | 6 | bslbf |
|             } | | |
|         } | | |
|     } | | |
| } | | |

FIG. 76

| Syntax | No. Bits | Format |
|---|---|---|
| Link_Layer_Initialization_descriptor() { | | |
|     descriptor_tag | 8 | uimsbf |
|     descriptor_length | 8 | uimsbf |
|     num_link | 8 | uimsbf |
|     signaling_path_configuration | 4 | bslbf |
|     reserved | 4 | bslbf |
|     if (signaling_path_configuration >='1000') { | | |
|         dedicated_DP_id | 8 | uimsbf |
|     } | | |
|     for(i=0;i<num_link;i++){ | | |
|         link_id | 8 | uimsbf |
|         encapsulation_mode | 2 | bslbf |
|         if (encapsulation_mode ==0) { | | |
|             reserved | 6 | bslbf |
|         } | | |
|         else { | | |
|             header_compression_mode | 3 | bslbf |
|             if (header_compression_mode ==0) { | | |
|                 reserved | 3 | |
|             } | | |
|             else { | | |
|                 packet_reconfiguration_mode | 2 | bslbf |
|                 context_transmission_mode | 3 | bslbf |
|                 reserved | 6 | bslbf |
|             } | | |
|         } | | |
|     } | | |
| } | | |

FIG. 83

| Syntax | No.Bits | Format |
|---|---|---|
| Packet_Structure_for_Dedicated_Channel() { | | |
|     length | 16 | uimsbf |
|     data_version | 8 | uimsbf |
|     payload_format | 4 | bslbf |
|     stuffing_flag | 1 | bslbf |
|     Reserved | 3 | bslbf |
|     CRC | 32 | rpchof |
|     payload_data_bytes() | var | |
|     if (stuffing_flag == 1 ) { | | |
|         stuffing_length | 8 | uimsbf |
|         stuffing_bytes | var | '0' |
|     } | | |
| } | | |

FIG. 84

| Syntax | No.Bits | Format |
|---|---|---|
| Dedicated_Channel_Configuration() { | | |
|     num_dedicated_channel | 4 | uimsbf |
|     reserved | 4 | bslbf |
|     for(i= 0 ;i< num_dedicated_channel;i++){ | | |
|         dedicated_channel_id | 4 | bslbf |
|         operation_mode | 4 | bslbf |
|     } | | |
| } | | |

FIG. 92

| Syntax | No. of Bits | Format |
|---|---|---|
| fast_information_table( ) { | | |
|     FIT_protocol_version | 8 | uimsbf |
|     broadcast_stream_id | 16 | uimsbf |
|     FIT_section_number | 4 | |
|     total_FIT_section_number | 4 | |
|     FIT_section_version | 4 | |
|     FIT_section_length | 12 | |
|     num_services | 8 | uimsbf |
|     for (i=0; i<num_services;i++) { | | |
|         service_id | 16 | uimsbf |
|         SLS_data_version | 8 | uimsbf |
|         service_category | 5 | uimsbf |
|         short_service_name_length | 3 | uimsbf |
|         for (j=0; j<short_name_length; j++) { | | |
|             short_service_name_byte_pair( ) | 16 * m | bslbf |
|         } | | |
|         provider_id | 8 | uimsbf |
|         service_status | 3 | uimsbf |
|         sp_indicator | 1 | bslbf |
|         num_service_level_descriptors | 4 | uimsbf |
|         for (j=0;j<num_service_level_descriptors;j++){ | | |
|             service_level_descriptor( ) | var | |
|         } | | |
|     } | | |
|     reserved | 4 | '1111' |
|     num_FIT_level_descriptors | 4 | uimsbf |
|     for (n=0; n<num_FIT_level_descriptors; n++) { | | |
|         FIT_level_descriptor( ) | var | |
|     } | | |
| } | | |

FIG. 93

| Descript Name | Descriptor Tag | ATSC3.0 Broadcast ||
|---|---|---|---|
| | | Service level | FIT level |
| broadcast_signaling_location_descriptor ( ) | TBD | M | |
| inet_signaling_location_descriptor ( ) | TBD | O | O |
| capability_descriptor ( ) | TBD | O | |

FIG. 94

| Syntax | No. of Bits | Format |
|---|---|---|
| broadcast_signaling_location_descriptor( ) { | | |
|     descriptor_tag | 8 | TBD |
|     descriptor_length | 8 | |
|     reserved | 6 | '111111' |
|     IP_version_flag | 1 | bslbf |
|     SLS_source_IP_address_flag | 1 | bslbf |
|     if(SLS_source_IP_address_flag) { | | |
|         SLS_source_IP_address | 32 or 128 | uimsbf |
|     } | | |
|     SLS_destination_IP_address | 32 or 128 | uimsbf |
|     SLS_destination_UDP_port | 16 | uimsbf |
|     SLS_TSI | 16 | uimsbf |
|     SLS_PLP_ID | 8 | uimsbf |
| } | | |

FIG. 95

| Syntax | No. of Bits | Format |
|---|---|---|
| inet_signaling_location_descriptor( ) { | | |
|     descriptor_tag | 8 | TBD |
|     descriptor_length | 8 | |
|     provider_id | 8 | uimsbf |
|     URL_type | 8 | uimsbf |
|     URL_bytes( ) | descriptor_length-2 | |
| } | | |

| URL_type | Meaning |
|---|---|
| 0 x 00 | URL to Signaling server |
| 0 x 01 | URL to ESG server |
| 0 x 02 ~ 0 x FF | Reserved for future use |

FIG. 96

| Resource(s) Requested | Query Term(s) |
|---|---|
| SLS Set | ?SLS=ALL[&svc=<service_id>] |
| SLS Diff Set | ?SLS=DiffALL[&svc=<service_id>] |
| SLS Template | ?SLS=Template[&svc=<service_id>] |
| USD | ?SLS=USD[&svc=<service_id>] |
| S-TSID | ?SLS=S-TSID[&svc=<service_id>] |
| ESG | ?ESG[&prv=<prv>] |

| Table(s) Requested | Query Term(s) |
|---|---|
| SLS Set | ?SLS=ALL |
| SLS Diff Set | ?SLS=DiffALL |
| SLS Template | ?SLS=Template |
| USD | ?SLS=USD |
| S-TSID | ?SLS=S-TSID |
| MPD | ?SLS=MPD |

FIG. 97

| Syntax | No. of Bits | Format |
|---|---|---|
| capabilities_descriptor( ) { | | |
| descriptor_tag | 8 | TBD |
| descriptor_length | 8 | uimsbf |
| capabilities_bytes( ) | descriptor_length-2 | |
| } | | |

FIG. 98

| Element or Attribute Name | Use | Description |
|---|---|---|
| fit | | Root element of the FIT |
| @bsid | M | Identifier of the whole Broadcast Stream. |
| @fitSectionNumber | M | Number of the section. A FIT can be comprised of multiple FIT sections. |
| @totalFitSectionNumber | M | Number of the total FIT section (that is, the section with the highest FIT_section_number) of the FIT of which this section is part. |
| @fitSectionVersion | M | Version number of the FIT section. The version _number shall be incremented by 1 when a change in the information carried within the FIT_section occurs. 0When it reaches maximum value, it wraps around to . |
| Service | 1..N | ATSC3.0 service entry |
| @serviceId | M | Integer number that shall uniquely identify this Service within the scope of this Broadcast area. |
| @providerId | O | Identifier for the provider which is broadcasting this service. |
| @serviceCategory | O | Attribute indicates the category of this service, the value is coded according to Table 6.2. |
| @spIndicator | O | When set to true, that one or more components necessary for meaningful presentation is protected. When set to false, this flag indicates that no components necessary for meaningful presentation of the service are protected. |
| @serviceStatus | O | Attribute indicates the status of this service, a pair of these values, ['0': Inactive or '1':Active] and ['2':Shown or '3':Hidden]. |
| @shortServiceName | O | Short string name of the Service |
| @SLSVersion | M | An unsigned integer number that shall be incremented any time there is a change in any of the signalling fragments for the service carried via the service layer signalling. This allows a receiver signalling. This allows a receiver to monitor just the FIT and learn if there are any changes to the signalling for any services. |
| capabilityCode | 0..1 | Specifies the capabilities and capability groups required in the receiver to be able to create a meaningful presentation of the content of this ATSC service. The contents and format of this element are identical to the atsc:capabilities element specified under the Content fragment of the ATSC 3.0 Service Announcement & Personalization spec [9]. |
| inetSignalingLocation | 0..1 | Contains URL telling where a receiver can acquire any requested type of data for this service from external server(s) via broadband. |
| @urlType | M | Attribute indicates the type of URL, this value is coded according to Table 6.6. |
| @url | M | The URL where Service Layer Signalling belong to the service can be retrieved from broadband connection. If the serviceCategory is not ESG service, URL can be used by a query term in order to indicate the signalling fragment(s) desired. If the broadcasters want to give different SLS URL not be used. The base URL shall be further extended by one of the query terms from Table 6.8, in order to indicate the resource(s) desired. If the serviceCategory is ESG service,this URL shall mean the internet server that receivers can retrieve ESG. |
| broadcastSignalingLocation | 1 | Bootstrap addresses for Service Layer Signalling for this service. |
| @IPVersion | OD | Attribute indicates IP version 'v4' or 'v6' for the following sourceIPAddress and destinationIP Address. If not, default value is 'v4'. |
| @sourceIPAddress | O | Source IP address of the Service Layer Signalling LCT channel for this service. |
| @destinationIPAddress | M | Destination IP Address of the Service Layer Signalling LCT channel for this service. |
| @destinationUdpPort | M | Destination UDP Port number of the Service Layer Signalling LCT channel for this service. |
| @TSI | O | Transport Session Identifier of the Service Layer Signalling LCT channel for this service. |
| @PLPID | O | Identifier of the "physical layer pipe" that contains the Service Layer Signalling LCT channel for this service. It will typically be the most robust pipe used by the service. |
| inetSignalingLocation | 0..1 | Contains URL telling where a receiver can acquire any requested type of data from external server(s) via broadband. |
| @providerId | O | Identifier for the provider which is broadcasting this service. |
| @urlType | M | Attribute indicates the type of URL, this value is coded according to Table 6.6. |
| @url | M | This URL can be used by a query term to indicate what the type of resource is by which requesting with this URL. If the type of resource is SLS, it gives a single URL where the receiver can retrieve SLS over broadband for all services fragment in this FIT. In this case, optional string(svc) is very useful and the receiver can request SLS for a specific service if svc query string is appended at the end of query terms. If the type of resource is ESG, it gives a single URL where the receiver can retrieve ESG over broadband for all providers described in this FIT. In this case, optional string(prv) is useful and the receiver can request ESG for a specific provider if prv query string is appended at the end of query terms. The base URL shall be further extended by one of the query terms from Table 6.7, in order to indicate the resource(s) desired. |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 100

| Element or Attribute Name | Use | Description |
|---|---|---|
| bundleDescription | | Root element of the User Service Bundle Description. |
| userServiceDescription | | A single instance of an ATSC 3.0 Service. |
| @serviceId | M | Globally unique identifier of the ATSC 3.0 Service. |
| @atsc:serviceId | M | Reference to corresponding service entry in LLS(FIT). The value of this attribute is the same value of serviceId assigned to the entry. |
| @atsc:fullMPDUri | M | Reference to an MPD fragment which contains descriptions for contents components of the ATSC 3.0 Service delivered over broadcast and optionally, also over broadband. |
| @atsc:sTSIDUri | M | Reference to the S-TSID fragment which provides access related parameters to the Transport sessions carrying contents of this ATSC 3.0 Service. |
| name | 0..N | Name of the ATSC 3.0 service as given by the lang attribute |
| lang | CM | Language of the ATSC 3.0 service name. The language shall be specified according to XML datatypes (XML Schema Part 2 [7]). |
| serviceLanguage | 0..N | Available languages of the ATSC 3.0 service. The language shall be specified according to XML datatypes (XML Schema Part 2 [7]). |
| atsc:capabilityCode | 0..1 | Specifies the capabilities and capability groups, as defined in the ATSC 3.0 Service Announcement & Personalization standard [9], required in the receiver to be able to create a meaningful presentation of the content of this ATSC service. The format of this element shall be identical to the atsc:capabilities element specified under the Content fragment of the ATSC 3.0 Service Announcement & Personalization spec [9]. |
| deliveryMethod | 1..N | Container of transport related information pertaining to the contents of the service over broadcast and (optionally) broadband modes of access. |
| atsc:broadcastAppService | 1..N | A DASH Representation delivered over broadcast, in multiplexed or non-multiplexed form, containing the corresponding media component(s) belonging to the ATSC 3.0 Service, across all Periods of the affiliated Media Presentation. |
| basePattern | 1..N | A character pattern for use by the the ATSC receiver to match against any portion of the Segment URL used by the DASH client to request Media Segments of a parent Representation under its containing Period. A match implies that the corresponding requested Media Segment is carried over broadcast transport. |
| atsc:unicastAppService | 0..1 | A DASH Representation delivered over broadband, in multiplexed or non-multiplexed form, containing the constituent media content component(s) belonging to the ATSC 3.0 Service, across all Periods of the affiliated Media Presentation. |
| basePattern | 1..N | A character pattern for use by the the ATSC receiver to match against any portion of the Segment URL used by the DASH client to request Media Segments of a parent Representation under its containing Period. A match implies that the corresponding requested Media Segment is carried over broadband transport. |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @.

FIG. 101

| Element/@Attribute | | | | Use | Description |
|---|---|---|---|---|---|
| S-TSID | | | | | Service Transport Session Instance Description |
| | @serviceId | | | O | Reference to corresponding service element in LLS (FIT). The value of this attribute shall reference a service in the FIT with a corresponding value of service_id. This attribute shall be present when MMTP sessions are used for broadcast delivery of a linear service without USD and without ROUTE sessions. |
| | RS | | | 0 .. N | ROUTE session |
| | | @bsid | | OD | Identifier of the Broadcast Stream within which the content component(s) of the broadcastAppService are carried. When this attribute is absent, the default Broadcast Stream is the one whose PLPs carry SLS fragments for this ATSC 3.0 service. Its value shall be identical to that of the broadcast_stream_id in the FIT. |
| | | @sIpAddr | | OD | Source IP address (default: current ROUTE session's source IP address) (M for non-primary session) |
| | | @dIpAddr | | OD | Destination IP address (default: current ROUTE session's destination IP address) (M for non-primary session) |
| | | @dport | | OD | Destination port (default: current ROUTE session's destination port) (M for non-primary session) |
| | | @PLPID | | OD | Physical Layer Pipe ID for ROUTE session (default: current physical layer pipe) |
| | | LS | | 1 .. N | LCT Session |
| | | | @tsi | M | TSI value |
| | | | @PLPID | OD | PLP ID (overrides default ROUTE session value) |
| | | | @bw | O | Maximum bandwidth |
| | | | @startTime | O | Start time |
| | | | @endTime | O | End time |
| | | | SrcFlow | 0 .. 1 | Source Flow as defined by the ATSC 3.0 Delivery & Synchronization spec [3] |
| | | | RprFlow | 0 .. 1 | Repair Flow as defined by the ATSC 3.0 Delivery & Synchronization spec [3][3] |
| | MS | | | 0 .. 1 | MMTP session |
| | | @versionNumber | | OD | The version number of the MMTP protocol used in this MMTP session. (default: 0) |
| | | @bsid | | OD | Identifier of the Broadcast Stream within which the content component(s) are carried. When this attribute is absent, the default Broadcast Stream is the one whose PLPs carry the SLS fragments for this ATSC 3.0 service. Its value shall be identical to that of the broadcast_stream_id in the FIT. |
| | | @sIpAddr | | O | Source IP address |
| | | @dIpAddr | | M | Destination IP address |
| | | @dport | | M | Destination port |
| | | @packetId | | OD | MMTP packet_id carrying MMT signaling messages of this MMTP session (default: 0x00) |
| | | @PLPID | | OD | Physical Layer Pipe ID for MMTP session (default: current physical layer pipe) |
| | | @bw | | O | Maximum bandwidth |
| | | @startTime | | O | Start time of this MMTP session |
| | | @endTime | | O | End time of this MMTP session |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @.

FIG. 102

| Syntax | No. of Bits | Format |
|---|---|---|
| ATSC_physical_layer_pipe_identifier_descriptor( ) { | | |
| descriptor_tag | 8 | uimsbf |
| descriptor_length | 16 | uimsbf |
| PLP_id | 8 | uimsbf |
| } | | |

FIG. 112

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Fragment Type    |     Fragment Type Extension   |   Version |
+-+-+-+-+-+-+-+-+-+-+-+-+-+-+-+-+-+-+-+-+-+-+-+-+-+-+-+-+-+-+-+-+
```

| Value | Fragment Type |
|---|---|
| 0 x 00 | Bundled |
| 0 x 01 | USBD/USD |
| 0 x 02 | S-TSID |
| 0 x 03 | MPD |
| ≥ 0 x 04 ... | Reserved |

| Fragment Type Value | Fragment Type | | Description |
|---|---|---|---|
| 0 x 00 | Value generated by OR operation applied on the following values | 0b0000000000000001 | USBD/USD is contained in this bundle |
| | | 0b0000000000000010 | S-TSID is contained in this bundle |
| | | 0b0000000000000100 | MPD is contained in this bundle |
| 0 x 01 - 0 x 03 | 16-bits hashed value derived from the url of Service Layer Signaling fragment | | To enable the client to filter the fragment that has instance url in question before assembling LCT packets |
| ≥ 0 x 04 ... | Reserved | | |

FIG. 113

```
<metadataEnvelope xmlns=" urn : 3gpp : metadata : 2005 : MBMS : envelope ">
<item metadataURI =" SignalingInstanceID "
version=" SignalingInstanceVersion " - - optional
    <metadataFragment>
        <![CDATA[ <diffUpdate>
            <templateID> SignalingTemplateID </templateID>
            <templateVersion> SignalingTemplateVersion </templateVersion> - optional
            <update> Diff </update>
            </diffUpdate>]]>
    </metadataFragment>
</item>
</metadataEnvelope>
```

FIG. 115

| Syntax | No. of Bits | Format |
|---|---|---|
| Signaling_on_inet_descriptor( ) { | | |
| descriptor_tag | 8 | TBD |
| descriptor_length | 8 | |
| provider_id | 8 | uimsbf |
| URL_type_mask | 8 | uimsbf |
| URL_bytes( ) | descriptor_length-1 | |
| } | | |

| Bit (b7 b6 b5 b4 b3 b2 b1 b0) | Meaning |
|---|---|
| b7 (MSB) | URL to Signaling server |
| b6 | URL to ESG server |
| b0 ~ b5 | Reserved for future use |

FIG. 116

| Element or Attribute Name | Use | Description |
|---|---|---|
| fit | | Root element of the FIT |
| @bsid | M | Identifier of the whole Broadcast Stream. |
| @fitSectionNumber | M | Number of the section. A FIT can be comprised of multiple FIT sections. |
| @totalFitSectionNumber | M | Number of the total FIT section (that is, the section with the highest FIT_section_number) of the FIT of which this section is part. |
| @fitSectionVersion | M | Version number of the FIT section. The version_number shall be incremented by 1 when a change in the information carried within the FIT_section occurs. When it reaches maximum value, it wraps around to 0. |
| Service | 1..N | ATSC3.0 service entry |
|   @serviceId | M | Integer number that shall uniquely identify this Service within the scope of this Broadcast area. This number shall be unique within the ATSC3.0 Broadcast. The service_id is scoped to be unique within this broadcast emission signal. |
|   @providerId | O | Identifier for the provider which is broadcasting this service. |
|   @serviceCategory | O | Attribute indicates the category of this service, the value is coded according to Table 6.2 below. |
|   @spIndicator | O | When set to true, that one or more components necessary for meaningful presentation is protected. When set to false, this flag indicates that no components necessary for meaningful presentation of the service are protected. |
|   @serviceStatus | O | Attribute indicates the status of this service, a pair of these values, ['0': Inactive or '1':Active] and ['2':Shown or '3':Hidden]. |
|   @shortServiceName | O | Short string name of the Service |
|   @SLSSimpleservice | O | When set to true, that a service layer signalling for this service is simple (more detail description: TBD). Default value is false. |
|   @SLSVersion | M | An unsigned integer number that shall be incremented any time there is a change in any of the signalling fragments for the service carried via the service layer signalling. This allows a receiver to monitor just the FIT and learn if there are any changes to the signalling for any services. |
|   capabilityCode | 0..1 | Specifies the capabilities and capability groups required in the receiver to be able to create a meaningful presentation of the content of this ATSC service. The contents and format of this element are identical to the atsc:capabilities element specifed under the Content fragment of the ATSC 3.0 Service Announcement & Personalization spec [8]. |
|   signallingOnInet | 0..1 | Contains URL telling where a receiver can acquire any requested type of data for this service from external server(s) via broadband. |
|     @url_type | M | Attribute indicates the type of URL, this value is coded according to Table 6.3 below |
|     @url | M | The URL where Service Layer Signalling belong to the service can be retrieved from broadband connection. If the serviceCategory is not ESG service, URL can be used by a query term in order to indicate the signalling fragment(s) desired. If the broadcasters want to give different SLS URL for each service, it can be used and in this case optional string(svc) at the end of query string may not be used. The base URL shall be further extended by one of the query terms from Table X.Y, in order to indicate the resource(s) desired. If the serviceCategory is ESG service, this URL shall mean the internet server that receivers can retrieve ESG. |
|   signalingBroadcast | 1 | Bootstrap addresses for Service Layer Signalling for this service. |
|     @IPVersion | OD | Attribute indicates IP version 'v4' or 'v6' for the following sourceIPAddress and destinationIPAddress. If not, default value is 'v4'. |
|     @sourceIPAddress | O | Source IP address of the Service Layer Signalling LCT channel for this service. |
|     @destinationIPAddress | M | Destination IP Address of the Service Layer Signalling LCT channel for this service. |
|     @destinationUdpPort | M | Destination UDP Port number of the Service Layer Signalling LCT channel for this service. |
|     @TSI | O | Transport Session Identifier of the Service Layer Signalling LCT channel for this service. |
|     @PLPID | O | Identifier of the "physical layer pipe" that contains the Service Layer Signalling LCT channel for this service. It will typically be the most robust pipe used by the service. |
| signallingOnInet | 0..1 | Contains URL telling where a receiver can acquire any requested type of data from external server(s) via broadband. |
|   @provider_id | M | Identifier for the provider which is broadcasting this service. |
|   @url_type | M | Attribute indicates the type of URL, this value is coded according to Table 6.3 below |
|   @url | M | This URL can be used by a query term to indicate what the type of resource is by which requesting with this URL. If the type of resource is SLS, it gives a single URL where the receiver can retrieve SLS over broadband for all services fragment in this FIT. In this case, optional string(svc) is very useful and the receiver can request SLS for a specific service if svc query string is appended at the end of query terms. If the type of resource is ESG, it gives a single URL where the receiver can retrieve ESG over broadband for all providers described in this FIT. In this case, optional string(prv) is useful and the receiver can request ESG for a specific provider if prv query string is appended at the end of query terms.The base URL shall be further extended by one of the query terms from Table X.X, in order to indicate the resource(s) desired. |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 117

| URL_type | Meaning |
|---|---|
| 0 x 00 | URL to Signaling server |
| 0 x 01 | URL to ESG server |
| 0 x 02 | URL to Signaling Template server |
| 0 x 03 ~ 0 x 07 | Reserved for future use |

FIG. 118

| Syntax | No. of Bits | No. of Bits |
|---|---|---|
| service_list_table_section( ) { | | |
|   table_id | 8 | TBD |
|   SLT_section_version | 4 | uimsbf |
|   SLT_section_length | 12 | uimsbf |
|   SLT_protocol_version | 8 | uimsbf |
|   broadcast_stream_id | 16 | uimsbf |
|   SLT_section_number | 4 | uimsbf |
|   last_SLT_section_number | 4 | uimsbf |
| | | |
|   num_services | 8 | uimsbf |
|   for (i=0; i<num_services;i++) { | | |
|     service_id | 16 | uimsbf |
|     protected | 1 | bslbf |
|     reserved | 2 | '11' |
|     rep_service_flag | 1 | bslbf |
|     major_channel_number | 10 | uimsbf |
|     minor_channel_number | 10 | uimsbf |
|     service_category | 4 | uimsbf |
|     short_service_name_length  /* m */ | 4 | uimsbf |
|     short_service_name( ) | 8 * m | uimsbf |
|     reserved | 2 | '11' |
|     SLS_protocol_type | 4 | uimsbf |
|     if(SLS_protocol_type == 0x01){ | | |
|       reserved | 2 | '11' |
|       SLS_PLP_ID | 8 | uimsbf |
|       TSID | 16 | uimsbf |
|     } | | |
|     else { | | |
|       broadcast_components_present | 1 | bslbf |
|       SLS_source_IP_address_present | 1 | bslbf |
|       if (broadcast_components_present) { | | |
|         SLS_PLP_ID | 8 | uimsbf |
|         SLS_destination_IP_address | 32 | uimsbf |
|         SLS_destination_UDP_port | 16 | uimsbf |
|         if (SLS_source_address_present) { | | |
|           SLS_source_IP_address | 32 | uimsbf |
|         } | | |
|         if (SLS_protocol_type == 0x02) { | | |
|           ROUTE_version | 8 | uimsbf |
|         } else if (SLS_protocol_type == 0x03) { | | |
|           reserved | 6 | '111111' |
|           MMTP_version | 2 | uimsbf |
|         } else { | | |
|           reserved | var | |
|         } | | |
|       } | | |
|     } | | |
|     reserved | 4 | '1111' |
|     num_SLT_level_descriptors | 4 | uimsbf |
|     for (n=0; n<num_SLT_level_descriptors; n++) { | | |
|       SLT_level_descriptor( ) | var | |
|     } | | |
|   } | | |
|   reserved | 4 | '1111' |
|   num_SLT_level_descriptors | 4 | uimsbf |
|   for (n=0; n<num_SLT_level_descriptors; n++) { | | |
|     SLT_level_descriptor( ) | var | |
|   } | | |
| } | | |

FIG. 119

| Descriptor Name | Descriptor Tag | ATSC3.0 Broadcast | |
| --- | --- | --- | --- |
| | | Service level | SLT level |
| inet_signaling_location_descriptor( ) | TBD | O | O |
| service_language_descriptor( ) | TBD | O | O |
| representative_service_descriptor( ) | TBD | | O |
| service_group_descriptor( ) | TBD | | O |
| service_provider_descriptor( ) | TBD | O | |

FIG. 120

| Syntax | No. of Bits | Format |
|---|---|---|
| service_language_descriptor( ) { | | |
|     descriptor_tag | 8 | TBD |
|     descriptor_length | 8 | uimsbf |
|     language | 3 * 8 | |
| } | | |

| Syntax | No. of Bits | Format |
|---|---|---|
| Representative_service_descriptor( ) { | | |
|     descriptor_tag | 8 | TBD |
|     descriptor_length | 8 | uimsbf |
|     num_provider | 8 | uimsbf |
|     for( i = 0 ; i < num _ provider ; i ++ ){ | | |
|         rep_service_id | 16 | |
|     } | | |
| } | | |

FIG. 121

| Syntax | No. of Bits | Format |
|---|---|---|
| service_group_descriptor( ) { | | |
|     descriptor_tag | 8 | TBD |
|     descriptor_length | 8 | uimsbf |
|     num_provider | 8 | uimsbf |
|     for( i = 0 ; i < num _ provider ; i ++ ){ | | |
|         service_id | 16 | |
|     } | | |
| } | | |

FIG. 122

| Syntax | No. of Bits | Format |
|---|---|---|
| service_group_descriptor( ) { | | |
|     descriptor_tag | 8 | TBD |
|     descriptor_length | 8 | uimsbf |
|     num_broadcaster | 8 | uimsbf |
|     for( i = 0 ; i < num_broadcaster ; i++ ){ | | |
|         num_service | | |
|         for( j = 0 ; j < num_service ; j++ ){ | | |
|             service_id | 16 | |
|         } | | |
|     } | | |
| } | | |

FIG. 123

| Syntax | No. of Bits | Format |
|---|---|---|
| service_group_descriptor( ) { | | |
|     descriptor_tag | 8 | TBD |
|     descriptor_length | 8 | uimsbf |
|     num_provider | 8 | uimsbf |
|     for( i = 0 ; i < num _ provider ; i++ ){ | | |
|         provider_id | 8 | uimsbf |
|         num_service | 8 | |
|         for( j = 0 ; num _ service ; j++ ){ | | |
|             service_id | 16 | uimsbf |
|         } | | |
|     } | | |
| } | | |

FIG. 124

| Syntax | No. of Bits | Format |
|---|---|---|
| service_provider_descriptor( ) { | | |
|     descriptor_tag | 8 | TBD |
|     descriptor_length | 8 | uimsbf |
|     provider_id | 8 | uimsbf |
| } | | |

FIG. 125

| Element or Attribute Name | Use | Description |
|---|---|---|
| slt | | Root element of the SLT |
| @bsid | 1 | Identifier of the whole Broadcast Stream |
| @sltSectionVersion | 1 | Version number of the SLT section. The sltSectionVersion shall be incremented by 1 when a change in the information carried within the slt occurs. When it reaches maximum value, it wraps around to 0. |
| @sltSectionNumber | 0..1 | The number, counting from 1, of this section of the SLT. Shall default to 1 when not present. |
| @totalSltSectionNumbers | 0..1 | The total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. Shall default to 1 when not present. |
| @language | 0..1 | A three-character language code per ISO 639.2/B [1] indicating the primary language of the services included in this slt instance. |
| @providerId | 0..1 | If SLT is owned by one provider, this provider ID will indicate that which provider (broadcaster) will describe services listed in this SLT. This value is optional |
| InetSigLocation | 0..1 | Provides a URL telling the receiver where it can acquire any requested type of data from external server(s) via broadband. The format of InetSigLocation shall be as given below in in Table 3.16. |
| RepresentativeService | 0..1 | Provides the service list which is provided by one broadcaster. The format of ServiceGroup shall be as given below in Table 3.17 |
| ServiceGroup | 0..1 | Provides the service list which is provided by one broadcaster. The format of ServiceGroup shall be as given below in Table 3.17 |
| Service | 1..N | ATSC3.0 service entry |
| @serviceId | M | Integer number that shall uniquely identify this Service within the scope of this Broadcast area. |
| @protected | 0..1 | When set to true, that one or more components necessary for meaningful presentation is protected. When set to false, this flag indicates that no components necessary for meaningful presentation of the service are protected. Default value is false. |
| @representative | 0..1 | Default value is false, if this attribute is described with value "true", then this service is representative of one broadcaster. |
| @majorChannelNo | 1 | An integer number in the range 1 to 1000 that shall represent the "major" channel number associated with the service. |
| @minorChannelNo | 1 | An integer number in the range 1 to 1000 that shall represent the "major" channel number associated with the service. |
| @serviceCategory | 1 | Attribute indicates the category of this service. The value shall be coded according to Table 3.2. |
| @shortServiceName | 1 | Short string name of the Service |
| @SLSProtocolType | 1 | An attribute indicating the type of protocol of Service Layer Signaling used by this service, coded according to Table 3.3. |
| @slsPlpId | 0..1 | A string representing an integer number indicating the PLP ID of the physical layer pipe carrying the SLS for this service. |
| @slsDestinationIpAddress | 0..1 | A string containing the dotted-IPv4 destination address of the packets carrying SLS data for this service. |
| @slsDestinationUdpPort | 0..1 | A string containing the port number of the packets carrying SLS data for this service. |
| @slsSourceIpAddress | 0..1 | A string containing the dotted-IPv4 source address of the packets carrying SLS data for this service. |
| @mmtpVersion | 0..1 | Version number of the MMTP protocol used in the MMTP session containing the Service Layer Signalling MMTP channel for this service. Specified only for MMT/MPU protocol. Default value is 0. |
| @routeVersion | 0..1 | Version number of the ROUTE protocol used in the ROUTE session containing the Service Layer Signalling channel for this service. Specified only for ROUTE protocol. Default value is 0. |
| @service_language | 0..1 | A three-character language code per ISO 639.2/B [1] indicating the primary language of the service. |
| InetSigLocation | 0..1 | Provides a URL telling the receiver where it can acquire any requested type of data from external server(s) via broadband. The format of InetSigLocation shall be as given below in Table 3.11. |
| ServiceProvider | 0..1 | Provides the identifier of provider which is broadcasting this service |

FIG. 126

| | | |
|---|---|---|
| InetSigLocation | 0..1 | Contains URL telling where a receiver can acquire any requested type of data from external server(s) via broadband. |
| @urlType | 1 | Attribute indicates the type of URL, this value is coded according to Table 3.6. |
| @url | 1 | This URL can be used by a query term to indicate what the type of resource is by which requesting with this URL. If the type of resource is SLS, it gives a single URL where the receiver can retrieve SLS over broadband for all services fragment in this SLT. In this case, optional string(svc) is very useful and the receiver can request SLS for a specific service if svc query string is appended at the end of query terms. If the type of resource is ESG, it gives a single URL where the receiver can retrieve ESG over broadband for all providers described in this SLT. . In this case, optional string(prv) is useful and the receiver can request ESG for a specific provider if prv query string is appended at the end of query terms. The base URL shall be further extended by one of the query terms from Table 3.7, in order to indicate the resource(s) desired. If the serviceCategory is ESG service, this URL shall mean the internet server that receivers can retrieve ESG. |

| | | |
|---|---|---|
| Representative Service | 0..1 | Contains representative service list of the number of broadcasters which are sharing one RF frequency. |
| RepServiceId | 1..N | This unsigned integer shall have the same value as the serviceId attribute in the Service element of the SLT. |

| | | |
|---|---|---|
| ServiceGroup | 0..1 | Contains service group list of the number of broadcasters which are sharing one RF frequency. |
| Provider | 1..N | Broadcaster which is consuming one RF frequency. |
| @broadcaster_id | 0..1 | Attribute indicates the identifier of broadcaster. This value is optional. |
| serviceId | 1..N | This unsigned integer shall have the same value as the serviceId attribute in the Service element of the SLT. |

| | | |
|---|---|---|
| Service Provider | 0..1 | |
| @id | 1 | Provider identifier |

APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

CROSS REFERENCE TO RELATED APPLICATIONS

This application is the National Phase of PCT International Application No. PCT/KR2016/002295, filed on Mar. 8, 2016, which claims priority under 35 U.S.C. 119(e) to U.S. Provisional Application Nos. 62/129,933 filed on Mar. 8, 2015, 62/130,612 filed on Mar. 10, 2015, 62/133,963 filed on Mar. 16, 2015 and 62/151,374 filed on Apr. 22, 2015, all of which are hereby expressly incorporated by reference into the present application.

TECHNICAL FIELD

The present invention relates to an apparatus for transmitting a broadcast signal, an apparatus for receiving a broadcast signal and methods for transmitting and receiving a broadcast signal.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The object of the present invention can be achieved by providing a method of processing transmission of a broadcast signal, the method including generating broadcast data for one or more broadcast services, generating first level signaling information including information for describing attribute for the one or more broadcast services, generating second level signaling information including information for listing the one or more broadcast service, generating link layer packets including the encoded broadcast data, the first level signaling information, and the second level signaling information, and generating a broadcast signal including the generated link layer packets, wherein the generated link layer packets further includes third level signaling information that is transmitted in a lower layer than an Internet protocol (IP) and is acquirable before a receiver acquires the first level signaling information and the second level signaling information, the generated link layer packets includes packet type information for identifying a type of data included in the link layer packets, the packet type information identifies a link layer packet including the third level signaling information among the link layer packets, and the third level signaling information includes first information for identifying a physical layer pipe (PLP) for transmitting the first level signaling information.

In another aspect of the present invention, provided herein is an apparatus for processing transmission of a broadcast signal, the apparatus including a data encoder configured to generate broadcast data for one or more broadcast services, a first level signaling encoder configured to generate first level signaling information including information for describing attribute for the one or more broadcast services, a second level signaling encoder configured to generate second level signaling information including information for listing the one or more broadcast services, a processor configured to generate link layer packets including the encoded broadcast data, the first level signaling information, and the second level signaling information, and a broadcast signal generator configured to generate broadcast signal including the generated link layer packets, wherein the generated link layer packets further include third level signaling information that is transmitted in a lower layer than an Internet protocol (IP) and is acquirable before a receiver acquires the first level signaling information and the second level signaling information, the generated link layer packets includes packet type information for identifying a type of data included in the link layer packets, the packet type information identifies a link layer packet including the third level signaling information among the link layer packets, and the third level signaling information includes first information for identifying a physical layer pipe (PLP) for transmitting the first level signaling information.

The second level signaling information may include service level signaling protocol type information for identifying whether a Real time Object delivery over Unidirectional Transport (ROUTE) protocol or a MPEG Media Transport (MMT) protocol is used in order to transmit the first level signaling information for each broadcast service of the one or more broadcast services.

The second level signaling information may further include URL information indicating a URL required to access a server for providing the first level signaling information transmitted through a broadband network or a server for providing an Electronic Service Guide (ESG) service.

The second level signaling information may further include URL type information indicating whether the URL indicated by the URL information is a URL for access to a server for providing the first level signaling information or a URL for access to an Electronic Service Guide (ESG) service.

The second level signaling information may further include provider identification information for identifying a broadcaster for providing the one or more broadcast services, and representative service identifier information for identifying a representative broadcast service of the broadcaster among the one or more broadcast services provided by the broadcaster identified by the provider identification information.

The second level signaling information may include broadcaster number information indicating the number of two or more broadcasters that share one RF frequency, and service group information for listing broadcast services provided by each of the two or more broadcasters.

The generated broadcast signal may further include fourth level signaling information including a transmission layer parameter required to transmit data included in the generated broadcast signal, and the fourth level signaling information may include second information for identifying a PLP for transmitting the second level signaling information.

Advantageous Effects

The present invention can accurately acquire information on services provided each broadcaster even when one or more broadcasters share one RF band (frequency).

The present invention may acquire signaling information required to acquire a service before a receiver process an IP layer and, thus, an unnecessary operation may not be necessarily performed in an IP layer and an upper layer thereof.

The present invention can control quality of service (QoS) with respect to services or service components by processing data on the basis of service characteristics, thereby providing various broadcast services.

The present invention can achieve transmission flexibility by transmitting various broadcast services through the same radio frequency (RF) signal bandwidth.

The present invention can provide methods and apparatuses for transmitting and receiving broadcast signals, which enable digital broadcast signals to be received without error even when a mobile reception device is used or even in an indoor environment.

The present invention can effectively support future broadcast services in an environment supporting future hybrid broadcasting using terrestrial broadcast networks and the Internet.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a relation between an SLT and service layer signaling (SLS) according to an embodiment of the present invention;

FIG. 3 illustrates an SLT according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention;

FIG. 13 illustrates an example of adaptation modes in IP header compression according to an embodiment of the present invention (transmitting side);

FIG. 14 illustrates a link mapping table (LMT) and an RoHC-U description table according to an embodiment of the present invention;

FIG. 24 is a table illustrating PLS1 data according to an embodiment of the present invention;

FIG. 25 is a table illustrating PLS2 data according to an embodiment of the present invention;

FIG. 33 illustrates a main PRBS used for all FFT modes according to an embodiment of the present invention;

FIG. 34 illustrates a sub-PRBS used for FFT modes and an interleaving address for frequency interleaving according to an embodiment of the present invention;

FIG. 35 illustrates a write operation of a time interleaver according to an embodiment of the present invention;

FIG. 36 is a table illustrating an interleaving type applied according to the number of PLPs;

FIG. 37 is a block diagram including a first example of a structure of a hybrid time interleaver;

FIG. 38 is a block diagram including a second example of the structure of the hybrid time interleaver;

FIG. 47 is a diagram illustrating definition according to a type of an organication of a link layer according to an embodiment of the present invention;

FIG. 53 is a diagram illustrating syntax of a fast information channel (FIC) according to an embodiment of the present invention;

FIG. 54 is a diagram illustrating syntax of an Emergency Alert Table (EAT) according to an embodiment of the present invention;

FIG. 58 is a diagram illustrating syntax of an FIC according to another embodiment of the present invention;

FIG. 59 is a diagram illustrating signaling_Information_Part( ) according to an embodiment of the present invention;

FIG. 61 is a is a diagram illustrating an operation in a link layer according to a value of a flag and a form of a packet transmitted to a physical layer according to an embodiment of the present invention;

FIG. 62 is a diagram illustrating a descriptor for signaling a mode control parameter according to an embodiment of the present invention;

FIG. 65 is a diagram illustrating information for identifying an encapsulation mode according to an embodiment of the present invention;

FIG. 66 is a diagram illustrating information for identifying a header compression mode according to an embodiment of the present invention;

FIG. 67 is a diagram illustrating information for identifying a packet reconfiguration mode according to an embodiment of the present invention;

FIG. 68 is a diagram illustrating a context transmission mode according to an embodiment of the present invention;

FIG. 69 is a diagram illustrating initialization information when RoHC is applied using a header compression method according to an embodiment of the present invention;

FIG. 70 is a diagram illustrating information for identifying link layer signaling path configuration according to an embodiment of the present invention;

FIG. 71 is a diagram illustrating information on configuration of a signaling path via a bit mapping method according to an embodiment of the present invention;

FIG. 74 is a diagram illustrating a signaling format for transmitting an initialization parameter according to an embodiment of the present invention FIG. 75 is a diagram illustrating a signaling format for transmitting an initialization parameter according to another embodiment of the present invention;

FIG. 76 is a diagram illustrating a signaling format for transmitting an initialization parameter according to another embodiment of the present invention;

FIG. 83 is a diagram illustrating a format of data transmitted through a dedicated channel according to an embodiment of the present invention;

FIG. 84 is a diagram illustrating dedicated channel configuration information for signaling information on a dedicated channel according to an embodiment of the present invention;

FIG. 92 is a diagram illustrating an FIT according to an embodiment of the present invention;

FIG. 93 is a diagram illustrating a location of a descriptor to be included in signaling for a broadcast system according to an embodiment of the present invention;

FIG. 94 is a diagram illustrating broadcast_signaling_location_descriptor( ) according to an embodiment of the present invention;

FIG. 95 is a diagram illustrating meaning of inet_signaling_location_descriptor( ) and URL_type information according to an embodiment of the present invention FIG. 96 is a diagram illustrating a query term using URL_bytes information of inet_signaling_location_descriptor( ) according to an embodiment of the present invention;

FIG. 97 is a diagram illustrating capability_descriptor( ) according to an embodiment of the present invention;

FIG. 98 is a diagram illustrating an FIT defined in XML according to an embodiment of the present invention;

FIG. 100 is a diagram illustrating a User Service Bundle Description (USBD) according to an embodiment of the present invention.

FIG. 101 is a diagram illustrating a S-TSID according to an embodiment of the present invention;

FIG. 102 is a diagram illustrating ATSC_physical_layer_pipe_identifier_descriptor( ) according to an embodiment of the present invention.

FIG. 112 is a diagram illustrating meaning of an LCT Transport Object Identifier (TOI) field for filtering of a signaling fragment and information included in the field according to an embodiment of the present invention FIG. 113 is a diagram illustrating XML form of MetadataEnvelope for applying template-based compression to signaling according to an embodiment of the present invention;

FIG. 115 is a diagram illustrating Signaling_on_inet_descriptor( ) according to another embodiment of the present invention FIG. 116 is a diagram illustrating an FIT defined in XML according to another embodiment of the present invention FIG. 117 is a diagram illustrating meaning indicated by URL_type information according to an embodiment of the present invention;

FIG. 118 is a diagram illustrating a section of a Service List Table (SLT) according to an embodiment of the present invention;

FIG. 119 is a diagram illustrating a descriptor included in an SLT and a location thereof according to an embodiment of the present invention. The TSID information may identify a transport stream for transmitting service signaling (e.g., PSI/PSIP);

FIG. 120 is a diagram illustrating service_language_descriptor( ) and representative_service_descriptor( ) according to an embodiment of the present invention;

FIG. 121 is a diagram illustrating service_group_descriptor( ) according to an embodiment of the present invention;

FIG. 122 is a diagram illustrating service_group_descriptor( ) according to another embodiment of the present invention;

FIG. 123 is a diagram illustrating service_group_descriptor( ) according to another embodiment of the present invention;

FIG. 124 is a diagram illustrating service_provider_descriptor( ) according to an embodiment of the present invention;

FIG. 125 is a diagram illustrating a service list table defined in the form of XML according to an embodiment of the present invention;

FIG. 126 is a diagram illustrating InetSigLocation element, Representative Service element, ServiceGroup element, and Service Provider element according to an embodiment of the present invention;

FIG. 127 is a diagram illustrating signaling by a service list table during conversion into a next-generation broadcast system from a typical broadcast system, according to an embodiment of the present invention;

FIG. 128 is a diagram illustrating signaling using service_group_descriptor ( ) included in a service list table when a plurality of broadcasters share a frequency according to an embodiment of the present invention;

FIG. 129 is a flowchart illustrating of processing transmission of a broadcast signal according to an embodiment of the present invention; and FIG. 130 is a diagram illustrating a broadcast system according to an embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
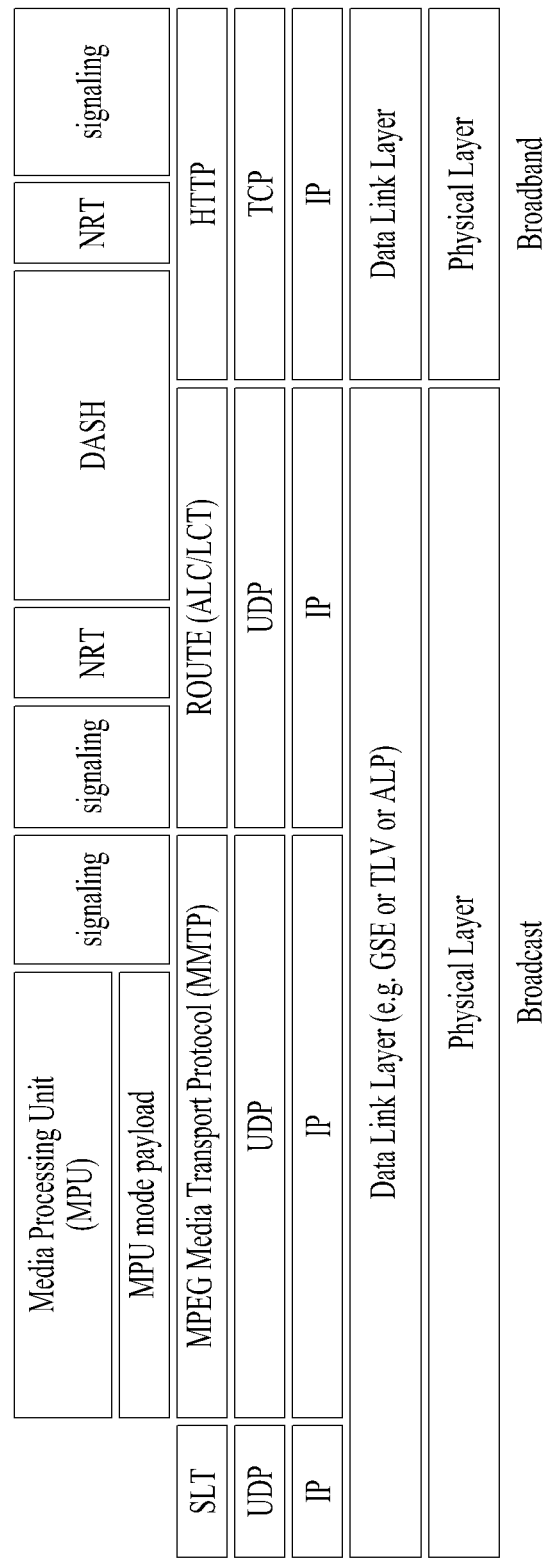
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel. Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this sit instance. According to a given embodiment, a value of this field may have be a three-character language code defined in the ISO. This field may be omitted.

@capabilities can indicate required capabilities for decoding and meaningfully presenting the content for all the services in this sit instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

Figure 4:
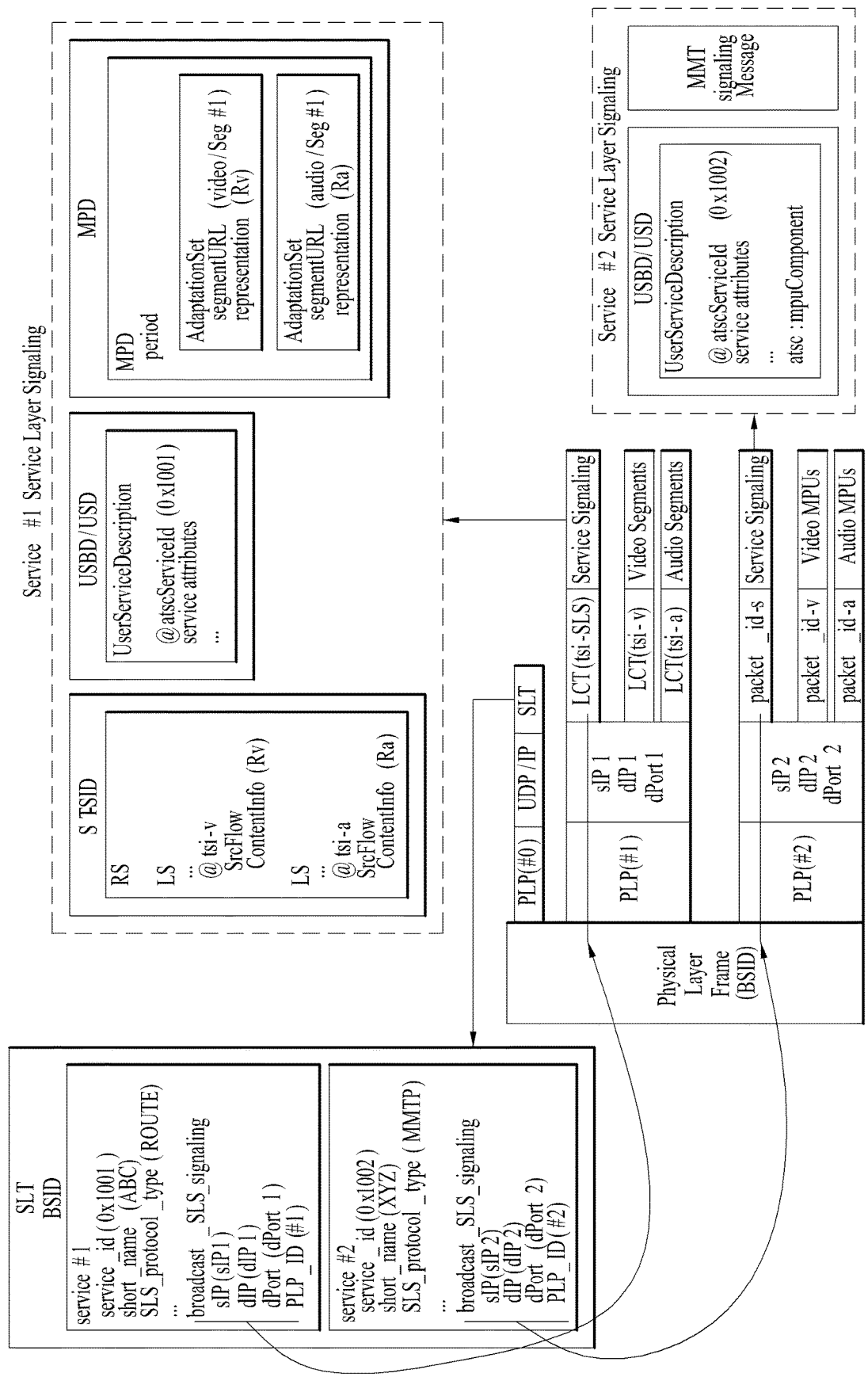
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's MPT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @dIpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service. (default: current physical layer pipe).

@sTSIDDestinationIpAddress can be a string containing the dotted-IPv4 destination address of the packets carrying S-TSID for this service. (default: current MMTP session's source IP address)

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset_id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ): This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

Figure 8:
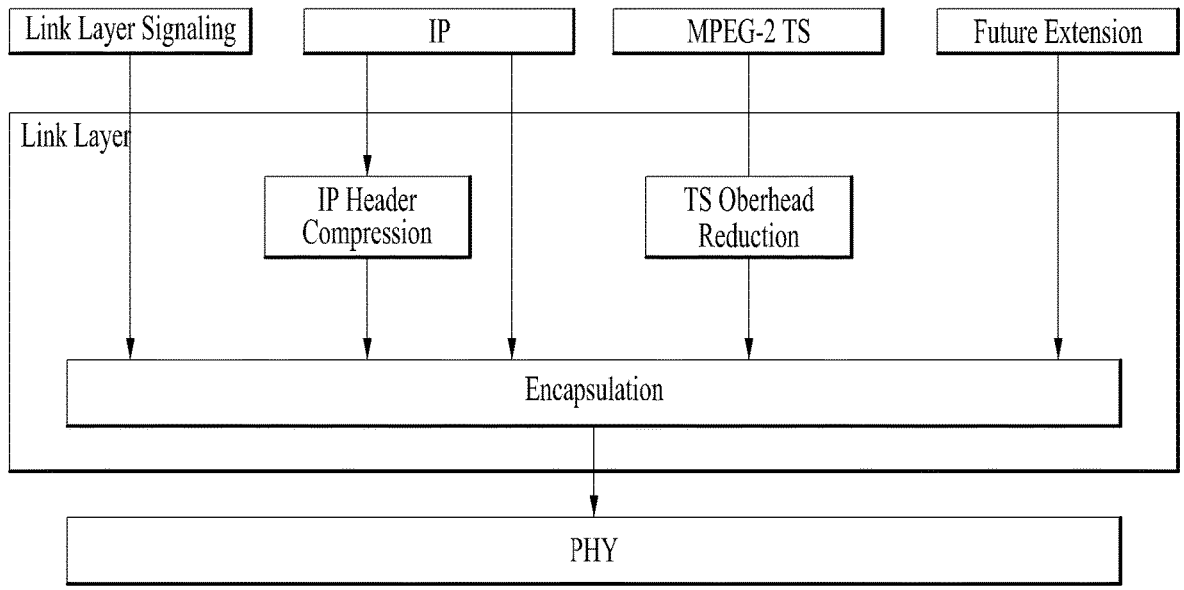
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
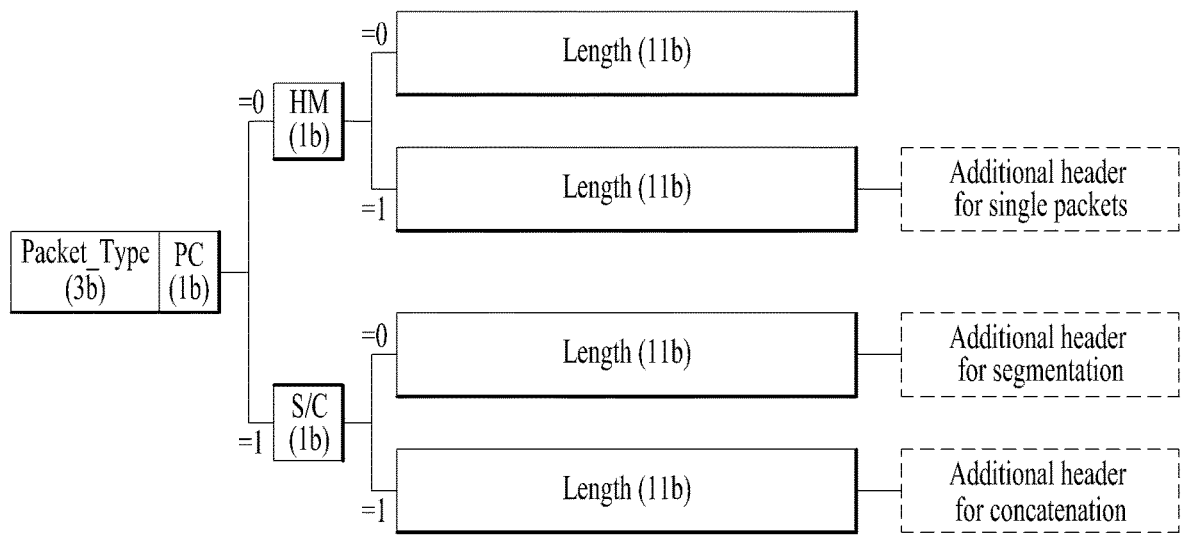
FIG. 9 illustrates a structure of a base header of a link layer packet according to an embodiment of the present invention.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is "000", "001" "100" or "111", that is the original data type of an ALP packet is one of an IPv4 packet, a compressed IP packet, link layer signaling or extension packet. When the MPEG-2 TS packet is encapsulated, the value of Packet_Type can be "010". Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be a 11-bit field that indicates the 11 least significant bits (LSBs) of the length in bytes of payload carried by the link layer packet. When there is a Length_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

Figure 10:
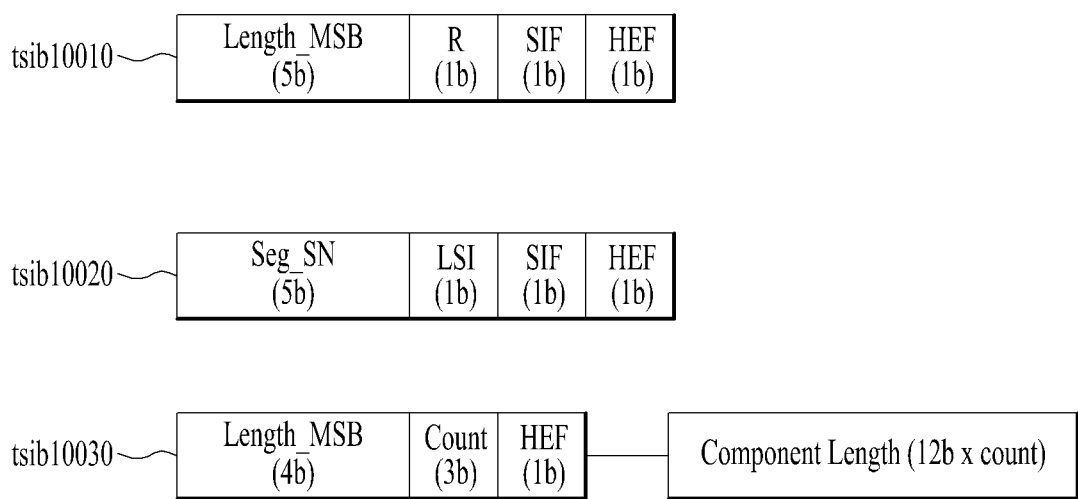
FIG. 10 illustrates a structure of an additional header of a link layer packet according to an embodiment of the present invention.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header_Mode (HM)="1". The Header_Mode (HM) can be set to 1 when the length of the payload of the link layer packet is larger than 2047 bytes or when the optional fields are used. The additional header for single packet is shown in Figure (tsib10010).

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation_Concatenation (S/C)="0". Segment_Sequence_Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be a 8-bit field that can indicate the sub stream identifier for the link layer packet. If there is optional header extension, SID present between additional header and optional header extension.

Header_Extension ( ) can include the fields defined below.

Extension_Type can be an 8-bit field that can indicate the type of the Header_Extension ( ).

Extension_Length can be a 8-bit field that can indicate the length of the Header Extension ( ) in bytes counting from the next byte to the last byte of the Header_Extension ( ).

Extension_Byte can be a byte representing the value of the Header_Extension ( ).

Figure 11:
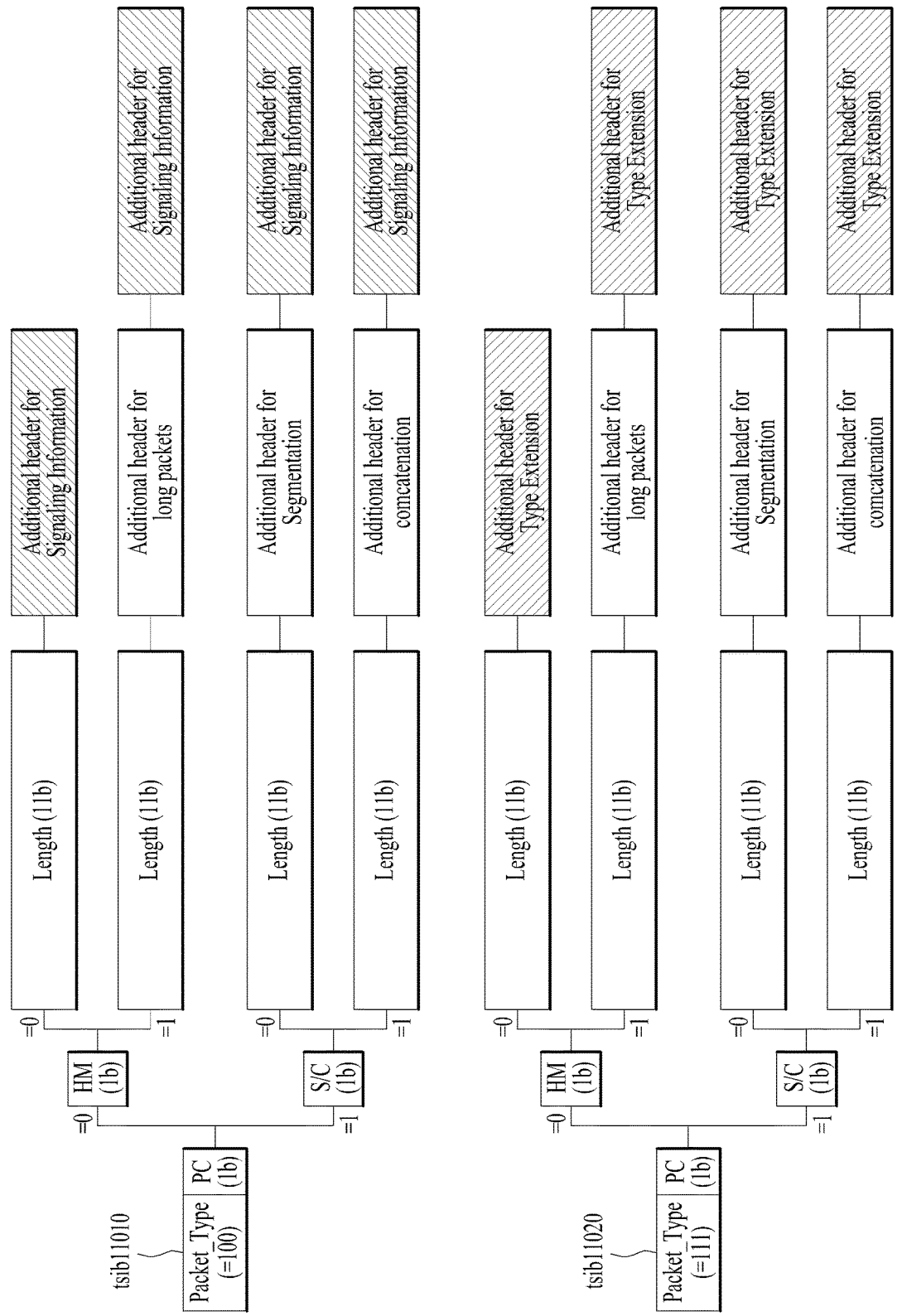
FIG. 11 illustrates a structure of an additional header of a link layer packet according to another embodiment of the present invention.

FIG. 11 illustrates a structure of an additional header of a link layer packet according to another embodiment of the present invention.

Hereinafter, a description will be given of an additional header for signaling information.

How link layer signaling is incorporated into link layer packets are as follows. Signaling packets are identified by when the Packet_Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields. According to a given embodiment, some fields may be omitted.

Signaling_Type can be an 8-bit field that can indicate the type of signaling.

Signaling_Type_Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet_type is 111 in the base header as described above. Figure (tsib11020) shows the structure of the link layer packets containing additional header for type extension.

The additional header for type extension can include following fields. According to a given embodiment, some fields may be omitted.

extended_type can be a 16-bit field that can indicate the protocol or packet type of the input encapsulated in the link layer packet as payload. This field cannot be used for any protocol or packet type already defined by Packet_Type field.

Figure 12:
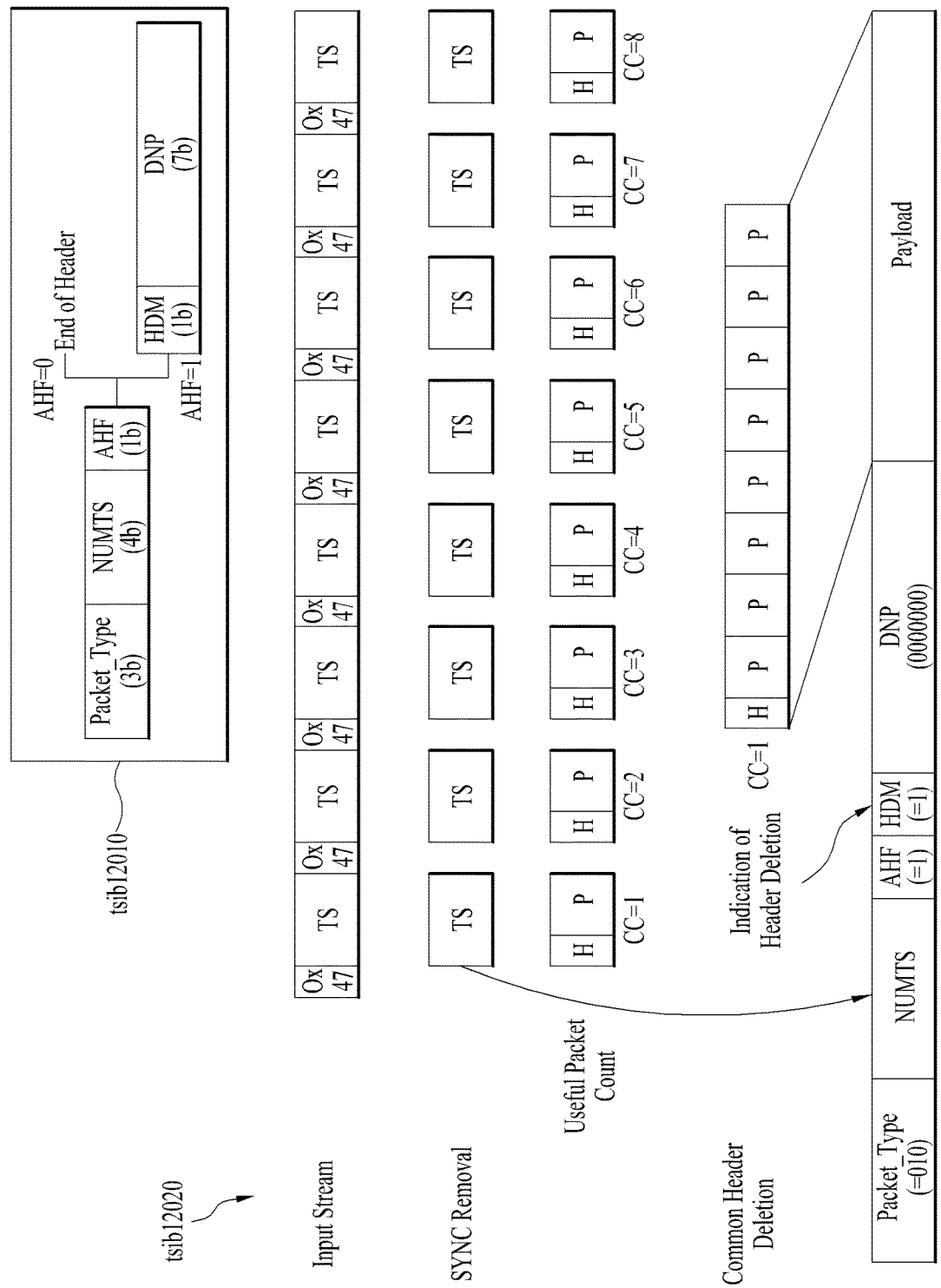
FIG. 12 illustrates a header structure of a link layer packet for an MPEG-2 TS packet and an encapsulation process thereof according to an embodiment of the present invention.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion. According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet_Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "O" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces the size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirectional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling In Adaptation Mode 2 (tsib13010), the adaptation module can detect the IR packet from ROHC packet flow and extract the context information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to "100".

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling_type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit Boolean field that indicates whether the header compression is applied the link layer packets carrying the upper layer session identified by above 4 fields, Src_IP_add, Dst_IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context_ID field can be present.

SID can be an 8-bit unsigned integer field that indicates sub stream identifier for the link layer packets carrying the upper layer session identified by above 4 fields, Src_IP_add, Dst_IP_add, Src_UDP_Port and Dst_UDP_Port. This field can be present when the value of SID_flag is equal to 1.

context_id can be an 8-bit field that provides a reference for the context id (CID) provided in the ROHC-U description table. This field can be present when the value of compressed_flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to "0x02".

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to "0x0". If the static_chain( ) or dynamic_chain( ) byte is included in this table, this field may be set to "0x01" or "0x02" respectively. If both of the static_chain( ) and dynamic_chain( ) byte are included in this table, this field may be set to "0x03".

context_length can be an 8-bit field that indicates the length of the static chain byte sequence. This field can be omitted.

static_chain_byte ( ) can be a field that conveys the static information used to initialize the ROHC-U decompressor. The size and structure of this field depend on the context profile.

dynamic_chain_byte ( ) can be a field that conveys the dynamic information used to initialize the ROHC-U decompressor. The size and structure of this field depend on the context profile.

The static_chain_byte can be defined as sub-header information of IR packet. The dynamic_chain_byte can be defined as sub-header information of IR packet and IR-DYN packet.

Figure 15:
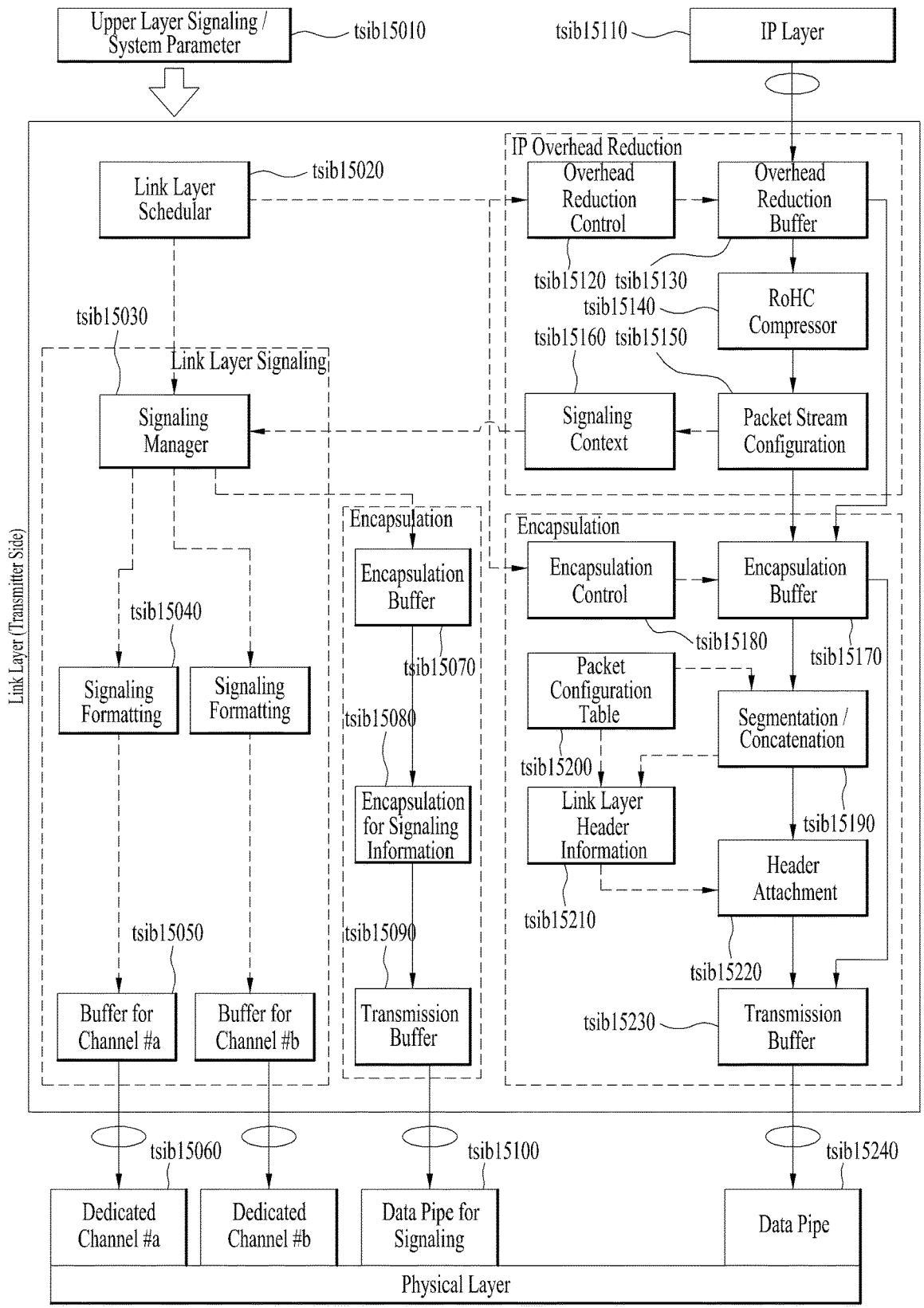
FIG. 15 illustrates a structure of a link layer on a transmitter side according to an embodiment of the present invention.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be filterer or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel. A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160. The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

Figure 16:
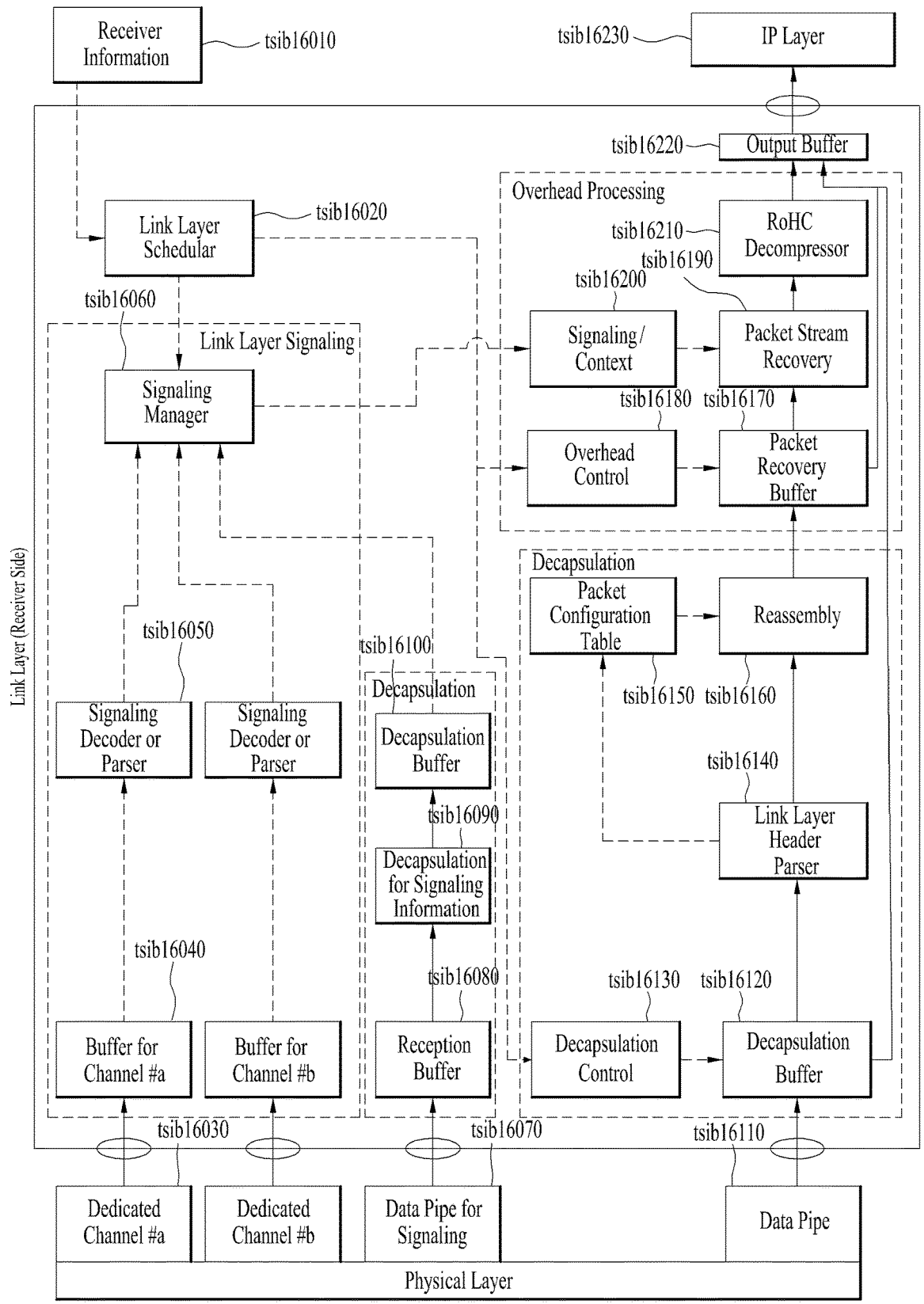
FIG. 16 illustrates a structure of a link layer on a receiver side according to an embodiment of the present invention.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream. This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

Figure 17:
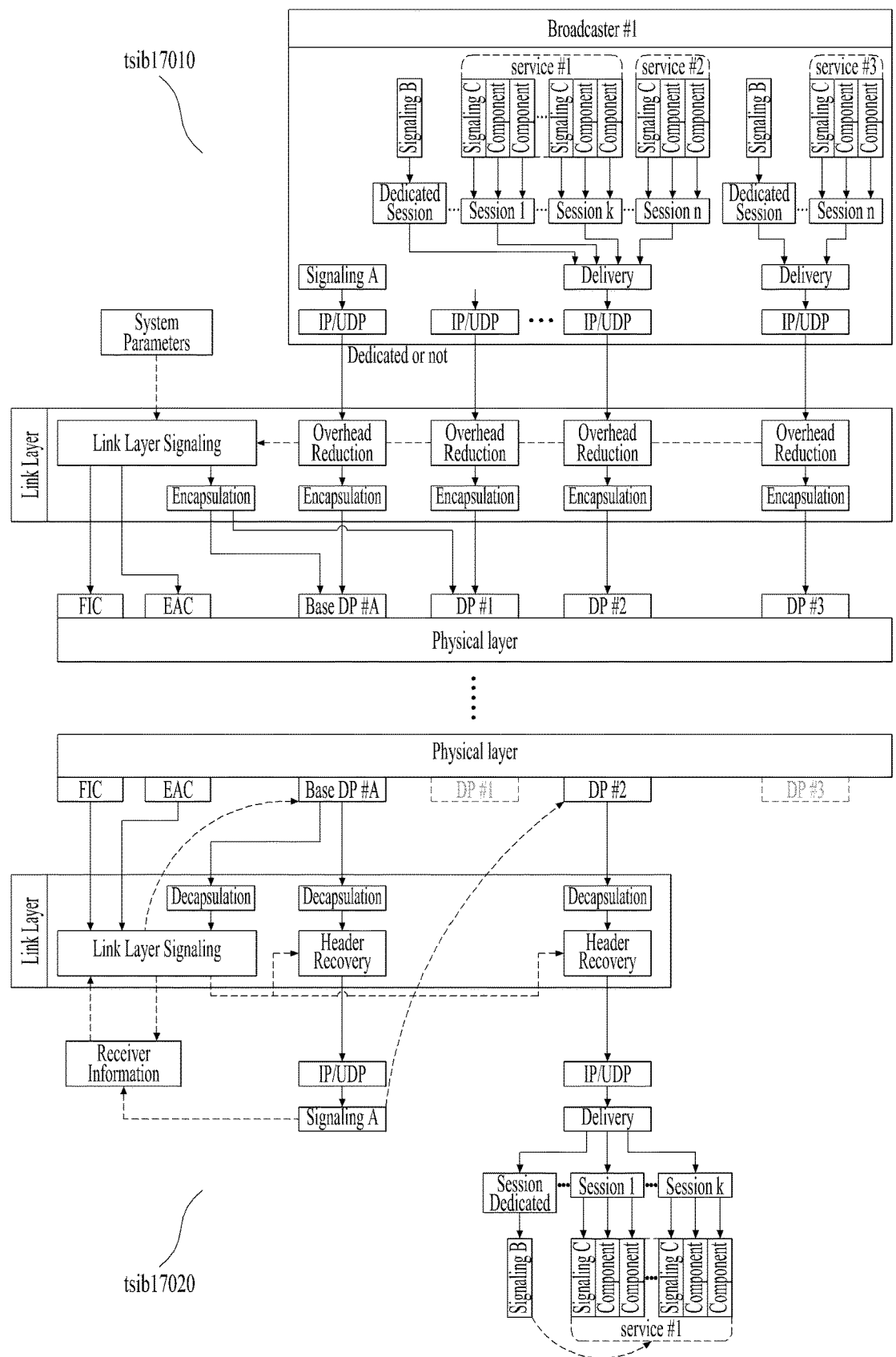
FIG. 17 illustrates a configuration of signaling transmission through a link layer according to an embodiment of the present invention (transmitting/receiving sides)

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, . . . ). In general, a signal for a service may be transmitted through a general transmission session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transmission session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

While MISO or MIMO uses two antennas in the following for convenience of description, the present invention is applicable to systems using two or more antennas. The present invention proposes a physical profile (or system) optimized to minimize receiver complexity while attaining the performance required for a particular use case. Physical (PHY) profiles (base, handheld and advanced profiles) according to an embodiment of the present invention are subsets of all configurations that a corresponding receiver should implement. The PHY profiles share most of the functional blocks but differ slightly in specific blocks and/or parameters. For the system evolution, future profiles may also be multiplexed with existing profiles in a single radio frequency (RF) channel through a future extension frame (FEF). The base profile and the handheld profile according to the embodiment of the present invention refer to profiles to which MIMO is not applied, and the advanced profile refers to a profile to which MIMO is applied. The base profile may be used as a profile for both the terrestrial broadcast service and the mobile broadcast service. That is, the base profile may be used to define a concept of a profile which includes the mobile profile. In addition, the advanced profile may be divided into an advanced profile for a base profile with MIMO and an advanced profile for a handheld profile with MIMO. Moreover, the profiles may be changed according to intention of the designer.

The following terms and definitions may be applied to the present invention. The following terms and definitions may be changed according to design.

Auxiliary stream: sequence of cells carrying data of as yet undefined modulation and coding, which may be used for future extensions or as required by broadcasters or network operators Base data pipe: data pipe that carries service signaling data Baseband frame (or BBFRAME): set of Kbch bits which form the input to one FEC encoding process (BCH and LDPC encoding)

Cell: modulation value that is carried by one carrier of orthogonal frequency division multiplexing (OFDM) transmission Coded block: LDPC-encoded block of PLS1 data or one of the LDPC-encoded blocks of PLS2 data Data pipe: logical channel in the physical layer that carries service data or related metadata, which may carry one or a plurality of service(s) or service component(s).

Data pipe unit (DPU): a basic unit for allocating data cells to a DP in a frame.

Data symbol: OFDM symbol in a frame which is not a preamble symbol (the data symbol encompasses the frame signaling symbol and frame edge symbol)

DP_ID: this 8-bit field identifies uniquely a DP within the system identified by the SYSTEM_ID Dummy cell: cell carrying a pseudo-random value used to fill the remaining capacity not used for PLS signaling, DPs or auxiliary streams Emergency alert channel (EAC): part of a frame that carries EAS information data Frame: physical layer time slot that starts with a preamble and ends with a frame edge symbol Frame repetition unit: a set of frames belonging to the same or different physical layer profiles including an FEF, which is repeated eight times in a superframe Fast information channel (FIC): a logical channel in a frame that carries mapping information between a service and the corresponding base DP FECBLOCK: set of LDPC-encoded bits of DP data FFT size: nominal FFT size used for a particular mode, equal to the active symbol period Ts expressed in cycles of an elementary period T Frame signaling symbol: OFDM symbol with higher pilot density used at the start of a frame in certain combinations of FFT size, guard interval and scattered pilot pattern, which carries a part of the PLS data Frame edge symbol: OFDM symbol with higher pilot density used at the end of a frame in certain combinations of FFT size, guard interval and scattered pilot pattern Frame group: the set of all frames having the same PHY profile type in a superframe Future extension frame: physical layer time slot within the superframe that may be used for future extension, which starts with a preamble Futurecast UTB system: proposed physical layer broadcast system, the input of which is one or more MPEG2-TS, IP or general stream(s) and the output of which is an RF signal Input stream: a stream of data for an ensemble of services delivered to the end users by the system Normal data symbol: data symbol excluding the frame signaling symbol and the frame edge symbol PHY profile: subset of all configurations that a corresponding receiver should implement PLS: physical layer signaling data including PLS1 and PLS2

PLS1: a first set of PLS data carried in a frame signaling symbol (FSS) having a fixed size, coding and modulation, which carries basic information about a system as well as parameters needed to decode PLS2

NOTE: PLS1 data remains constant for the duration of a frame group

PLS2: a second set of PLS data transmitted in the FSS, which carries more detailed PLS data about the system and the DPs PLS2 dynamic data: PLS2 data that dynamically changes frame-by-frame PLS2 static data: PLS2 data that remains static for the duration of a frame group Preamble signaling data: signaling data carried by the preamble symbol and used to identify the basic mode of the system Preamble symbol: fixed-length pilot symbol that carries basic PLS data and is located at the beginning of a frame The preamble symbol is mainly used for fast initial band scan to detect the system signal, timing thereof, frequency offset, and FFT size.

Reserved for future use: not defined by the present document but may be defined in future Superframe: set of eight frame repetition units Time interleaving block (TI block): set of cells within which time interleaving is carried out, corresponding to one use of a time interleaver memory TI group: unit over which dynamic capacity allocation for a particular DP is carried out, made up of an integer, dynamically varying number of XFECBLOCKs NOTE: The TI group may be mapped directly to one frame or may be mapped to a plurality of frames. The TI group may contain one or more TI blocks.

Figure 18:
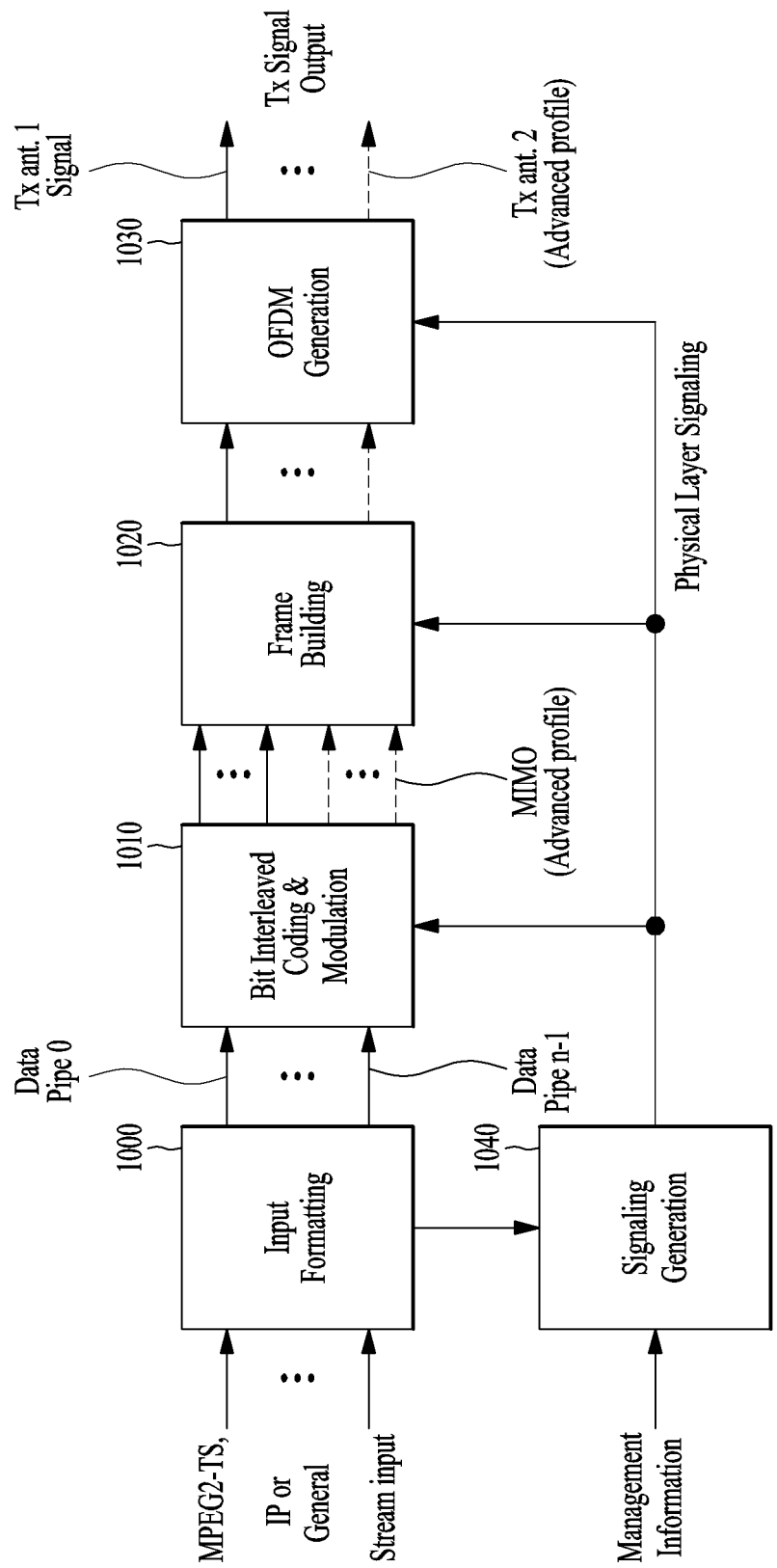
FIG. 18 is a block diagram illustrating a configuration of a broadcast signal transmission apparatus for future broadcast services according to an embodiment of the present invention.

Type 1 DP: DP of a frame where all DPs are mapped to the frame in time division multiplexing (TDM) scheme Type 2 DP: DP of a frame where all DPs are mapped to the frame in frequency division multiplexing (FDM) scheme XFECBLOCK: set of Ncells cells carrying all the bits of one LDPC FECBLOCK FIG. 18 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams. In addition to these data inputs, management information is input to control scheduling and allocation of the corresponding bandwidth for each input stream. In addition, the present invention allows simultaneous input of one or a plurality of TS streams, IP stream(s) and/or a general stream(s).

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

In addition, a DPU is a basic unit for allocating data cells to a DP in one frame.

An input to the physical layer may include one or a plurality of data streams. Each of the data streams is delivered by one DP. The input formatting block 1000 may covert a data stream input through one or more physical paths (or DPs) into a baseband frame (BBF). In this case, the input formatting block 1000 may perform null packet deletion or header compression on input data (a TS or IP input stream) in order to enhance transmission efficiency. A receiver may have a priori information for a particular part of a header, and thus this known information may be deleted from a transmitter. A null packet deletion block 3030 may be used only for a TS input stream.

In the BICM block 1010, parity data is added for error correction and encoded bit streams are mapped to complex-value constellation symbols. The symbols are interleaved across a specific interleaving depth that is used for the corresponding DP. For the advanced profile, MIMO encoding is performed in the BICM block 1010 and an additional data path is added at the output for MIMO transmission.

The frame building block 1020 may map the data cells of the input DPs into the OFDM symbols within a frame, and perform frequency interleaving for frequency-domain diversity, especially to combat frequency-selective fading channels. The frame building block 1020 may include a delay compensation block, a cell mapper and a frequency interleaver.

The delay compensation block may adjust timing between DPs and corresponding PLS data to ensure that the DPs and the corresponding PLS data are co-timed at a transmitter side. The PLS data is delayed by the same amount as the data pipes by addressing the delays of data pipes caused by the input formatting block and BICM block. The delay of the BICM block is mainly due to the time interleaver. In-band signaling data carries information of the next TI group so that the information is carried one frame ahead of the DPs to be signaled. The delay compensation block delays in-band signaling data accordingly.

The cell mapper may map PLS, DPs, auxiliary streams, dummy cells, etc. to active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. A basic function of the cell mapper is to map a data cell generated by time interleaving for each DP and PLS cell to an array of active OFDM cells (if present) corresponding to respective OFDM symbols in one frame. Service signaling data (such as program specific information (PSI)/SI) may be separately gathered and sent by a DP. The cell mapper operates according to dynamic information produced by a scheduler and the configuration of a frame structure. The frequency interleaver may randomly interleave data cells received from the cell mapper to provide frequency diversity. In addition, the frequency interleaver may operate on an OFDM symbol pair including two sequential OFDM symbols using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

Specifically, after inserting a preamble at the beginning of each frame, the OFDM generation block 1030 may apply conventional OFDM modulation having a cyclic prefix as a guard interval. For antenna space diversity, a distributed MISO scheme is applied across transmitters. In addition, a PAPR scheme is performed in the time domain. For flexible network planning, the present invention provides a set of various FFT sizes, guard interval lengths and corresponding pilot patterns.

In addition, the present invention may multiplex signals of a plurality of broadcast transmission/reception systems in the time domain such that data of two or more different broadcast transmission/reception systems providing broadcast services may be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

The signaling generation block 1040 may create physical layer signaling information used for an operation of each functional block. This signaling information is also transmitted so that services of interest are properly recovered at a receiver side. Signaling information according to an embodiment of the present invention may include PLS data. PLS provides the receiver with a means to access physical layer DPs. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame. Details of the PLS data will be described later.

The above-described blocks may be omitted or replaced by blocks having similar or identical functions.

Figure 19:
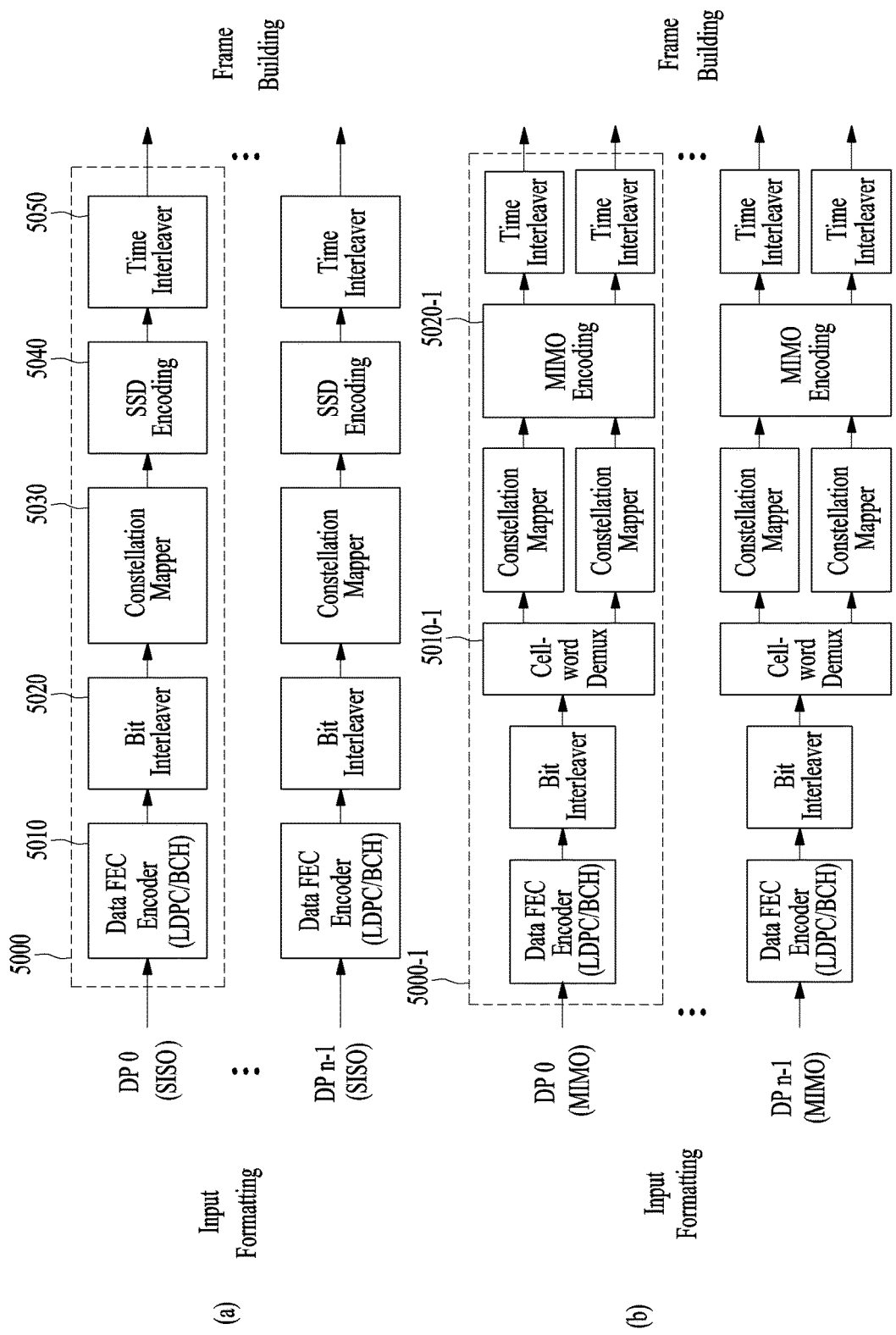
FIG. 19 is a block diagram illustrating a bit interleaved coding & modulation (BICM) block according to an embodiment of the present invention.

FIG. 19 illustrates a BICM block according to an embodiment of the present invention.

The BICM block illustrated in FIG. 19 corresponds to an embodiment of the BICM block 1010 described with reference to FIG. 18.

As described above, the broadcast signal transmission apparatus for future broadcast services according to the embodiment of the present invention may provide a terrestrial broadcast service, mobile broadcast service, UHDTV service, etc.

Since QoS depends on characteristics of a service provided by the broadcast signal transmission apparatus for future broadcast services according to the embodiment of the present invention, data corresponding to respective services needs to be processed using different schemes. Accordingly, the BICM block according to the embodiment of the present invention may independently process respective DPs by independently applying SISO, MISO and MIMO schemes to data pipes respectively corresponding to data paths. Consequently, the broadcast signal transmission apparatus for future broadcast services according to the embodiment of the present invention may control QoS for each service or service component transmitted through each DP.

(a) shows a BICM block applied to a profile (or system) to which MIMO is not applied, and (b) shows a BICM block of a profile (or system) to which MIMO is applied.

The BICM block to which MIMO is not applied and the BICM block to which MIMO is applied may include a plurality of processing blocks for processing each DP.

Description will be given of each processing block of the BICM block to which MIMO is not applied and the BICM block to which MIMO is applied.

A processing block 5000 of the BICM block to which MIMO is not applied may include a data FEC encoder 5010, a bit interleaver 5020, a constellation mapper 5030, a signal space diversity (SSD) encoding block 5040 and a time interleaver 5050.

The data FEC encoder 5010 performs FEC encoding on an input BBF to generate FECBLOCK procedure using outer coding (BCH) and inner coding (LDPC). The outer coding (BCH) is optional coding method. A detailed operation of the data FEC encoder 5010 will be described later.

The bit interleaver 5020 may interleave outputs of the data FEC encoder 5010 to achieve optimized performance with a combination of LDPC codes and a modulation scheme while providing an efficiently implementable structure. A detailed operation of the bit interleaver 5020 will be described later.

The constellation mapper 5030 may modulate each cell word from the bit interleaver 5020 in the base and the handheld profiles, or each cell word from the cell-word demultiplexer 5010-1 in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point, el. This constellation mapping is applied only for DPs. It is observed that QAM-16 and NUQs are square shaped, while NUCs have arbitrary shapes. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in the PLS2 data.

The time interleaver 5050 may operates at a DP level. Parameters of time interleaving (TI) may be set differently for each DP. A detailed operation of the time interleaver 5050 will be described later.

A processing block 5000-1 of the BICM block to which MIMO is applied may include the data FEC encoder, the bit interleaver, the constellation mapper, and the time interleaver.

However, the processing block 5000-1 is distinguished from the processing block 5000 of the BICM block to which MIMO is not applied in that the processing block 5000-1 further includes a cell-word demultiplexer 5010-1 and a MIMO encoding block 5020-1.

In addition, operations of the data FEC encoder, the bit interleaver, the constellation mapper, and the time interleaver in the processing block 5000-1 correspond to those of the data FEC encoder 5010, the bit interleaver 5020, the constellation mapper 5030, and the time interleaver 5050 described above, and thus description thereof is omitted.

The cell-word demultiplexer 5010-1 is used for a DP of the advanced profile to divide a single cell-word stream into dual cell-word streams for MIMO processing.

The MIMO encoding block 5020-1 may process an output of the cell-word demultiplexer 5010-1 using a MIMO encoding scheme. The MIMO encoding scheme is optimized for broadcast signal transmission. MIMO technology is a promising way to obtain a capacity increase but depends on channel characteristics. Especially for broadcasting, a strong LOS component of a channel or a difference in received signal power between two antennas caused by different signal propagation characteristics makes it difficult to obtain capacity gain from MIMO. The proposed MIMO encoding scheme overcomes this problem using rotation-based precoding and phase randomization of one of MIMO output signals.

MIMO encoding is intended for a 2×2 MIMO system requiring at least two antennas at both the transmitter and the receiver. A MIMO encoding mode of the present invention may be defined as full-rate spatial multiplexing (FR-SM). FR-SM encoding may provide capacity increase with relatively small complexity increase at the receiver side. In addition, the MIMO encoding scheme of the present invention has no restriction on an antenna polarity configuration.

MIMO processing is applied at the DP level. NUQ (e1,i and e2,i) corresponding to a pair of constellation mapper outputs is fed to an input of a MIMO encoder. Paired MIMO encoder output (g1,i and g2,i) is transmitted by the same carrier k and OFDM symbol 1 of respective TX antennas thereof.

The above-described blocks may be omitted or replaced by blocks having similar or identical functions.

Figure 20:
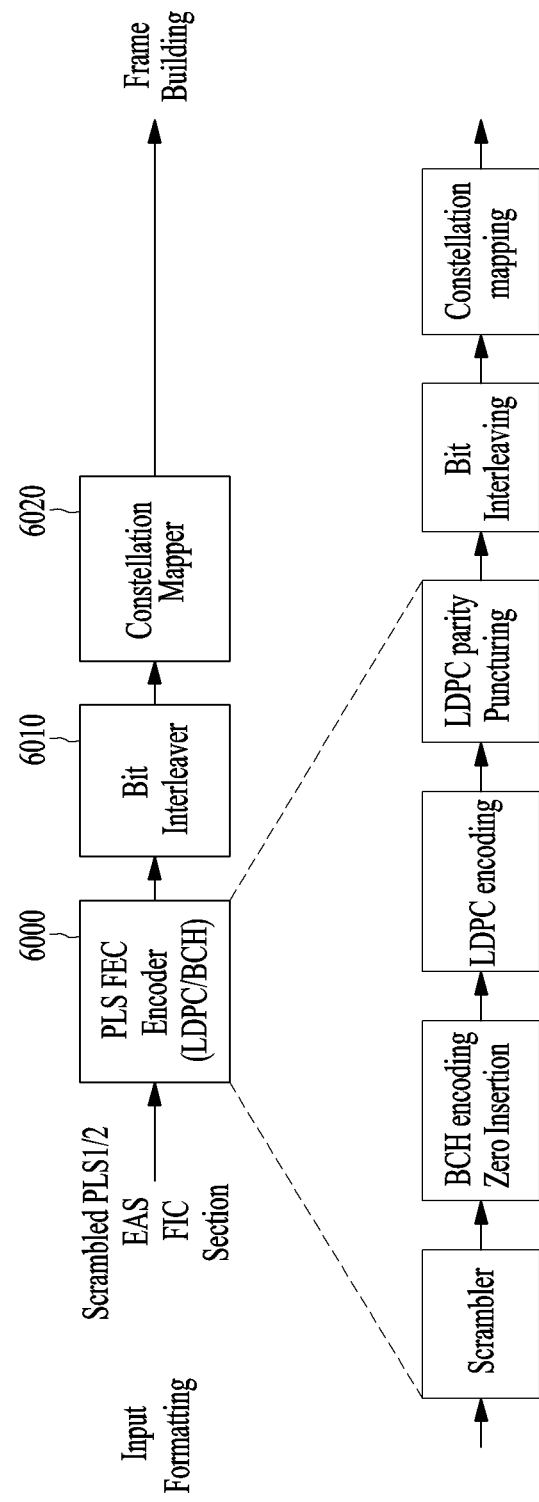
FIG. 20 is a block diagram illustrating a BICM block according to another embodiment of the present invention.

FIG. 20 illustrates a BICM block according to another embodiment of the present invention.

The BICM block illustrated in FIG. 20 corresponds to another embodiment of the BICM block 1010 described with reference to FIG. 18.

FIG. 20 illustrates a BICM block for protection of physical layer signaling (PLS), an emergency alert channel (EAC) and a fast information channel (FIC). The EAC is a part of a frame that carries EAS information data, and the FIC is a logical channel in a frame that carries mapping information between a service and a corresponding base DP. Details of the EAC and FIC will be described later.

Referring to FIG. 20, the BICM block for protection of the PLS, the EAC and the FIC may include a PLS FEC encoder 6000, a bit interleaver 6010 and a constellation mapper 6020.

In addition, the PLS FEC encoder 6000 may include a scrambler, a BCH encoding/zero insertion block, an LDPC encoding block and an LDPC parity puncturing block. Description will be given of each block of the BICM block.

The PLS FEC encoder 6000 may encode scrambled PLS1/2 data, EAC and FIC sections.

The scrambler may scramble PLS1 data and PLS2 data before BCH encoding and shortened and punctured LDPC encoding.

The BCH encoding/zero insertion block may perform outer encoding on the scrambled PLS1/2 data using a shortened BCH code for PLS protection, and insert zero bits after BCH encoding. For PLS1 data only, output bits of zero insertion may be permutted before LDPC encoding.

The LDPC encoding block may encode an output of the BCH encoding/zero insertion block using an LDPC code. To generate a complete coded block, Cldpc and parity bits Pldpc are encoded systematically from each zero-inserted PLS information block Ildpc and appended thereto.

$$C_{ldpc} = [I_{ldpc} P_{ldpc}] = [i_0, i_1, \ldots, i_{K_{ldpc}-1},$$
$$p_0, p_1, \ldots, p_{N_{ldpc}-K_{ldpc}-1}] \quad \text{[Equation 1]}$$

The LDPC parity puncturing block may perform puncturing on the PLS1 data and the PLS2 data.

When shortening is applied to PLS1 data protection, some LDPC parity bits are punctured after LDPC encoding. In addition, for PLS2 data protection, LDPC parity bits of PLS2 are punctured after LDPC encoding. These punctured bits are not transmitted.

The bit interleaver 6010 may interleave each of shortened and punctured PLS1 data and PLS2 data.

The constellation mapper 6020 may map the bit-ineterleaved PLS1 data and PLS2 data to constellations.

The above-described blocks may be omitted or replaced by blocks having similar or identical functions.

Figure 21:
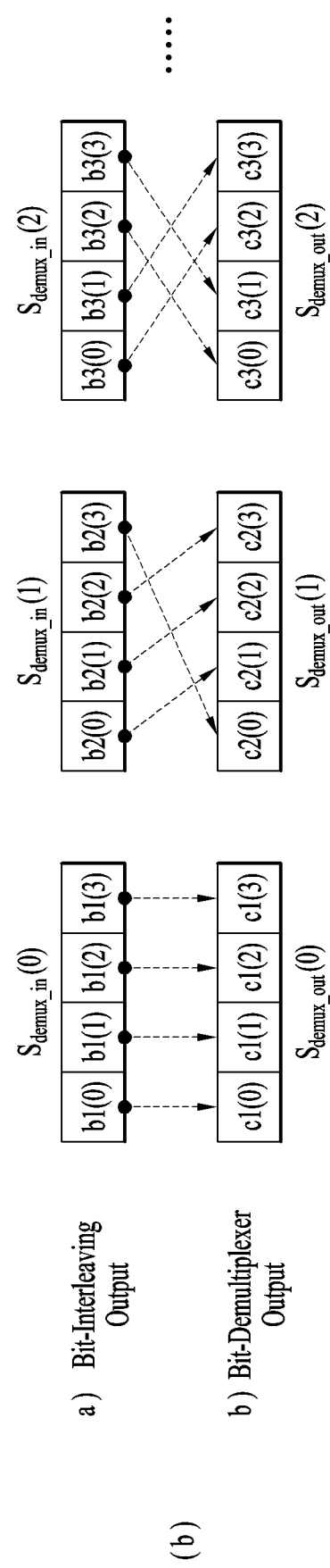
FIG. 21 illustrates a bit interleaving process of physical layer signaling (PLS) according to an embodiment of the present invention.

FIG. 21 illustrates a bit interleaving process of PLS according to an embodiment of the present invention.

Figure 22:
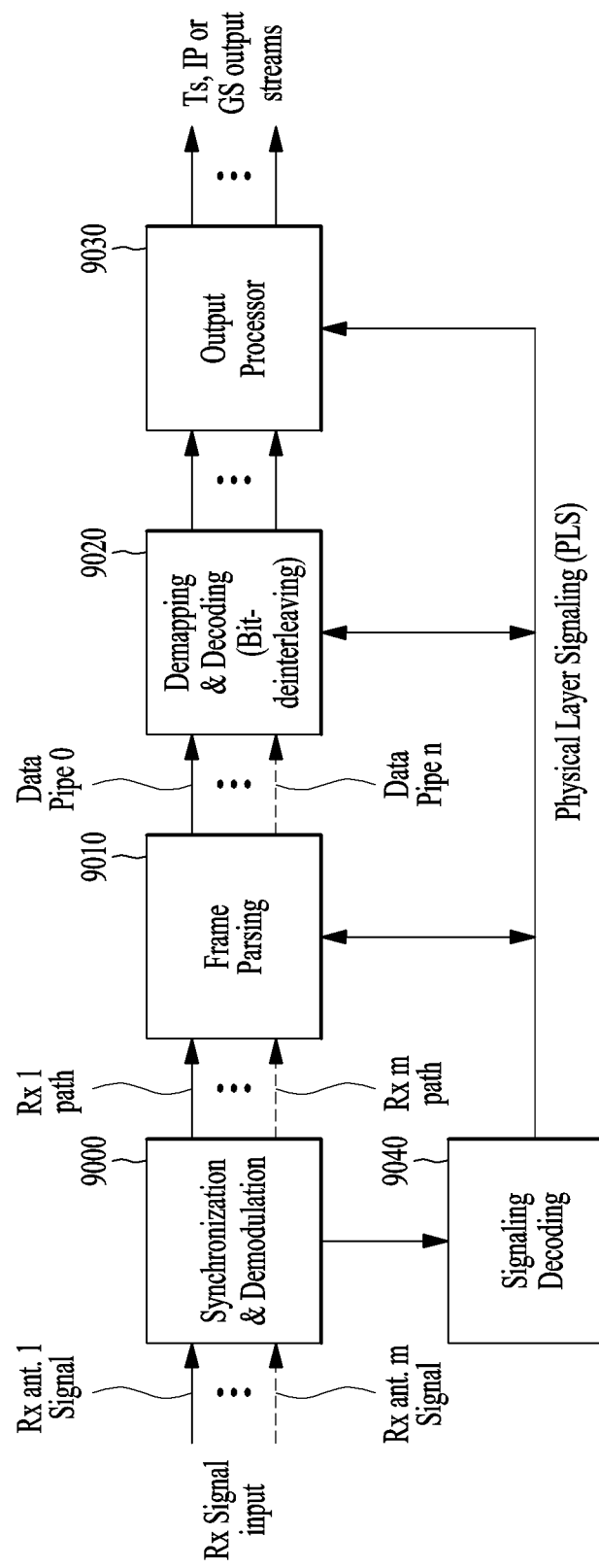
FIG. 22 is a block diagram illustrating a configuration of a broadcast signal reception apparatus for future broadcast services according to an embodiment of the present invention.

Each shortened and punctured PLS1 and PLS2 coded block is interleaved bit-by-bit as described in FIG. 22. Each block of additional parity bits is interleaved with the same block interleaving structure but separately.

In the case of BPSK, there are two branches for bit interleaving to duplicate FEC coded bits in the real and imaginary parts. Each coded block is written to the upper branch first. The bits are mapped to the lower branch by applying modulo NFEC addition with cyclic shifting value floor(NFEC/2), where NFEC is the length of each LDPC coded block after shortening and puncturing.

In other modulation cases, such as QSPK, QAM-16 and NUQ-64, FEC coded bits are written serially into the interleaver column-wise, where the number of columns is the same as the modulation order.

In the read operation, the bits for one constellation symbol are read out sequentially row-wise and fed into the bit demultiplexer block. These operations are continued until the end of the column.

Each bit interleaved group is demultiplexed bit-by-bit in a group before constellation mapping. Depending on modulation order, there are two mapping rules. In the case of BPSK and QPSK, the reliability of bits in a symbol is equal. Therefore, the bit group read out from the bit interleaving block is mapped to a QAM symbol without any operation.

Figure 23:
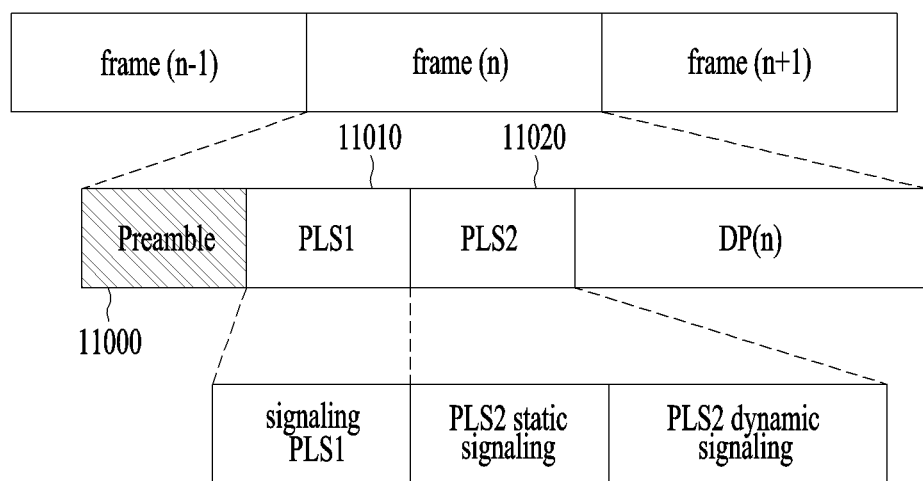
FIG. 23 illustrates a signaling hierarchy structure of a frame according to an embodiment of the present invention.

In the cases of QAM-16 and NUQ-64 mapped to a QAM symbol, the rule of operation is described in FIG. 23($a$). As shown in FIG. 23($a$), i is bit group index corresponding to column index in bit interleaving.

FIG. 21 shows the bit demultiplexing rule for QAM-16. This operation continues until all bit groups are read from the bit interleaving block.

FIG. 22 illustrates a configuration of a broadcast signal reception apparatus for future broadcast services according to an embodiment of the present invention.

The broadcast signal reception apparatus for future broadcast services according to the embodiment of the present invention may correspond to the broadcast signal transmission apparatus for future broadcast services described with reference to FIG. 18.

The broadcast signal reception apparatus for future broadcast services according to the embodiment of the present invention may include a synchronization & demodulation module 9000, a frame parsing module 9010, a demapping & decoding module 9020, an output processor 9030 and a signaling decoding module 9040. A description will be given of operation of each module of the broadcast signal reception apparatus.

The synchronization & demodulation module 9000 may receive input signals through m Rx antennas, perform signal detection and synchronization with respect to a system corresponding to the broadcast signal reception apparatus, and carry out demodulation corresponding to a reverse procedure of a procedure performed by the broadcast signal transmission apparatus.

The frame parsing module 9010 may parse input signal frames and extract data through which a service selected by a user is transmitted. If the broadcast signal transmission apparatus performs interleaving, the frame parsing module 9010 may carry out deinterleaving corresponding to a reverse procedure of interleaving. In this case, positions of a signal and data that need to be extracted may be obtained by decoding data output from the signaling decoding module 9040 to restore scheduling information generated by the broadcast signal transmission apparatus.

The demapping & decoding module 9020 may convert input signals into bit domain data and then deinterleave the same as necessary. The demapping & decoding module 9020 may perform demapping of mapping applied for transmission efficiency and correct an error generated on a transmission channel through decoding. In this case, the demapping & decoding module 9020 may obtain transmission parameters necessary for demapping and decoding by decoding data output from the signaling decoding module 9040.

The output processor 9030 may perform reverse procedures of various compression/signal processing procedures which are applied by the broadcast signal transmission apparatus to improve transmission efficiency. In this case, the output processor 9030 may acquire necessary control information from data output from the signaling decoding module 9040. An output of the output processor 9030 corresponds to a signal input to the broadcast signal transmission apparatus and may be MPEG-TSs, IP streams (v4 or v6) and generic streams.

The signaling decoding module 9040 may obtain PLS information from a signal demodulated by the synchronization & demodulation module 9000. As described above, the frame parsing module 9010, the demapping & decoding module 9020 and the output processor 9030 may execute functions thereof using data output from the signaling decoding module 9040.

A frame according to an embodiment of the present invention is further divided into a number of OFDM symbols and a preamble. As shown in (d), the frame includes a preamble, one or more frame signaling symbols (FSSs), normal data symbols and a frame edge symbol (FES).

The preamble is a special symbol that enables fast futurecast UTB system signal detection and provides a set of basic transmission parameters for efficient transmission and reception of a signal. Details of the preamble will be described later.

A main purpose of the FSS is to carry PLS data. For fast synchronization and channel estimation, and hence fast decoding of PLS data, the FSS has a dense pilot pattern than a normal data symbol. The FES has exactly the same pilots as the FSS, which enables frequency-only interpolation within the FES and temporal interpolation, without extrapolation, for symbols immediately preceding the FES.

FIG. 23 illustrates a signaling hierarchy structure of a frame according to an embodiment of the present invention.

FIG. 23 illustrates the signaling hierarchy structure, which is split into three main parts corresponding to preamble signaling data 11000, PLS1 data 11010 and PLS2 data 11020. A purpose of a preamble, which is carried by a preamble symbol in every frame, is to indicate a transmission type and basic transmission parameters of the frame. PLS1 enables the receiver to access and decode the PLS2 data, which contains the parameters to access a DP of interest. PLS2 is carried in every frame and split into two main parts corresponding to PLS2-STAT data and PLS2-DYN data. Static and dynamic portions of PLS2 data are followed by padding, if necessary.

Preamble signaling data according to an embodiment of the present invention carries 21 bits of information that are needed to enable the receiver to access PLS data and trace DPs within the frame structure. Details of the preamble signaling data are as follows.

FFT_SIZE: This 2-bit field indicates an FFT size of a current frame within a frame group as described in the following Table 1.

TABLE 1

| Value | FFT size |
|---|---|
| 00 | 8K FFT |
| 01 | 16K FFT |

TABLE 1-continued

| Value | FFT size |
|-------|----------|
| 10    | 32K FFT  |
| 11    | Reserved |

GI_FRACTION: This 3-bit field indicates a guard interval fraction value in a current superframe as described in the following Table 2.

TABLE 2

| Value      | GI_FRACTION |
|------------|-------------|
| 000        | 1/5         |
| 001        | 1/10        |
| 010        | 1/20        |
| 011        | 1/40        |
| 100        | 1/80        |
| 101        | 1/160       |
| 110 to 111 | Reserved    |

EAC_FLAG: This 1-bit field indicates whether the EAC is provided in a current frame. If this field is set to '1', an emergency alert service (EAS) is provided in the current frame. If this field set to '0', the EAS is not carried in the current frame. This field may be switched dynamically within a superframe.

PILOT_MODE: This 1-bit field indicates whether a pilot mode is a mobile mode or a fixed mode for a current frame in a current frame group. If this field is set to '0', the mobile pilot mode is used. If the field is set to '1', the fixed pilot mode is used.

PAPR_FLAG: This 1-bit field indicates whether PAPR reduction is used for a current frame in a current frame group. If this field is set to a value of '1', tone reservation is used for PAPR reduction. If this field is set to a value of '0', PAPR reduction is not used.

RESERVED: This 7-bit field is reserved for future use.

FIG. 24 illustrates PLS1 data according to an embodiment of the present invention.

PLS1 data provides basic transmission parameters including parameters required to enable reception and decoding of PLS2. As mentioned above, the PLS1 data remain unchanged for the entire duration of one frame group. A detailed definition of the signaling fields of the PLS1 data is as follows.

PREAMBLE_DATA: This 20-bit field is a copy of preamble signaling data excluding EAC_FLAG.

NUM_FRAME_FRU: This 2-bit field indicates the number of the frames per FRU.

PAYLOAD_TYPE: This 3-bit field indicates a format of payload data carried in a frame group. PAYLOAD_TYPE is signaled as shown in Table 3.

TABLE 3

| Value | Payload type           |
|-------|------------------------|
| 1XX   | TS is transmitted.     |
| X1X   | IP stream is transmitted. |
| XX1   | GS is transmitted.     |

NUM_FSS: This 2-bit field indicates the number of FSSs in a current frame.

SYSTEM_VERSION: This 8-bit field indicates a version of a transmitted signal format. SYSTEM_VERSION is divided into two 4-bit fields: a major version and a minor version.

Major version: The MSB corresponding to four bits of the SYSTEM_VERSION field indicate major version information. A change in the major version field indicates a non-backward-compatible change. A default value is '0000'. For a version described in this standard, a value is set to '0000'.

Minor version: The LSB corresponding to four bits of SYSTEM_VERSION field indicate minor version information. A change in the minor version field is backwards compatible.

CELL_ID: This is a 16-bit field which uniquely identifies a geographic cell in an ATSC network. An ATSC cell coverage area may include one or more frequencies depending on the number of frequencies used per futurecast UTB system. If a value of CELL_ID is not known or unspecified, this field is set to '0'.

NETWORK_ID: This is a 16-bit field which uniquely identifies a current ATSC network.

SYSTEM_ID: This 16-bit field uniquely identifies the futurecast UTB system within the ATSC network. The futurecast UTB system is a terrestrial broadcast system whose input is one or more input streams (TS, IP, GS) and whose output is an RF signal. The futurecast UTB system carries one or more PHY profiles and FEF, if any. The same futurecast UTB system may carry different input streams and use different RFs in different geographical areas, allowing local service insertion. The frame structure and scheduling are controlled in one place and are identical for all transmissions within the futurecast UTB system. One or more futurecast UTB systems may have the same SYSTEM_ID meaning that they all have the same physical layer structure and configuration.

The following loop includes FRU_PHY_PROFILE, FRU_FRAME_LENGTH, FRU_GI_FRACTION, and RESERVED which are used to indicate an FRU configuration and a length of each frame type. A loop size is fixed so that four PHY profiles (including an FEF) are signaled within the FRU. If NUM_FRAME_FRU is less than 4, unused fields are filled with zeros.

FRU_PHY_PROFILE: This 3-bit field indicates a PHY profile type of an (i+1)th (i is a loop index) frame of an associated FRU. This field uses the same signaling format as shown in Table 8.

FRU_FRAME_LENGTH: This 2-bit field indicates a length of an (i+1)th frame of an associated FRU. Using FRU_FRAME_LENGTH together with FRU_GI_FRACTION, an exact value of a frame duration may be obtained.

FRU_GI_FRACTION: This 3-bit field indicates a guard interval fraction value of an (i+1)th frame of an associated FRU. FRU_GI_FRACTION is signaled according to Table 7.

RESERVED: This 4-bit field is reserved for future use.

The following fields provide parameters for decoding the PLS2 data.

PLS2_FEC_TYPE: This 2-bit field indicates an FEC type used by PLS2 protection. The FEC type is signaled according to Table 4. Details of LDPC codes will be described later.

TABLE 4

| Content  | PLS2 FEC type                  |
|----------|--------------------------------|
| 00       | 4K-1/4 and 7K-3/10 LDPC codes  |
| 01 to 11 | Reserved                       |

PLS2_MOD: This 3-bit field indicates a modulation type used by PLS2. The modulation type is signaled according to Table 5.

TABLE 5

| Value | PLS2_MODE |
|---|---|
| 000 | BPSK |
| 001 | QPSK |
| 010 | QAM-16 |
| 011 | NUQ-64 |
| 100 to 111 | Reserved |

PLS2_SIZE_CELL: This 15-bit field indicates Ctotal_partial_block, a size (specified as the number of QAM cells) of the collection of full coded blocks for PLS2 that is carried in a current frame group. This value is constant during the entire duration of the current frame group.

PLS2_STAT_SIZE_BIT: This 14-bit field indicates a size, in bits, of PLS2-STAT for a current frame group. This value is constant during the entire duration of the current frame group.

PLS2_DYN_SIZE_BIT: This 14-bit field indicates a size, in bits, of PLS2-DYN for a current frame group. This value is constant during the entire duration of the current frame group.

PLS2_REP_FLAG: This 1-bit flag indicates whether a PLS2 repetition mode is used in a current frame group. When this field is set to a value of '1', the PLS2 repetition mode is activated. When this field is set to a value of '0', the PLS2 repetition mode is deactivated.

PLS2_REP_SIZE_CELL: This 15-bit field indicates Ctotal_partial_block, a size (specified as the number of QAM cells) of the collection of partial coded blocks for PLS2 carried in every frame of a current frame group, when PLS2 repetition is used. If repetition is not used, a value of this field is equal to 0. This value is constant during the entire duration of the current frame group.

PLS2_NEXT_FEC_TYPE: This 2-bit field indicates an FEC type used for PLS2 that is carried in every frame of a next frame group. The FEC type is signaled according to Table 10.

PLS2_NEXT_MOD: This 3-bit field indicates a modulation type used for PLS2 that is carried in every frame of a next frame group. The modulation type is signaled according to Table 11.

PLS2_NEXT_REP_FLAG: This 1-bit flag indicates whether the PLS2 repetition mode is used in a next frame group. When this field is set to a value of '1', the PLS2 repetition mode is activated. When this field is set to a value of '0', the PLS2 repetition mode is deactivated.

PLS2_NEXT_REP_SIZE_CELL: This 15-bit field indicates Ctotal_full_block, a size (specified as the number of QAM cells) of the collection of full coded blocks for PLS2 that is carried in every frame of a next frame group, when PLS2 repetition is used. If repetition is not used in the next frame group, a value of this field is equal to 0. This value is constant during the entire duration of a current frame group.

PLS2_NEXT_REP_STAT_SIZE_BIT: This 14-bit field indicates a size, in bits, of PLS2-STAT for a next frame group. This value is constant in a current frame group.

PLS2_NEXT_REP_DYN_SIZE_BIT: This 14-bit field indicates the size, in bits, of the PLS2-DYN for a next frame group. This value is constant in a current frame group.

PLS2_AP_MODE: This 2-bit field indicates whether additional parity is provided for PLS2 in a current frame group. This value is constant during the entire duration of the current frame group. Table 6 below provides values of this field. When this field is set to a value of '00', additional parity is not used for the PLS2 in the current frame group.

TABLE 6

| Value | PLS2-AP mode |
|---|---|
| 00 | AP is not provided |
| 01 | AP1 mode |
| 10 to 11 | Reserved |

PLS2_AP_SIZE_CELL: This 15-bit field indicates a size (specified as the number of QAM cells) of additional parity bits of PLS2. This value is constant during the entire duration of a current frame group.

PLS2_NEXT_AP_MODE: This 2-bit field indicates whether additional parity is provided for PLS2 signaling in every frame of a next frame group. This value is constant during the entire duration of a current frame group. Table 12 defines values of this field.

PLS2_NEXT_AP_SIZE_CELL: This 15-bit field indicates a size (specified as the number of QAM cells) of additional parity bits of PLS2 in every frame of a next frame group. This value is constant during the entire duration of a current frame group.

RESERVED: This 32-bit field is reserved for future use.

CRC_32: A 32-bit error detection code, which is applied to all PLS1 signaling.

FIG. 25 illustrates PLS2 data according to an embodiment of the present invention.

FIG. 25 illustrates PLS2-STAT data of the PLS2 data. The PLS2-STAT data is the same within a frame group, while PLS2-DYN data provides information that is specific for a current frame.

Details of fields of the PLS2-STAT data are described below.

FIC_FLAG: This 1-bit field indicates whether the FIC is used in a current frame group. If this field is set to '1', the FIC is provided in the current frame. If this field set to '0', the FIC is not carried in the current frame. This value is constant during the entire duration of a current frame group.

AUX_FLAG: This 1-bit field indicates whether an auxiliary stream is used in a current frame group. If this field is set to '1', the auxiliary stream is provided in a current frame. If this field set to '0', the auxiliary stream is not carried in the current frame. This value is constant during the entire duration of current frame group.

NUM_DP: This 6-bit field indicates the number of DPs carried within a current frame. A value of this field ranges from 1 to 64, and the number of DPs is NUM_DP+1.

DP_ID: This 6-bit field identifies uniquely a DP within a PHY profile.

DP_TYPE: This 3-bit field indicates a type of a DP. This is signaled according to the following Table 7.

TABLE 7

| Value | DP Type |
|---|---|
| 000 | DP Type 1 |
| 001 | DP Type 2 |
| 010 to 111 | Reserved |

DP_GROUP_ID: This 8-bit field identifies a DP group with which a current DP is associated. This may be used by the receiver to access DPs of service components associated with a particular service having the same DP_GROUP_ID.

BASE_DP_ID: This 6-bit field indicates a DP carrying service signaling data (such as PSI/SI) used in a management layer. The DP indicated by BASE_DP_ID may be either a normal DP carrying the service signaling data along with service data or a dedicated DP carrying only the service signaling data.

DP_FEC_TYPE: This 2-bit field indicates an FEC type used by an associated DP. The FEC type is signaled according to the following Table 8.

TABLE 8

| Value | FEC_TYPE |
|---|---|
| 00 | 16K LDPC |
| 01 | 64K LDPC |
| 10 to 11 | Reserved |

DP_COD: This 4-bit field indicates a code rate used by an associated DP. The code rate is signaled according to the following Table 9.

TABLE 9

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001 to 1111 | Reserved |

DP_MOD: This 4-bit field indicates modulation used by an associated DP. The modulation is signaled according to the following Table 10.

TABLE 10

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001 to 1111 | Reserved |

DP_SSD_FLAG: This 1-bit field indicates whether an SSD mode is used in an associated DP. If this field is set to a value of '1', SSD is used. If this field is set to a value of '0', SSD is not used.

The following field appears only if PHY_PROFILE is equal to '010', which indicates the advanced profile:

DP_MIMO: This 3-bit field indicates which type of MIMO encoding process is applied to an associated DP. A type of MIMO encoding process is signaled according to the following Table 11.

TABLE 11

| Value | MIMO encoding |
|---|---|
| 000 | FR-SM |
| 001 | FRFD-SM |
| 010 to 111 | Reserved |

DP_TI_TYPE: This 1-bit field indicates a type of time interleaving. A value of '0' indicates that one TI group corresponds to one frame and contains one or more TI blocks. A value of '1' indicates that one TI group is carried in more than one frame and contains only one TI block.

DP_TI_LENGTH: The use of this 2-bit field (allowed values are only 1, 2, 4, and 8) is determined by values set within the DP_TI_TYPE field as follows.

If DP_TI_TYPE is set to a value of '1', this field indicates PI, the number of frames to which each TI group is mapped, and one TI block is present per TI group (NTI=1). Allowed values of PI with the 2-bit field are defined in Table 12 below.

If DP_TI_TYPE is set to a value of '0', this field indicates the number of TI blocks NTI per TI group, and one TI group is present per frame (PI=1). Allowed values of PI with the 2-bit field are defined in the following Table 12.

TABLE 12

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates a frame interval (IJUMP) within a frame group for an associated DP and allowed values are 1, 2, 4, and 8 (the corresponding 2-bit field is '00', '01', '10', or '11', respectively). For DPs that do not appear every frame of the frame group, a value of this field is equal to an interval between successive frames. For example, if a DP appears on frames 1, 5, 9, 13, etc., this field is set to a value of '4'. For DPs that appear in every frame, this field is set to a value of '1'.

DP_TI_BYPASS: This 1-bit field determines availability of the time interleaver 5050. If time interleaving is not used for a DP, a value of this field is set to '1'. If time interleaving is used, the value is set to '0'.

DP_FIRST_FRAME_IDX: This 5-bit field indicates an index of a first frame of a superframe in which a current DP occurs. A value of DP_FIRST_FRAME_IDX ranges from 0 to 31.

DP_NUM_BLOCK_MAX: This 10-bit field indicates a maximum value of DP_NUM_BLOCKS for this DP. A value of this field has the same range as DP_NUM_BLOCKS.

DP_PAYLOAD_TYPE: This 2-bit field indicates a type of payload data carried by a given DP. DP_PAYLOAD_TYPE is signaled according to the following Table 13.

TABLE 13

| Value | Payload type |
|---|---|
| 00 | TS |
| 01 | IP |
| 10 | GS |
| 11 | Reserved |

DP_INBAND_MODE: This 2-bit field indicates whether a current DP carries in-band signaling information. An in-band signaling type is signaled according to the following Table 14.

TABLE 14

| Value | In-band mode |
|---|---|
| 00 | In-band signaling is not carried. |
| 01 | INBAND-PLS is carried |
| 10 | INBAND-ISSY is carried |
| 11 | INBAND-PLS and INBAND-ISSY are carried |

DP_PROTOCOL_TYPE: This 2-bit field indicates a protocol type of a payload carried by a given DP. The protocol type is signaled according to Table 15 below when input payload types are selected.

TABLE 15

| Value | If DP_PAYLOAD_TYPE is TS | If DP_PAYLOAD_TYPE is IP | If DP_PAYLOAD_TYPE is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in an input formatting block. A CRC mode is signaled according to the following Table 16.

TABLE 16

| Value | CRC mode |
|---|---|
| 00 | Not used |
| 01 | CRC-8 |
| 10 | CRC-16 |
| 11 | CRC-32 |

DNP_MODE: This 2-bit field indicates a null-packet deletion mode used by an associated DP when DP_PAYLOAD_TYPE is set to TS ('00'). DNP_MODE is signaled according to Table 17 below. If DP_PAYLOAD_TYPE is not TS ('00'), DNP_MODE is set to a value of '00'.

TABLE 17

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates an ISSY mode used by an associated DP when DP_PAYLOAD_TYPE is set to TS ('00'). ISSY_MODE is signaled according to Table 18 below. If DP_PAYLOAD_TYPE is not TS ('00'), ISSY_MODE is set to the value of '00'.

TABLE 18

| Value | ISSY mode |
|---|---|
| 00 | Not used |
| 01 | ISSY-UP |
| 10 | ISSY-BBF |
| 11 | Reserved |

HC_MODE_TS: This 2-bit field indicates a TS header compression mode used by an associated DP when DP_PAYLOAD_TYPE is set to TS ('00'). HC_MODE_TS is signaled according to the following Table 19.

TABLE 19

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates an IP header compression mode when DP_PAYLOAD_TYPE is set to IP ('01'). HC_MODE_IP is signaled according to the following Table 20.

TABLE 20

| Value | Header compression mode |
|---|---|
| 00 | No compression |
| 01 | HC_MODE_IP 1 |
| 10 to 11 | Reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following fields appear only if FIC_FLAG is equal to '1'.

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following fields appear only if AUX_FLAG is equal to '1'.

NUM_AUX: This 4-bit field indicates the number of auxiliary streams. Zero means no auxiliary stream is used.

AUX_CONFIG_RFU: This 8-bit field is reserved for future use.

AUX_STREAM_TYPE: This 4-bit is reserved for future use for indicating a type of a current auxiliary stream.

AUX_PRIVATE_CONFIG: This 28-bit field is reserved for future use for signaling auxiliary streams.

Figures 26, 27:
FIG. 26 is a table illustrating PLS2 data according to another embodiment of the present invention.
FIG. 27 illustrates a logical structure of a frame according to an embodiment of the present invention.

FIG. 26 illustrates PLS2 data according to another embodiment of the present invention.

FIG. 26 illustrates PLS2-DYN data of the PLS2 data. Values of the PLS2-DYN data may change during the duration of one frame group while sizes of fields remain constant.

Details of fields of the PLS2-DYN data are as below.

FRAME_INDEX: This 5-bit field indicates a frame index of a current frame within a superframe. An index of a first frame of the superframe is set to '0'.

PLS_CHANGE_COUNTER: This 4-bit field indicates the number of superframes before a configuration changes. A next superframe with changes in the configuration is indicated by a value signaled within this field. If this field is set to a value of '0000', it means that no scheduled change is foreseen. For example, a value of '1' indicates that there is a change in the next superframe.

FIC_CHANGE_COUNTER: This 4-bit field indicates the number of superframes before a configuration (i.e., content of the FIC) changes. A next superframe with changes in the configuration is indicated by a value signaled within this field. If this field is set to a value of '0000', it means that no scheduled change is foreseen. For example, a value of '0001' indicates that there is a change in the next superframe.

RESERVED: This 16-bit field is reserved for future use.

The following fields appear in a loop over NUM_DP, which describe parameters associated with a DP carried in a current frame.

DP_ID: This 6-bit field uniquely indicates a DP within a PHY profile.

DP_START: This 15-bit (or 13-bit) field indicates a start position of the first of the DPs using a DPU addressing scheme. The DP_START field has differing length according to the PHY profile and FFT size as shown in the following Table 21.

TABLE 21

| PHY profile | DP_START field size | |
|---|---|---|
| | 64K | 16K |
| Base | 13 bits | 15 bits |
| Handheld | — | 13 bits |
| Advanced | 13 bits | 15 its |

DP_NUM_BLOCK: This 10-bit field indicates the number of FEC blocks in a current TI group for a current DP. A value of DP_NUM_BLOCK ranges from 0 to 1023.

RESERVED: This 8-bit field is reserved for future use.

The following fields indicate FIC parameters associated with the EAC.

EAC_FLAG: This 1-bit field indicates the presence of the EAC in a current frame. This bit is the same value as EAC_FLAG in a preamble.

EAS_WAKE_UP_VERSION_NUM: This 8-bit field indicates a version number of a wake-up indication.

If the EAC_FLAG field is equal to '1', the following 12 bits are allocated to EAC_LENGTH_BYTE.

If the EAC_FLAG field is equal to '0', the following 12 bits are allocated to EAC_COUNTER.

EAC_LENGTH_BYTE: This 12-bit field indicates a length, in bytes, of the EAC.

EAC_COUNTER: This 12-bit field indicates the number of frames before a frame where the EAC arrives.

The following fields appear only if the AUX_FLAG field is equal to '1'.

AUX_PRIVATE_DYN: This 48-bit field is reserved for future use for signaling auxiliary streams. A meaning of this field depends on a value of AUX_STREAM_TYPE in a configurable PLS2-STAT.

CRC_32: A 32-bit error detection code, which is applied to the entire PLS2.

FIG. 27 illustrates a logical structure of a frame according to an embodiment of the present invention.

As above mentioned, the PLS, EAC, FIC, DPs, auxiliary streams and dummy cells are mapped to the active carriers of OFDM symbols in a frame. PLS1 and PLS2 are first mapped to one or more FSSs. Thereafter, EAC cells, if any, are mapped to an immediately following PLS field, followed next by FIC cells, if any. The DPs are mapped next after the PLS or after the EAC or the FIC, if any. Type 1 DPs are mapped first and Type 2 DPs are mapped next. Details of types of the DPs will be described later. In some cases, DPs may carry some special data for EAS or service signaling data. The auxiliary streams or streams, if any, follow the DPs, which in turn are followed by dummy cells. When the PLS, EAC, FIC, DPs, auxiliary streams and dummy data cells are mapped all together in the above mentioned order, i.e. the PLS, EAC, FIC, DPs, auxiliary streams and dummy data cells, cell capacity in the frame is exactly filled.

Figure 28:
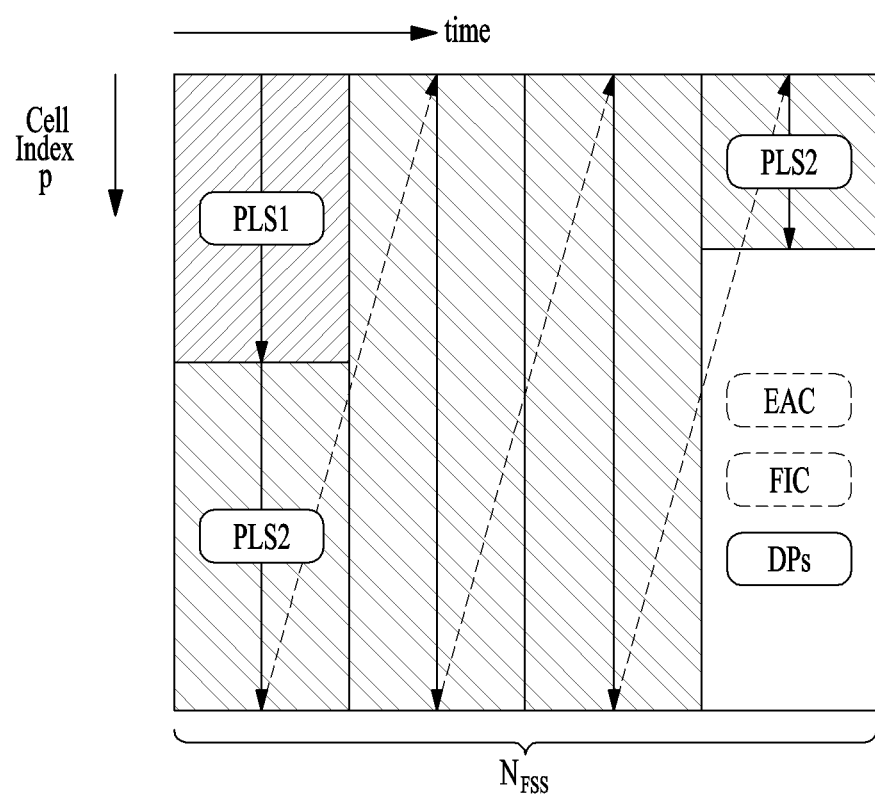
FIG. 28 illustrates PLS mapping according to an embodiment of the present invention.

FIG. 28 illustrates PLS mapping according to an embodiment of the present invention.

PLS cells are mapped to active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) have higher pilot density, allowing fast synchronization and frequency-only interpolation within the FSS.

PLS cells are mapped to active carriers of the FSS(s) in a top-down manner as shown in the figure. PLS1 cells are mapped first from a first cell of a first FSS in increasing order of cell index. PLS2 cells follow immediately after a last cell of PLS1 and mapping continues downward until a last cell index of the first FSS. If the total number of required PLS cells exceeds the number of active carriers of one FSS, mapping proceeds to a next FSS and continues in exactly the same manner as the first FSS.

After PLS mapping is completed, DPs are carried next. If an EAC, an FIC or both are present in a current frame, the EAC and the FIC are placed between the PLS and "normal" DPs.

Hereinafter, description will be given of encoding an FEC structure according to an embodiment of the present invention. As above mentioned, the data FEC encoder may perform FEC encoding on an input BBF to generate an FECBLOCK procedure using outer coding (BCH), and inner coding (LDPC). The illustrated FEC structure corresponds to the FECBLOCK. In addition, the FECBLOCK and the FEC structure have same value corresponding to a length of an LDPC codeword.

As described above, BCH encoding is applied to each BBF (Kbch bits), and then LDPC encoding is applied to BCH-encoded BBF (Kldpc bits=Nbch bits).

A value of Nldpc is either 64,800 bits (long FECBLOCK) or 16,200 bits (short FECBLOCK).

Table 22 and Table 23 below show FEC encoding parameters for the long FECBLOCK and the short FECBLOCK, respectively.

TABLE 22

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 23

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |

TABLE 23-continued

| LDPC rate | $N_{ldpc}$ | $K_{ldpc}$ | $K_{bch}$ | BCH error correction capability | $N_{bch} - K_{bch}$ |
|---|---|---|---|---|---|
| 11/15 | 11880 | 11712 | | | |
| 12/15 | 12960 | 12792 | | | |
| 13/15 | 14040 | 13872 | | | |

Detailed operations of BCH encoding and LDPC encoding are as below.

A 12-error correcting BCH code is used for outer encoding of the BBF. A BCH generator polynomial for the short FECBLOCK and the long FECBLOCK are obtained by multiplying all polynomials together.

LDPC code is used to encode an output of outer BCH encoding. To generate a completed Bldpc (FECBLOCK), Pldpc (parity bits) is encoded systematically from each Ildpc (BCH—encoded BBF), and appended to Ildpc. The completed Bldpc (FECBLOCK) is expressed by the following Equation.

$$B_{ldpc} = [I_{ldpc}\ P_{ldpc}] = [i_0, i_1, \ldots, i_{K_{ldpc}-1}, p_0, p_1, \ldots, p_{N_{ldpc}-K_{ldpc}-1}]$$ [Equation 2]

Parameters for the long FECBLOCK and the short FECBLOCK are given in the above Tables 22 and 23, respectively.

A detailed procedure to calculate Nldpc—Kldpc parity bits for the long FECBLOCK, is as follows.

1) Initialize the parity bits $$p_0 = p_1 = p_2 = \ldots = p_{N_{ldpc}-K_{ldpc}-1} = 0$$ [Equation 3]

2) Accumulate a first information bit—i0, at a parity bit address specified in a first row of addresses of a parity check matrix. Details of the addresses of the parity check matrix will be described later. For example, for the rate of 13/15, $p_{983} = p_{983} \oplus i_0$ $p_{2815} = p_{2815} \oplus i_0$ $p_{4837} = p_{4837} \oplus i_0$ $p_{4989} = p_{4989} \oplus i_0$ $p_{6138} = p_{6138} \oplus i_0$ $p_{6458} = p_{6458} \oplus i_0$ $p_{6921} = p_{6921} \oplus i_0$ $p_{6974} = p_{6974} \oplus i_0$ $p_{7572} = p_{7572} \oplus i_0$ $p_{8260} = p_{8260} \oplus i_0$ $p_{8496} = p_{8496} \oplus i_0$ [Equation 4]

3) For the next 359 information bits, is, s=1, 2, ..., 359, accumulate is at parity bit addresses using following Equation.

$\{x+(s\ mod\ 360) \times Q_{ldpc}\}\ mod(N_{ldpc}-K_{ldpc})$ [Equation 5]

Here, x denotes an address of a parity bit accumulator corresponding to a first bit i0, and Qldpc is a code rate dependent constant specified in the addresses of the parity check matrix. Continuing with the example, Qldpc=24 for the rate of 13/15, so for an information bit i1, the following operations are performed.

$p_{1007} = p_{1007} \oplus i_1$ $p_{2839} = p_{2839} \oplus i_1$ $p_{4861} = p_{4861} \oplus i_1$ $p_{5013} = p_{5013} \oplus i_1$ $p_{6162} = p_{6162} \oplus i_1$ $p_{6482} = p_{6482} \oplus i_1$ $p_{6945} = p_{6945} \oplus i_1$ $p_{6998} = p_{6998} \oplus i_1$ $p_{7596} = p_{7596} \oplus i_1$ $p_{8284} = p_{8284} \oplus i_1$ $p_{8520} = p_{8520} \oplus i_1$ [Equation 6]

4) For a 361th information bit i360, an address of the parity bit accumulator is given in a second row of the addresses of the parity check matrix. In a similar manner, addresses of the parity bit accumulator for the following 359 information bits is, s=361, 362, ..., 719 are obtained using Equation 6, where x denotes an address of the parity bit accumulator corresponding to the information bit i360, i.e., an entry in the second row of the addresses of the parity check matrix.

5) In a similar manner, for every group of 360 new information bits, a new row from the addresses of the parity check matrix is used to find the address of the parity bit accumulator.

After all of the information bits are exhausted, a final parity bit is obtained as below.

6) Sequentially perform the following operations starting with i=1.

$p_i = p_i \oplus p_{i-1}, i=1, 2, \ldots, N_{ldpc}-K_{ldpc}-1$ [Equation 7]

Here, final content of pi (i=0, 1, ..., Nldpc−Kldpc−1) is equal to a parity bit pi.

TABLE 24

| Code rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for the short FECBLOCK is in accordance with t LDPC encoding procedure for the long FECBLOCK, except that Table 24 is replaced with Table 25, and the addresses of the parity check matrix for the long FECBLOCK are replaced with the addresses of the parity check matrix for the short FECBLOCK.

TABLE 25

| Code rate | $Q_{ldpc}$ |
| --- | --- |
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 29:
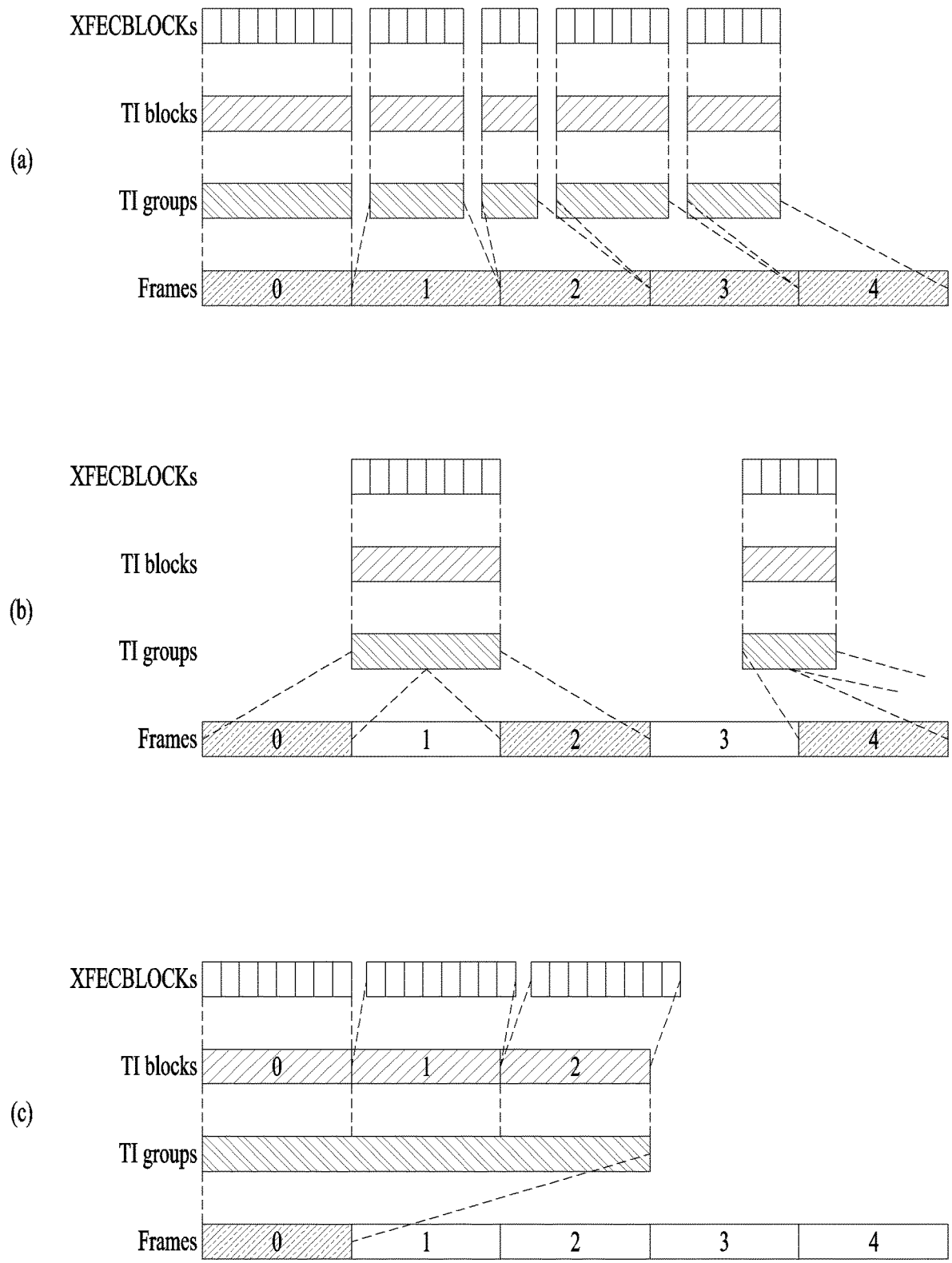
FIG. 29 illustrates time interleaving according to an embodiment of the present invention.

FIG. 29 illustrates time interleaving according to an embodiment of the present invention.

(a) to (c) show examples of a TI mode.

A time interleaver operates at the DP level. Parameters of time interleaving (TI) may be set differently for each DP.

The following parameters, which appear in part of the PLS2-STAT data, configure the TI.

DP_TI_TYPE (allowed values: 0 or 1): This parameter represents the TI mode. The value of '0' indicates a mode with multiple TI blocks (more than one TI block) per TI group. In this case, one TI group is directly mapped to one frame (no inter-frame interleaving). The value of '1' indicates a mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): This parameter represents the maximum number of XFEC-BLOCKs per TI group.

DP_FRAME_INTERVAL (allowed values: 1, 2, 4, and 8): This parameter represents the number of the frames IJUMP between two successive frames carrying the same DP of a given PHY profile.

DP_TI_BYPASS (allowed values: 0 or 1): If time interleaving is not used for a DP, this parameter is set to '1'. This parameter is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the delay compensation block for the dynamic configuration information from the scheduler may still be required. In each DP, the XFECBLOCKs received from SSD/MIMO encoding are grouped into TI groups. That is, each TI group is a set of an integer number of XFEC-BLOCKs and contains a dynamically variable number of XFECBLOCKs. The number of XFECBLOCKs in the TI group of index n is denoted by NxBLOCK_Group(n) and is signaled as DP_NUM_BLOCK in the PLS2-DYN data. Note that NxBLOCK_Group(n) may vary from a minimum value of 0 to a maximum value of NxBLOCK_Group_MAX (corresponding to DP_NUM_BLOCK_MAX), the largest value of which is 1023.

Each TI group is either mapped directly to one frame or spread over PI frames. Each TI group is also divided into more than one TI block (NTI), where each TI block corresponds to one usage of a time interleaver memory. The TI blocks within the TI group may contain slightly different numbers of XFECBLOCKs. If the TI group is divided into multiple TI blocks, the TI group is directly mapped to only one frame. There are three options for time interleaving (except an extra option of skipping time interleaving) as shown in the following Table 26.

TABLE 26

| Modes | Descriptions |
| --- | --- |
| Option 1 | Each TI group contains one TI block and is mapped directly to one frame as shown in (a). This option is signaled in PLS2-STAT by DP_TI_TYPE = '0' and DP_TI_LENGTH = '1' ($N_{TI}$ = 1). |
| Option 2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in PLS2-STAT by DP_TI_TYPE = '1'. |
| Option 3 | Each TI group is divided into multiple TI blocks and is mapped directly to one frame as shown in (c). Each TI block may use a full TI memory so as to provide a maximum bit-rate for a DP. This option is signaled in PLS2-STAT by DP_TI_TYPE = '0' and DP_TI_LENGTH = $N_{TI}$, while $P_I$ = 1. |

Typically, the time interleaver may also function as a buffer for DP data prior to a process of frame building. This is achieved by means of two memory banks for each DP. A first TI block is written to a first bank. A second TI block is written to a second bank while the first bank is being read from and so on.

The TI is a twisted row-column block interleaver. For an sth TI block of an nth TI group, the number of rows Nr of a TI memory is equal to the number of cells Ncells, i.e., Nr=Ncells while the number of columns Nc is equal to the number NxBLOCK_TI(n,s).

Figure 30:
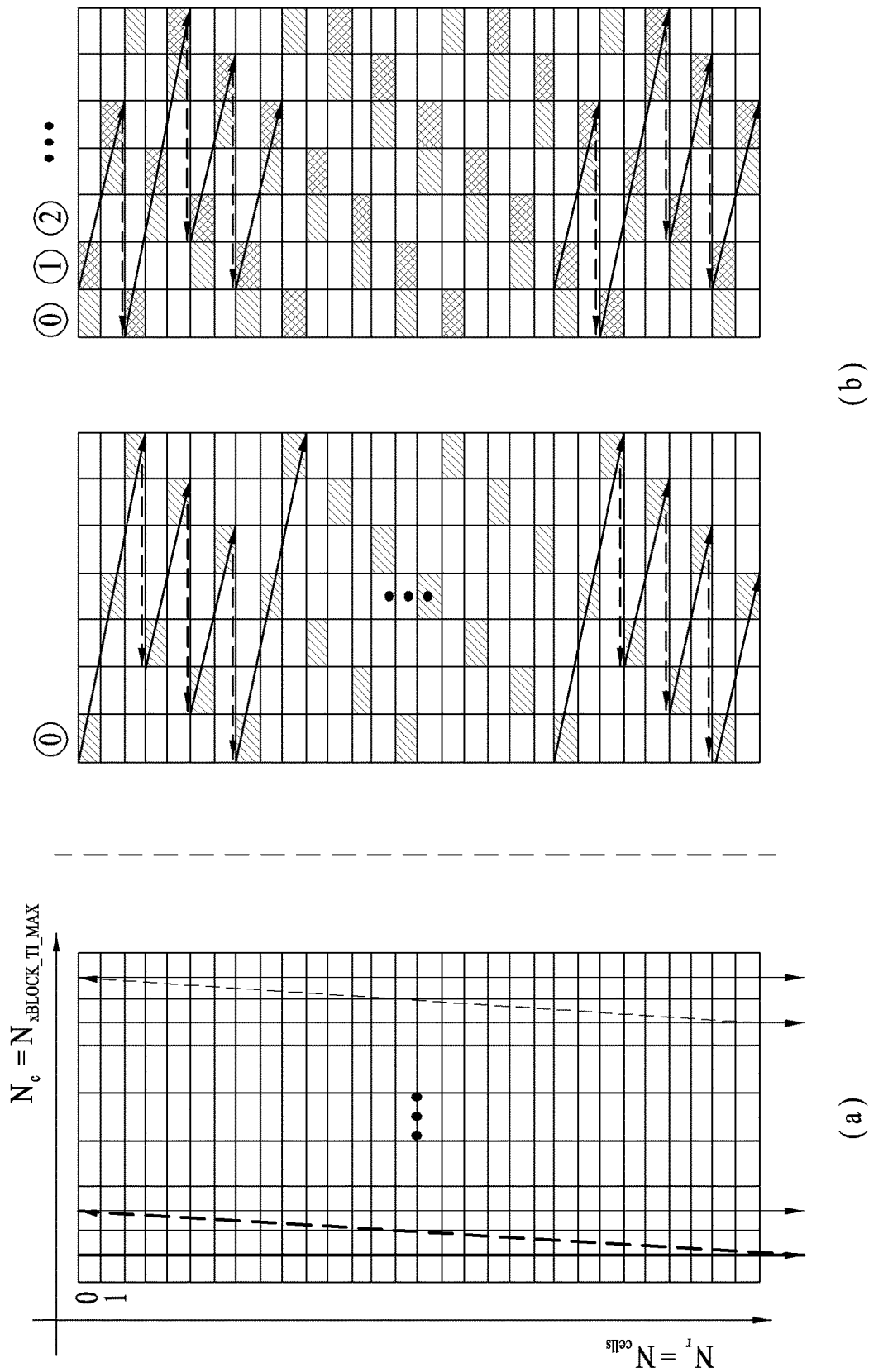
FIG. 30 illustrates a basic operation of a twisted row-column block interleaver according to an embodiment of the present invention.

FIG. 30 illustrates a basic operation of a twisted row-column block interleaver according to an embodiment of the present invention.

FIG. 30(a) shows a write operation in the time interleaver and FIG. 30(b) shows a read operation in the time interleaver. A first XFECBLOCK is written column-wise into a first column of a TI memory, and a second XFECBLOCK is written into a next column, and so on as shown in (a). Then, in an interleaving array, cells are read diagonal-wise. During diagonal-wise reading from a first row (rightwards along a row beginning with a left-most column) to a last row, Nr cells are read out as shown in (b). In detail, assuming $z_{n,s,i}$ (i=0, . . . ,$N_rN_c$) as a TI memory cell position to be read sequentially, a reading process in such an interleaving array is performed by calculating a row index $R_{n,s,i}$, a column index $C_{n,s,i}$, and an associated twisting parameter $T_{n,s,i}$ as in the following Equation.

[Equation 8]
$$\text{GENERATE}(R_{n,s,i}, C_{n,s,i}) = \{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

Here, $S_{shift}$ is a common shift value for a diagonal-wise reading process regardless of $N_{xBLOCK\_TI}$(n,s), and the shift value is determined by $N_{xBLOCK\_TI\_MAX}$ given in PLS2-STAT as in the following Equation.

$$\text{for} \begin{cases} N'_{xBLOCK\_TI\_MAX} = \\ N_{xBLOCK\_TI\_MAX} + 1, & \text{if } N_{xBLOCK\_TI\_MAX} \bmod 2 = 0 \\ N'_{xBLOCK\_TI\_MAX} = \\ N_{xBLOCK\_TI\_MAX}, & \text{if } N_{xBLOCK\_TI\_MAX} \bmod 2 = 1 \end{cases}, \quad \text{[Equation 9]}$$

$$S_{shift} = \frac{N'_{xBLOCK\_TI\_MAX} - 1}{2}$$

As a result, cell positions to be read are calculated by coordinates $z_{n,s,i} = N_r C_{n,s,i} + R_{n,s,i}$.

Figure 31:
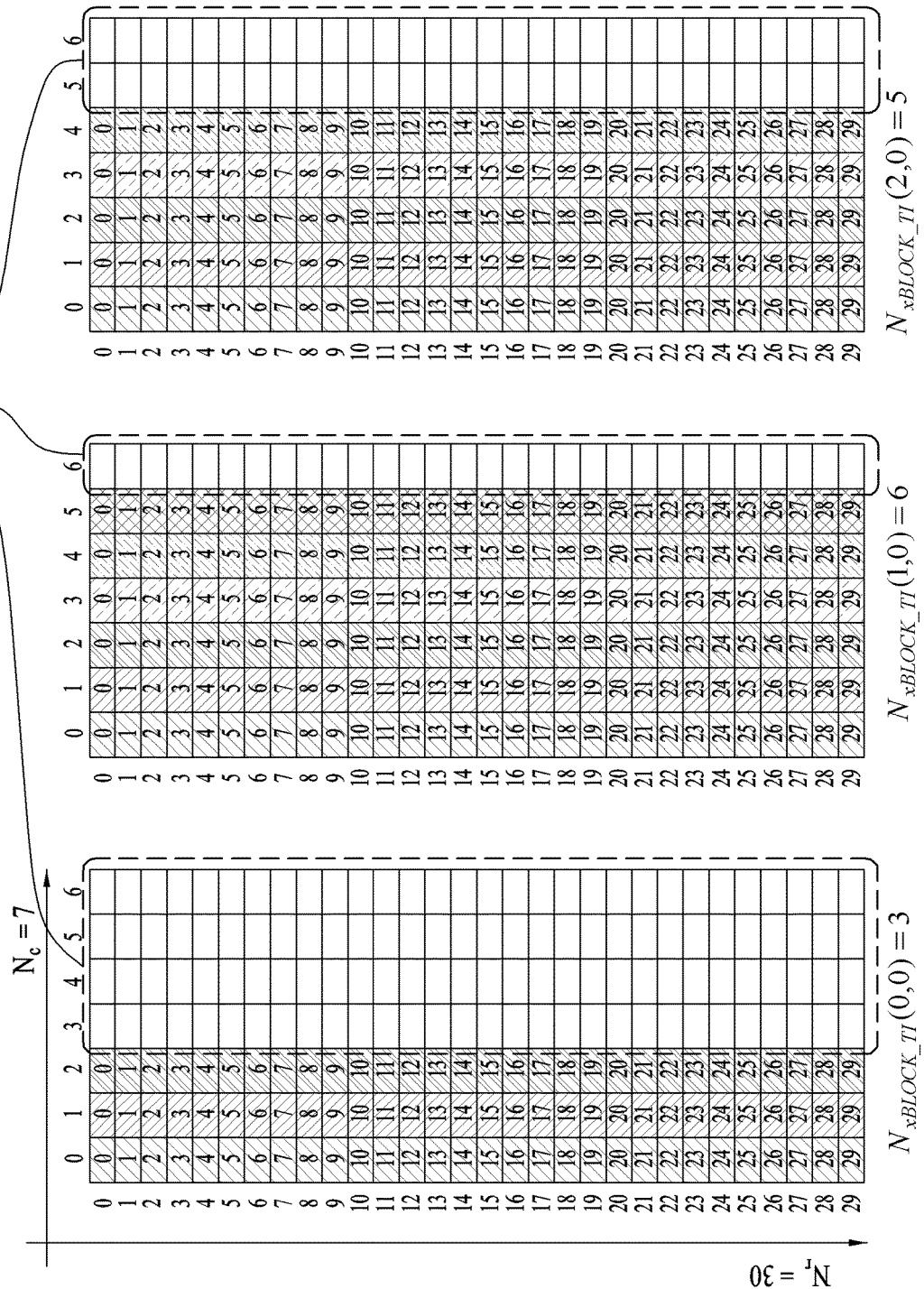
FIG. 31 illustrates an operation of a twisted row-column block interleaver according to another embodiment of the present invention.

FIG. 31 illustrates an operation of a twisted row-column block interleaver according to another embodiment of the present invention.

More specifically, FIG. 31 illustrates an interleaving array in a TI memory for each TI group, including virtual XFEC-BLOCKs when $N_{xBLOCK\_TI}(0,0)=3$ $N_{xBLOCK\_TI}(1,0)=6$ and $N_{xBLOCK\_TI}(2,0)=5$.

A variable number $N_{xBLOCK\_TI}(n,s)=N_r$ may be less than or equal to $N_{xBLOCK\_TI\_MAX}$. Thus, in order to achieve single-memory deinterleaving at a receiver side regardless of $N_{xBLOCK\_TI}(n,s)$, the interleaving array for use in the twisted row-column block interleaver is set to a size of $N_r \times N_c = N_{cells} \times N'_{xBLOCK\_TI\_MAX}$ by inserting the virtual XFECBLOCKs into the TI memory and a reading process is accomplished as in the following Equation.

[Equation 10]

```
p = 0;
for i = 0; i < N_cells N'_xBLOCK_TI_MAX; i = i + 1
{GENERATE(R_n,s,i, C_n,s,i);
V_i = N_r C_n,s,j + R_n,s,j
    if V_i < N_cells N_xBLOCK_TI(n,s)
    {
        Z_n,s,p = V_i; p = p + 1;
    }
}
```

The number of TI groups is set to 3. An option of the time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. A maximum number of XFECBLOCKs is signaled in the PLS2-STAT data by NxBLOCK_Group_MAX, which leads to $\lfloor N_{xBLOCK\_Group\_MAX} / N_{TI} \rfloor = N_{xBLOCK\_TI\_MAX} = 6$.

The purpose of the Frequency Interleaver, which operates on data corresponding to a single OFDM symbol, is to provide frequency diversity by randomly interleaving data cells received from the frame builder. In order to get maximum interleaving gain in a single frame, a different interleaving-sequence is used for every OFDM symbol pair comprised of two sequential OFDM symbols.

Therefore, the frequency interleaver according to the present embodiment may include an interleaving address generator for generating an interleaving address for applying corresponding data to a symbol pair.

Figure 32:
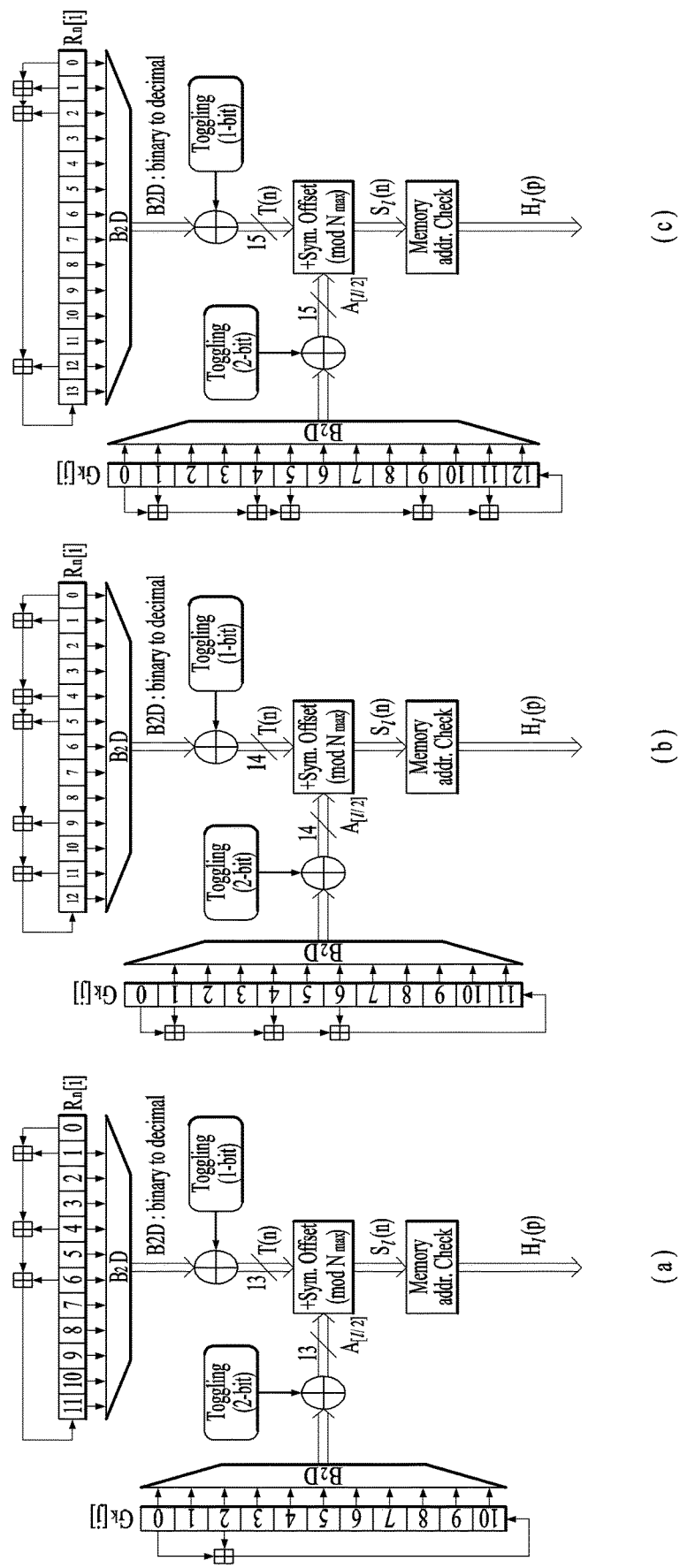
FIG. 32 is a block diagram illustrating an interlaving address generator including a main pseudo-random binary sequence (PRBS) generator and a sub-PRBS generator according to each FFT mode according to an embodiment of the present invention.

FIG. 32 illustrates an interleaving address generator including a main pseudo-random binary sequence (PRBS) generator and a sub-PRBS generator according to each FFT mode according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l} = [x_{m,l,0}, \ldots, x_{m,l,p}, \ldots, x_{m,l,N_{data}-1}]$ for $l=0, \ldots, N_{sym}-1$, where $x_{m,l,p}$ is the pth cell of the lth OFDM symbol in the mth frame and Ndata is the number of data cells: Ndata=CFSS for the frame signaling symbol(s), Ndata=Cdata for the normal data, and Ndata=CFES for the frame edge symbol. In addition, the interleaved data cells are defined as $p_{m,l} = [v_{m,l,0}, \ldots, v_{m,l,N_{data}-1}]$ for $l=0, \ldots, N_{sym}-1$.

For the OFDM symbol pair, the interleaved OFDM symbol pair is given by $v_{m,l,H_i(p)} = x_{m,l,p}$, $p=0, \ldots, N_{data}-1$, for the first OFDM symbol of each pair $v_{m,l,p} = x_{m,l,H_i(p)}$, $p=0, \ldots, N_{data}-1$, for the second OFDM symbol of each pair, where H(p) is the interleaving address generated by a PRBS generator.

FIG. 33 illustrates a main PRBS used for all FFT modes according to an embodiment of the present invention.

(a) illustrates the main PRBS, and (b) illustrates a parameter Nmax for each FFT mode.

FIG. 34 illustrates a sub-PRBS used for FFT modes and an interleaving address for frequency interleaving according to an embodiment of the present invention.

(a) illustrates a sub-PRBS generator, and (b) illustrates an interleaving address for frequency interleaving. A cyclic shift value according to an embodiment of the present invention may be referred to as a symbol offset.

Figure 35:
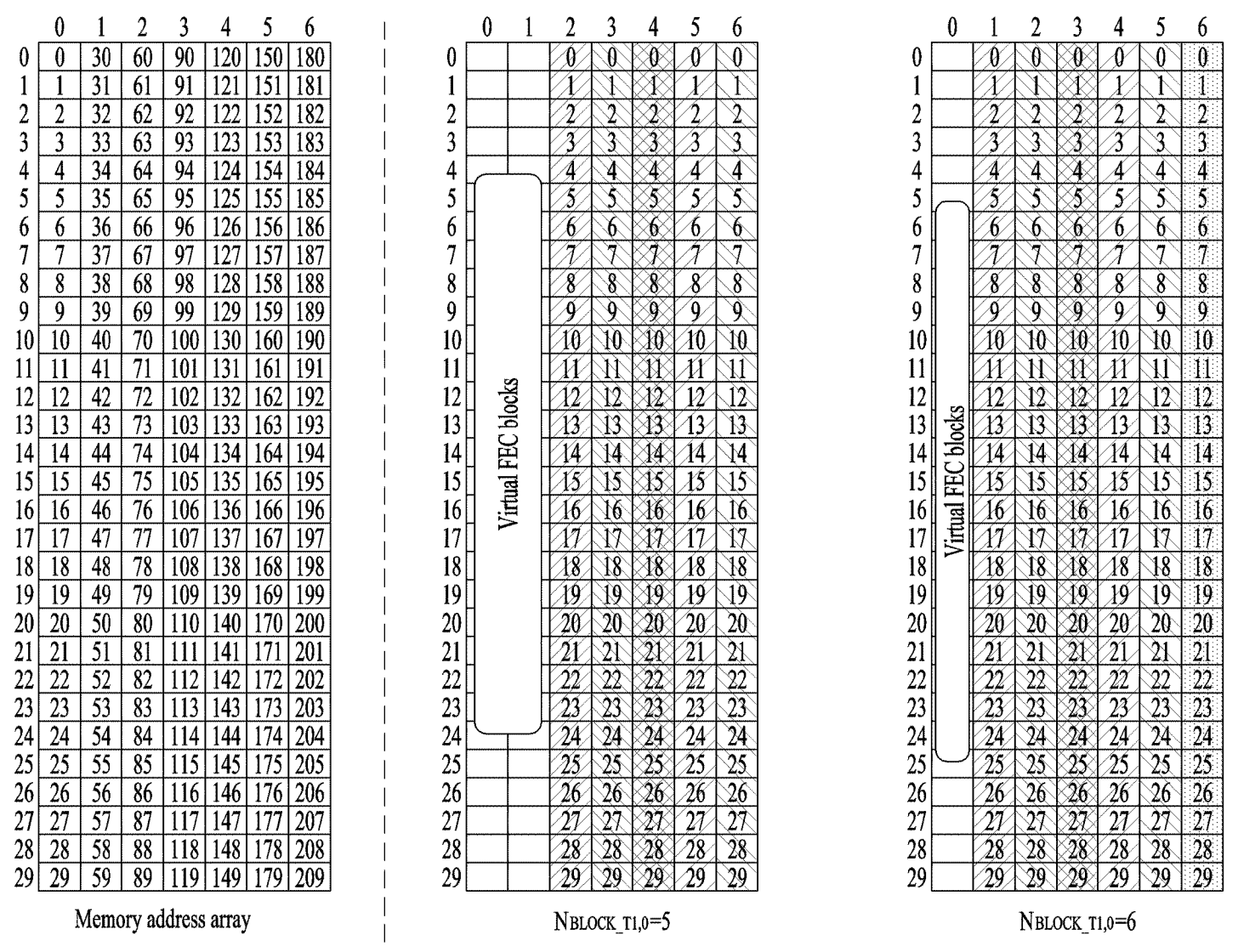

FIG. 35 illustrates a write operation of a time interleaver according to an embodiment of the present invention.

FIG. 35 illustrates a write operation for two TI groups.

A left block in the figure illustrates a TI memory address array, and right blocks in the figure illustrate a write operation when two virtual FEC blocks and one virtual FEC block are inserted into heads of two contiguous TI groups, respectively.

Hereinafter, description will be given of a configuration of a time interleaver and a time interleaving method using both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer.

A PLP mode according to an embodiment of the present invention may include a single PLP mode or a multi-PLP mode according to the number of PLPs processed by a broadcast signal transmitter or a broadcast signal transmission apparatus. The single PLP mode corresponds to a case in which one PLP is processed by the broadcast signal transmission apparatus. The single PLP mode may be referred to as a single PLP.

The multi-PLP mode corresponds to a case in which one or more PLPs are processed by the broadcast signal transmission apparatus. The multi-PLP mode may be referred to as multiple PLPs.

In the present invention, time interleaving in which different time interleaving schemes are applied according to PLP modes may be referred to as hybrid time interleaving. Hybrid time interleaving according to an embodiment of the present invention is applied for each PLP (or at each PLP level) in the multi-PLP mode.

FIG. 36 illustrates an interleaving type applied according to the number of PLPs in a table.

In a time interleaving according to an embodiment of the present invention, an interleaving type may be determined based on a value of PLP_NUM. PLP_NUM is a signaling field indicating a PLP mode. When PLP_NUM has a value of 1, the PLP mode corresponds to a single PLP. The single PLP according to the present embodiment may be applied only to a CI.

When PLP_NUM has a value greater than 1, the PLP mode corresponds to multiple PLPs. The multiple PLPs according to the present embodiment may be applied to the CI and a BI. In this case, the CI may perform inter-frame interleaving, and the BI may perform intra-frame interleaving.

FIG. 37 is a block diagram including a first example of a structure of a hybrid time interleaver described above.

The hybrid time interleaver according to the first example may include a BI and a CI. The time interleaver of the present invention may be positioned between a BICM chain block and a frame builder.

The BICM chain block illustrated in FIGS. 37 and 38 may include the blocks in the processing block 5000 of the BICM block illustrated in FIG. 19 except for the time interleaver 5050. The frame builder illustrated in FIGS. 37 and 38 may perform the same function as that of the frame building block 1020 of FIG. 18.

As described in the foregoing, it is possible to determine whether to apply the BI according to the first example of the structure of the hybrid time interleaver depending on values of PLP_NUM. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be the same as or similar to a structure and an operation of the CI applied when PLP_NUM=1.

FIG. 38 is a block diagram including a second example of the structure of the hybrid time interleaver described above.

An operation of each block included in the second example of the structure of the hybrid time interleaver is the same as the above description in FIG. 20. It is possible to determine whether to apply a BI according to the second example of the structure of the hybrid time interleaver depending on values of PLP_NUM. Each block of the hybrid time interleaver according to the second example may perform operations according to embodiments of the present invention. In this instance, an applied structure and operation of a CI may be different between a case of PLP_NUM=1 and a case of PLP_NUM>1.

Figure 39:
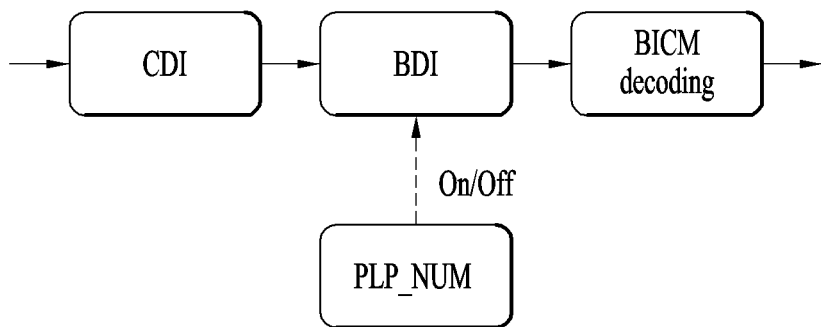
FIG. 39 is a block diagram including a first example of a structure of a hybrid time deinterleaver.

FIG. 39 is a block diagram including a first example of a structure of a hybrid time deinterleaver.

The hybrid time deinterleaver according to the first example may perform an operation corresponding to a reverse operation of the hybrid time interleaver according to the first example described above. Therefore, the hybrid time deinterleaver according to the first example of FIG. 39 may include a convolutional deinterleaver (CDI) and a block deinterleaver (BDI).

A structure and an operation of the CDI applied when PLP_NUM>1 may be the same as or similar to a structure and an operation of the CDI applied when PLP_NUM=1.

It is possible to determine whether to apply the BDI according to the first example of the structure of the hybrid time deinterleaver depending on values of PLP_NUM. That is, when PLP_NUM=1, the BDI is not applied (BDI is turned OFF) and only the CDI is applied.

The CDI of the hybrid time deinterleaver may perform inter-frame deinterleaving, and the BDEI may perform intra-frame deinterleaving. Details of inter-frame deinterleaving and intra-frame deinterleaving are the same as the above description.

Figure 40:
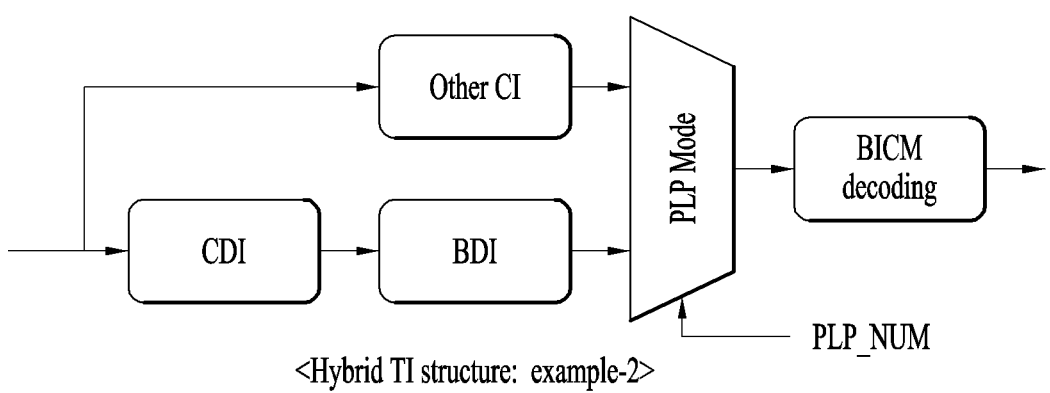
FIG. 40 is a block diagram including a second example of the structure of the hybrid time deinterleaver.

A BICM decoding block illustrated in FIGS. 39 and 40 may perform a reverse operation of the BICM chain block of FIGS. 37 and 38.

FIG. 40 is a block diagram including a second example of the structure of the hybrid time deinterleaver.

The hybrid time deinterleaver according to the second example may perform an operation corresponding to a reverse operation of the hybrid time interleaver according to the second example described above. An operation of each block included in the second example of the structure of the hybrid time deinterleaver may be the same as the above description in FIG. 39.

It is possible to determine whether to apply a BDI according to the second example of the structure of the hybrid time deinterleaver depending on values of PLP_NUM. Each block of the hybrid time deinterleaver according to the second example may perform operations according to embodiments of the present invention. In this instance, an applied structure and operation of a CDI may be different between a case of PLP_NUM=1 and a case of PLP_NUM>1.

Figure 41:
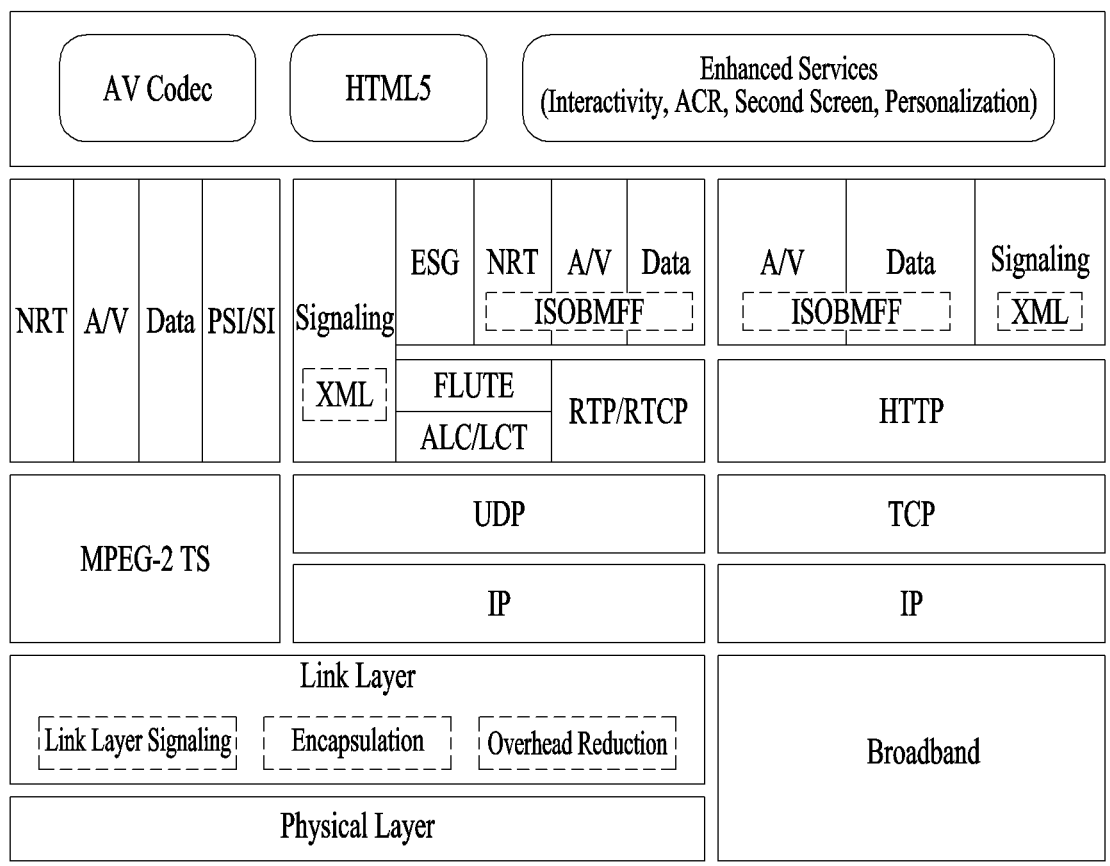
FIG. 41 is a diagram illustrating protocol stack for a next-generation broadcast system according to an embodiment of the present invention.

FIG. 41 is a diagram illustrating protocol stack for a next-generation broadcast system according to an embodiment of the present invention.

The broadcast system according to the present invention may be a hybrid broadcast system formed by combining an Internet protocol (IP) centric broadcast network and a broadband.

The broadcast system according to the present invention may be designed to maintain compatibility with a typical MPEG-2 based broadcast system.

The broadcast system according to the present invention may be a hybrid broadcast system based on a combination of an IP centric broadcast network, a broadband network, and/or a mobile communication network or a cellular network.

Referring to the drawing, a physical layer may use a physical protocol employed in a broadcast system such as an ATSC system and/or a DVB system. For example, in the physical layer according to the present invention, a transmitter/receiver may transmit/receive a terrestrial broadcast signal and convert a transport frame including broadcast data into an appropriate form.

In an encapsulation layer, IP datagram may be acquired from information acquired from the physical layer or the acquired IP datagram may be converted into a specific frame (e.g., RS Frame, GSE-lite, GSE, or signal frame). Here, the frame may include a set of IP datagrams. For example, in the encapsulation layer, the transmitter may add data processed by the physical layer to a transport frame or the receiver may extract MPEG-2 TS and IP datagram from the transport frame acquired from the physical layer.

A fast information channel (FIC) may include information (e.g., mapping information between a service ID and a frame) for access to a service and/or content. The FIC may also be referred to as a fast access channel (FAC).

The broadcast system according to the present invention may use a protocol such as Internet Protocol (IP), User Datagram Protocol (UDP), Transmission Control Protocol (TCP), Asynchronous Layered Coding/Layered Coding Transport (ALC/LCT), Rate Control Protocol/RTP Control Protocol (RCP/RTCP), Hypertext Transfer Protocol (HTTP), and File Delivery over Unidirectional Transport (FLUTE). Stack between theses protocols may be understood with reference to a structure illustrated in the drawing.

The broadcast system according to the present invention, data may be transmitted in the form of ISO base media file format (ISOBMFF). Electrical Service Guide (ESG), Non Real Time (NRT), Audio/Video (AN), and/or general data may be transmitted in the form of ISOBMFF.

Transmission of data via a broadcast network may include transmission of linear content and/or transmission of non-linear content.

Transmission of RTP/RTCP based A/V and Data (closed caption, emergency alert message, etc.) may correspond to transmission of linear content.

A RTP payload may be encapsulated and transmitted in the form of an ISO based media file format and/or a RTP/AV stream including a Network Abstraction Layer (NAL). Transmission of the RTP payload may correspond to transmission of linear content. Transmission with encapsulation in the form of ISO based media file format may include a MPEG DASH media segment for AN, etc.

Transmission of FLUTE-based ESG, transmission of non-timed data, and transmission of NRT content may correspond to transmission of non-linear content. These may be encapsulated and transmitted in the form of a file of an MIME type and/or ISO based media file format. Transmission with encapsulation in the form of ISO based media file format may include an MPEG DASH media segment for A/V, etc.

Transmission via a broadband network may be divided into transmission of content and transmission of signaling data.

Transmission of content may include transmission of Linear content (A/V, data (closed caption, emergency alert message, etc.), transmission of non-linear content (ESG, non-timed data, etc.), and transmission of MPEG DASH-based Media segment (A/V, data).

Transmission of signaling data may be transmission containing a signaling table (including MPD of MPEG DASH) transmitted in a broadcast network.

The broadcast system according to the present invention may support synchronization between linear/non-linear contents transmitted via a broadcast network or synchronization between content transmitted via a broadcast network and content transmitted via a broadband. For example, when one UD content item is divided and the divided contents are simultaneously transmitted through a broadcast network and a broadband, the receiver may adjust a timeline dependent upon a transport protocol and synchronize content of a broadcast network and content of a broadcast to reconfigure one UD content item.

An Applications layer of the broadcast system according to the present invention may embody technological features such as interactivity, personalization, second screen, and automatic content recognition (ACR). These features are important features in terms of extension to ATSC3.0 from ATSC2.0 that is the broadcast standard of North America. For example, for the feature of interactivity, HTML5 may be used.

In a presentation layer of the broadcast system according to the present invention, HTML and HTML5 may be used in order to identify spatial and temporal relationship between components or interactive applications.

According to the present invention, signaling may include signaling information for supporting effective acquisition of content and/or a service. Signaling data may be represented in the form of binary or XML and may be transmitted through a terrestrial broadcast network or a broadband.

Real-time broadcast A/V content and/or data may be represented in ISO Base Media File Format or the lime. In this case, broadcast A/V content and/or data may be transmitted through a terrestrial broadcast network in real time and transmitted based on IP/UDP/FLUTE in non real time. Alternatively, broadcast A/V content and/or data may be received by streaming or making a request for content in real time using Dynamic Adaptive Streaming over HTTP (DASH) via the Internet. The broadcast system according to an embodiment of the present invention may combine the broadcast A/V content and/or the data received as such and provide various enhanced services such as an Interactive service and a second screen service to a viewer.

In a hybrid based broadcast system of TS and IP, a link layer may be used in order to transmit a TS or IP stream type of data. The link layer may convert data into format supported by the physical layer and transmit the data to the physical layer in order to transmit various types of data through the physical layer. Thereby, various types of data may be transmitted through the same physical layer. Here, the physical layer may refer to an operation of interleaving, multiplexing, and/or modulating data and transmitting the data using a method such as MIMO/MISO.

The link layer needs to be designed to minimize influence on an operation of the link layer even if a configuration of the physical layer is changed. That is, the operation of the link layer needs to be determined so as to compatible with various physical layers.

The present invention proposes a link layer that may independently operate irrespective of the types of an upper layer and a lower layer. Thereby, various upper layers and lower layers may be supported. Here, the upper layer may refer to a layer of a data stream such as TS or IP. Here, the lower layer may refer to a physical layer. In addition, the present invention proposes a link layer with a correctible structure whereby a function supportable by the link layer may be extended/added/removed. In addition, the present invention proposes a method of configuring an overhead reduction function in a link layer so as to effectively use a radio resource.

In the drawing, layers and a protocol such as Internet Protocol (IP), User Datagram Protocol (UDP), Transmission Control Protocol (TCP), Asynchronous Layered Coding/Layered Coding Transport (ALC/LCT), Rate Control Protocol/RTP Control Protocol (RCP/RTCP), Hypertext Transfer Protocol (HTTP), and File Delivery over Unidirectional Transport (FLUTE) are the same as in the above description.

In the drawing, a link layer t88010 may be another embodiment of the aforementioned data link part (data link (encapsulation) part). The present invention proposes a structure and/or operation of the link layer t88010. The link layer t88010 proposed according to the present invention may process signaling required for operations of the link layer and/or the physical layer. In addition, the link layer t88010 proposed according to the present invention may perform encapsulation of TS and IP packets, etc. and perform overhead reduction, etc. during this procedure.

The link layer t88010 proposed according to the present invention may be referred to as various terms such as a data link layer, an encapsulation layer, and layer 2. In some embodiments, the link layer may be denoted by a new term and may be used.

Figure 42:
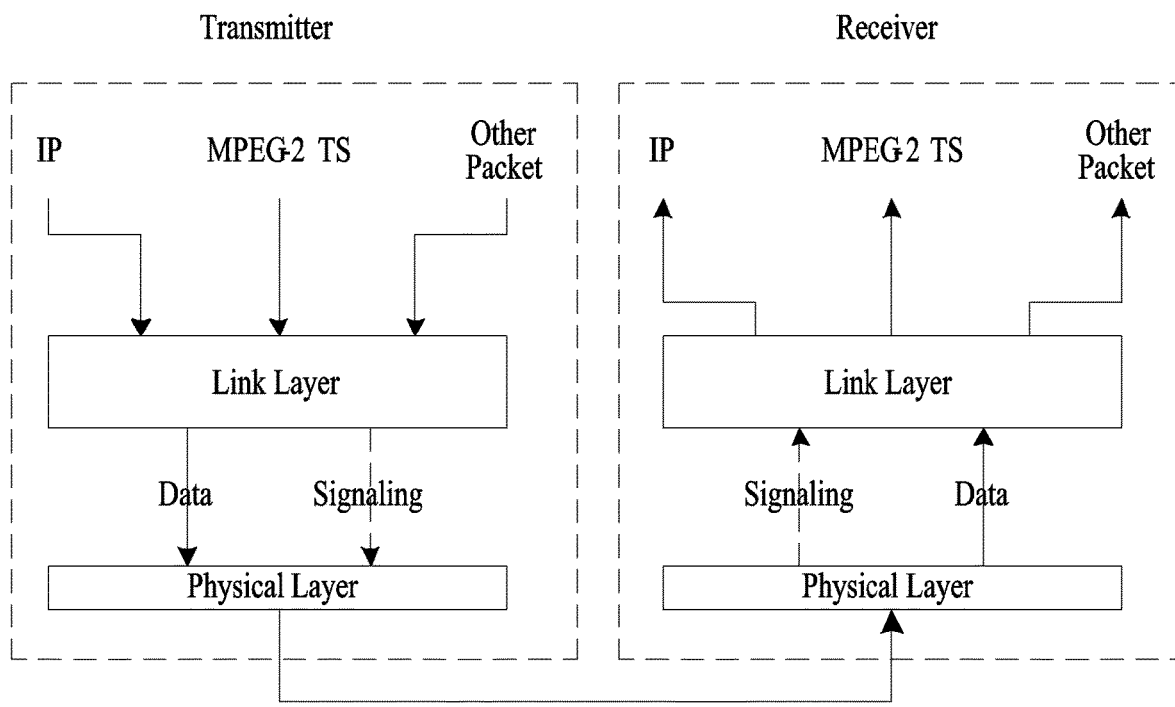
FIG. 42 is a diagram illustrating an interface of a link layer according to an embodiment of the present invention.

FIG. 42 is a diagram illustrating an interface of a link layer according to an embodiment of the present invention.

FIG. 42 illustrates the case in which a transmitter uses an IP packet and/or an MPEG2-TS packet used in digital broadcast as an input signal. The transmitter may support a packet structure in a new protocol to be used in a next-generation broadcast system. Encapsulated data and/or signaling information of the link layer may be transmitted in a physical layer. The transmitter may process transmitted data (which may include signaling data) according to a protocol of a physical layer supported by a broadcast system and transmit a signal including corresponding data.

A receiver may restore data and/or signaling information received from the physical layer to other data to be processed in an upper layer. The receiver may read a header of a packet and determine whether a packet received from a physical layer includes signaling information (or signaling data) or general data (or content data).

The signaling information (i.e., signaling data) transmitted from the transmitter may include first signaling information that is received from an upper layer and needs to be transmitted to the upper layer, second signaling information that is generated in the link layer and provides information related to processing of data in the link layer of the receiver, and/or third signaling information that is generated in an upper layer or a link layer and is transmitted in order to rapidly identify specific data (e.g., service, content, and/or signaling data) in a physical layer.

Figure 43:
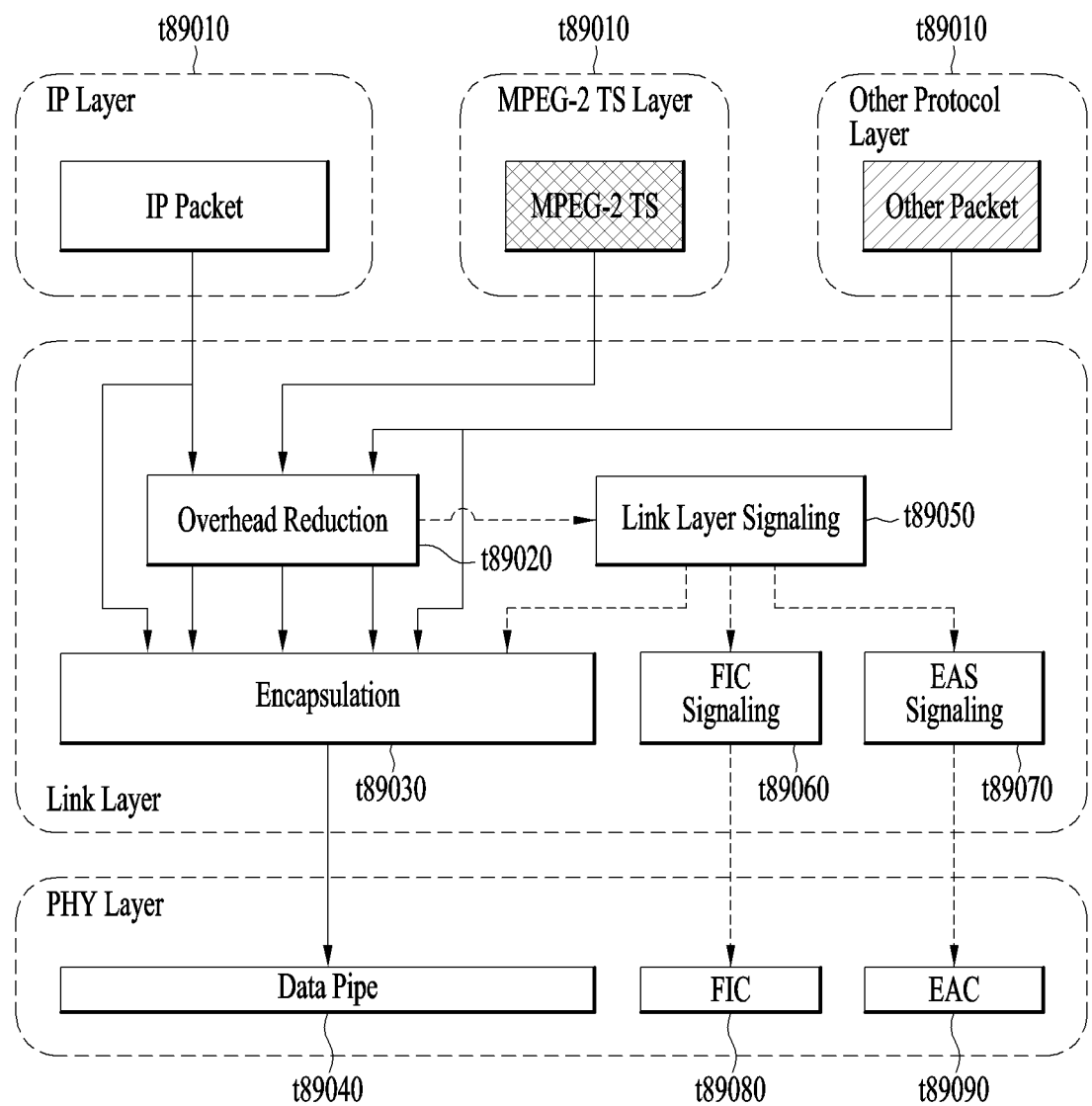
FIG. 43 is a diagram illustrating an operation in a normal mode among operation modes of a link layer according to an embodiment of the present invention.

FIG. 43 is a diagram illustrating an operation in a normal mode among operation modes of a link layer according to an embodiment of the present invention.

The link layer proposed according to the present invention may have various operation modes for compatibility with an upper layer and a lower layer. The present invention proposes a normal mode and a transparent mode of a link layer. The two operation modes may coexist in the link layer and a mode that is supposed to be used may be determined using signaling or a system parameter. In some embodiments, only one of the two modes may be embodied. Different modes may be applied according to an IP layer, a TS layer, and so on which are input to the link layer. In addition, different modes may be applied for respective streams of an IP layer and respective streams of a TS layer.

In some embodiments, a new operation mode may be added to a link layer. The new operation mode may be added based on structures of the upper layer and the lower layer. The new operation mode may include different interfaces based on the configurations of the upper layer and the lower layer. Whether the new operation mode is used may also be determined using signaling or a system parameter.

In a normal mode, data may be processed via all functions supported by the link layer and then transmitted to a physical layer.

First, each packet from an IP layer, an MPEG-2 TS layer, or another specific layer t89010 may be transmitted to the link layer. That is, the IP packet may be transmitted to the link layer from the IP layer. Similarly, the MPEG-2 TS packet may be transmitted to the link layer from the MPEG-2 TS layer and a specific packet may be transmitted to the link layer from a specific protocol layer.

Each of the transmitted packets may go through encapsulation t89030 after or without going through overhead reduction t89020.

First, the IP packet may go through the encapsulation t89030 after or without going through the overhead reduction t89020. Whether overhead reduction is performed may be determined according to signaling or a system parameter. In some embodiments, overhead reduction may or may not be performed for each IP stream. An encapsulated IP packet may be transmitted to a physical layer.

Second, the MPEG-2 TS packet may go through the encapsulation t89030 after going through the overhead reduction t89020. In some embodiments, in the case of the MPEG-2 TS packet, the overhead reduction procedure may also be omitted. However, in a general case, the TS packet has a sync byte (0x47), etc. in front and, thus, it may be effective to remove the fixed overhead. The encapsulated TS packet may be transmitted to the physical layer.

Third, a packet that is not an IP or TS packet may go through the encapsulation t89030 after or without going through the overhead reduction t89020. Whether overhead reduction is performed may be determined according to the characteristics of a corresponding packet. Whether overhead reduction is performed may be determined according to signaling or a system parameter. The encapsulated packet may be transmitted to the physical layer.

During a procedure of the overhead reduction t89020, a size of an input packet may be reduced via an appropriate method. During the overhead reduction procedure, specific information may be extracted or generated from the input packet. The specific information may be associated with signaling and transmitted through a signaling region. The signaling information may allow a receiver to restore a changed item to an original packet form during the overhead reduction. The signaling information may be transmitted to the link layer signaling t89050.

The link layer signaling t89050 may transmit and manage the signaling information extracted/generated during the overhead reduction procedure. The physical layer may have transmission paths that are physically/logically separated for signaling and the link layer signaling t89050 may transmit signaling information to the physical layer according to the separated transmission paths. Here, the separated transmission paths may include the aforementioned FIC signaling t89060 and EAS signaling t89070, etc. Signaling information items that are not transmitted through the separated transmission paths may be transmitted to the physical layer through the encapsulation t89030.

The signaling information managed by the link layer signaling t89050 may include signaling information received from an upper layer, signaling information generated in a link layer, and/or a system parameter. In detail, the signaling information managed by the link layer signaling t89050 may include signaling information that is received from an upper layer and needs to be transmitted to an upper layer of the receiver as a result, signaling information that is generated in an link layer and needs to be used in an operation of a link layer of a receiver, signaling information that is generated in an upper layer or a link layer and is used for rapid detection in a physical layer of a receiver, etc.

Data that goes through the encapsulation t89030 and transmitted to a physical layer may be transmitted through a data pipe (DP) t89040. Here, the DP may be a physical layer pipe (PLP). The aforementioned signaling information items transmitted through the separated transmission paths may be transmitted through transmission paths, respectively. For example, FIC signaling may be transmitted through an FIC channel t89080 determined in a physical frame. In addition, EAS signaling may be transmitted through an EAC channel t89090 determined in a physical frame. Information indicating a specific channel such an FIC channel or an EAC channel is present may be signaled and transmitted in a preamble region of a physical frame or may be signaled by scrambling a preamble using a specific scrambling sequence. In some embodiments, FIC signaling/EAS signaling information items may be transmitted through a general DP region, a PLS region, or a preamble, but not a determined specific channel.

The receiver may receive data and signaling information through the physical layer. The receiver may restore the data and the signaling information in the form of data that is capable of being processed in the upper layer and transmit the restored data and signaling information to the upper layer. This procedure may be performed in the link layer of the receiver. The receiver may determine whether the received packet is associated with the signaling information or the data using a method of reading a header of a packet, etc. In addition, the receiver may restore a packet with reduced overhead to an original packet through overhead reduction when a transmitter side performs overhead reduction. During this procedure, the received signaling information may be used.

Figure 44:
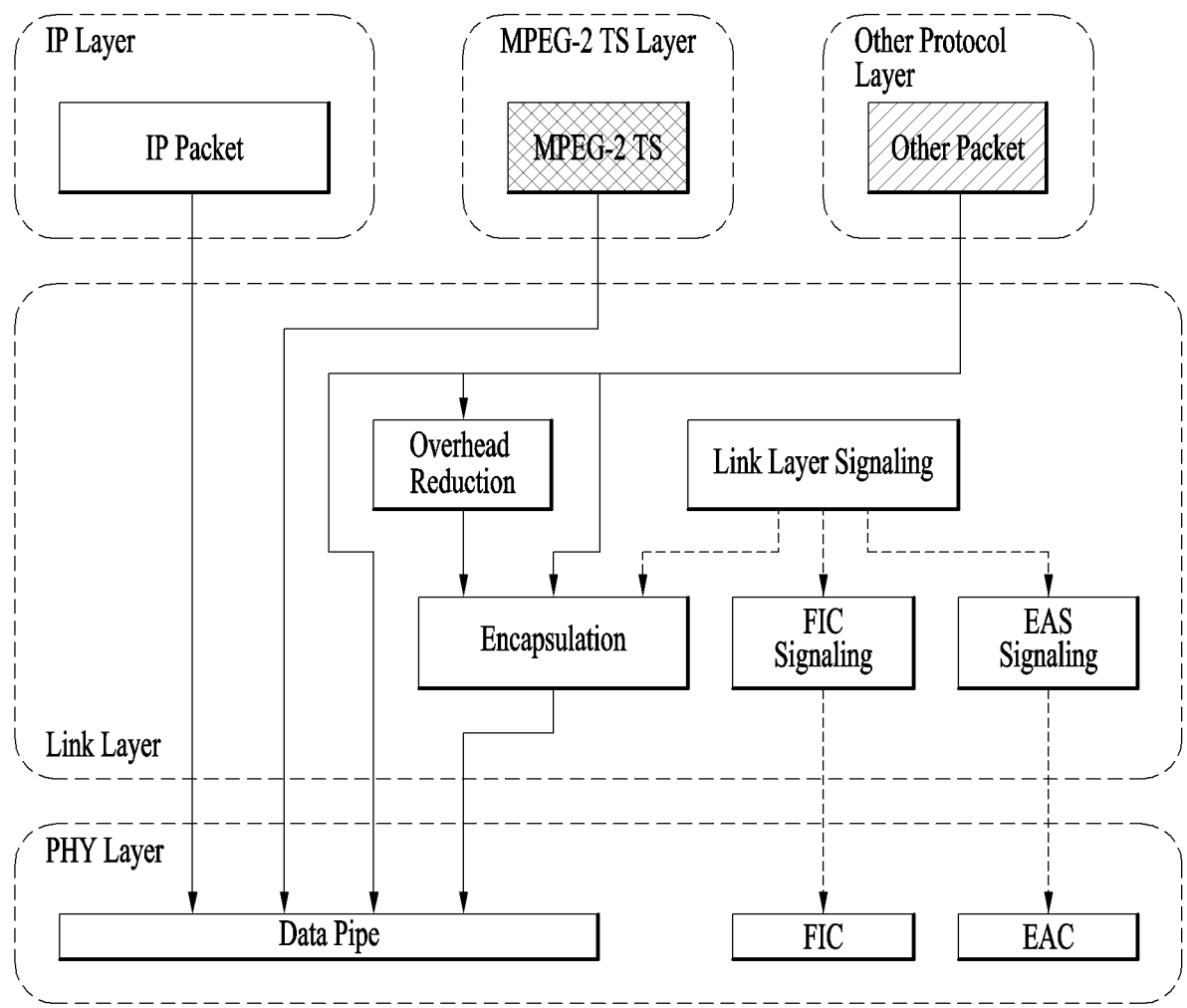
FIG. 44 is a diagram illustrating an operation in a transparent mode among operation modes of a link layer according to an embodiment of the present invention.

FIG. 44 is a diagram illustrating an operation in a transparent mode among operation modes of a link layer according to an embodiment of the present invention.

In the transparent mode, data may be transmitted to a physical layer without going through functions supported by a link layer or after going through some of functions supported by the link layer. That is, in the transparent mode, a packet received from the upper layer may be transmitted to the physical layer without a change without going through separate overhead reduction and/or encapsulation procedures. As necessary, other packets may go through overhead reduction and/or encapsulation procedures. The transparent mode may be referred to as a bypass mode or other terms.

In some embodiments, some packets may be processed in a normal mode and some packets may be provided in a transparent mode based on the characteristics of packets and management of a system.

A packet to which the transparent mode is applied may be a packet of a type that is a well known to the system. When a corresponding packet may be capable of being processed in the physical layer, the transparent mode may be used. For example, a well known TS or IP packet may go through a separate overhead reduction and input formatting procedure in the physical layer and, thus, the transparent mode may be used in a procedure of the link layer. When the transparent mode is applied and a packet is processed through input formatting, etc. in the physical layer, an operation such as the aforementioned TS header compression may be performed in the physical layer. On the other hand, when a normal mode is applied, the processed link layer packet may be considered and processed as a GS packet in the physical layer.

In the transparent mode, when transmission of signaling needs to be supported, a link layer signaling module may be used. As described above, the link layer signaling module may transmit and manage the signaling information. The signaling information may be encapsulated and transmitted through a DP and FIC and EAS signaling information items having separated transmission paths may be transmitted through an FIC channel and an EAC channel, respectively.

In the transparent mode, whether corresponding information is signaling information may be indicated using a method of using a fixed IP address and a Port number, etc. In this case, corresponding signaling information may be filtered to configure a link layer packet and then may be transmitted through the physical layer.

Figure 45:
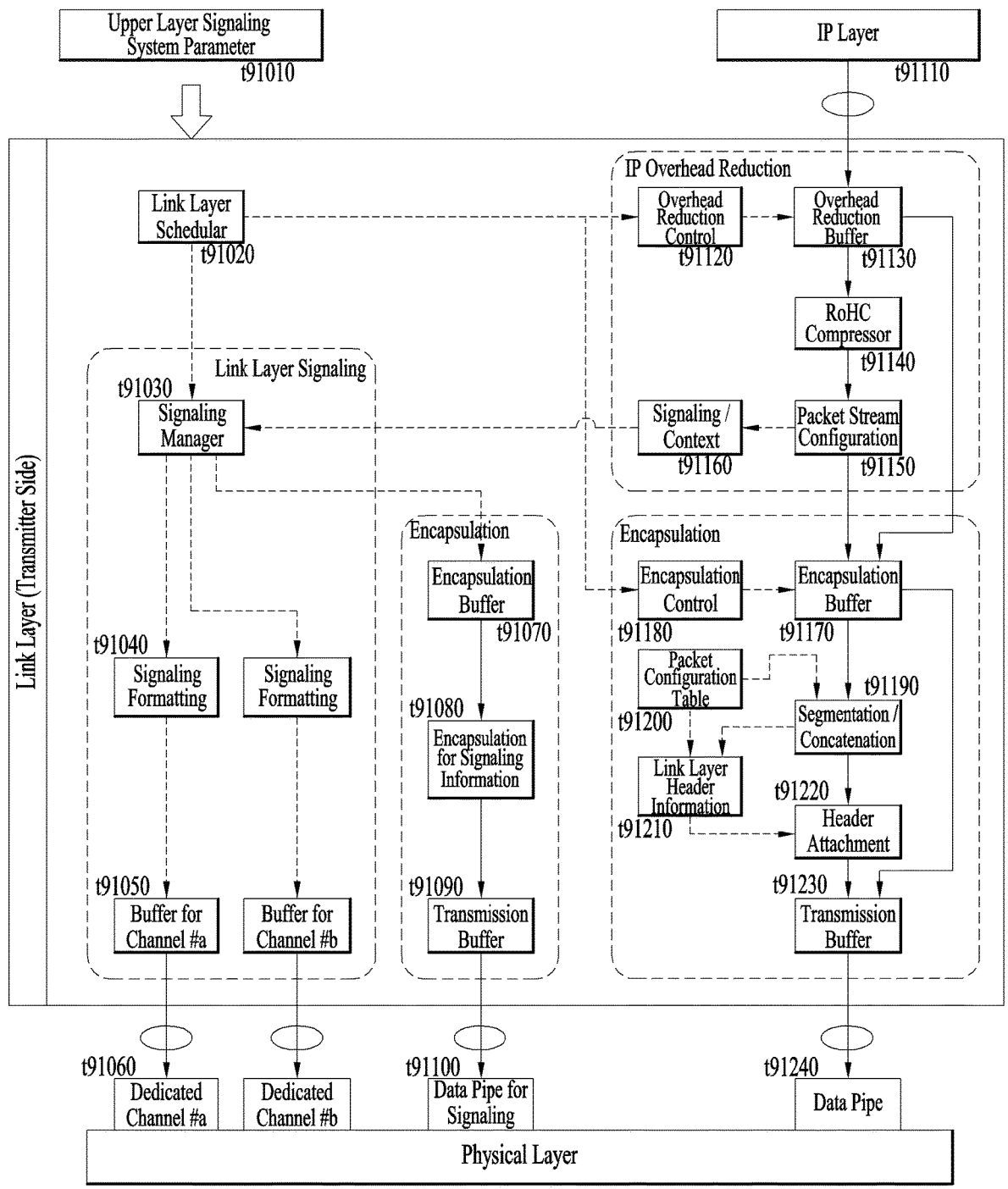
FIG. 45 is a diagram illustrating a structure of a link layer of a transmitter side according to an embodiment of the present invention (normal mode)

FIG. 45 is a diagram illustrating a structure of a link layer of a transmitter side according to an embodiment of the present invention (normal mode).

In the present embodiment, an IP packet is assumed to be processed. In terms of a function of the link layer of the transmitter side, the link layer may roughly include a link layer signaling part for processing signaling information, an overhead reduction part, and/or an encapsulation part. In addition, the link layer of the transmitter side may include a scheduler for controlling and scheduling an entire operation of the link layer and/or an input/output part of the link layer.

First, an upper signaling information and/or system parameter t91010 may be transmitted to the link layer. In addition, an IP stream including IP packets from an IP layer t91110 may be transmitted to the link layer.

As described above, a scheduler t91020 may determine and control operations of various modules included in the link layer. The received upper signaling information and/or system parameter t91010 may be filtered and used by the scheduler t91020. Information required by the received from the received upper signaling information and/or system parameter t91010 may be transmitted to the link layer signaling part. In addition, information required for the operation of the link layer from the signaling information may be transmitted to the overhead reduction control t91120 or encapsulation control t91180.

The link layer signaling part may collect information to be transmitted as signaling in the physical layer and convert/configure the information in the form appropriate for transmission. The link layer signaling part may include a signaling manager t91030, a signaling formatter t91040, and/or a buffer t91050 for a channel.

The signaling manager t91030 may receive signaling information received from the scheduler t91020 and signaling and/or context information received from the overhead reduction part. The signaling manager t91030 may determine a path through which each signaling information items is to be transmitted with respect to the received data. Each signaling information item may be transmitted through a path determined by the signaling manager t91030. As described above, signaling information items to be transmitted through the separated channels such as FIC and EAS may be transmitted to the signaling formatter t91040 and other signaling information items may be transmitted an encapsulation buffer t91070.

The signaling formatter t91040 may format related signaling information in the form appropriate for the separated channels so as to transmit signaling information through the separated channels. As described above, the physical layer may include physically/logically separated channels. The separated channels may be used to transmit FIC signaling information or EAS related information. The FIC or EAS related information may be classified by the signaling manager t91030 and input to the signaling formatter t91040. The signaling formatter t91040 may format information items according to respective separate channels. Other than the FIC and the EAS, when the physical layer is designed to transmit specific signaling information through a separated channel, a signaling formatter for the specific signaling information may be added. By this method, the link layer may be compatible with various physical layers.

The buffers t91050 for a channel may transmit signaling information items received from the signaling formatter t91040 to a separately determined channel t91060. The number and information of the separate channels may be changed in some embodiments.

As described above, the signaling manager t91030 may consider signaling information that is not transmitted to a specific channel to the encapsulation buffer t91070. The encapsulation buffer t91070 may function as a buffer that receives signaling information that is not transmitted to a specific channel.

Encapsulation t91080 for signaling information may be performed on the signaling information that is not transmitted to a specific channel. A transmission buffer t91090 may function as a buffer that transmits the encapsulated signaling information to a DP t91100 for signaling information. Here the DP t91100 for signaling information may refer to the aforementioned PLS region.

The overhead reduction part may remove overhead of packets transmitted to the link layer to enable effective transmission. The overhead reduction part may be configured by as much as the number of IP streams input to the link layer.

An overhead reduction buffer t91130 may receive an IP packet received from the upper layer. The received IP packet may be input to the overhead reduction part through the overhead reduction buffer t91130.

The overhead reduction control t91120 may determine whether overhead reduction is performed on a packet stream input to the overhead reduction buffer t91130. The overhead reduction control t91120 may determine whether overhead reduction is performed for each packet stream. When overhead reduction is performed on a packet stream, packets may be transmitted to a RoHC compressor t91140 and overhead reduction may be performed. When overhead reduction is not performed on a packet stream, packets may be transmitted to the encapsulation part and encapsulation may proceed without overhead reduction. Whether overhead reduction of packets is performed may be determined according to the upper signaling information and/or system parameter t91010 transmitted to the upper signaling information and/or system parameter t91010. The signaling information items may be transmitted to the overhead reduction control t91120 by the scheduler t91020.

The RoHC compressor t91140 may perform overhead reduction on a packet stream. The RoHC compressor t91140 may perform an operation of compressing headers of packets. Various methods may be used in overhead reduction. Overhead reduction may be performed using the aforementioned methods proposed by the present invention. In the present embodiment, an IP stream is assumed and, thus, is represented as an RoHC compressor. However, the term of the IP stream may be changed in some embodiments, an operation may not also be limited to compression of an IP stream, and overhead reduction of all types of packets may be performed by the RoHC compressor t91140.

A packet stream configuration block t91150 may separate information to be transmitted to a signaling region and information to be transmitted to a packet stream from IP packets with a compressed header. The information to be transmitted to the packet stream may refer to information to be transmitted to a DP region. The information to be transmitted to the signaling region may be transmitted to signaling and/or context control t91160. The information to be transmitted to the packet stream may be transmitted to the encapsulation part.

The signaling and/or context control t91160 may collect signaling and/or context information and transmit the signaling and/or context information to a signaling manager in order to transmit the signaling and/or the context information to the signaling region.

The encapsulation part may perform an operation of encapsulating packets in the form appropriate for transmission of the packets to the physical layer. The encapsulation part may be configured by as much as the number of IP streams.

An encapsulation buffer t91170 may receive a packet stream for encapsulation. When overhead reduction is performed, the encapsulation buffer t91170 may receive the overhead-reduced packets and when overhead reduction is not performed, the encapsulation buffer t91170 may receive an input IP packet without a change.

The encapsulation control t91180 may determine whether encapsulation is to be performed on the input packet stream. When encapsulation is performed, the packet stream may be transmitted to segmentation/concatenation t91190. When encapsulation is not performed, the packet stream may be transmitted to a transmission buffer t91230. Whether encapsulation is performed on packets may be determined according to the upper signaling information and/or system parameter t91010 transmitted to the link layer. The signaling information items may be transmitted to the encapsulation control t91180 by the scheduler t91020.

The segmentation/concatenation t91190 may perform the aforementioned segmentation or concatenation operation on packets. That is, when the input IP packet is longer than a link layer packet as an output of the link layer, one IP packet may be divided into a plurality of segments to form a plurality of link layer packet payloads. In addition, when the input IP packet is shorter than a link layer packet as an output of the link layer, a plurality of IP packets are connected to each other to form one link layer packet payload.

A packet configuration table t91200 may have configuration information of the segmented and/or concatenated link layer packet. Information of the packet configuration table t91200 may be the same as information of the transmitter and the receiver. The information of the packet configuration table t91200 may be referred to by the transmitter and the receiver. An index value of the information of the packet configuration table t91200 may be contained in a header of the corresponding link layer packet.

A link layer header information block t91210 may collect header information generated during the encapsulation procedure. In addition, the link layer header information block t91210 may collect information owned by the packet configuration table t91200. The link layer header information block t91210 may configure header information according to a header structure of the link layer packet.

Header attachment t91220 may add a header to a payload of the segmented and/or concatenated link layer packet. The transmission buffer t91230 may function as a buffer for transmitting a link layer packet to a DP t91240 of the physical layer.

Blocks, modules, and parts may be configured as one module/protocol in the link layer or may be configured as a plurality of modules/protocols.

Figure 46:
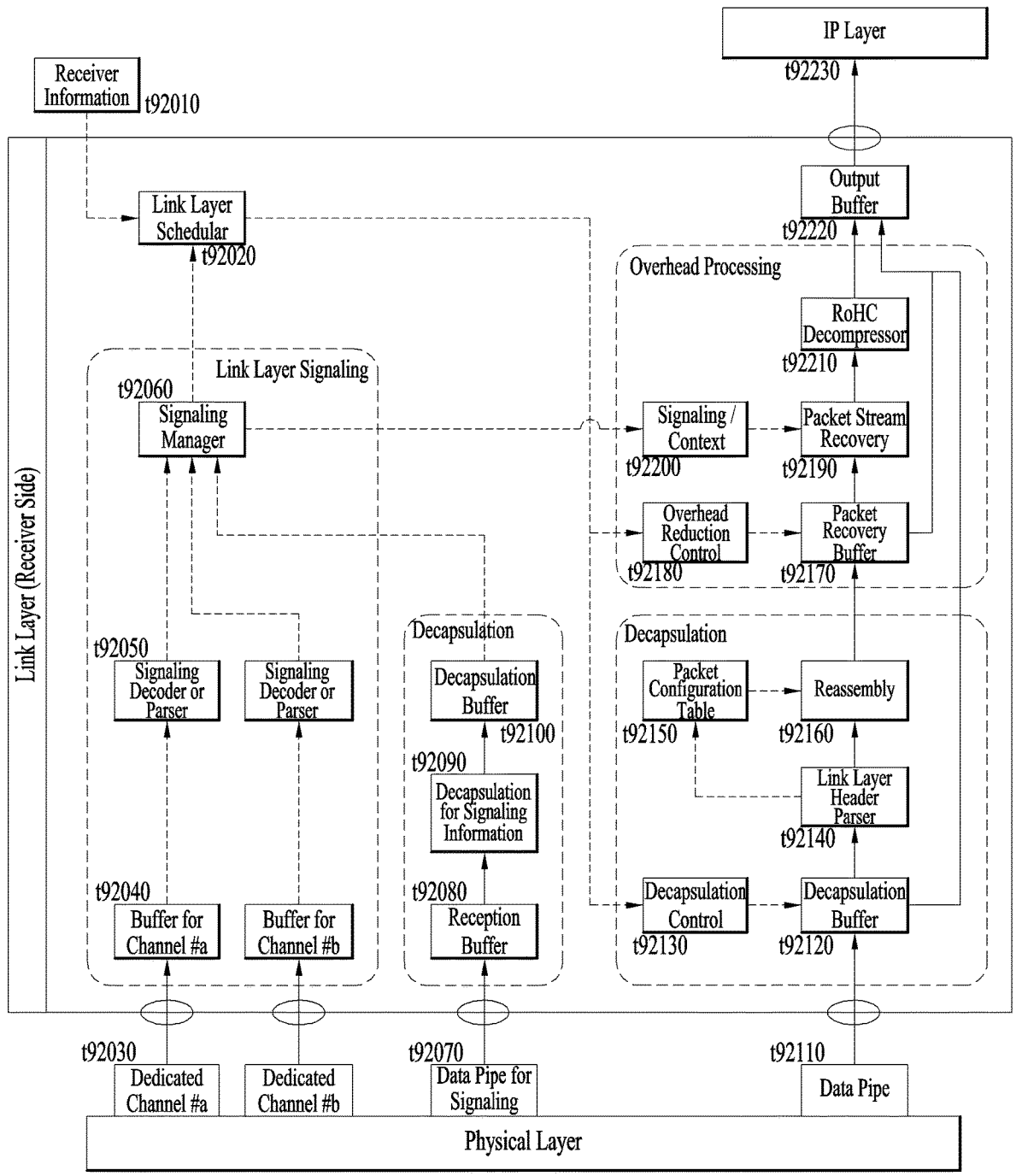
FIG. 46 is a diagram illustrating a structure of a link layer of a receiver side according to an embodiment of the present invention (normal mode)

FIG. 46 is a diagram illustrating a structure of a link layer of a receiver side according to an embodiment of the present invention (normal mode).

In the present embodiment, an IP packet is assumed to be processed. In terms of a function of the link layer of the receiver side, the link layer may roughly include a link layer signaling part for processing signaling information, an overhead processing part, and/or a decapsulation part. The link layer of the receiver side may include a scheduler for controlling and scheduling an entire operation of the link layer and/or an input/output part.

First, information items received from the physical layer may be transmitted to the link layer. The link layer may process the information items, restore the information items to an original state before being processed by the transmitter side, and transmit the restored information items to the upper layer. In the present embodiment, the upper layer may be an IP layer.

Information items transmitted through specific channels t92030 separated in the physical layer may be transmitted to the link layer signaling part. The link layer signaling part may determine signaling information items received from the physical layer and transmit the determined signaling information items to the respective parts of the link layer.

A buffer t92040 for a channel may function as a buffer that receives signaling information items transmitted through specific channels. As described above, when physical/logically separated channels are present in the physical layer, signaling information items transmitted through the channels may be received. When the information items received from the separate channels may be separate, the separated information items may be stored until the information items become a complete form of information.

A signaling decoder/parser t92050 may check format of signaling information received through a specific channel and extract information items to be used in the link layer. When signaling information through a specific channel is encoded, decoding may be performed. In addition, in some embodiments, integrity, etc. of corresponding signaling information may be checked.

A signaling manager t92060 may integrate signaling information items received through various paths. Signaling information items received through a DP t92070 for signaling to be described below may also be integrated by the signaling manager t92060. The signaling manager t92060 may transmit signaling information required by each part of the link layer. For example, context information, etc. for recovery of a packet may be transmitted to the overhead processing part. In addition, signaling information items for control may be transmitted to a scheduler t92020.

General signaling information items that are not received by a separate specific channel may be received through the DP t92070 for signaling. Here, the DP for signaling may refer to a PLS or the like. A reception buffer t92080 may function as a buffer that receives signaling information received from the DP for signaling. Decapsulation t92090 of signaling information, the received signaling information may be decapsulated. The decapsulated signaling information may be transmitted to the signaling manager t92060 through a decapsulation buffer t92100. As described above, the signaling manager t92060 may collect signaling information and transmit the information to a required part of the link layer.

The scheduler t92020 may determine and control operations of various modules included in the link layer. The scheduler t92020 may control each part of the link layer using receiver information t92010 and/or information received from the signaling manager t92060. In addition, the scheduler t92020 may determine an operation mode, etc. of each part. Here, the receiver information t92010 may refer to information that is pre-stored by the receiver. The scheduler t92020 may also use information used by a user, such as channel conversion, for control.

The decapsulation part may filter a packet received from a DP t92110 of the physical layer and separate packets according to a type of a corresponding packet. The decapsulation part may be configured by as much as the number of DPs for simultaneous decoding in the physical layer.

A decapsulation buffer t92120 may function as a buffer that receives a packet stream from the physical layer for decapsulation. Decapsulation control t92130 may determine whether decapsulation is performed on an input packet stream. When decapsulation is performed, a packet stream may be transmitted to a link layer header parser t92140. When decapsulation is not performed, the packet stream may be transmitted to an output buffer t92220. The signaling information received from the scheduler t92020 may be used to determine whether decapsulation is performed.

The link layer header parser t92140 may check a header of the received link layer packet. The header may be checked to check a configuration of the IP packet included in a payload of the link layer packet. For example, the IP packet may be segmented or concatenated.

A packet configuration table t92150 may include payload information of a link layer packet configured via segmentation and/or concatenation. The information of the packet configuration table t92150 may have the same information as the transmitter and the receiver. The information of the packet configuration table t92150 may be referred to by the transmitter and the receiver. A value required for assembly may be discovered based on index information included in the link layer packet.

A reassembly block t92160 may configure a payload of a link layer packet configured via segmentation and/or concatenation using packets of an original IP stream. Segments may be collected as one to reassemble one IP packet or concatenated packets may be separated to reassemble a plurality of IP packet streams. The reassembled IP packets may be transmitted to the overhead processing part.

The overhead processing part may restore the overhead-reduced packets to an original packet as an inverse process of the overhead reduction performed by the transmitter. This operation is referred to as overhead processing. The overhead processing part may be configured by as much as the number of DPs for simultaneous decoding in the physical layer.

A packet recovery buffer t92170 may function as a buffer for receiving an RoHC packet and IP packet decapsulated for overhead processing.

Overhead control t92180 may determine whether packet recovery and/or decompression are performed on the decapsulated packets. When packet recovery and/or decompression are performed, a packet may be transmitted to packet stream recovery t92190. When packet recovery and/or decompression are not performed, packets may be transmitted to the output buffer t92220. Whether packet recovery and/or decompression are performed may be determined based on signaling information transmitted to the scheduler t92020.

The packet stream recovery t92190 may integrate a packet stream separated by the transmitter and context information of the packet stream. This may be a procedure of restoring a packet stream so as to be processed by an RoHC decompressor t92210. During this procedure, signaling information and/or context information may be received from signaling and/or context control t92200. The signaling and/or context control t92200 may determine signaling information received from the transmitter and transmit signaling information to packet stream recovery t92190 so as to be mapped to a stream appropriate for a corresponding context ID.

The RoHC decompressor t92210 may restore a header of packets of the packet stream. The packets of the packet stream may be restored to the original form of the IP packets by restoring a header. That is, the RoHC decompressor t92210 may perform overhead processing.

The output buffer t92220 may function as buffer prior to transmitting of an output stream to the IP layer t92230.

The link layer of the transmitter and receiver proposed according to the present invention may include the aforementioned blocks and modules. Thereby, the link layer may independently operate irrespective of the upper layer and the lower layer, may effectively perform overhead reduction, and may easily fix/add/remove a function supportable by upper and lower layers, etc.

FIG. 47 is a diagram illustrating definition according to a type of an organization of a link layer according to an embodiment of the present invention.

When the link layer is embodied as an actual protocol layer, a broadcast service may be transmitted and received through one frequency slot. Here, one frequency slot may be, for example, a broadcast channel that mainly has a specific bandwidth. As described above, according to the present invention, when a configuration of a physical layer is changed in a broadcast system, or in a plurality of broadcast systems having different physical layer structures, a compatible link layer may be defined.

The physical layer may have a logical data path for an interface of the link layer. The link layer may be connected to a logical data path of the physical layer and may transmit information associated to a corresponding data path. A data path of the physical layer interfaced with the link layer may be considered in the following form.

In a broadcast system, a normal data pipe (normal DP) may be present in the form of a data path. The Normal Data Pipe may be a data pipe for transmitting general data and one or more data pipes may be present according to a configuration of the physical layer.

In the broadcast system, a data base pipe (data DP) may be present in the form of a data path. The Base Data Pipe may be a data pipe used for a specific purpose and may transmit signaling information (entire or partial signaling information described in the present invention) and/or data common in a corresponding frequency slot. As necessary, for effective management of a bandwidth, data transmitted through a normal data pipe may be transmitted through a Base Data Pipe. When a Dedicated channel is present, if a size of information to be transmitted exceeds accommodation capability of corresponding channel, the Base Data Pipe may perform a complementary role. That is, the data that exceeds the accommodation capability of the corresponding channel may be transmitted through the Base Data Pipe.

With regard to a base data pipe, it may be general to continuously use one determined data pipe, but one or more data pipes may be dynamically selected among a plurality of data pipes for the base data pipe using a method such as physical layer signaling or link layer signaling in order to effectively manage a data pipe.

In the broadcast system, a dedicated channel may be present in the form of a data path. The Dedicated Channel may be a channel used for signaling in a physical layer or for a specific purpose similar thereto and may include a Fast Information Channel (FIC) for rapidly acquiring items serviced on a current frequency slot and/or an emergency alert channel (EAC) for immediately transmitting notification of urgent alarm to a user.

It may be general to embody a logical data path in the Physical layer in order to transmit a normal data pipe. The Base data pipe and/or the logical data path for a Dedicated Channel may not be embodied in the physical layer.

An organization for transmitting data to be transmitted in the link layer may be defined as in the drawing.

Organization Type 1 may indicate the case in which a logical data path includes only a Normal Data Pipe.

Organization Type 2 may indicate the case in which a logical data path includes a Normal Data Pipe and a Base Data Pipe.

Organization Type 3 may indicate the case in which a logical data path includes a Normal Data Pipe and a Dedicated Channel.

Organization Type 4 may indicate the case in which a logical data path includes a Normal Data Pipe, a Base Data Pipe, and a Dedicated Channel.

As necessary, the logical data path may include a Base Data Pipe and/or a Dedicated Channel.

According to an embodiment of the present invention, a transmitting procedure of signaling information may be determined according to a configuration of a logical data path. Detailed information of signaling transmitted in a specific logical data path may be determined according to a protocol of an upper layer of a link layer defined in the present invention. With regard to the procedure described in the present invention, signaling parsed through an upper layer may also be used, and corresponding signaling may be transmitted in the form of an IP packet from the upper layer and may be re-capsulated and transmitted in the form of a link layer packet.

When the signaling information is transmitted, the receiver may extract detailed signaling information using session information included in an IP packet stream according to a protocol configuration. When the signaling information of the upper layer is used, a DB may be used or a shared memory may be used. For example, when signaling information is extracted using session information included in an IP packet stream, the extracted signaling information may be stored in a database (DB) and/or the shared memory of the receiver. Then, when corresponding signaling information is required in a processing procedure of data in a broadcast signal, signaling information may be acquired from the storage device.

Figure 48:
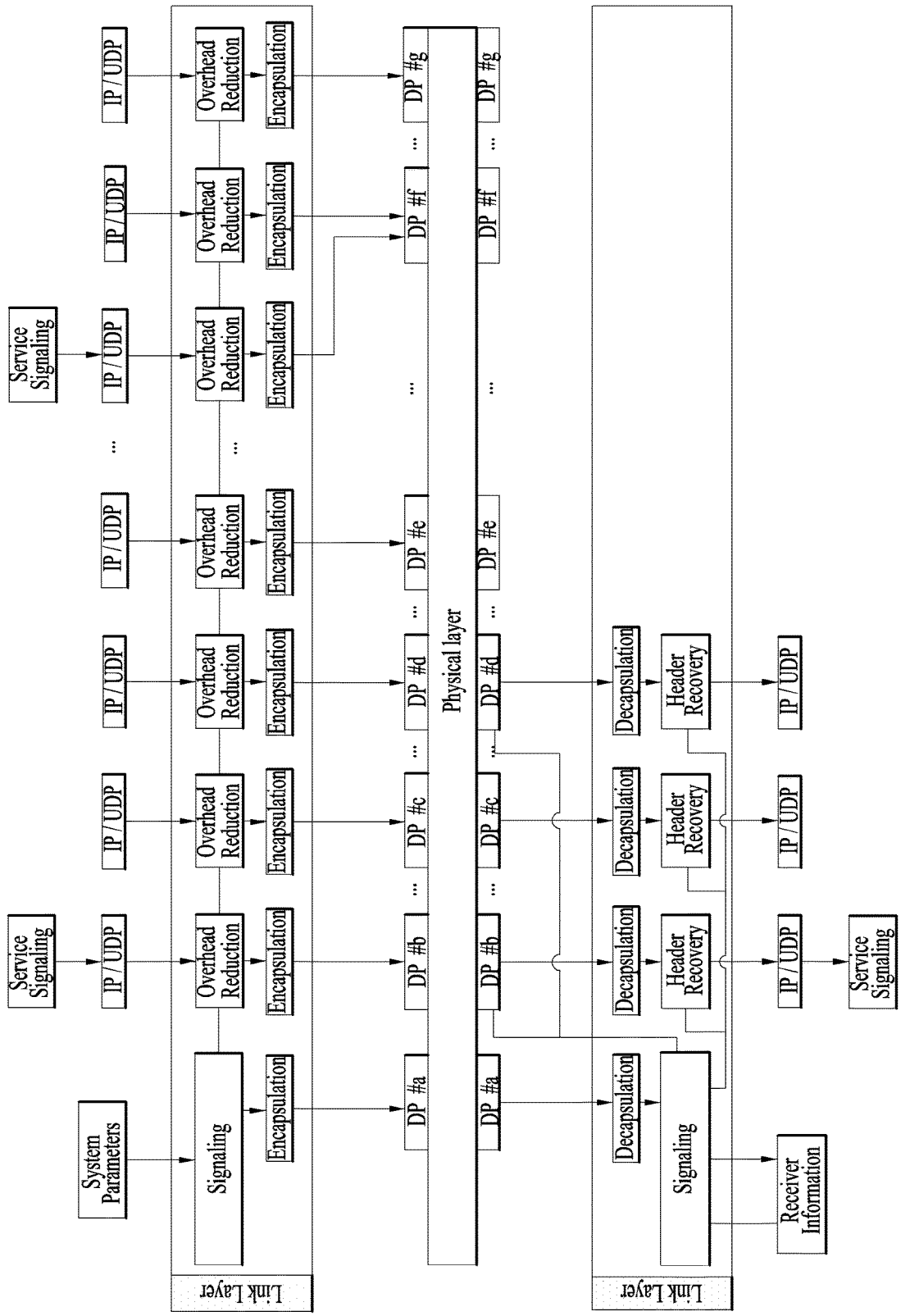
FIG. 48 is a diagram illustrating processing of a broadcast signal when a logical data path includes only a Normal Data Pipe according to an embodiment of the present invention.

FIG. 48 is a diagram illustrating processing of a broadcast signal when a logical data path includes only a Normal Data Pipe according to an embodiment of the present invention.

A structure of a link layer when a logical data path of a physical layer includes only a Normal Data Pipe is illustrated in the drawing. As described above, the link layer may include a Link Layer Signaling processor, an Overhead Reduction processor, and an Encapsulation (Decapsulation) processor. Transmission of information output by each functional module (which may be embodied in hardware or software) to an appropriate data path of the physical layer may be one of important functions of the link layer.

With regard to an IP stream configured in an upper layer of the link layer, a plurality of packet streams may be transmitted according to a data rate for transmission, and overhead reduction and encapsulation procedures may be performed for each corresponding packet stream. In the physical layer, DPs as a plurality of logical data paths which the link layer is capable of accessing may be configured in one frequency band and the packet stream processed in the link layer for each packet stream may be transmitted. When the number of packet streams to be transmitted is smaller than the number of DPs, some packet streams may be multiplexed and input to the DPs in consideration of a data rate.

The signaling processor may check transmitting system information, a related parameter, and/or signaling transmitted to an upper layer and collect information to be transmitted via signaling. The physical layer includes only a normal DP and, thus, corresponding signaling needs to be transmitted in the form of a packet. Accordingly, during a configuration of the link layer packet, signaling may be indicated using a header and so on of a packet. In this case, a header of a packet including signaling may include information for identifying whether a payload of the present packet includes signaling data.

In the case of service signaling transmitted in the form of an IP packet in an upper layer, the same processing as another IP packet may be generally performed. However, for configuration of link layer signaling, information of a corresponding IP packet may be read. To this end, a packet including signaling may be discovered using a filtering method of an IP address. For example, IANA determines an IP address of 224.0.23.60 via ATSC service signaling and, thus, may check an IP packet having the corresponding IP address and use the IP packet in order to configure link layer signaling. In this case, a corresponding packet needs to be transmitted to the receiver and, thus, the IP packet may be still processed. The receiver may parse the IP packet transmitted to a predetermined IP address to acquire data for signaling in the link layer.

When a plurality of broadcast services are transmitted through one frequency band, the receiver may not necessarily decode all DPs and it may be effective to first check signaling information and to decode only a DP related to a required service. Accordingly, in relation to an operation of a link layer of the receiver, the following operations may be performed.

When the receiver selects or changes a service to be received by a user, a channel may be tuned to a corresponding frequency and information of the receiver, which is stored in a DB in relation to the corresponding channel, may be read.

The receiver may check information on a DP for transmitting link layer signaling and decode the corresponding DP to acquire a link layer signaling packet.

The receiver may parse the link layer signaling packet to acquire information on a DP for transmitting data related to a service selected by a user among one or more DPs transmitted to a current channel and overhead reduction information on a packet stream of the corresponding DP. The receiver may acquire information for identifying a DP for transmitting data related to the service selected by the user from the link layer signaling packet and acquire the corresponding DP based on this information. In addition, the link layer signaling packet may include information indicating overhead reduction applied to the corresponding DP and the receiver may restore a DP to which overhead reduction is applied using the information.

The receiver may transmit DP information to be received by a physical layer processor for processing a signal or data in the physical layer and receive a packet stream from the corresponding DP.

The receiver may perform encapsulation and header recovery on the packet stream decoded by the physical layer processor and may transmit the packet stream to an upper layer of the receiver in the form of an IP packet stream.

Then, the receiver may perform processing according to a protocol of the upper layer and provide a broadcast service to the user.

Figure 49:
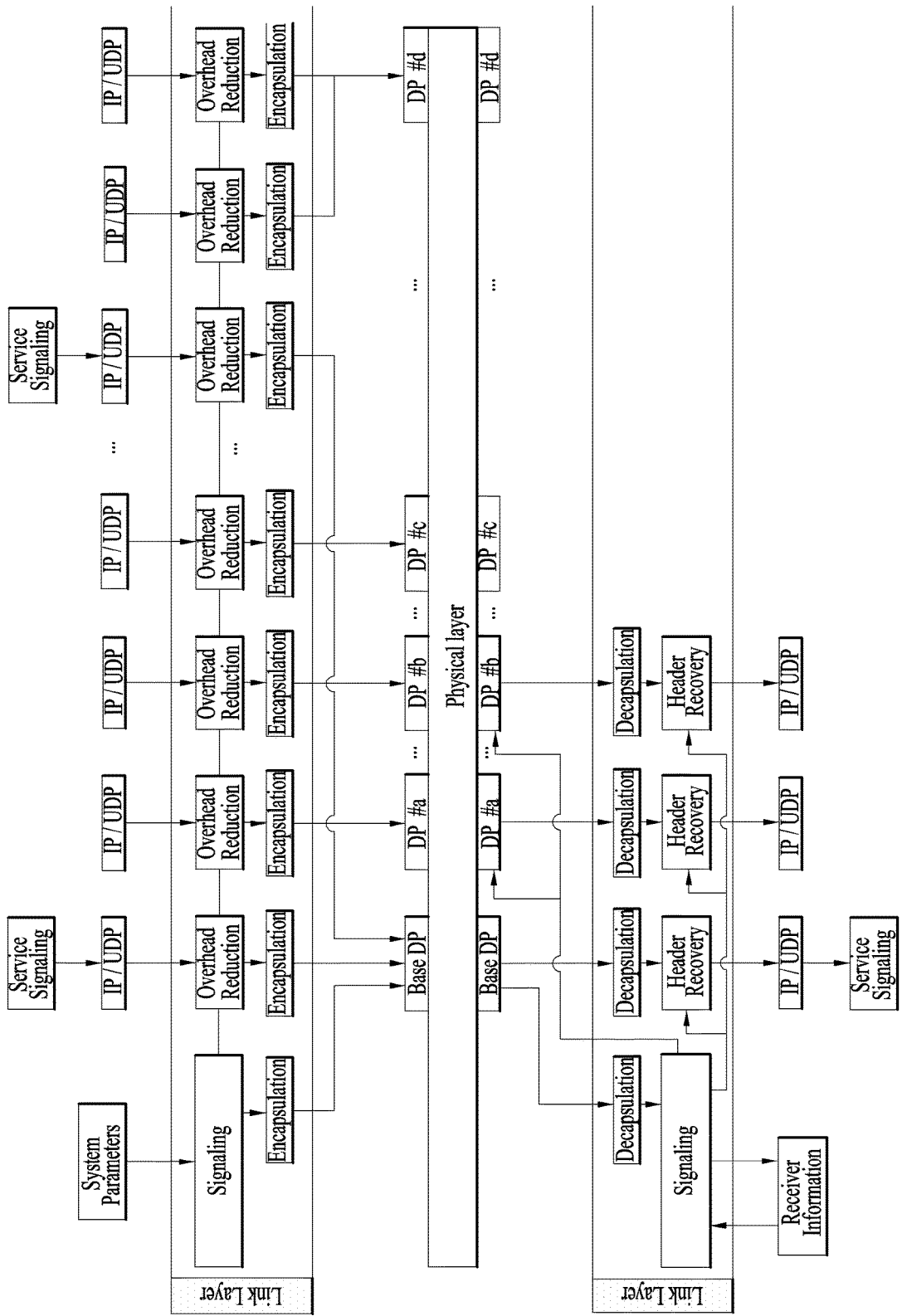
FIG. 49 is a diagram illustrating processing of a broadcast signal when a logical data path includes a Normal Data Pipe and a base data pipe, according to an embodiment of the present invention.

FIG. 49 is a diagram illustrating processing of a broadcast signal when a logical data path includes a Normal Data Pipe and a base data pipe, according to an embodiment of the present invention.

A structure of a link layer when the logical data path of the physical layer includes a Base Data Pipe and a Normal Data Pipe is illustrated in the drawing. As described above, the link layer may include a Link Layer Signaling part, an Overhead Reduction part, and an Encapsulation (Decapsulation) part. In this case, the link layer processor for processing a signal and/or data in the link layer may include a Link Layer Signaling processor, an Overhead Reduction processor, and an Encapsulation (Decapsulation) processor.

Transmission of information output by each functional module (which may be embodied in hardware or software) to an appropriate data path of the physical layer may be one of important functions of the link layer.

With regard to an IP stream configured in an upper layer of the link layer, a plurality of packet streams may be transmitted according to a data rate for transmission, and overhead reduction and encapsulation procedures may be performed for each corresponding packet stream.

In the physical layer, DPs as a plurality of logical data paths which the link layer is capable of accessing may be configured in one frequency band and the packet stream processed in the link layer for each packet stream may be transmitted. When the number of packet streams to be transmitted is smaller than the number of DPs, some packet streams may be multiplexed and input to the DPs in consideration of a data rate.

The signaling processor may check transmitting system information, a related parameter, upper layer signaling, and so on and collect information to be transmitted via signaling. A broadcast signal of the physical layer includes a base DP and a normal DP and, thus, signaling may be transmitted to a base DP and signaling data may be transmitted in the form of a packet appropriate for transmission of the base DP. In this case, during configuration of the link layer packet, signaling may be indicated using a header and so on of a packet. For example, a header of a link layer packet may include information indicating that data included in a packet of the present packet is signaling data.

In a physical layer structure in which a logical data path such as a Base DP is present, it may be effective to transmit data that is not audio/video content to the Base DP in consideration of a data rate like signaling information. Accordingly, service signaling transmitted in the form of an IP packet in the upper layer may be transmitted to the base DP using a method such as IP address filtering. For example, IANA determines an IP address of 224.0.23.60 via ATSC service signaling and, thus, an IP packet stream having the corresponding IP address may be transmitted to the base DP.

When a plurality of IP packet streams for corresponding service signaling are present, the IP packet streams may be transmitted to one base DP using a method such as multiplexing. However, packets for different service signaling may be differentiated via fields of a source address and/or a port. In this case, required information of link layer signaling may be read from the corresponding service signaling packet.

When a plurality of broadcast services are transmitted through one frequency band, the receiver may not necessarily decode all DPs, may first check signaling information, and may decode only a DP for transmitting data and/or signals related to a corresponding service. Accordingly, the receiver may perform the following operations in relation to data and/or processing in the link layer.

When the receiver selects or changes a service to be received by a user, a channel may be tuned to a corresponding frequency and information of the receiver, which is stored in a DB in relation to the corresponding channel, may be read.

The receiver may decode the Base DP to acquire a link layer signaling packet included in the Base DP.

The receiver may parse the link layer signaling packet to acquire DP information for receiving the service selected by the user making a plurality of DPs transmitted to a current channel and overhead reduction information on a packet stream of the corresponding DP. The link layer signaling packet may include information for identifying a DP for transmitting a signal and/or data related to a specific service and/or information for identifying a type of overhead reduction applied to the packet steam transmitted to the corresponding DP. The receiver may access one or more DPs for a specific service or restore a packet included in the corresponding DP using the above information.

The receiver may transmit information on a DP, to be received for a corresponding service, to a physical layer processor that processes a signal and/or data according to a protocol of the Physical layer and receive a packet stream from the corresponding DP.

The receiver may perform decapsulation and header recovery on a packet stream decoded in the physical layer and transmit the packet stream to an upper layer of the receiver in the form of an IP packet stream.

Then, the receiver may perform processing according to a protocol of the upper layer and provide a broadcast service to a user.

During a procedure of decoding the aforementioned Base DP to acquire a link layer packet, information on a Base DP (e.g., identification information of a Base DP, positional information of the Base DP, or signaling information included in the Base DP) may be searched for and stored in a DB during previous channel scan or the stored Base DP may be used by the receiver. Alternatively, the receiver may first search a previously accessed DP to acquire the Base DP.

During a procedure of parsing the aforementioned link layer packet to acquire DP information for a service selected by the user and overhead reduction information on a DP packet stream for transmitting the corresponding service, when information on a DP for transmitting the service selected by the user is transmitted via upper layer signaling (e.g., an upper layer or an IP layer rather than a link layer), corresponding information may be acquired from a DB, a buffer, and/or a shared memory and used as information on a DP that needs to be decoded, as described above.

When link layer signaling and general data (e.g., broadcast content data) are transmitted through the same DP or only one type of DP is used in a broadcast system, the general data transmitted through the DP may be temporally stored in a buffer or a memory while signaling information is decoded and parsed. Upon acquiring signaling information, the receiver may transmit a command for extracting a DP to be acquired according to corresponding signaling information to an apparatus for extracting and processing the DP using a method of using a system internal command, etc.

Figure 50:
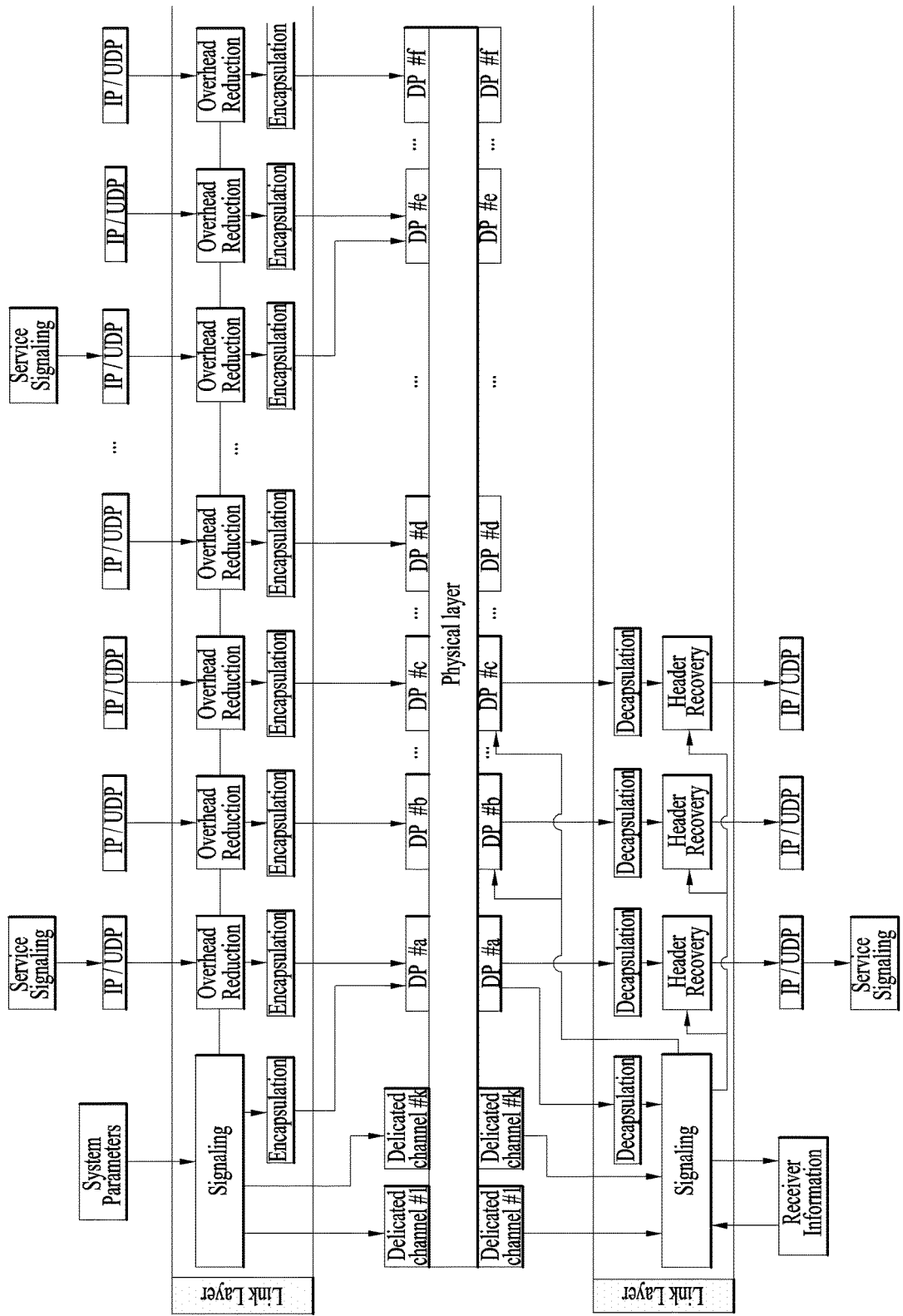
FIG. 50 is a diagram illustrating processing of a broadcast signal when a logical data path includes a Normal Data Pipe and a Dedicated Channel, according to an embodiment of the present invention.

FIG. 50 is a diagram illustrating processing of a broadcast signal when a logical data path includes a Normal Data Pipe and a Dedicated Channel, according to an embodiment of the present invention.

A structure of a link layer when a logical data path of a physical layer includes a Dedicated Channel and a Normal Data Pipe is illustrated in the drawing. As described above, the link layer may include a Link Layer Signaling part, an Overhead Reduction part, and an Encapsulation (Decapsulation) part. In this regard, a link layer processor to be included in the receiver may include a Link Layer Signaling processor, an Overhead Reduction processor, and/or an Encapsulation (Decapsulation) processor. Transmission of information output by each functional module (which may be embodied in hardware or software) to an appropriate data path of the physical layer may be one of important functions of the link layer.

With regard to an IP stream configured in an upper layer of the link layer, a plurality of packet streams may be transmitted according to a data rate for transmission, and overhead reduction and encapsulation procedures may be performed for each corresponding packet stream. In the physical layer, DPs as a plurality of logical data paths which the link layer is capable of accessing may be configured in one frequency band and the packet stream processed in the link layer for each packet stream may be transmitted. When the number of packet streams to be transmitted is smaller than the number of DPs, some packet streams may be multiplexed and transmitted to the DPs in consideration of a data rate.

The signaling processor may check transmitting system information, a related parameter, and/or upper layer signaling and collect information to be transmitted via signaling. In a structure of the physical layer in which a logical data path such as a Dedicate channel is present, it may be effective to mainly transmit signaling information to a dedicated channel in consideration of a data rate. However, in order to transmit a large amount of data through the dedicated channel and, thus, a bandwidth for the dedicated channel needs to be occupied by as much as the amount, it may be general not to set a high data rate of the dedicated channel. In addition, the dedicated channel is rapidly received and decoded compared with a DP and, thus, it may be effective to transmit signaling information in terms of information that needs to be rapidly acquired by the receiver. As necessary, when sufficient signaling data is not transmitted through the dedicated channel, signaling data such as the aforementioned link layer signaling packet may be transmitted through the normal DP and signaling data transmitted through the dedicated channel may include information for identifying a corresponding link layer signaling packet.

As necessary, a plurality of dedicated channels may be present and the channel may be enabled/disabled according to a physical layer.

In the case of service signaling transmitted in the form of an IP packet in an upper layer, the same processing as another IP packet may be generally performed. However, for configuration of link layer signaling, information of a corresponding IP packet may be read. To this end, a packet including signaling may be discovered using a filtering method of an IP address. For example, IANA determines an IP address of 224.0.23.60 via ATSC service signaling and, thus, may check an IP packet having the corresponding IP address and use the IP packet in order to configure link layer signaling. In this case, a corresponding packet needs to be transmitted to the receiver and, thus, the IP packet may be still processed.

When a plurality of IP packet streams for service signaling is present, the IP packet streams may be transmitted to one DP together with audio/video data using a method such as multiplexing. However, packets for service signaling and audio/video data may be differentiated via fields of an IP address, a port, etc.

When a plurality of broadcast services are transmitted through one frequency band, the receiver may not necessarily decode all DPs, may first check signaling information, and may decode only a DP for transmitting data and/or signaling related to a required service. Accordingly, the receiver may perform processing according to a protocol of a link layer using the following operations.

When the receiver selects or changes a service to be received by a user, a channel may be tuned to a corresponding frequency and information of the receiver, which is stored in a DB in relation to the corresponding channel, may be read. The information stored in the DB may include information for identifying a dedicated channel and/or signaling information for acquiring a channel/service/program.

The receiver may decode data transmitted to a dedicated channel and perform processing related to signaling appropriate for a purpose of a corresponding channel. For example, in the case of a dedicated channel for transmitting an FIC, information on a service and/or a channel may be stored and updated, and in the case of a dedicated channel for transmitting an EAC, processing such as transmission of emergency alert information may be performed.

The receiver may acquire information of a DP, to be decoded using information transmitted to the dedicated channel. As necessary, when link layer signaling is transmitted through the DP, a DP to which singling is transmitted may be decoded and transmitted to a dedicated channel in order to first acquire the signaling information and may be transmitted to the dedicated channel. In addition, a packet for the link layer signaling may be transmitted through the normal DP and, in this case, the signaling data transmitted through the dedicated channel may include information for identifying a DP including a packet for the link layer signaling.

The receiver may acquire DP information for receiving a service selected by a user and overhead reduction information on a packet stream of the corresponding DP among a plurality of DPs transmitted to a current channel using the link layer signaling information. The link layer signaling information may include information for identifying a DP for transmitting a signal and/or data related to a specific service, and/or information for identifying a type of overhead reduction applied to a packet stream transmitted to the corresponding DP. The receiver may access one or more DPs for a specific service or restore a packet included in the corresponding DP using the above information.

The receiver may transmit information for identifying a DP to be received by the physical layer to a physical layer processor for processing a signal and/or data in the physical layer and receive a packet stream from the corresponding DP.

The receiver may perform decapsulation and header recovery on a packet stream decoded in the physical layer and may transmit the packet stream to the upper layer in the form of an IP packet stream.

Then, the receiver may perform processing according to a protocol of the upper layer and provide a broadcast service to a user.

Figure 51:
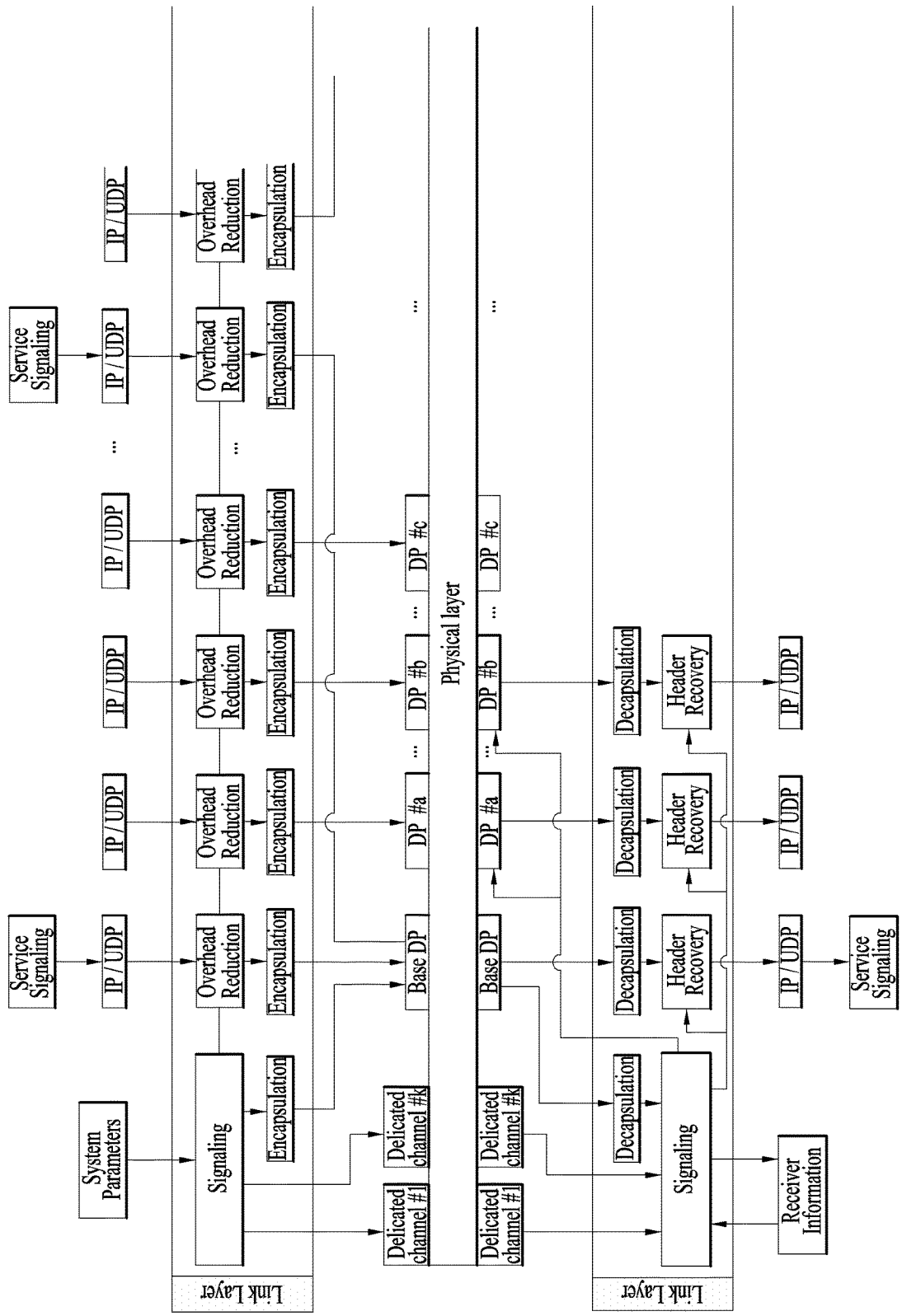
FIG. 51 is a diagram illustrating processing of a broadcast signal when a logical data path includes a Normal Data Pipe, a Base Data Pipe, and a Dedicated Channel according to an embodiment of the present invention.

FIG. 51 is a diagram illustrating processing of a broadcast signal when a logical data path includes a Normal Data Pipe, a Base Data Pipe, and a Dedicated Channel according to an embodiment of the present invention.

A structure of a link layer when the logical data path of the physical layer includes a Dedicated Channel, a Base Data Pipe, and a Normal Data Pipe is illustrated in the drawing. As described above, the link layer may include a Link Layer Signaling part, an Overhead Reduction part, and an Encapsulation (Decapsulation) part. In this regard, a link layer processor to be included in the receiver may include a Link Layer Signaling processor, an Overhead Reduction processor, and/or an Encapsulation (Decapsulation) processor. Transmission of information output by each functional module (which may be embodied in hardware or software) to an appropriate data path of the physical layer may be one of important functions of the link layer.

With regard to an IP stream configured in an upper layer of the link layer, a plurality of packet streams may be transmitted according to a data rate for transmission, and overhead reduction and encapsulation procedures may be performed for each corresponding packet stream. In the physical layer, DPs as a plurality of logical data paths which the link layer is capable of accessing may be configured in one frequency band and the packet stream processed in the link layer for each packet stream may be transmitted. When the number of packet streams to be transmitted is smaller than the number of DPs, some packet streams may be multiplexed and input to the DPs in consideration of a data rate.

The signaling processor may check transmitting system information, a related parameter, and/or upper layer signaling and collect information to be transmitted via signaling. A signal of the physical layer includes a base DP and a normal DP and, thus, it may be effective to transmit signaling to the base DP in consideration of a data rate. In this case, the signaling data needs to be transmitted in the form of a packet appropriate for transmission through the base DP. During a configuration of the link layer packet, signaling may be indicated using a header and so on of a packet. That is, a header of a link layer signaling packet including the signaling data may include information indicating that a payload of a corresponding packet includes signaling data.

In a physical layer structure in which a Dedicate channel and a base DP are simultaneously present, signaling information may be separately transmitted to a dedicated channel and a base DP. Generally, a data rate of a dedicated channel may not be set to be high and, thus, signaling information that has a small size and needs to be rapidly acquired may be transmitted to the dedicated channel and signaling with a large amount of data may be transmitted to the base DP. As necessary, a plurality of dedicated channels may be present and the channel may be enabled/disabled according to a physical layer. In addition, the base DP may be configured to have a separate structure from the normal DP. In addition, one may be determined among normal DPs and may be used as the base DP.

In the case of service signaling transmitted in the form of an IP packet in an upper layer, signaling information may be transmitted to the base DP using a method such as IP address filtering. An IP packet stream having a specific IP address and including signaling information may be transmitted to the IP packet stream. When a plurality of IP packet streams for corresponding service signaling are present, the IP packet streams may be transmitted to one base DP using a method such as multiplexing. However, packets for different service signaling may be differentiated via fields of a source address and/or a port. The receiver may read information required to configure link layer signaling from the corresponding service signaling packet.

When a plurality of broadcast services is transmitted through one frequency band, the receiver may not necessarily decode all DPs, may first check signaling information, and may decode only a DP for transmitting data and/or signals related to a required service. Accordingly, the receiver may perform processing according to a protocol of a link layer using the following operations.

When the receiver selects or changes a service to be received by a user, a channel may be tuned to a corresponding frequency and information of the receiver, which is stored in a DB in relation to the corresponding channel, may be read. The information stored in the DB may include information for identifying a dedicated channel, information for identifying a base data pipe, and/or signaling information for acquiring a channel/service/program.

The receiver may decode data transmitted to a dedicated channel and perform processing related to signaling appropriate for a purpose of a corresponding channel. For example, in the case of a dedicated channel for transmitting an FIC, information on a service and/or a channel may be stored and updated, and in the case of a dedicated channel for transmitting an EAC, processing such as transmission of emergency alert information may be performed.

The receiver may acquire information of a base DP using information transmitted to the dedicated channel. The information transmitted to the dedicated channel may include information for identifying the base DP (e.g., an identifier of the base DP and/or an IP address to which the base DP is transmitted). As necessary, signaling information and parameters that are pre-stored in the DB of the receiver may be updated to information transmitted from the dedicated channel.

The receiver may decode the base DP to acquire a link layer signaling packet and, as necessary, may combine the link layer signaling packet with signaling information from the dedicated channel. The receiver may discover the base DP using the dedicate channel or pre-stored signaling information of the receiver The receiver may acquire DP information for receiving a service selected by a user and overhead reduction information on a packet stream of the corresponding DP among a plurality of DPs transmitted to a current channel using the link layer signaling information. The link layer signaling information may include information for identifying a DP for transmitting a signal and/or data related to a specific service, and/or information for identifying a type of overhead reduction applied to a packet stream transmitted to the corresponding DP. The receiver may access one or more DPs for a specific service or restore a packet included in the corresponding DP using the above information.

The receiver may transmit information for identifying a DP to be received by the physical layer to a physical layer processor for processing a signal and/or data in the physical layer and receive a packet stream from the corresponding DP.

The receiver may perform decapsulation and header recovery on a packet stream decoded in the physical layer and may transmit the packet stream to the upper layer in the form of an IP packet stream.

Then, the receiver may perform processing according to a protocol of the upper layer and provide a broadcast service to a user.

According to an embodiment of the present invention, when information for service signaling is transmitted by one or more IP packet streams, a corresponding IP packet stream may be multiplexed and transmitted through one Base DP. The receiver may differentiate packets for different service signaling based on fields of a source address and/or a port. The receiver may read information for acquisition/configuration of the link layer signaling in the service signaling packet.

During a procedure of processing signaling information transmitted to a dedicated channel, the receiver may acquire version information of a dedicated channel or information for identifying whether update is performed, and when it is determined that signaling information in the dedicated channel is not changed, processing (decoding or parsing) of the signaling information transmitted to the dedicated channel may be omitted. Upon determining that the dedicated channel is not updated, the receiver may acquire information of the base DP using information pre-stored in the receiver.

During the aforementioned procedure of parsing the link layer packet to acquire DP information for a service selected by a user and overhead reduction information on a DP packet stream for transmitting a corresponding service, when information on a DP for transmitting the service selected by the user is transmitted via upper layer signaling (e.g., an upper layer rather than link layer, or an IP layer), corresponding information may be acquired from a DB, a buffer, and/or a shared memory and may be used as information on a DP, which needs to be decoded.

When link layer signaling (link layer signaling information) and genera data (e.g., broadcast content data) are transmitted through the same DP or when only one type of DP is used in a broadcast system, general data transmitted through the DP may be temporally stored in a buffer or a memory while signaling information is decoded and parsed. Upon acquiring signaling information, the receiver may transmit a command for extracting a DP to be acquired according to corresponding signaling information to an apparatus for extracting and processing the DP using a method of using a system internal command, etc.

Figure 52:
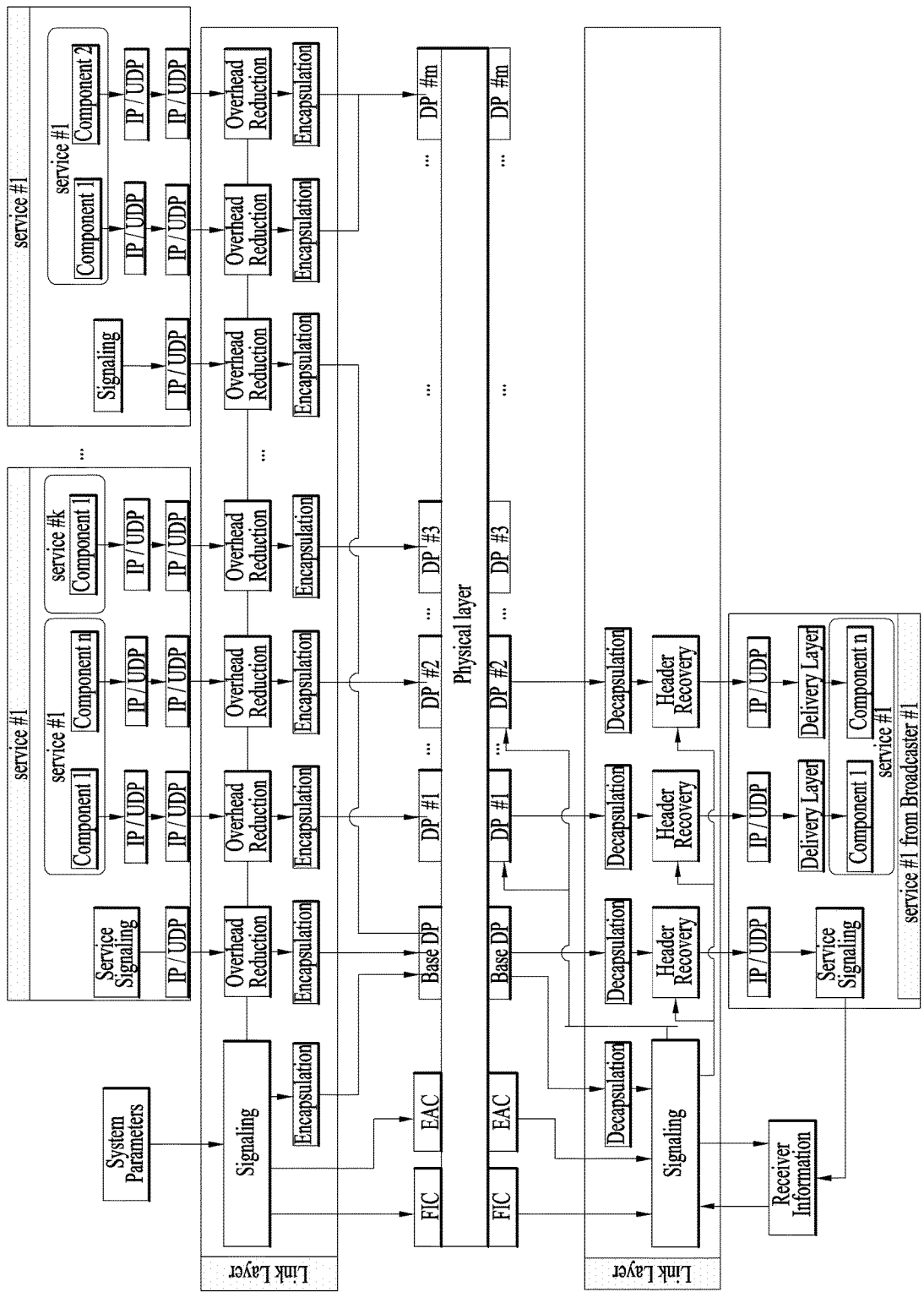
FIG. 52 is a diagram illustrating a detailed processing operation of a signal and/or data in a link layer of a receiver when a logical data path includes a Normal Data Pipe, a Base Data Pipe, and a Dedicated Channel according to an embodiment of the present invention.

FIG. 52 is a diagram illustrating a detailed processing operation of a signal and/or data in a link layer of a receiver when a logical data path includes a Normal Data Pipe, a Base Data Pipe, and a Dedicated Channel according to an embodiment of the present invention.

In the present embodiment, the case in which one or more services provided by one or more broadcasters are transmitted in one frequency band may be considered. One broadcaster transmits one or more broadcast services. In this regard, it may be considered that one service includes one or more components and a user receives content in a unit of a broadcast service. In addition, some of one or more components included in one broadcast service may be replaced with other components according to user selection.

A Fast Information Channel (FIC) and/or an Emergency Alert Channel (EAC) may be transmitted to the dedicated channel. The base DP and the Normal DP may be separated in a broadcast signal and transmitted or managed. Configuration information of the FIC and/or EAC may be transmitted via Physical layer signaling or may be recognized by the receiver, and the link layer may format signaling according to the characteristics of a corresponding channel. Data may be transmitted to a specific channel of the physical layer from a logical point of view and an actual operation may be performed according to the characteristics of the physical layer.

Information on a service of each broadcaster, which is being transmitted in a corresponding frequency, and a path for receiving the service may be transmitted through the FIC. To this end, the following information may be signaled via Link Layer Signaling.

System Parameter—Transmitter related parameter and/or parameter related to a broadcaster for providing a service in a corresponding channel.

Link layer—which includes IP header compression related Context information and/or ID of a DP to which corresponding context is applied.

Upper layer—IP address and/or UDP port number, Service and/or component information, Emergency alert information, and mapping relationship information between a DP and an IP address of a packet stream transmitted from the IP layer.

When a plurality of broadcast services are transmitted through one frequency band, the receiver may not necessarily decode all DPs and it may be effective to first check signaling information and to decode only a DP related to a required service. In a broadcast system, the transmitter may transmit information for identifying only a required DP through an FIC and the receiver may check a DP to be accessed for a specific service using the FIC. In this case, a related operation of the link layer of the receiver will now be described below.

When the receiver selects or changes a service to be received by a user, a channel may be tuned to a corresponding frequency and information of the receiver, which is stored in a DB in relation to the corresponding channel, may be read. The information stored in the DB of the receiver may be acquired from the FIC during initial channel scan and may be configured using information included in the FIC.

The receiver may receive the FIC and update a pre-stored DB or may acquire information on a mapping relationship between a component of the service selected by the user and a DP for transmitting each component from the FIC. Information on a base DP for transmitting signaling may be acquired from the FIC.

When initialization information related to RoHC is present in the signaling transmitted through the FIC, the receiver may acquire the initialization information and prepare recovery of a header.

The receiver may decode the base DP and/or a DP for transmitting the service selected by the user based on information transmitted through the FIC.

The receiver may acquire overhead reduction on a received DP included in the base DP, perform decapsulation and/or header recovery on a packet stream received by a normal DP using the acquired overhead information, and transmit the packet stream to an upper layer in the form of an IP packet stream.

The receiver may receive service signaling transmitted in the form of an IP packet with a specific address with respect to the received service through the base DP and transmit the packet stream to the upper layer.

When emergency alert occurs, the receiver may receive signaling information including a CAP message through signaling and may parse the signaling information and may immediately transmit the signaling information to a user in order to rapidly transmit an emergency alert message, and when path information for receiving an audio/video service is recognized through signaling, the receiver may discover a path for receiving the corresponding service and receive the service data. In addition, when there is information transmitted through a broadband or the like, the receiver may receive an NRT service and additional information using corresponding uniform resource identifier (URI) information and so on. Signaling information related to emergency alert will be described below in detail.

A procedure of processing emergency alert by a receiver will now be described below.

The receiver may recognize that an emergency alert message is transmitted through a preamble, etc. of a physical layer. The preamble of the physical layer may be a signaling signal included in a broadcast signal and may correspond to signaling in the physical layer. The preamble of the physical layer may mainly include data included in the broadcast signal, a broadcast frame, a DP, and/or information for acquiring a transmission pipe.

The receiver may check a configuration of an Emergency Alert Channel (EAC) through physical layer signaling of the receiver and decode the EAC to acquire an EAT. Here, the EAC may also correspond to the aforementioned dedicated channel.

The receiver may extract the received EAT, extract a CAP message, and transmit the CAP message to a CAP parser.

When service information related to emergency alert is present in the EAT, the receiver may decode a corresponding DP and receive service data. The EAT may include information for identifying a DP for transmitting a service related to an emergency alert.

When information related to NRT service data is present in the EAC or CAP message, the receiver may receive the information through a broadband.

FIG. 53 is a diagram illustrating syntax of a fast information channel (FIC) according to an embodiment of the present invention.

Information included in the FIC may be transmitted in the form of a fast information table (FIT).

Information included in the FIT may be transmitted in the form of an XML and/or a section table.

The FIT may include table_id information, FIT_data_version information, num_broadcast information, broadcast_id information, delivery_system_id information, base_DP_id information, base_DP_version information, num_service information, service_id information, service_category information, service_hidden_flag information, SP_indicator information, num_component information, component_id information, DP_id information, context_id information, RoHC_init_descriptor, context_profile information, max_cid information, and/or large_cid information.

The table_id information may indicate that a corresponding table section is a Fast Information Table.

The FIT_data_version information may indicate version information of a syntax and semantics included in the fast information table. The receiver may determine whether signaling included in the corresponding Fast Information Table is processed using the FIT_data_version information. The receiver may determine whether information of a pre-stored FIC is updated using the FIT_data_version information.

The num_broadcast information may indicate the number of broadcasting stations for transmitting a broadcast service and/or content through a corresponding frequency or a transmitted transport frame.

The broadcast_id information may indicate a unique ID of a broadcasting station for transmitting a broadcast service and/or content through a corresponding frequency or a transmitted transport frame. In the case of a broadcasting station for transmitting MPEG-2 TS-based data, the broadcast_id may have the same value as transport_stream_id of MPEG-2 TS.

The delivery_system_id information may indicate an ID of a broadcast transmitting system for applying and processing the same transmission parameter in a network of transmitted broadcast.

The base_DP_id information may be information for identifying a base DP in a broadcast signal. The base DP may refer to a DP for transmitting service signaling including Program Specific Information/System Information (PSI/SI) and/or overhead reduction of a broadcasting station corresponding to the broadcast_id. Alternatively, the base_DP_id information may indicate a representative DP for decoding a component included in a broadcast service in a corresponding broadcasting station.

The base_DP_version information may indicate version information of data transmitted through a base DP. For example, when service signaling such as PSI/SI is transmitted through the base DP, if service signaling is changed, a value of the base_DP_version information may be increased on a one by one basis.

The num_service information may indicate the number of broadcast services transmitted from a broadcasting station corresponding to the broadcast_id in a corresponding frequency or a transport frame.

The service_id information may be used as an ID for identifying a broadcast service.

The service_category information may indicate a category of a broadcast service. The service_category information may have the following meaning according to a value of a corresponding field. 0x01 as a value of the service_category information may indicate a Basic TV, 0x02 may indicate a Basic Radio, 0x03 may indicate an RI service, 0x08 may indicate Service Guide, and 0x09 may indicate Emergency Alerting.

The service_hidden_flag information may indicate whether a corresponding broadcast service is hidden. When the service is hidden, the service is a test service or an autonomously used service and, thus, the broadcast receiver may disregard the service and hide the service from a service list.

The SP_indicator information may indicate whether service protection is applied to one or more components in a corresponding broadcast service.

The num_component information may indicate the number of components included in a corresponding broadcast service.

The component_id information may be used as an ID for identifying a component in a broadcast service.

The DP_id information may be used as an ID indicating a DP for transmitting a corresponding component.

The RoHC_init_descriptor may include information related to Overhead Reduction and/or header recovery. The RoHC_init_descriptor may include information for identifying a header compression method used in a transmitting end.

The context_id information may indicate a context to which a subsequent RoHC related field belongs. The context_id information may correspond to a context identifier (CID).

The context_profile information may indicate a range of a protocol for compressing a header in RoHC. When a compressor and a decompressor have the same profile, it may be possible to compress and restore a stream in the RoHC.

The max_cid information may be used to indicate a maximum value of a CID to a decompressor.

The large_cid information may have a Boolean value and indicate whether a short CID 0 to 15 or an enhanced CID 0 to 16383 is used for configuration of a CID. Accordingly, a size of a byte for representing a CID may be determined together.

FIG. 54 is a diagram illustrating syntax of an Emergency Alert Table (EAT) according to an embodiment of the present invention.

Information related to emergency alert may be transmitted through the EAC. The EAC may correspond to the aforementioned dedicated channel.

According to an embodiment of the present invention, the EAT may include EAT_protocol_version information, automatic_tuning_flag information, num_EAS_messages information, EAS_message_id information, EAS_IP_version_flag information, EAS_message_transfer_type information, EAS_message_encoding_type information, EAS_NRT_flag information, EAS_message_length information, EAS_message_byte information, IP_address information, UDP_port_num information, DP_id information, automatic_tuning_channel_number information, automatic_tuning_DP_id information, automatic_tuning_service_id information, and/or EAS_NRT_service_id information.

The EAT_protocol_version information may indicate protocol version of a received EAT.

The automatic_tuning_flag information may indicate whether a receiver automatically converts a channel.

The num_EAS_messages information may indicate the number of messages included in the EAT.

The EAS_message_id information may be information for identifying each EAS message.

The EAS_IP_version_flag information may indicate IPv4 when a value of the EAS_IP_version_flag information is 0 and indicate IPv6 when the value of the EAS_IP_version_flag information is 1.

The EAS_message_transfer_type information may indicate a type for transmitting an EAS message. When a value of the EAS_message_transfer_type information is 000, the EAS_message_transfer_type information may indicate a not specified state, when the value of the EAS_message_transfer_type information is 001, the EAS_message_transfer_type information may indicate No Alert message (only AV content), and when the value of EAS_message_transfer_type information is 010, the EAS_message_transfer_type information may indicate that an EAS message is included in a corresponding EAT. To this end, a length field and a field of a corresponding EAS message may be added. When a value of the EAS_message_transfer_type information is 011, the EAS_message_transfer_type information may indicate that an EAS message is transmitted through a data pipe. The EAS may be transmitted in a data pipe in the form of IP datagram. To this end, an IP address, UDP port information, and DP information of a transmitted physical layer may be added.

The EAS_message_encoding_type information may indicate information on an encoding type of an Emergence Alert message. For example, when a value of the EAS_message_encoding_type information is 000, the EAS_message_encoding_type information may indicate a not specified state, when the value of the EAS_message_encoding_type information is 001, the EAS_message_encoding_type information may indicate No Encoding, when the value of the EAS_message_encoding_type information is 010, the EAS_message_encoding_type information may indicate DEFLATE algorithm (RFC1951), and 001 to 111 among values of the EAS_message_encoding_type information may be reserved for other encoding types.

The EAS_NRT_flag information may indicate whether NRT contents and/or NRT data related to a received message is present. When a value of the EAS_NRT_flag information is 0, the EAS_NRT_flag information may indicate that the NRT contents and/or the NRT data are not present in relation the received Emergency message, and when the value of the EAS_NRT_flag information is 1, the EAS_NRT_flag information may indicate that the NRT contents and/or NRT data are present in relation the received Emergency message.

The EAS_message_length information may indicate a length of an EAS message.

The EAS_message_byte information may include content of an EAS message.

The IP_address information may indicate an IP address of an IP packet for transmitting an EAS message.

The UDP_port_num information may indicate a UDP port number for transmitting an EAS message.

The DP_id information may identify a data pipe for transmitting an EAS message.

The automatic_tuning_channel_number information may include information on a number of a channel to be converted.

The automatic_tuning_DP_id information may be information for identifying a data pipe for transmitting corresponding content.

The automatic_tuning_service_id information may be information for identifying a service to which corresponding content belongs.

The EAS_NRT_service_id information may information for identifying a corresponding NRT service when NRT contents and data related to a received emergency alert message are transmitted, that is, when EAS_NRT_flag is enabled.

Figure 55:
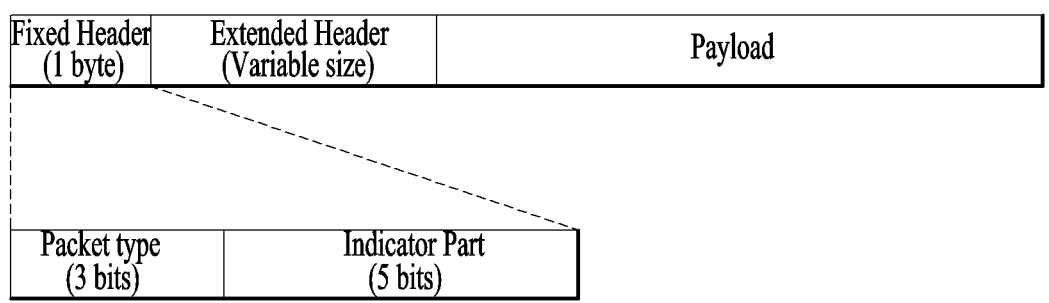
FIG. 55 is a diagram illustrating a packet transmitted to a data pipe according to an embodiment of the present invention.

FIG. 55 is a diagram illustrating a packet transmitted to a data pipe according to an embodiment of the present invention.

According to an embodiment of the present invention, a structure of a packet in a link layer may be newly defined and a compatible link layer packet may be generated irrespective of a change in protocol of an upper layer and the link layer or a lower layer of the link layer.

According to an embodiment of the present invention, a link layer packet may be transmitted to a normal DP and/or a base DP.

The link layer packet may include a fixed header, an extended header, and/or a payload.

The fixed header may be a header with a fixed size and the extended header may be a header, a size of which is changeable according to a configuration of a packet of the upper layer. The payload may be a region for transmitting data of the upper layer.

The packet header (fixed header or extended header) may include a field indicating a type of the payload. In the case of a fixed header, first 3 bites (packet type) of one byte may include data for identifying a packet type of an upper layer and the remaining 5 bits may be used as an indicator part. The indicator part may include data for identifying a configuration method of a payload and/or configuration information of the extended header and may have a different configuration according to a packet type.

The table illustrated drawing may indicate a type of a packet of an upper layer included in a payload according to a value of a packet type.

According to a configuration of a system, a payload, an IP packet, and/or an RoHC packet may be transmitted through a DP, and a signaling packet may be transmitted through a base DP. Accordingly, when various types of packets are mixed and transmitted, a value of a packet type may be applied to differentiate a data packet and a signaling packet.

When a value of a packet type is 000, this may indicate that an IP packet of IPv4 is included in a payload.

When a value of a packet type is 001, this may indicate that an IP packet of IPv6 is included in a payload.

When a value of a packet type is 010, this may indicate that a compressed IP packet is included in a payload. The compressed IP packet may include an IP packet to which header compression is applied.

When a value of a packet type is 110, this may indicate a packet including signaling data is included in a payload.

When a value of a packet type is 111, this may indicate that a framed packet type is included in a payload.

Figure 56:
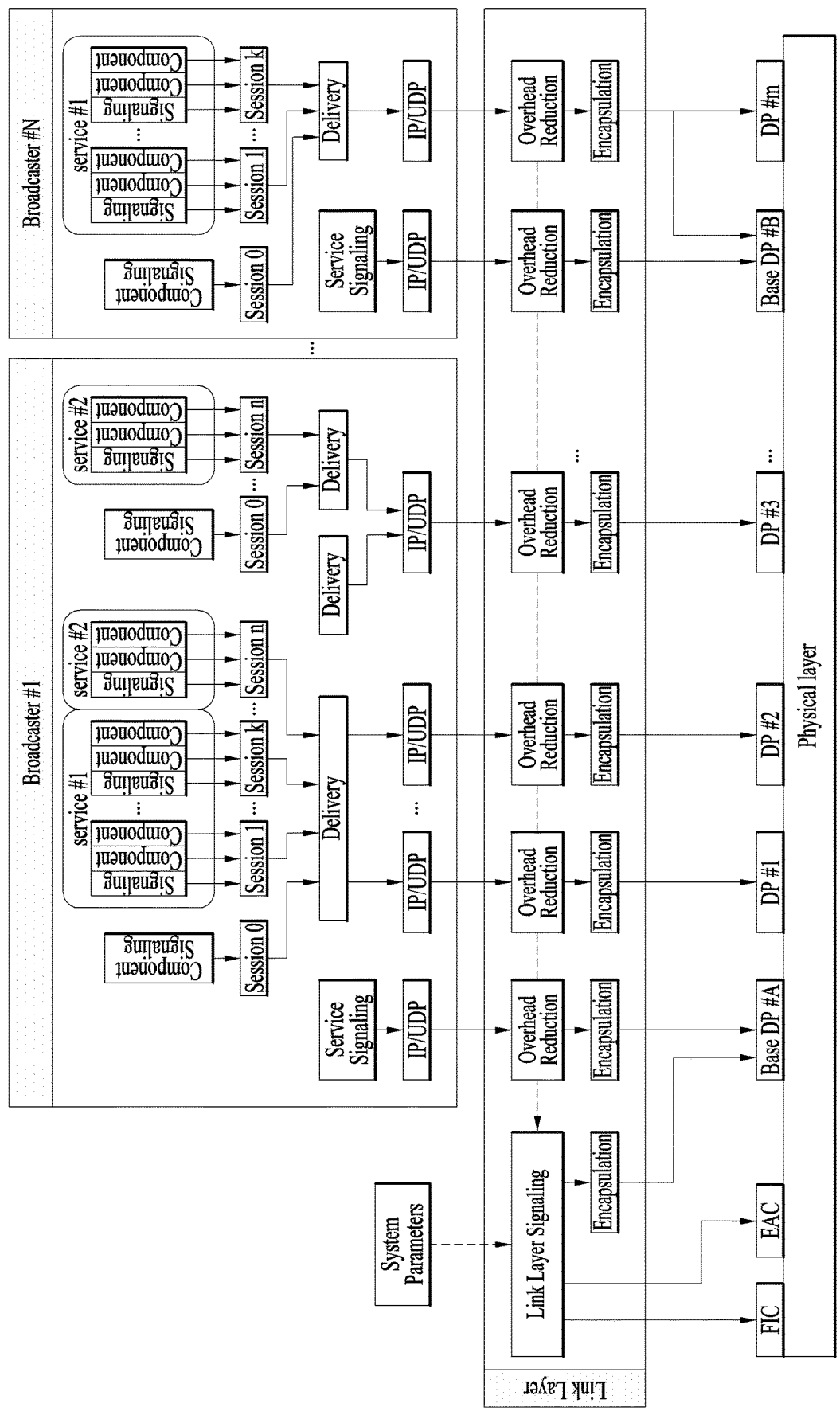
FIG. 56 is a diagram illustrating a detailed processing operation of a signal and/or data in each protocol stack of a transmitter when a logical data path (data path) of a physical layer includes a dedicated channel, a Base DP, and a Normal Data DP according to another embodiment of the present invention.

FIG. 56 is a diagram illustrating a detailed processing operation of a signal and/or data in each protocol stack of a transmitter when a logical data path (data path) of a physical layer includes a dedicated channel, a Base DP, and a Normal Data DP according to another embodiment of the present invention.

In one frequency band, one or more broadcasters may provide a broadcast service. The broadcaster may transmit a plurality of broadcast services. In this regard, one broadcast service may include one or more components. A user may receive broadcast content in a service unit.

A broadcast system may use a session-based transmission protocol in order to support IP hybrid broadcast and, according to a transmission structure of the corresponding protocol, content of signaling transmitted to each signaling path may be determined.

As described above, data related to Fast Information Channel (FIC) and/or Emergency Alert Channel (EAC) may be transmitted/received through a dedicated channel. In the broadcast system, the Base DP and the Normal DP may be differentiated and used.

Configuration information of the FIC and/or EAC may be included in physical layer signaling (Physical layer signaling, transmission parameter, or transmission parameter). The link layer may format signaling according to the characteristics of a corresponding channel. Data may be transmitted to a specific channel of the physical layer from a logical point of view and an actual operation may be performed according to the characteristics of the physical layer.

The FIC may include information on a service of each broadcaster, which is being transmitted in a corresponding frequency, and information on a path for receiving the service. The FIC may include information for acquiring a service and may be referred to as service acquisition information.

The FIC and/or the EAC may be included in link layer signaling.

The link layer signaling may include the following information.

System Parameter—Transmitter related parameter and parameter related to a broadcaster for providing a service in a corresponding channel Link layer—IP header compression related Context information and ID of DP to which corresponding context is applied Upper layer—IP address and UDP port number, Service and component information, Emergency alert information, and mapping relationship between a DP and an IP address, a UDP port number, and Session ID of a packet stream and signaling transmitted from the IP layer As described above, when one or more broadcast services are transmitted through one frequency band, the receiver may not necessarily decode all DPs and it may be effective to first check signaling information and to decode only a DP related to a required service.

In this case, with reference to the drawing, the broadcast system may provide or acquire information for mapping a DP and a service using an FIC and/or a base DP.

A processing procedure of a broadcast signal or broadcast data in a transmitted illustrated in the drawing is now described. One or more broadcasters (broadcast #1 to # N) may process data for component signaling and/or one or more broadcast services to be processed by one or more sessions. One broadcast service may be transmitted through one or more sessions. The broadcast service may include signaling information for one or more components and/or broadcast services included in the broadcast service. The component signaling may include information used to acquire a component included in the broadcast service. Data for service signaling, component signaling, and/or one or more broadcast services may be transmitted through a link layer via processing in the IP layer.

When overhead reduction is required for an IP packet in the link layer, the transmitter may perform overhead reduction and generate related information via link layer signaling. The link layer signaling may include a system parameter for describing a broadcast system other than the aforementioned information. The transmitter may process an IP packet and transmit the IP packet to a physical layer in the form of one or more DPs during processing of the link layer.

The transmitter may transmit the link layer signaling to the receiver in a form or configuration of an FIC and/or an EAC. The transmitter may transmit the link layer signaling to the base DP through an encapsulation procedure of the link layer.

Figure 57:
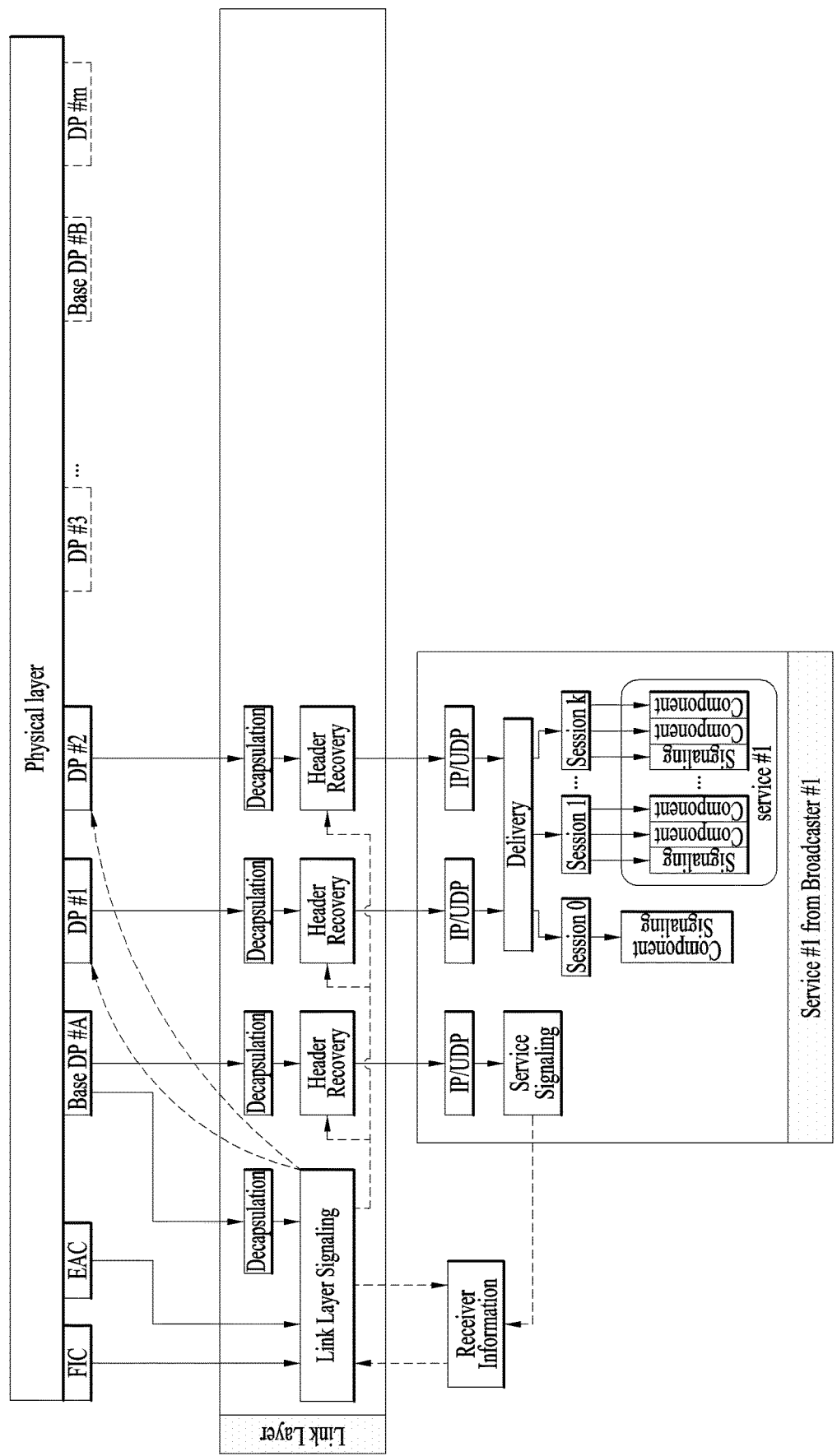
FIG. 57 is a diagram illustrating a detailed processing operation of a signal and/or data in each protocol stack of a receiver when a logical data path (data path) of a physical layer includes a dedicated channel, a Base DP, and a Normal Data DP according to another embodiment of the present invention.

FIG. 57 is a diagram illustrating a detailed processing operation of a signal and/or data in each protocol stack of a receiver when a logical data path (data path) of a physical layer includes a dedicated channel, a Base DP, and a Normal Data DP according to another embodiment of the present invention.

When the receiver selects or changes a service to be received by a user, a channel may be tuned to a corresponding frequency. The read may read information stored in a DB, etc. in relation to a corresponding channel. Here, the information stored in the DB, etc. of the receiver may be acquired from the FIC and/or the EAC during initial channel scan and may correspond to information included in the FIC and/or the EAC. In addition, as described above in the present specification, transmitted information may be extracted.

The receiver may receive the FIC and/or the EAC, receive information of a channel to be accessed and, then, update information pre-stored in a DB. The receiver may acquire information on a mapping relationship between a component about a service selected by a user and a DP for transmitting each component or may acquire information on a base DP and/or a normal DP for transmitting signaling required to acquire the information. When the receiver determines that corresponding information is not changed using version information of the FIC or information for identifying whether a dedicated channel needs to be separately updated, a decoding or parsing procedure of the received FIC and/or EAC may be omitted.

The receiver may decode a base DP and/or a DP for transmitting signaling information based on information transmitted through the FIC to acquire a link layer signaling packet including the link layer signaling information. As necessary, the receiver may combine and use the received link layer signaling information with signaling information received from the dedicated channel (e.g., in the drawing, receiver information).

The receiver may acquire DP information for receiving a service selected by a user among a plurality of DPs transmitted to a current channel and overhead reduction information on a packet stream of the corresponding DP using the FIC and/or the link layer signaling information.

Upon receiving information on a DP for receiving the selected service via upper layer signaling, as described above, the receiver may acquire signaling information stored in a DB and/or a shared memory and decode information as a decoding target indicated by the corresponding signaling information.

When link layer signaling information and general data (e.g., data included in broadcast content) are transmitted through the same DP or only one is managed in order to transmit the link layer signaling information and the general data, the receiver may temporally store general data transmitted through a DP in an apparatus such as a buffer while signaling information is decoded and/or parsed.

The receiver may acquire a Base DP and/or a DP for transmitting signaling information, acquire overhead reduction information on a DP to be received from the Base DP and/or the DP, perform decapsulation and/or header recovery on a packet stream received in the normal DP using the acquired overhead information, process the packet stream in the form of an IP packet stream, and transmit the packet stream to the upper layer.

FIG. 58 is a diagram illustrating syntax of an FIC according to another embodiment of the present invention.

Information included in an FIC described with reference to the drawing may be selectively combined with other information items described to be included in the aforementioned FIC to configure the FIC.

The receiver may rapidly acquire information on a channel using the information included in the FIC. The receiver may acquire bootstrap related information using the information included in the FIC. The FIC may include information for rapid channel scan and/or rapid service acquisition. The FIC may be referred to as another term, for example, a service list table or service acquisition information. The FIC may be transmitted in an IP packet in the IP layer according to a broadcast system. In this case, an IP address and/or a UDP port number for transmitting the FIC 를 may be fixed to a specific value, and the receiver may recognize that an IP packet transmitted to an corresponding IP address and/or a UDP port number may include an FIC without a separate processing procedure.

The FIC may incude FIC_protocol_version information, transport_stream_id information, num_partitions information, partition_id information, partition_protocol_version information, num_services information, service_id information, service_data_version information, service_channel_number information, service_category information, service_status information, service_distribution information, sp_indicator information, IP_version_flag information, SSC_source_IP_address_flag information, SSC_source_IP_address information, SSC_destination_IP_address information, SSC_destination_UDP_port information, SSC_TSI information, SSC_DP_ID information, num_partition_level_descriptors information, partition_level_descriptor( ) information, num_FIC_level_descriptors information, and/or FIC_level_descriptor( ) information.

The FIC_protocol_version information may indicate version of a structure of an FIC.

The transport_stream_id information may identify a broadcast stream. The transport_stream_id information may be used as information for identifying a broadcaster.

The num_partitions information may indicate the number of partition in a broadcast stream. The broadcast stream may be divided and transmitted into one or more partitions. Each partition may include one or more data pipes (DPs). A DP included in each partition may be used by one broadcaster. In this case, the partition may be defined as a data transmitting unit allocated to each broadcaster.

The partition_id information may identify a partition. The partition_id information may identify a broadcaster.

The partition_protocol_version information may indicate partition of a structure of a partition.

The num_services information may indicate the number services included in the partition. The service may include one or more components.

The service_id information may identify a service.

When signaling table (signaling information) for a service is changed or a service entry for a service to be signaled by an FIC is changed, the service_data_version information may indicate this change. A number of the service_data_version information may be increased whenever the above change occurs.

The service_channel_number information may indicate a channel number of a service.

The service_category information may indicate a category of a service. The category of the service may include A/V content, audio content, Electronic Service Guide (ESG), and/or Content on Demand (CoD).

The service_status information may include a state of a service. The state of the service may include an active or suspend state and a hidden or shown state. The state of the service may be in an inactive state. In the inactive state, currently, broadcast content may not be provided and a broadcast serviced may be provided in the future and, accordingly, the receiver may not show a scan result of a corresponding service to a viewer while the viewer scans a channel in the receiver.

The service_distribution information may indicate a distribution state of data for a service. For example, the service_distribution information may indicate that entire data of the service is included in one partition, that some data of a service are not included in the current partition, that content is presentable using only data in the partition, that other partitions are required to present content, or that other broadcast streams are required in order to present content.

The sp_indicator information may identify whether service protection is applied. For example, the sp_indicator information may identify whether one or more components (e.g., a stat in which a component is encapsulated) required for meaningful presentation is protected (e.g., a state in which a component is encapsulated).

The IP_version_flag information may identify whether an IP address indicated by the SSC_source_IP_address information and/or the SSC_destination_IP_address information is an IPv4 address or an IPv6 address.

The SSC_source_IP_address_flag information may identify whether SSC_source_IP_address information is present.

The SSC_source_IP_address information may indicate a source IP address of an IP datagram for transmitting signaling information for a service. The signaling information for a service may be referred to as service layer signaling. The service layer signaling may include information for describing a broadcast service. For example, the service layer signaling may include information for identifying a data unit (session, DP, and packet) for transmitting a component included in a broadcast service.

The SSC_destination_IP_address information may indicate a destination IP address of an IP datagram (or channel) for transmitting signaling information for a service.

The SSC_destination_UDP_port information may indicate a destination UDP port number for a UDP/IP stream for transmitting signaling information for a service.

The SSC_TSI information may indicate a Transport Session Identifier (TSI) of an LCT channel (or session) for transmitting signaling information (or signaling table) for a service.

The SSC_DP_ID information may be an identifier for identifying a DP including signaling information (or signaling table) for a service. The DP including the signaling information may be allocated as a most robust DP in a broadcast transmitting procedure.

The num_partition_level_descriptors information may identify the number of descriptors of a partition level for partition.

The partition_level_descriptor( ) information may include 0 or more descriptors for providing additional information for partition.

The num_FIC_level_descriptors information may indicate the number of descriptors of an FIC level for an FIC.

The FIC_level_descriptor( ) information may include 0 or more descriptors for providing additional information for an FIC.

FIG. 59 is a diagram illustrating signaling_Information_Part( ) according to an embodiment of the present invention.

The broadcast system may add additional information to an extended header part in the case of a packet for transmitting signaling information in a structure of a packet transmitted through the aforementioned DP. The additional information may be referred to as Signaling_Information_Part( ), hereinafter.

The Signaling_Information_Part( ) may include information used to determine a processing module (module or processor) for received signaling information. In a configuration operation of a system, a broadcast system may adjust the number of fields indicating information and the number of bits allocated to respective fields in bytes allocated to the Signaling_Information_Part( ). When the Signaling information is multiplexed and transmitted, the receiver may use information included in the Signaling_Information_Part( ) to determine whether corresponding signaling information is processed and to determine a signaling processing module to which each signaling information item is to be transmitted.

The Signaling_Information_Part( ) may include Signaling_Class information, Information_Type information, and/or Signaling Format information.

The Signaling_Class information may indicate a type of information that is transmitted signaling information. The signaling information may correspond to an FIC, an EAC, link layer signaling information, service signaling information, and/or upper layer signaling information. Configuration of the number of fields of the Signaling_Class information and mapping of a type of signaling information indicated by each value may be determined according to system design.

The Information_Type information may be used to indicate a detailed item of signaling information identified via signaling class information. Meaning according to a value of the Information_Type information may be separately defined according to a type of signaling information indicated by the Signaling_Class information.

The Signaling Format information may indicate a type (or format) of signaling information included in a payload. The Signaling Format information may identify a format of another type of signaling information illustrated in the drawing and identify a format of additionally and newly determined signaling information.

(a) and (b) of the drawing illustrate an embodiment of Signaling_Information_Part( ), and a bit number allocated to each field may be adjusted according to the characteristics of a broadcast system.

The Signaling_Information_Part( ) illustrated in (a) of the drawing may include signaling class information and/or signaling format information. The Signaling_Information_Part( ) may be used when a type of signaling information is not required to be determined or an information type may be determined in the signaling information. In addition, when only one signaling format is used or a signaling format is always not changed due to presence of a separate protocol for signaling, only a configuration 4-bit signaling field may be used without a signaling field and the remaining fields may be reserved as reserved fields for future use or may be set to support various types of signaling using a 8-bit signaling class.

With regard to the Signaling_Information_Part( ) illustrated in (b) of the drawing, when a signaling class is determined, information on an information type may be added to the Signaling_Information_Part( ) and the Signaling_Information_Part( ) may also include information type information in order to indicate a type and characteristics of more detailed information in a signaling class. The Signaling_Information_Part( ) may be used to determine decapsulation of signaling information or a processing procedure of the corresponding signaling through signaling class information and the information on the information type. A description of a detailed structure or processing process of link layer signaling is substituted with the above or following description.

Figure 60:
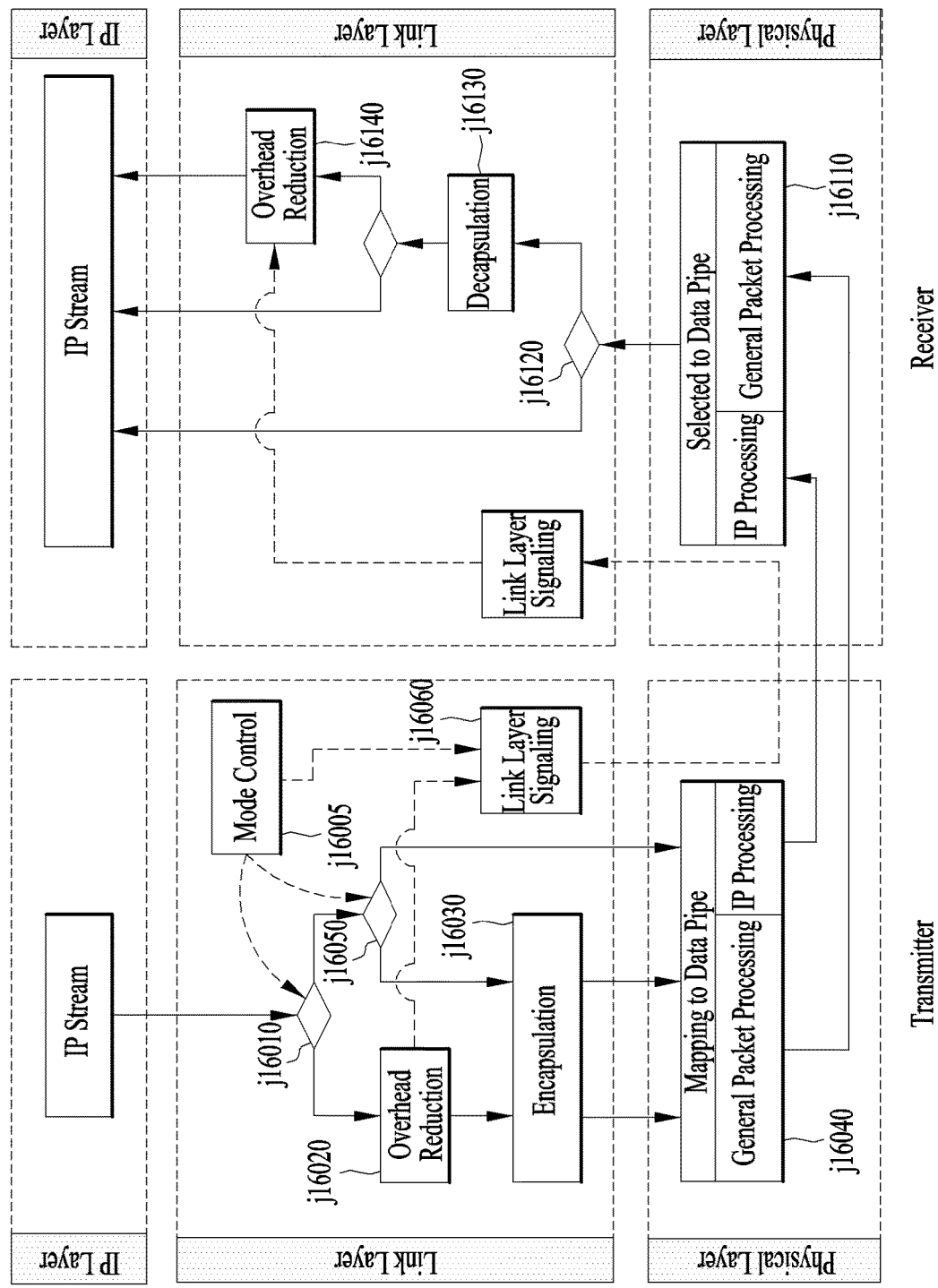
FIG. 60 is a diagram illustrating a procedure of an operation mode control of a transmitter and/or a receiver in a link layer according to an embodiment of the present invention.

FIG. 60 is a diagram illustrating a procedure of an operation mode control of a transmitter and/or a receiver in a link layer according to an embodiment of the present invention.

A method of determining an operation mode of the transmitter or receiver of the link layer may facilitate more effective use of a broadcast system and flexible design of the broadcast system. According to a method of controlling a link layer mode proposed according to the present invention, a mode of a link layer may be dynamically converted in order to effectively manage a system bandwidth and processing time. In addition, according to a method of controlling a link layer mode of the present invention, when a specific mode needs to be supported due to change in a physical layer or, oppositely, the specific is not necessary, the case may be easily handled. In addition, according to the method of controlling a link layer mode, when a broadcaster for providing a broadcast service intends to determine a transmitting method of a corresponding service, the broadcast system may also easily accommodate requirements of the corresponding broadcaster.

The method of controlling an operation mode of a link layer may be performed via configuration of executing the operation mode only in the link layer or via change in a data structure in the link layer. In this case, in the network layer and/or the physical layer, an independent operation of each layer may be performed without additionally embodying a separate function. A mode of a link layer proposed by the present invention may be controlled using signaling or a system internal parameter without changing a system according to a structure of a physical layer. A specific mode may be executed only when processing of corresponding input is supported in the physical layer.

The drawing illustrates a flow of processing a signal and/or data in an IP layer, a link layer, and a physical layer by a transmitter and/or a receiver.

A functional block (which may be embodied in hardware or software) for mode control may be added to the link layer and manage a parameter and/or signaling information for determining whether a packet is processed. Whether a corresponding function is performed in a processing procedure of a packet stream may be determined in the link layer using information of the mode control functional block.

An operation of a transmitter will now be described below.

The transmitter may determine whether overhead reduction j16020 is performed using a mode control parameter j16005 when an IP stream is input to a link layer (j16010). The mode control parameter may be generated by a service provider in the transmitter. The mode control parameter will be described below in detail.

When the overhead reduction j16020 is performed, information on overhead reduction may be generated and included in link layer signaling j16060 information. The link layer signaling j16060 information may include all or some of mode control parameters. The link layer signaling j16060 information may be transmitted in the form of a link layer signaling packet. The link layer signaling packet may be mapped to a DP and transmitted to the receiver but the link layer signaling packet may be transmitted to the received in the form of a link layer signaling packet through a predetermined region of a broadcast signal rather than being mapped to the DP.

A packet stream going through the overhead reduction j16020 may be encapsulated (j16030) and input to a DP j16040 of the physical layer. When overhead reduction is not performed, whether encapsulation is re-performed may be determined (j16050).

The packet stream going through the encapsulation j16030 may be input to the DP j16040 of the physical layer. In this case, in the physical layer, an operation of processing a general packet (link layer packet) may be performed. When the IP packet does not go through overhead reduction and encapsulation, the IP packet may be transmitted directly to the physical layer. In this case, in the physical layer, an operation of processing the IP packet may be performed. When the IP packet is directly transmitted, a parameter may be applied so as to perform the operation only when the physical layer supports an IP packet input. That is, when a value of the mode control parameter is adjusted in such a way that the physical layer does not support processing of the IP packet, an operation of transmitting the IP packet directly to the physical layer may be set not to be performed.

The transmitter may transmit a broadcast signal going through this procedure to the receiver.

An operation of the receiver will now be described below.

When the receiver selects a specific DP due to a change in channel according to user manipulation, etc. to receive a packet stream in a corresponding DP (j16110), a mode in which the packet is generated during transmission may be checked using a header of the packet stream and/or signaling information (j16120). When the operation mode during transmission with respect to a corresponding DP is checked, the IP packet may be transmitted to an upper layer through decapsulation j16130 and overhead reduction j16140 procedures according to a receiving procedure of the link layer. The overhead reduction j16140 procedure may include an overhead recovery procedure.

FIG. 61 is a is a diagram illustrating an operation in a link layer according to a value of a flag and a form of a packet transmitted to a physical layer according to an embodiment of the present invention.

In order to determine an operation mode of the link Layer, the aforementioned signaling method may be used. Signaling information related thereto may be transmitted directly to the receiver. In this case, the aforementioned signaling data or link layer signaling packet may include information related to mode control to be described below.

In consideration of the complexity of the receiver, an operation mode of the link layer may be indirectly signaled to the receiver.

With respect to control of an operation mode, the following two flags may be considered.

—Header Compression Flag (HCF): which may be a flag for determining whether header compression is applied in a corresponding layer and may be denoted by a value indicating Enable or Disable.

—Encapsulation Flag (EF): which may be a flag for determining whether encapsulation is applied in a corresponding link layer and may be denoted by a value indicating Enable or Disable. However, when encapsulation needs to be performed according to a header compression scheme, the EF may be defined to be dependent upon the HCF.

A value mapped to each flag may be denoted according to a system configuration as long as the value includes expressions Enable and Disable and a bit number allocated to each flag may be changed. According to an embodiment of the present invention, an enable value may be mapped to 1 and a disable value may be mapped to 0.

As illustrated in the drawing, whether header compression and encapsulation are performed, which is included in a link layer according to values of HCF and EF, and a packet format that is accordingly transmitted to the physical layer are illustrated. That is, according to an embodiment of the present invention, the receiver may recognize a type of a packet input to the physical layer using information on the HCF and the EF.

FIG. 62 is a diagram illustrating a descriptor for signaling a mode control parameter according to an embodiment of the present invention.

Flags as information on mode control in a link layer may be signaling information, generated in the form of a descriptor by a transmitter, and transmitted to the receiver. Signaling including the flag as the information on the mode control may be used to control an operation mode at a headend by the transmitter and whether the flag as the information on the mode control is contained in the signaling to be transmitted to the receiver may be optionally selected.

When the signaling including the flag as the information on the mode control is transmitted to the receiver, the receiver may directly select an operation mode of a corresponding DP and may perform a packet decapsulation operation. When the signaling including the flag as the information on the mode control is not transmitted to the receiver, the receiver may determine a mode for transmission using the physical layer signaling transmitted to the receiver or field information of a packet header.

According to an embodiment of the present invention, a link layer mode control descriptor may include DP_id information, HCF information, and/or EF information. The link layer mode control descriptor may be included in the aforementioned FIC, link layer signaling packet, signaling through a dedicated channel, PSI/SI, and/or a transmission parameter in a physical layer.

The DP_id information may identify a DP to which a mode in a link layer is applied.

The HCF information may identify whether header compression is applied in the DP identified by the DP_id information.

The EF information may identify whether encapsulation is performed on the DP identified by the DP_id information.

Figure 63:
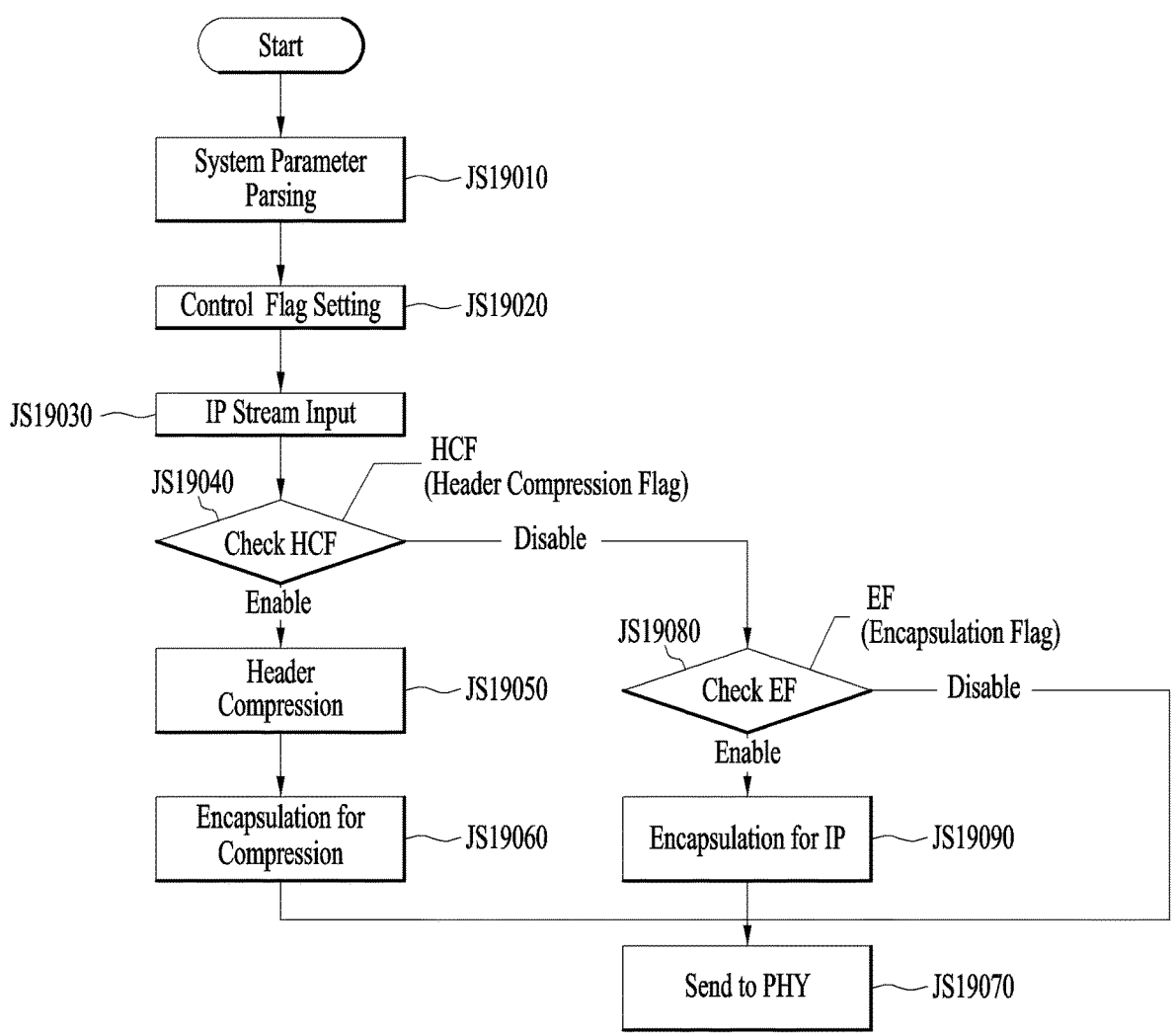
FIG. 63 is a diagram illustrating an operation of a transmitter for controlling an operation mode according to an embodiment of the present invention.

FIG. 63 is a diagram illustrating an operation of a transmitter for controlling an operation mode according to an embodiment of the present invention.

Although not illustrated in the drawing, prior to a processing procedure of the link layer, the transmitter may perform processing in an upper layer (e.g., IP layer). The transmitter may generate an IP packet including broadcast data for a broadcast service.

The transmitter may parse or generate a system parameter (JS19010). Here, the system parameter may correspond to the aforementioned signaling data or signaling information.

The transmitter may receive or set a mode control related parameter or signaling information and set a flag value related to operation mode control during a broadcast data processing procedure in the link layer (JS19020). The operation in the transmitter may be performed after a header compression operation or an encapsulation operation is performed. That is, the transmitter may perform a header compression or encapsulation operation and generate information related to the operation.

The transmitter may acquire a packet of an upper layer, which needs to be transmitted through a broadcast signal (JS19030). Here, the packet of the upper layer may correspond to an IP packet.

The transmitter may check an HCF in order to determine whether header compression is applied to the packet of the upper layer (JS19040).

When the HCF is enabled, the transmitter may apply header compression to the upper layer packet (JS19050). After header compression is performed, the transmitter may generate an HCF. The HCF may be used to signal whether header compression is applied, to the receiver.

The transmitter may perform encapsulation on the upper layer packet to which header compression is applied to generate the link layer packet (JS19060). After the Encapsulation procedure is performed, the transmitter may generate an EF. The EF may be used to signal whether encapsulation is applied on the upper layer packet, to the receiver.

The transmitter may transmit the link layer packet to the physical layer processor (JS19070). Then, the physical layer processor may generate a broadcast signal including the link layer packet and the broadcast signal to the receiver.

When the HCF is disabled, the transmitter may check the EF in order to determine whether encapsulation is applied (JS19080).

When the EF is enabled, the transmitter may perform encapsulation on the packet of the upper layer (JS19090). When the EF is disabled, the transmitter may not separately process a corresponding packet stream. The transmitter may transmit a packet stream (link layer packet) completed to be processed in the link layer, to the physical layer (JS19070). Header compression, encapsulation, and/or generation of the link layer packet may be performed by a link layer packet generator (i.e. link layer processor) in the transmitter.

The transmitter may generate service signaling channel (SCC) data. The service signaling channel data may be generated by a service signaling data encoder. The service signaling data encoder may be included in the link layer processor and may exist separately from the link layer processor. The service signaling channel data may include the aforementioned FIC and/or EAT. The service signaling channel data may be transmitted to the aforementioned dedicated channel.

Figure 64:
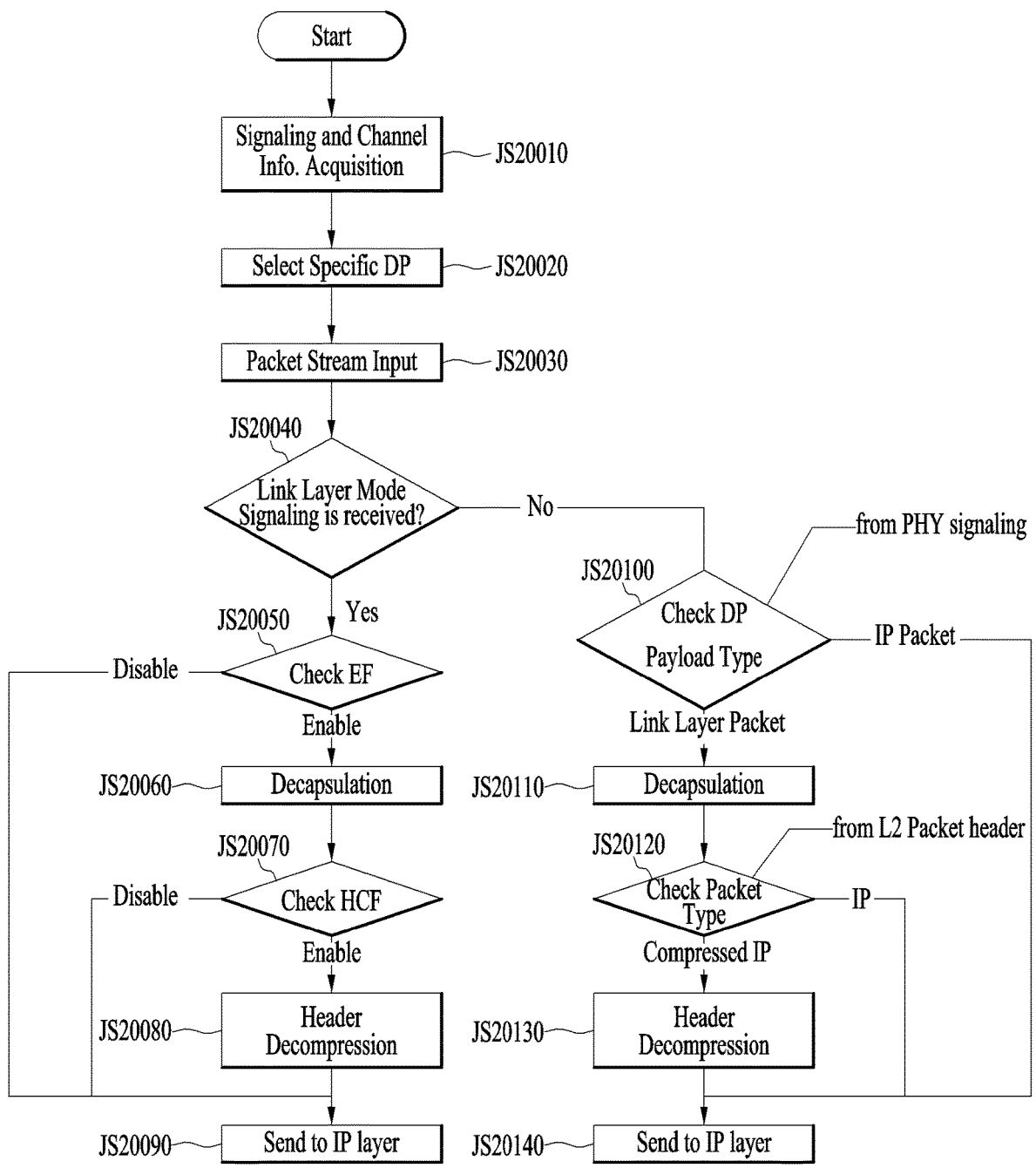
FIG. 64 is a diagram illustrating an operation of a receiver for processing a broadcast signal in an operation mode according to an embodiment of the present invention.

FIG. 64 is a diagram illustrating an operation of a receiver for processing a broadcast signal in an operation mode according to an embodiment of the present invention.

The receiver may receive operating mode related information in a link layer together with a packet stream.

The receiver may receive signaling information and/or channel information (JS20010). Here, a description of the signaling information and/or the channel information will be substituted with the above description.

The receiver may select a DP for reception processing according to the signaling information and/or the channel information (JS20020).

The receiver may perform decoding of a physical layer on a selected DP and receive a packet stream of the link layer (JS20030).

The receiver may check whether the received signaling includes link layer mode control related signaling (JS20040).

Upon receiving link layer mode related information, the receiver may check the EF (JS20050).

When the EF is enabled, the receiver may perform a decapsulation procedure on a packet of the link layer (JS20060).

The receiver may decapsulate a packet and, then, may check the HCF, and when the HCF is enabled, the receiver may perform a header decompression procedure (JS20080).

The receiver may transmit a packet on which header decompression is performed to an upper layer (e.g., IP layer) (JS20090). During the aforementioned procedure, when the HCF and the EF are disabled, the receiver may recognize that a processed packet stream as an IP packet and transmit the corresponding packet to the IP layer.

When the receiver may not receive link layer mode related information or may not transmit link layer mode related information to the receiver in a corresponding system, the receiver may operate as follows.

The receiver may receive signaling information and/or channel information (JS20010) and select a DP for reception processing according to corresponding information (JS20020). The receiver may perform decoding of the physical layer on a selected DP to acquire a packet stream (JS20030).

The receiver may check whether the received signaling includes link layer mode control related signaling (JS20040).

Since the receiver does not received the link layer mode related signaling, the receiver may check a format of a transmitted packet using physical layer signaling, etc. (JS20100). Here, the physical layer signaling information may include information for identifying a type of a packet included in a payload of a DP. When a packet transmitted from the packet receiver is an IP packet, the receiver may transmit the packet to the IP layer without separate processing in the link layer.

When the packet transmitted from the physical layer is a packet going through encapsulation in the link layer, the receiver may perform a decapsulation procedure on the corresponding packet (JS20110).

The receiver may check a type of a packet included in a payload using information on a header, etc. of the link layer packet during the decapsulation procedure (JS20120) and when the payload is an IP packet, the corresponding packet may be transmitted to the IP layer processor.

When the payload of the link layer packet is a compressed IP, the receiver may perform a decompression procedure on the corresponding packet (JS20130).

The receiver may transmit the IP packet to the IP layer processor (JS20140).

FIG. 65 is a diagram illustrating information for identifying an encapsulation mode according to an embodiment of the present invention.

In a broadcast system, when processing in the link layer is performed in one or more modes, a procedure of determining a mode in which the processing in the link layer is to be performed may be required (by a transmitter and/or a receiver). During a procedure of establishing the transmitter and the receiver, the transmitter and/or the receiver may check configuration of the link layer. This case may correspond to a case in which the receiver is first setup or performs a scan procedure on a service or a case in which a mobile receiver newly enters a transmission radius of the transmitter. This procedure may be referred to as an initialization procedure or a bootstrapping procedure. This procedure may include some of procedures supported by a corresponding system rather than being configured as a separate procedure according to a system. In the present specification, this procedure will be referred to as an initialization procedure.

A parameter required in the initialization procedure may be determined according to a function supported by a corresponding link layer and a type of an operation mode of each function. Each function included in the link layer and a parameter for determining an operation mode according to each function will be described below.

The drawing illustrates a parameter for identifying an encapsulation mode.

When it is possible to set an encapsulation procedure of a packet in a link layer or an upper layer (e.g., IP layer), each index may be applied to the following encapsulation mode and an appropriate field value may be arranged in the corresponding index. The drawing illustrates a field value mapped to each encapsulation mode according to an embodiment of the present invention. In the present embodiment, a field value of 2 bits is assumed to be applied but, in reality, when many encapsulation modes are supportable, the field value may be extended within a range allowed by the system.

In the present embodiment, when a field of information indicating an encapsulation mode is set to '00', the corresponding information may indicate that encapsulation in the link layer is not performed and data is bypassed. When the field of the information indicating an encapsulation mode is set to '01', the corresponding information may indicate that data is processed using a first encapsulation method in the link layer. When the field of the information indicating an encapsulation mode is set to '10', the corresponding information may indicate that data is processed using a second encapsulation method in the link layer. When the field of the information indicating an encapsulation mode is set to '11', the corresponding information may indicate that data is processed using a third encapsulation method in the link layer.

FIG. 66 is a diagram illustrating information for identifying a header compression mode according to an embodiment of the present invention.

Processing in a link layer may include a function of header compression of an IP packet. When the link layer is capable of supporting several IP header compression schemes, a transmitter side may determine a scheme to be used.

The header compression mode may be generally determined together with an encapsulation function and, thus, when an encapsulation mode is disabled, the header compression mode may also be disabled. The drawing illustrates a field value mapped to each header compression mode according to an embodiment of the present invention. In the present embodiment, a field value of 3 bits is assumed to be applied but, in reality, the field value may be extended or reduced in a range allowed by the system according to a supportable header compression mode.

In the present embodiment, when a field of information indicating a header compression mode is set to '000', the corresponding information may indicate that header compression is not performed on data in the link layer. When the field of the information indicting the header compression mode is set to '001', the corresponding information may indicate that a RoHC method is used to perform header compression on data in the link layer. When the field of the information indicting the header compression mode is set to '010', the corresponding information may indicate that a second type of header compression is used to perform header compression on data in the link layer. When the field of the information indicting the header compression mode is set to '011', the corresponding information may indicate that a third type of header compression is used to perform header compression on data in the link layer. When the field of the information indicting the header compression mode is set to '100' to '111', the corresponding information may be reserved as a region for identifying a new header compression processing method of data in the link layer.

FIG. 67 is a diagram illustrating information for identifying a packet reconfiguration mode according to an embodiment of the present invention.

In order to apply a header compression scheme to a unidirectional link such as a broadcast system, the broadcast system (transmitter and/or receiver) needs to rapidly acquire context information. The broadcast system may transmit/receive a packet stream on which a header compression procedure is performed in out-of-band via reconfiguration of a partially compressed packet and/or context information extraction of the packet stream. In the present invention, a mode in which a packet is reconfigured or information indicating a structure of a packet is added may be referred to as a Packet Reconfiguration Mode.

The Packet Reconfiguration Mode may have several methods. In the broadcast system, it may be possible to determine a corresponding method in the initialization procedure of the link layer. The drawing illustrates an index and field value mapped to the packet reconfiguration mode according to an embodiment of the present invention. In the present embodiment, a field value of 2 bits is assumed to be applied but, in reality, the field value may be extended or reduced in a range allowed by the system according to a supportable packet reconfiguration mode.

In the present embodiment, when a field of information indicating a packet reconfiguration mode is set to '00', the corresponding information may indicate that packet reconfiguration is not performed on a packet for transmitting data in a link layer. When the field of the information indicating the packet reconfiguration mode is set to '01', the corresponding information may indicate that a first type of reconfiguration is performed on the packet for transmitting data in the link layer. When the field of the information indicating the packet reconfiguration mode is set to '10', the corresponding information may indicate that a second type of reconfiguration is performed on the packet for transmitting data in the link layer. When the field of the information indicating the packet reconfiguration mode is set to '11', the corresponding information may indicate that a third type of reconfiguration is performed on the packet for transmitting data in the link layer.

FIG. 68 is a diagram illustrating a context transmission mode according to an embodiment of the present invention.

A transmission method of the aforementioned context information may include one or more transmission modes. That is, the broadcast system may transmit the aforementioned information using various methods. In the broadcast system, the context transmission mode may be determined according to a transmission path of a system and/or a logical physical layer, and information for identifying a method therefor may be signaled. The diagram illustrates an index and field value mapped to the context transmission mode according to an embodiment of the present invention. In the present embodiment, a field value of 3 bits is assumed to be applied but, in reality, the field value may be extended or reduced in a range allowed by the system according to a supportable context transmission mode.

In the present embodiment, when a field of information indicating a context transmission mode is set to '000', the corresponding information may indicate that context information is transmitted in a first transmission mode. When the field of the information indicating the context transmission mode is set to '001', the corresponding information may indicate that the context information is transmitted in a second transmission mode. When the field of the information indicating the context transmission mode is set to '010', the corresponding information may indicate that the context information is transmitted in a third transmission mode. When the field of the information indicating the context transmission mode is set to '011', the corresponding information may indicate that the context information is transmitted in a fourth transmission mode. When the field of the information indicating the context transmission mode is set to '100', the corresponding information may indicate that the context information is transmitted in a fifth transmission mode. When the field of the information indicating the context transmission mode is set to '101' to '111', the corresponding information may be reserved in order to identify that the context information is transmitted in a new transmission mode.

FIG. 69 is a diagram illustrating initialization information when RoHC is applied using a header compression method according to an embodiment of the present invention.

In the present invention, the RoHC is used in header compression but when another type of header compression method is used, similar initialization information may also be used in a broadcast system.

In the broadcast system, it may be required to transmit initialization information appropriate for a corresponding compression scheme according to a header compression mode. An initialization parameter of the case in which a header compression mode is set via RoHC will be described with regard to the present embodiment. The initialization information for RoHC may be used to transmit information on a configuration of an RoHC channel as a link between a compressor and a decompressor.

One RoHC channel may have one or more context information items. In this regard, Common information applied to all contexts in the corresponding RoHC channel may be transmitted/received in the initialization information. A path to which the RoHC is applied and related information is transmitted may be referred to as a RoHC channel and, in general, the RoHC channel may be mapped to a link. In addition, the RoHC channel may be generally transmitted through one DP and, in this case, the RoHC channel may be indicated using information related to the aforementioned DP.

The initialization information may include link_id information, max_cid information, large_cids information, num_profiles information, profiles( ) information, num_IP_stream information, and/or IP_address( ) information.

The link_id information may indicate an ID of a link (RoHC channel) to which corresponding information is applied. When the link or the RoHC channel is transmitted through one DP, the link_id information may be substituted with DP_id.

The max_cid information may indicate a maximum value of a CID. The max_cid information may be used to indicate the maximum value of the CID to a decompressor.

The large_cids information may have a Boolean value and may be used to identify whether a short CID (0 to 15) or an embedded CID (0 to 16383) for configuration of a CID. Accordingly, a size of a byte for indicating the CID may also be determined.

The num_profiles information may indicate the number of profiles supported by the identified RoHC channel.

The profiles( ) information may indicate a range of a protocol for compressing a header in the RoHC. When a compressor and a decompressor have the same profile, it may be possible to compress and restore a stream in the RoHC. Accordingly, a receiver may acquire a parameter of RoHC used by a transmitter side from the profiles( ) information.

The num_IP_stream information may indicate the number of IP streams transmitted through a channel (e.g., RoHC Channel).

The IP_address information may indicate an address of an IP stream. The IP_address information may indicate a destination address of a filtered IP stream input to a RoHC compressor (transmitter).

FIG. 70 is a diagram illustrating information for identifying link layer signaling path configuration according to an embodiment of the present invention.

Generally, a broadcast system may be designed to prevent a path for transmitting signaling information from being changed. However, when the system is changed or while different standards are exchanged, it may be necessary to signal information on a configuration of a physical layer for transmitting link layer signaling information, but not the form of an IP packet. In addition, in the case of a mobile receiver, when the mobile receiver is moved between areas covered by transmitters with different structures, a path for transmitting the link layer signaling information may be changed and, thus, transmission of link layer signaling path information may be frequently needed. The drawing illustrates information for identifying a signaling path as a path for transmitting/receiving link layer signaling information. With regard to the corresponding information, an index may be extended or reduced according to a signaling transmitting path configured in a physical layer. Irrespective of configuration of a link layer, a corresponding channel may be managed according to a procedure in the physical layer.

The drawing illustrates an embodiment in which information on a configuration of a signaling path is allocated to a corresponding field value. In the present embodiment, when a plurality of signaling paths is supported, a signaling path with high importance may be mapped in an order from a low index value. A signaling path with high priority may also be identified according to an index value.

In addition, the broadcast system may use all signaling paths with higher priority than a signaling path indicated by the information on a configuration of a signaling path. For example, when a signaling path configuration index value is 3, a corresponding field value may be '011' and, in this case, this may indicate that all of a Dedicated data path, a Specific signaling channel (FIC), and a Specific signaling channel (EAC) with priority of 1, 2, and 3 are used.

According to the above signaling method, the amount of data for transmitting signaling information may be reduced.

FIG. 71 is a diagram illustrating information on configuration of a signaling path via a bit mapping method according to an embodiment of the present invention.

The information on the aforementioned signaling path configuration may also be defined and transmitted/received via the bit mapping method. In the present embodiment, the case in which 4 bits are allocated to the information on the signaling path configuration may be considered, signaling paths corresponding to respective bits b1, b2, b3, and b4 may be mapped, when a bit value of each position is 0, the corresponding path may be indicated to be disabled, and when the bit value is 1, the path may be indicated to be enabled. For example, when a signaling path configuration field value of 4 bits is '1100', this may indicate that a broadcast system uses a Dedicated data pipe and a Specific signaling channel (FIC) in a link layer.

Figure 72:
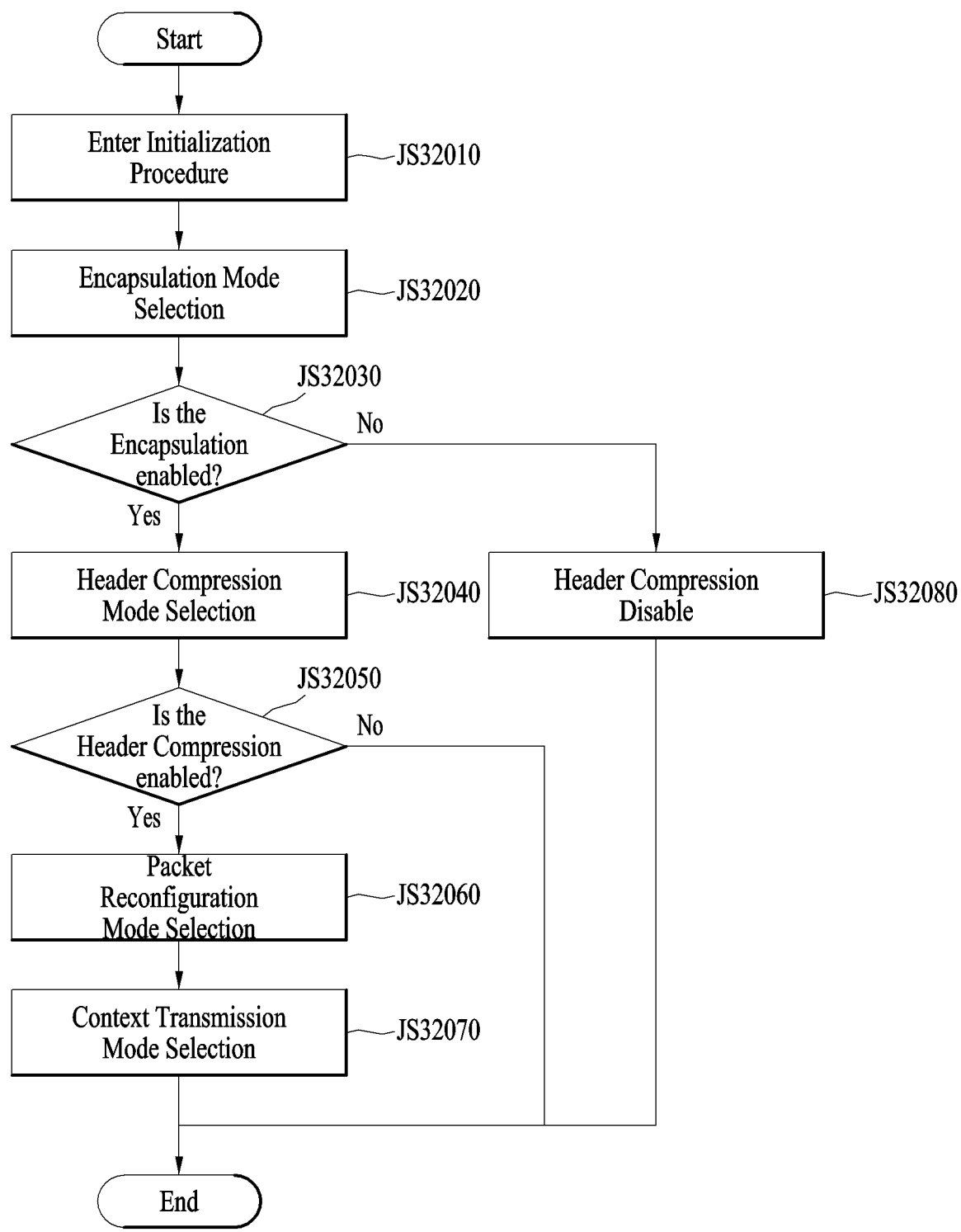
FIG. 72 is a flowchart illustrating a link layer initialization procedure according to an embodiment of the present invention.

FIG. 72 is a flowchart illustrating a link layer initialization procedure according to an embodiment of the present invention.

When power is supplied to a receiver and a mobile receiver enters a transmission area of a new transmitter, the receiver may perform an initialization procedure on all or some of system components. In this case, it may be possible to also perform an initialization procedure of the link layer. Initial set up of a link layer in the receiver using the aforementioned initialization parameter may be performed as illustrated in the drawing.

The receiver may enter the initialization procedure of the link layer (JS32010).

Upon entering the initialization procedure of the link layer, the receiver may determine an encapsulation mode (JS32020). The receiver may determine an encapsulation using the aforementioned initialization parameter during this procedure.

The receiver may determine whether encapsulation is enabled (JS32030). The receiver may determine whether encapsulation is enabled using the aforementioned initialization parameter during this procedure.

It may be general to consider use of a header compression scheme subsequently to encapsulation and, thus, when an encapsulation mode is disabled, the receiver may process the header compression mode to be disabled (JS32080). In this case, the receiver may not necessary perform the initialization procedure any longer and, thus, the receiver may immediately transmit data to another layer or may convert the procedure into a processing procedure of the data.

The receiver may determine a header compression mode when the encapsulation mode is enabled (JS32040). During determination of a header compression mode, the receiver may determine a header compression scheme applied to a packet using the aforementioned initialization parameter.

The receiver may determine whether header compression is enabled (JS32050). When header compression is disabled, the receiver may immediately transmit data or may convert the procedure into a processing procedure of the data.

When header compression is enabled, the receiver may identify a packet stream reconfiguration mode and/or a context transmission mode with respect to a corresponding header compression scheme (JS32060 and JS32070). The receiver may determine each mode using the aforementioned information during this procedure.

Then, the receiver may transmit data for another processing procedure or perform a processing procedure on the data.

Figure 73:
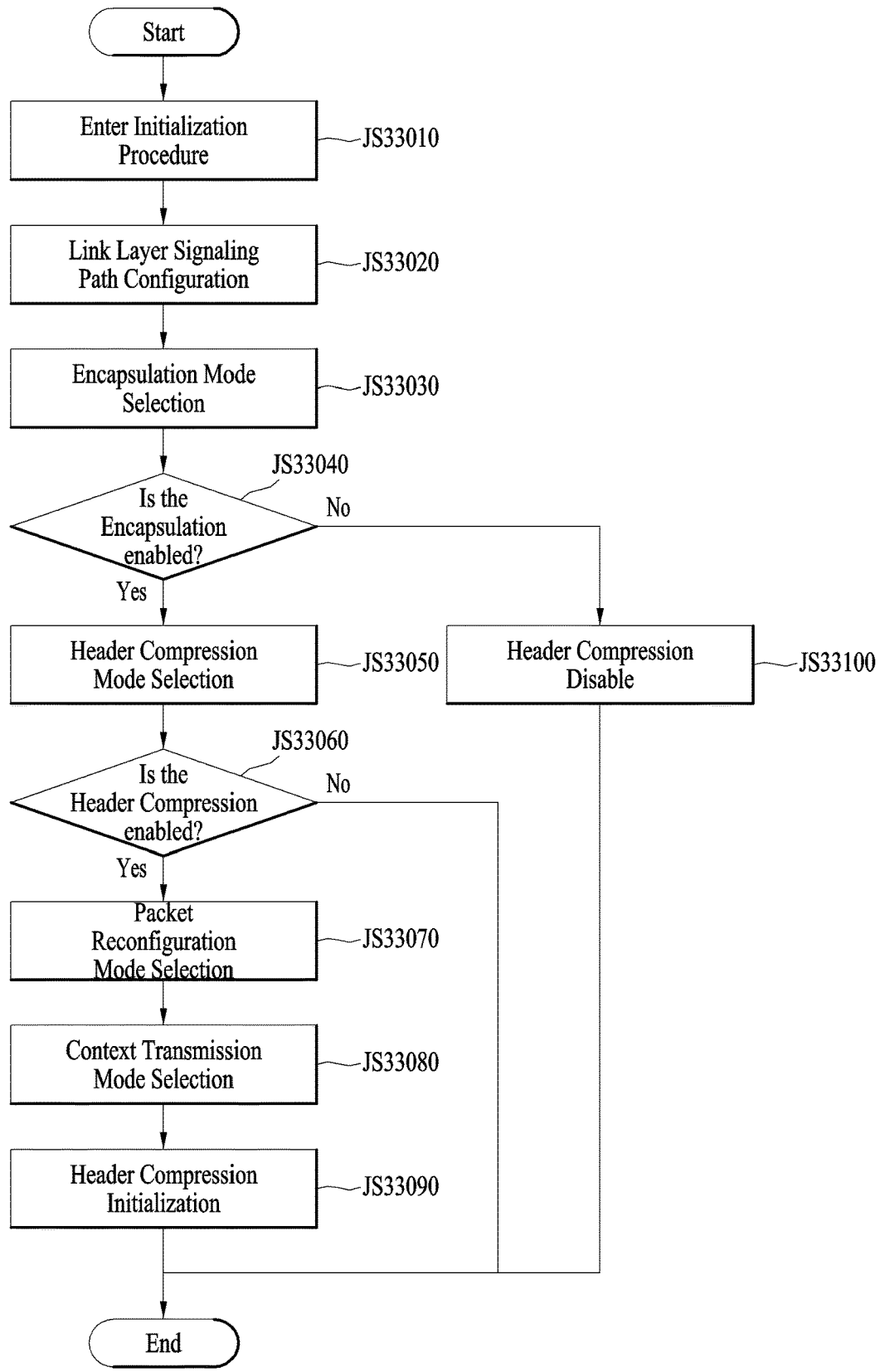
FIG. 73 is a flowchart illustrating a link layer initialization procedure according to another embodiment of the present invention.

FIG. 73 is a flowchart illustrating a link layer initialization procedure according to another embodiment of the present invention.

A receiver may enter an initialization procedure of the link layer (JS33010).

The receiver may recognize link layer signaling path configuration (JS33020). The receiver may recognize a path for transmitting link layer signaling information using the aforementioned information.

The receiver may determine an encapsulation mode (JS33030). The receiver may determine an encapsulation mode using the aforementioned initialization parameter during this procedure.

The receiver may determine whether encapsulation is enabled (JS33040). The receiver may determine whether encapsulation is enabled using the aforementioned initialization parameter during this procedure.

It may be general to consider use of a header compression scheme subsequently to encapsulation and, thus, when the encapsulation mode is determined to be disabled, the receiver may process the header compression mode to be disabled (JS34100). In this case, the receiver may not necessarily perform the initialization procedure any longer and, thus, the receiver may immediately transmit data to another layer or may convert the procedure into a processing procedure of the data.

When the encapsulation mode is enabled, the receiver may determine a header compression mode (JS33050). During determination of the header compression mode, the receiver may determine a header compression scheme applied to a packet using the aforementioned initialization parameter.

The receiver may determine whether header compression is enabled (JS33060). When header compression is disabled, the receiver may immediately transmit data or may convert the procedure into a processing procedure of the data.

When header compression is enabled, the receiver may identify the corresponding header compression scheme in a packet stream reconfiguration mode and/or a context transmission mode (JS33070 and JS32080). The receiver may determine each mode using the aforementioned information during procedure.

The receiver may perform header compression initialization (JS33090). The receiver may use the aforementioned information during the header compression initialization. Then, the receiver may transmit data for another processing procedure or perform a processing procedure on the data.

FIG. 74 is a diagram illustrating a signaling format for transmitting an initialization parameter according to an embodiment of the present invention.

In order to transmit the aforementioned initialization parameter to an actual receiver, a broadcast system may configure corresponding information in the form of a descriptor and transmit/receive the information. When there is a plurality of links managed in a link layer configured in the system, it may be possible to apply link_id information for identifying each link and to apply another parameter according to the link_id information. For example, when a type of data transmitted to the link layer is an IP, if an IP address in a corresponding IP stream is not changed, it may be possible to determine an IP address transmitted from an upper layer in configuration information.

According to an embodiment of the present invention, a link layer initialization descriptor for transmitting the initialization parameter may include descriptor_tag information, descriptor_length information, num_link information, link_id information, encapsulation_mode information, header_compression_mode information, packet_reconfiguration_mode information, context_transmission_mode information, max_cid information, large_cids information, num_profiles information, and/or profiles( ) information. A description of each information item is substituted with the above description of information with the same or similar term.

FIG. 75 is a diagram illustrating a signaling format for transmitting an initialization parameter according to another embodiment of the present invention.

The drawing illustrates another type of descriptor in order to transmit the aforementioned initialization parameter to an actual receiver. In the present embodiment, initial configuration information of the aforementioned header compression may be excluded. When a separate header compression initialization procedure is performed in processing of data of each link layer or each packet of a link layer has a separate header compression parameter, the same type of descriptors may be transmitted/received in the present embodiment.

According to another embodiment of the present invention, the link layer initialization descriptor for transmitting the initialization parameter may include descriptor_tag information, descriptor_length information, num_link information, link_id information, encapsulation_mode information, header_compression_mode information, packet_reconfiguration_mode information, and/or context_transmission_mode information. A description of each information item is substituted with the above description of information with the same or similar term.

FIG. 76 is a diagram illustrating a signaling format for transmitting an initialization parameter according to another embodiment of the present invention.

The drawing illustrates another type of descriptor in order to transmit the aforementioned initialization parameter to an actual receiver. In the present embodiment, the descriptor for transmitting the initialization parameter may not include initial configuration information of header compression and may include configuration information on a signaling transmitting path.

A configuration parameter of the signaling transmitting path may use a 4-bit bit mapping method, as described above. When a broadcast system (transmitter or receiver) for processing a broadcast signal is changed, a method of transmitting the link layer signaling or content thereof may be changed. In this case, when the initialization parameter is transmitted according to the present embodiment, the case in which the link layer signaling is changed may be substituted.

According to another embodiment of the present invention, the link layer initialization descriptor for transmitting the initialization parameter may include descriptor_tag information, descriptor_length information, num_link information, signaling_path_configuration information, dedicated_DP_id information, link_id information, encapsulation_mode information, header_compression_mode information, packet_reconfiguration_mode information, and/or context_transmission_mode information.

When link layer signaling information is transmitted through a dedicated DP, the dedicated_DP_id information may be information for identifying a corresponding DP. In the signaling path configuration, when the dedicated DP is determined as a path for transmitting signaling information, corresponding DP_id may be determined and DP_id information may be transmitted in the descriptor for transmitting the initialization parameter.

A description of each information item is substituted with the above description of information with the same or similar term.

Figure 77:
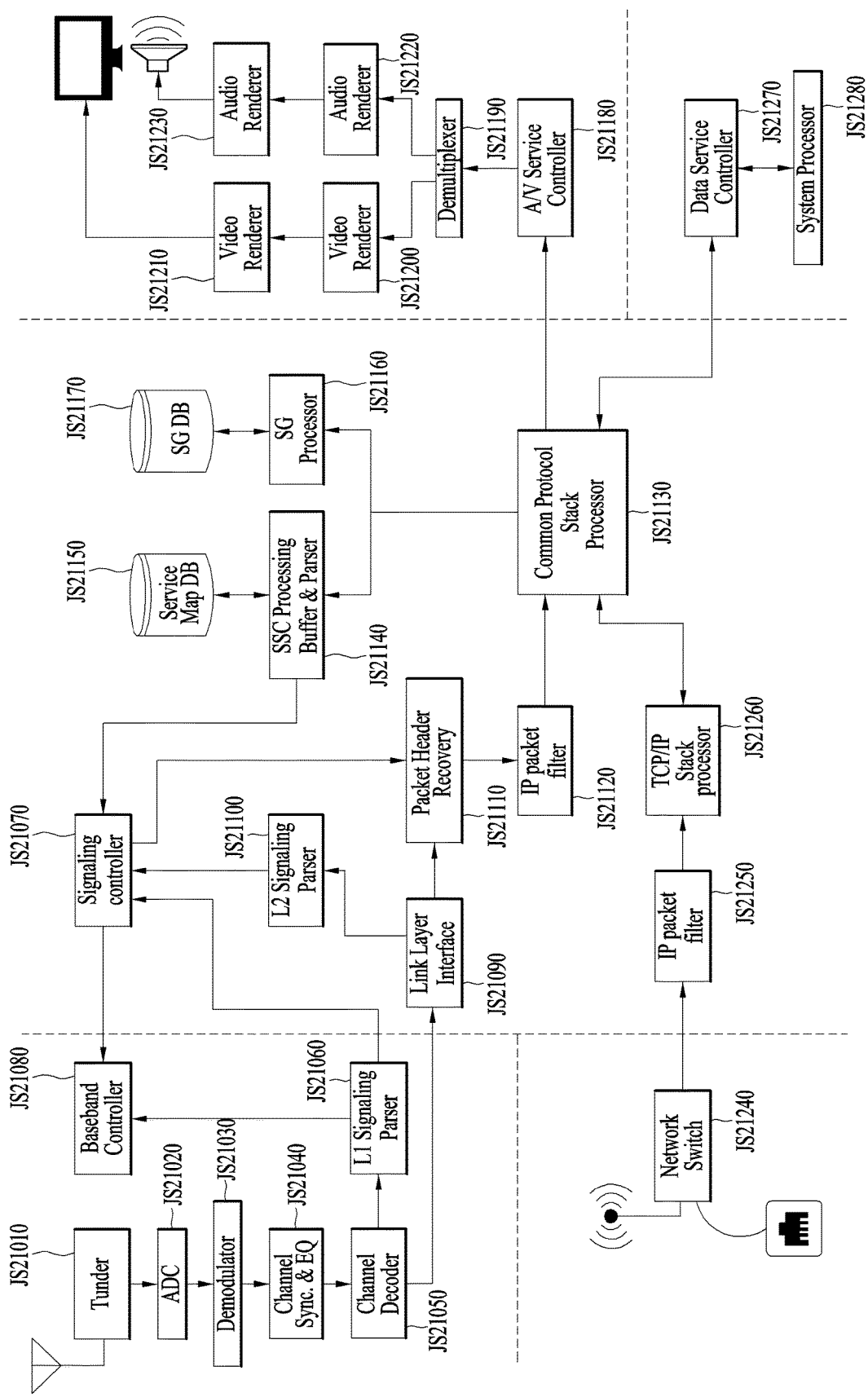
FIG. 77 is a diagram illustrating a receiver according to an embodiment of the present invention.

FIG. 77 is a diagram illustrating a receiver according to an embodiment of the present invention.

The receiver according to an embodiment of the present invention may include a tuner JS21010, an ADC JS21020, a demodulator JS21030, a channel synchronizer & equalizer JS21040, a channel decoder JS21050, an L1 signaling parser JS21060, a signaling controller JS21070, a baseband controller JS21080, a link layer interface JS21090, an L2 signaling parser JS21100, packet header recovery JS21110, an IP packet filter JS21120, a common protocol stack processor JS21130, an SSC processing buffer and parser JS21140, a service map database JS21150, a service guide processor JS21160, a service guide database JS21170, an AV service controller JS21180, a demultiplexer JS21190, a video decoder JS21200, a video renderer JS21210, an audio decoder JS21220, an audio renderer JS21230, a network switch JS21240, an IP packet filter JS21250, a TCP/IP stack processor JS21260, a data service controller JS21270, and/or a system processor JS21280.

The tuner JS21010 may receive a broadcast signal.

When the broadcast signal is an analog signal, the ADC JS21020 may convert the broadcast signal into a digital signal.

The demodulator JS21030 may demodulate the broadcast signal.

The channel synchronizer & equalizer JS21040 may perform channel synchronization and/or equalization.

The channel decoder JS21050 may decode a change 1 in the broadcast signal.

The L1 signaling parser JS21060 may parse L1 signaling information from the broadcast signal. The L1 signaling information may be physical layer signaling information. The L1 signaling information may include a transmission parameter.

The signaling controller JS21070 may process signaling information or transmit corresponding signaling information to an apparatus that requires the corresponding signaling information, from a broadcast receiver.

The baseband controller JS21080 may control processing of a broadcast signal in a baseband. The baseband controller JS21080 may perform the processing in the physical layer on the broadcast signal using L1 signaling information. When a connection relationship between the baseband controller JS21080 and other apparatuses is not indicated, the baseband controller JS21080 may transmit the processed broadcast signal or broadcast data to another device in the receiver.

The link layer interface JS21090 may access the link layer packet and acquire the link layer packet.

The L2 signaling parser JS21100 may parse L2 signaling information. The L2 signaling information may be information included in the aforementioned link layer signaling packet.

When header compression is applied to a packet (e.g., IP packet) of an upper layer rather than a link layer, the packet header recovery JS21110 may perform header decompression on the packet. Here, the packet header recovery JS21110 may restore a header of a packet of the upper layer using information for identifying whether the aforementioned header compression is applied.

The P packet filter JS21120 may filter an IP packet transmitted to a specific IP address and/or a UDP number. The IP packet transmitted to the specific IP address and the UDP number may include signaling information transmitted through the aforementioned dedicated channel. The IP packet transmitted to the specific IP address and the UDP number may include the aforementioned FIC, FIT, EAT, and/or emergency alert message (EAM).

The common protocol stack processor JS21130 may process data according to a protocol of each layer. For example, the common protocol stack processor JS21130 may decode or parse a corresponding IP packet according to a protocol of an IP layer and/or a upper layer rather than the IP layer.

The SSC processing buffer and parser JS21140 may store and parse signaling information transmitted to a service signaling channel (SSC). A specific IP packet may be determined as the SSC and the SSC may include information for acquiring a service, attribute information on content included in the service, DVB-SI information, and/or PSI/PSIP information.

The service map database JS21150 may store a service map table. The service map table may include attribute information on the broadcast service. The service map table may be transmitted in the SSC.

The service guide processor JS21160 may parse or decode a service guide.

The service guide database JS21170 may store the service guide.

The AV service controller JS21180 may perform overall control for acquisition of broadcast AV data.

The demultiplexer JS21190 may divide broadcast data into video data and audio data.

The video decoder JS21200 may decode video data.

The video renderer JS21210 may generate video provided to a user using the decoded video data.

The audio decoder JS21220 may decode audio data.

The audio renderer JS21230 may generate audio provided to the user using the decoded audio data.

The network switch JS21240 may control an interface with another network other than a broadcast network. For example, the network switch JS21240 may access an IP network to directly receive an IP packet.

The IP packet filter JS21250 may filter an IP packet with a specific IP address and/or a UDP number.

The TCP/IP stack processor JS21260 may decapsulate the IP packet according to a protocol of TCP/IP.

The data service controller JS21270 may control processing of a data service.

The system processor JS21280 may perform overall control of the receiver.

Figure 78:
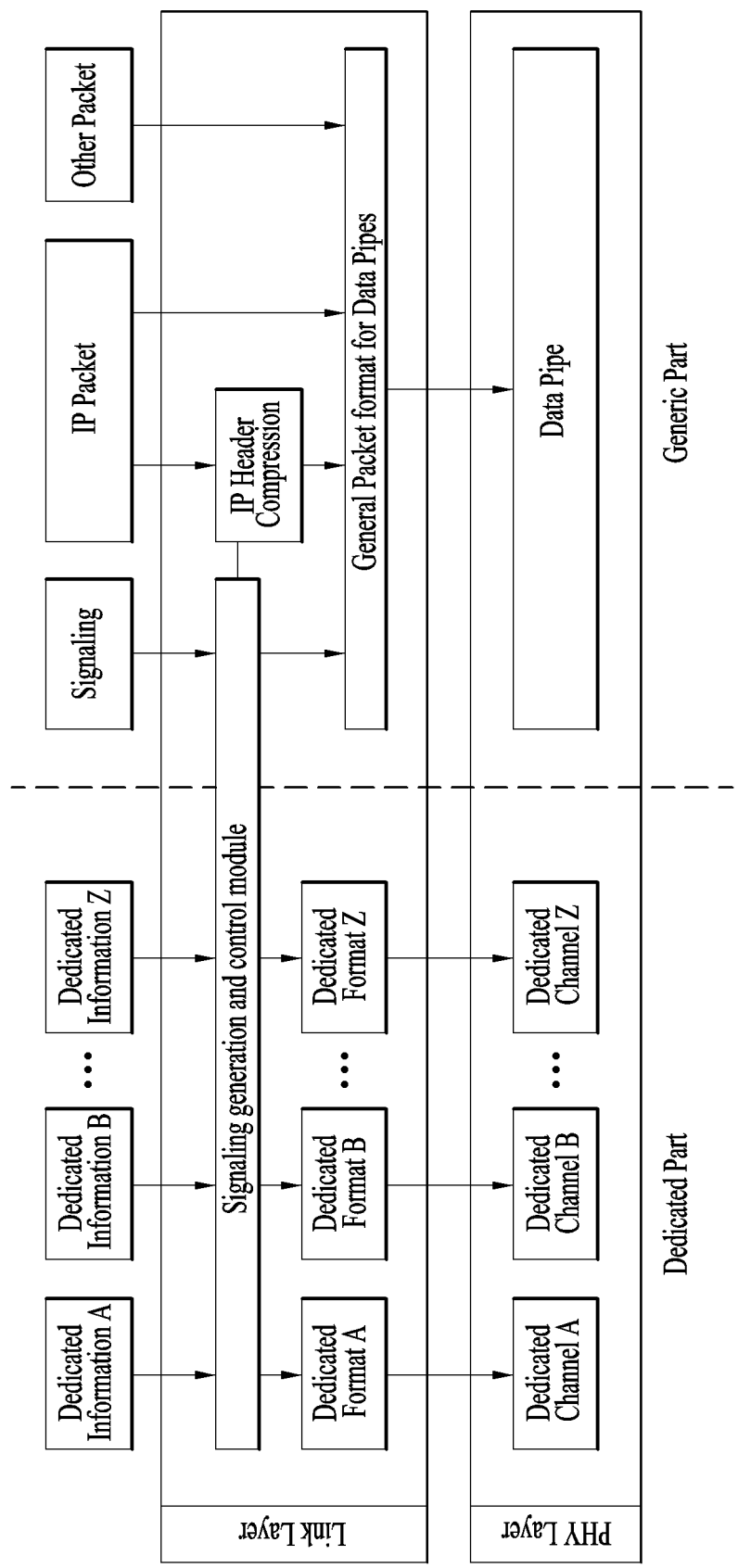
FIG. 78 is a diagram illustrating a layer structure when a dedicated channel is present according to an embodiment of the present invention.

FIG. 78 is a diagram illustrating a layer structure when a dedicated channel is present according to an embodiment of the present invention.

Data transmitted to a dedicated channel may not be an IP packet stream.

Accordingly, it may be necessary to apply a separate protocol structure from a typical IP-based protocol structure. Data transmitted to the dedicated channel may be data for a specific purpose. In the dedicated channel, a various types of data may not coexist. In this case, immediately after the receiver decodes corresponding data in a physical layer, the meaning of the corresponding data may become obvious in many cases.

In the above situation, it may not be necessary to perform processing on data transmitted to a dedicated channel according to all of the aforementioned protocol structures (for general broadcast data). That is, it may be possible to completely perform all processes on the data transmitted to the dedicated channel and to use information included in the corresponding data in the physical layer and/or the link layer.

In the broadcast system, the data transmitted to the dedicated channel may be data (signaling information) for signaling and the data (signaling data) for signaling may be transmitted directly to a dedicated channel rather than being transmitted in an IP stream. In this case, the receiver may more rapidly acquire the data transmitted to the dedicated channel than data transmitted in the IP stream.

With reference to the illustrated protocol structure, a dedicated channel may be configured in a physical layer, and the protocol structure related to processing of broadcast data is illustrated.

According to the present invention, a part according to a general protocol structure may be referred to as a generic part and a protocol part for processing a dedicated channel may be referred to as a dedicated part, but the present invention is not limited thereto. A description of processing of broadcast data through a protocol structure in a generic part may be supplemented by the above description in the present specification.

One or more information items (dedicated information A, dedicated information B, and/or dedicated information C) may be transmitted through a dedicated part (dedicated part) and the corresponding information may be transmitted from an external source of the link layer, or may be generated from an internal source of the link layer. The dedicated part may include one or more dedicated channels. In the dedicated part, processing of the data transmitted to the dedicated channel may be performed using methods.

The dedicated information transmitted to the link layer from the external source may be collected through a signaling generation and control module in the link layer and may be processed in the form appropriate for each dedicated channel. A processing form of the dedicated information transmitted to the dedicated channel may be referred to as a dedicated format in the present invention. Each dedicated format may include dedicated information.

As necessary, data (signaling data) transmitted through a generic part may be processed in the form of a packet of a protocol of the corresponding link layer. During this procedure, the signaling data transmitted to the generic part and the signaling data transmitted to the dedicated part may be multiplexed. That is, the signaling generation and control module may have a function for the aforementioned multiplexing.

In the dedicated channel, in the case of a structure that is capable of directly processing the dedicated information, data in the link layer may be processed in a transparent mode (bypass mode), as described above. An operation may be performed on all or some of the dedicated channels in a transparent mode, data in the dedicated part may be processed in a transparent mode, and data in the generic part may be processed in a normal mode. Alternatively, general data in the generic part may be processed in a transparent mode and only signaling data transmitted to the generic part and data in the dedicated part may be processed in a normal mode.

According to an embodiment of the present invention, when a dedicated channel is configured and dedicated information is transmitted, processing according to each processing defined in a broadcast system may not be required and, thus, information (dedicated information) required by a receiver side may be rapidly accessed.

A description of processing of data in a generic part and/or upper layers of a link layer in the drawing will be substituted with the above description.

Figure 79:
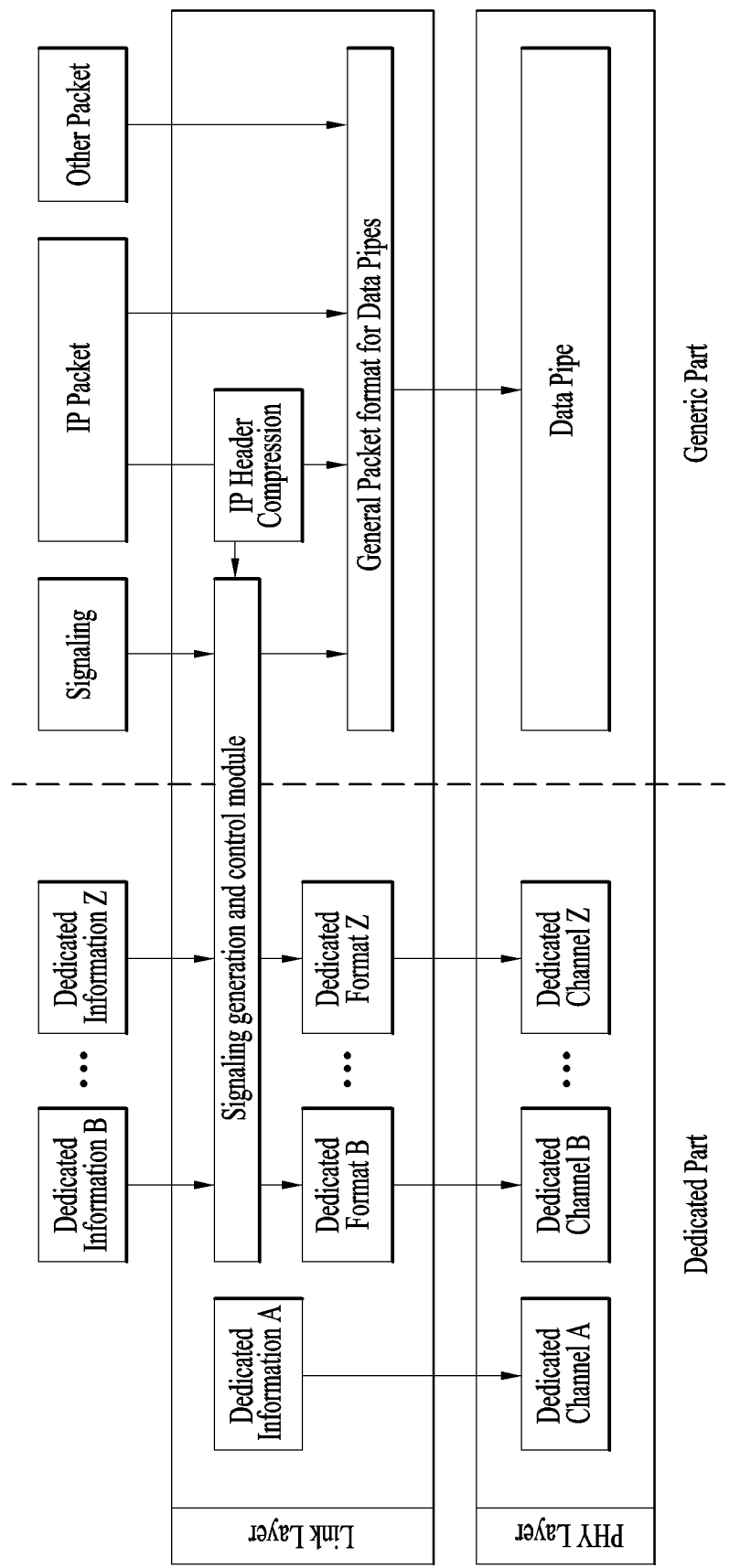
FIG. 79 is a diagram illustrating a layer structure when a dedicated channel is present according to another embodiment of the present invention.

FIG. 79 is a diagram illustrating a layer structure when a dedicated channel is present according to another embodiment of the present invention.

According to another embodiment of the present invention, some of dedicated channels may be processed in a link layer in a transparent mode. That is, processing in the link layer with respect to data transmitted to some dedicated channels may be omitted. For example, the dedicated information A may be configured in a separate dedicated format and transmitted directly to the dedicated channel. This transmission structure may be used when dedicated information A is information according to a structure that is well known in the broadcast system. Examples of the well known in the broadcast system may include a section table and/or descriptor (descriptor).

According to an embodiment of the present invention, as a wider meaning, when dedicated information corresponds to signaling data, up to a part for generating corresponding signaling data may be considered as a region of a link layer. That is, the dedicated information may be generated in the link layer.

Figure 80:
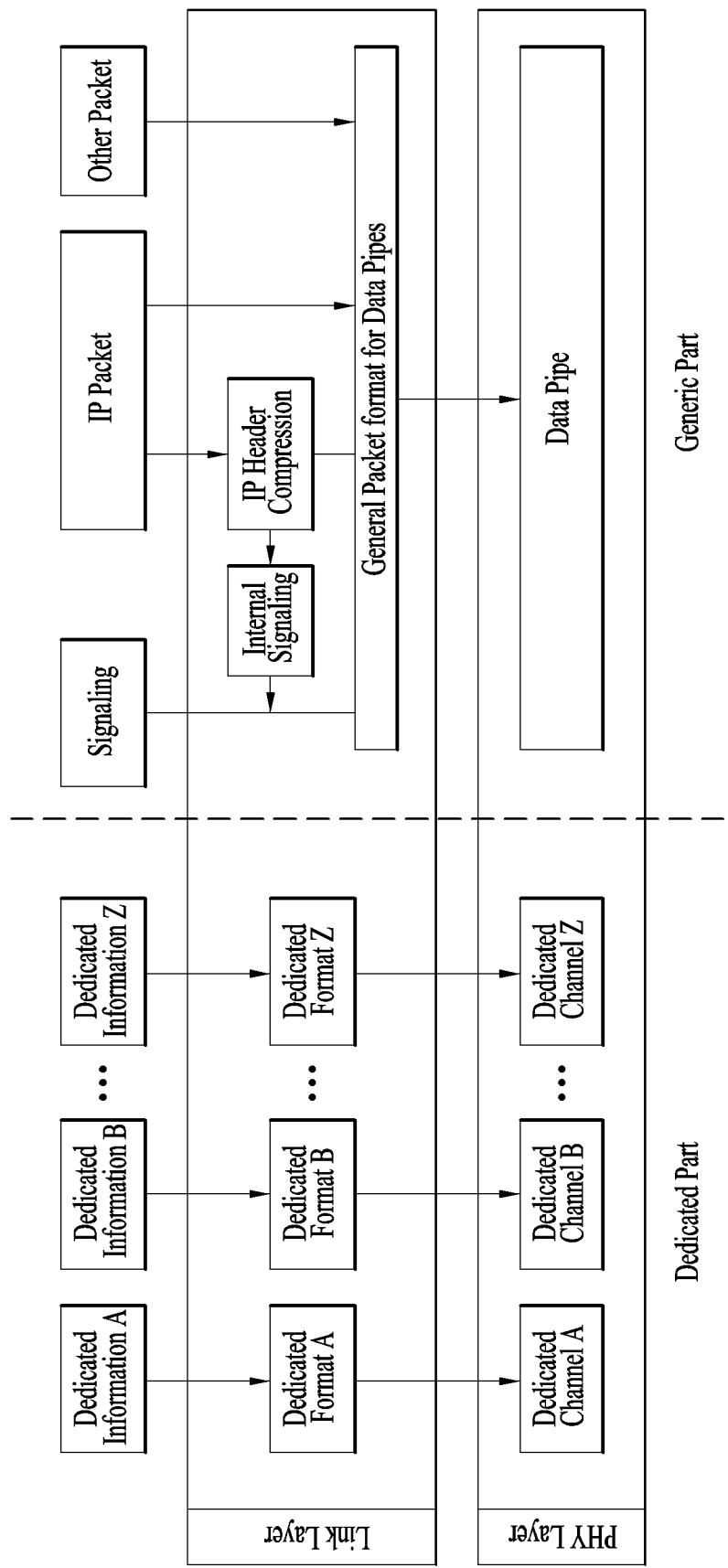
FIG. 80 is a diagram illustrating a layer structure when a dedicated channel is independently present according to an embodiment of the present invention.

FIG. 80 is a diagram illustrating a layer structure when a dedicated channel is independently present according to an embodiment of the present invention.

The diagram illustrating a protocol structure for processing broadcast data when a separate signaling generation and control module is not configured in the link layer. Each dedicated information item may be processed in a dedicated format and transmitted to the dedicated channel.

Signaling information that is not transmitted to the dedicated channel may be processed in the form of a link layer packet and transmitted through a data pipe.

The dedicated part may have one or more protocol structures appropriate for each dedicated channel. When the dedicated part has this structure, the link layer does not require a separate control module and, thus, it may be possible to configure a relatively simple system.

In the present embodiment, dedicated information A, dedicated information B, and dedicated information C may be processed according to different protocols or the same protocol. For example the dedicated format A, the dedicated format B, and the dedicated format C may have different types.

According to the present invention, an entity for generating dedicated information may transmit data any time as necessary without consideration of scheduling of a physical layer and a link layer. As necessary, in the link layer, data may be processed in a transparent mode with respect to all or some of dedicated channels.

A description of processing of data in a generic part and/or upper layers of an upper layer illustrated in the drawing may be substituted with the above description.

Figure 81:
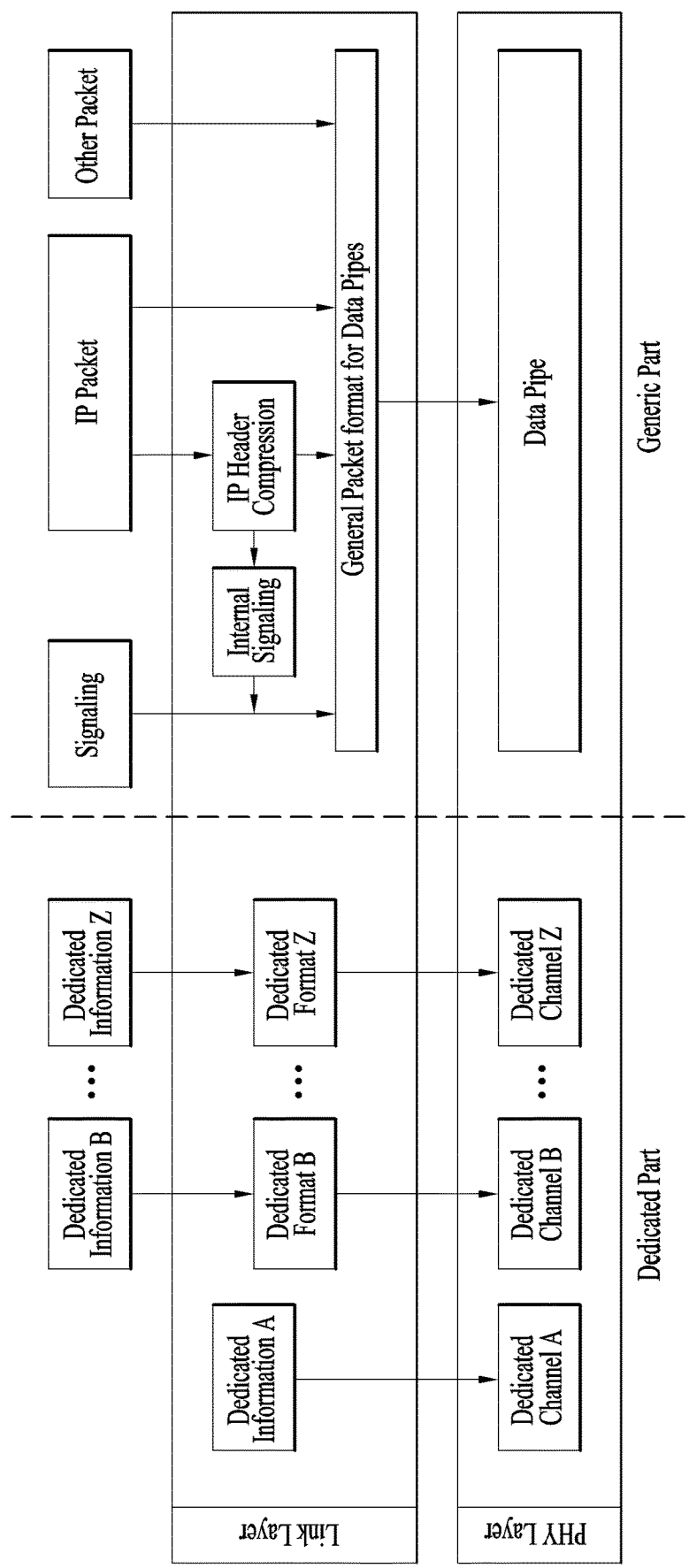
FIG. 81 is a diagram illustrating a layer structure when a dedicated channel is independently present according to another embodiment of the present invention.

FIG. 81 is a diagram illustrating a layer structure when a dedicated channel is independently present according to another embodiment of the present invention.

In the aforementioned embodiment of a layer structure when the aforementioned dedicated channel is independently present, processing in a link layer may be processed in a transparent mode with respect to some dedicated channels. With reference to the drawing, the dedicated information A may be transmitted directly to the dedicated channel without being processing in a separate format. This transmission structure may be used when the dedicated information A is information according to a structure known in a broadcast system. Examples of the structure known in the broadcast system may include section table and/or a descriptor.

According to an embodiment of the present invention, as a wider meaning, when dedicated information corresponds to signaling data, up to a part for generating corresponding signaling data may be considered as a region of a link layer. That is, the dedicated information may be generated in the link layer.

Figure 82:
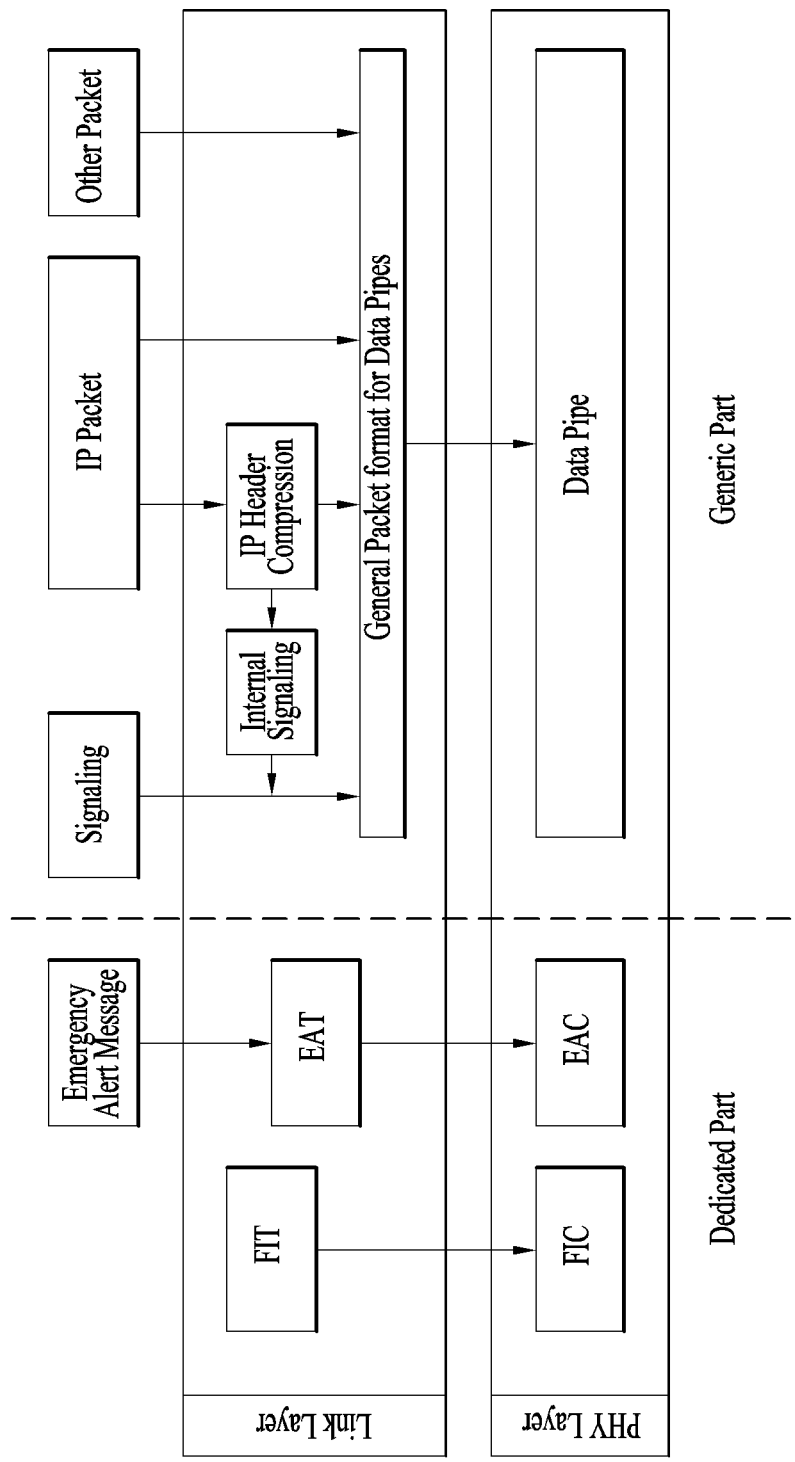
FIG. 82 is a diagram illustrating a layer structure when a dedicated channel transmits specific data according to an embodiment of the present invention.

FIG. 82 is a diagram illustrating a layer structure when a dedicated channel transmits specific data according to an embodiment of the present invention.

Service level signaling may be bootstrapped to the dedicated channel or a Fast Information Channel (FIC) as information for scanning a service and/or an Emergency Alert Channel (EAC) including information for emergency alert may be transmitted. Data transmitted through the FIC may be referred to as a fast information table (FIT) or a Service List Table (SLT) and data transmitted to the EAC may be referred to as an Emergency Alert Table (EAT).

A description of information to be included in an FIT or the FIT will be substituted with the above description. The FIT may be generated and transmitted directly by a broadcaster or generated by collecting various information items in the link layer. When the FIT is generated and transmitted directly by the broadcaster, the FIT may include information for identifying a corresponding broadcaster. When the FIT is generated by collecting the various information items in the link layer, information for scanning all services provided by the broadcaster may be collected to generate the FIT.

When the FIT is generated and transmitted by the broadcaster, the link layer may operate in a transparent mode and may be transmitted directly to the FIC. When the FIT is generated in a combination of various information items of the transmitter, generation of the FIT and configuration of the corresponding information in a table form may be within an operating range of the link layer.

A description of information to be included n the EAT and the EAT may be substituted with the above description. With regard to an EAC, when an entity (e.g., IPAWS) for managing an emergency alert message transmits a corresponding message to a broadcaster, an EAT associated with the corresponding message may be generated and transmitted through the EAC. In this case, the generation of a signaling table based on the emergency alert message may be within an operating range of the link layer.

The aforementioned signaling information generated in order to process IP header compression may be transmitted through a data pipe rather than being transmitted through a dedicated channel. In this case, processing for transmission of the corresponding signaling information may performed according to a protocol of a generic part and the signaling information may be transmitted in the form of a general (e.g., link layer packet).

FIG. 83 is a diagram illustrating a format of data transmitted through a dedicated channel according to an embodiment of the present invention.

When dedicated information transmitted to the dedicated channel is not appropriate to be transmitted directly to a corresponding channel or requires an additional function, the dedicated information may be encapsulated into a form that is capable of being processed in the physical layer, in the link layer. In this case, as described above, a packet structure according to a protocol of a generic part supported by the link layer may be used. The dedicated channel may not require a function supported by the packet structure transmitted through the generic part in many cases. In this case, the corresponding dedicated information may be processed in a form appropriate for the dedicated channel.

For example, in the following case, the dedicated information may be processed in a dedicated format and transmitted to the dedicated channel.

1) when a size of data to be transmitted to a dedicated channel does not correspond to a size of dedicated information to be transmitted 2) when dedicated information is configured in the form of data (e.g., XML) that requires a separate parser but not a table form.

3) when it is necessary to pre-check version of corresponding information prior to parsing of corresponding data and to determine whether the corresponding information is processed 4) when it is necessary to detect error from dedicated information As described above, when it is necessary to process dedicated information in a dedicated format, the dedicated format may have the illustrated form. Within a range corresponding to a purpose of each dedicated channel, a header including some of listed fields may be separately configured and a bit number allocated to a field may be changed.

According to an embodiment of the present invention, the dedicated format may include a length field, a data_version field, a payload_format field (or a data_format field, a stuffing_flag field, a CRC field, a payload_data_bytes( ) element, a stuffing_length field, and/or a stuffing_bytes field.

The length field may indicate a length of data included in a payload. The data of the length field may indicate the length of the data in a byte unit.

The data_version field may indicate version of information of corresponding data. In this regard, the receiver may check whether the corresponding information is pre-received information or new information using the version information and determine whether the corresponding information is used using the check result.

The data_format field may indicate a format of information included in the dedicated information. For example, a value of the data_format field is '000', this may indicate that the dedicated information is transmitted in the form of a table. When the value of the data_format field is '001', this may indicate that the dedicated information is transmitted in the form of a descriptor. When the value of the data_format field is '010', this may indicate that the dedicated information is transmitted in binary format but not the form of a table or descriptor. When the value of the data_format field is '011', this may indicate that the dedicated information is transmitted in the form of XML.

With regard to the stuffing_flag field, when a dedicated channel is larger than dedicated information, a stuffing byte may be added in order to adjust the length of required data. In this case, the stuffing_flag field may identify whether the stuffing byte is included.

The stuffing_length field may indicate a length of the stuffing_bytes field.

The stuffing byte may be filled in the stuffing_bytes field by as much as a size for indicating the stuffing_length field. The stuffing_bytes field may indicate a size of the stuffing byte.

The CRC field may include information for checking error of data to be transmitted to the dedicated channel. The CRC field may be calculated using information (or field) included in dedicated information. Upon determining that error is detected using the CRC field, the receiver may disregard the received information.

FIG. 84 is a diagram illustrating dedicated channel configuration information for signaling information on a dedicated channel according to an embodiment of the present invention.

An operation in a transparent mode or a normal mode with respect to the aforementioned dedicated channel may be pre-determined during design of the dedicated channel and may not be generally changed during management of a system. However, a plurality of transmission systems and reception systems are present in a broadcast system and, thus, it may be necessary to flexibly adjust a processing mode with respect to the dedicated channel. An operation mode for configuration of a flexible system may be changed or reconfigured and signaling information may be used in order to provide information on change in the operating mode to a receiver side. The signaling information may be transmitted in signaling of a physical layer (physical layer signaling, L1 signaling, and transmission parameter) and may be transmitted to one specific dedicated channel. Alternatively, the signaling information may be included in a table used in the broadcast system or a portion of a descriptor. That is, this information may be included as some of one or more signaling information items described in the present specification.

The dedicated channel configuration information may include a num_dedicated channel field, a dedicated_channel_id field, and/or an operation_mode field.

The num_dedicated_channel field may indicate the number of dedicated channels included in a physical layer.

The dedicated_channel_id field may correspond to an ID for identifying a dedicated channel. As necessary, the dedicated channel may be denoted by an arbitrary ID.

The operation_mode field may indicate a processing mode with respect to a dedicated channel. For example, when a value of the operation_mode field is '0000', this may indicate that the dedicated channel is processed in a normal mode. When the value of the operation_mode field is '1111', this may indicate that the dedicated channel is processed in a transparent mode (transparent mode or bypass mode). When the value of the operation mode field is '0001' to '1110', the field may be reserved for future use.

Figure 85:
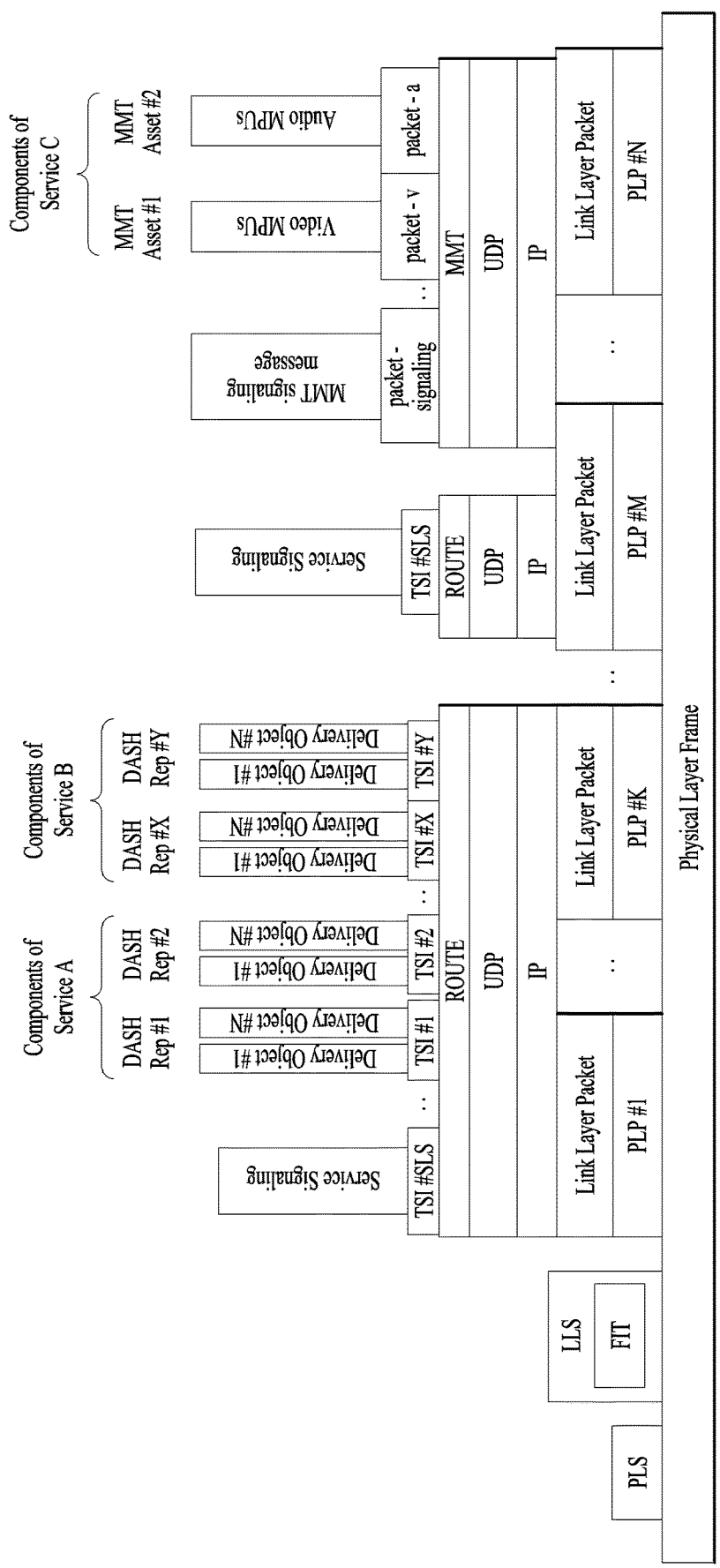
FIG. 85 is a diagram illustrating a hierarchical signaling structure according to an embodiment of the present invention.

FIG. 85 is a diagram illustrating a hierarchical signaling structure according to an embodiment of the present invention.

Prior to a description of the hierarchical signaling structure of a broadcast system according to the present invention, terms used in the present invention may be defined as follows.

3GPP may indicate $3^{rd}$ Generation Partnership Project.

ALC may indicate Asynchronous Layered Coding. A detailed description of a related protocol will be understood with reference to content of the RFC 5775 document such as Layered Coding Transport (LCT).

Broadband Stream may correspond to an RF channel. The RF channel may be defined as a center carrier frequency of a specific bandwidth.

DASH may indicate Dynamic Adaptive Streaming over HTTP and a detailed description thereof will be understood with reference to the ISO/IEC 23009-1 document.

eMBMS may indicate evolved Multimedia Broadcast/Multicast Service. The eMBMS may indicate a technology for describing content of cellular mobile broadcast of a service through an LTE network.

FIT may indicate Fast Information Table. The FIT may generate a basic service list or include information for bootstrapping discovery of an LCT channel and an ROUTE session for transmitting SLS.

LCT may indicate Layered Coding Transport. The LCT may be building block technology defined in the RFC 5651 document and may provide support of a transport level for supporting a stream transmission protocol and reliable content transmission.

LLS may indicate Link Layer Signaling. The LLS may correspond to signaling information transmitted by a payload of a packet of a second layer prior to a third layer (e.g., IP layer).

MMTP may indicate MPEG Multimedia Transport. Content of the MMTP will be understood with reference to content of the ISO/IEC 23008-1 document.

MPD may indicate Media Presentation Description. The MPD may include a formalized description of DASH media presentation for providing a streaming service. The MPD may be included in a fragment of SLS for transmission of a streaming service.

MPU may indicate Media Processing Unit. A description of the MPU will be understood with reference to content of the ISO/IEC 23008-1 document.

PLP may indicate Physical Layer Pipe. The PLP may correspond to a set of data items associated by specific modulation and coding parameters as a part of transmission capacity provided by a broadcast stream for transmitting service metadata such as service signaling and/or a content component of an ATSC3.0 service.

ROUTE may indicate Real-Time Object delivery Over Unidirectional Transport. The ROUTE may define a technology for facilitating real-time streaming in order to provide a service via file-based transmission.

SLS may indicate Service Layer Signaling. The SLS may include information required to discover and acquire ATSC3.0 services and content components thereof. The SLS data may be transmitted through a third layer (e.g., IP packet).

S-TSID may indicate Service-based Transport Session Instance Description. The S-TSID may correspond to a fragment of SLS metadata defined in the form of XML. The S-TSID may include session description information for transmission sessions for transmitting content components included in an ATSC service. The S-TSID may include or refer to description information of transmission of object flow and/or objects transmitted through an associated transmission session.

TOI may indicate Transmission Object Identifier. The TOI may be transmitted by an LCT header and may correspond to a unique ID of a transmission object transmitted in an ALC/LCT session.

TSI may indicate Transmission Session Identifier. The TSI may be an ID of a ALC/LCT transmission session within a range of a TSI value and an IP address of a sender.

USBD/USD may indicate User Service Bundle Description/User Service Description. The USBD may correspond to a SLS metadata fragment of XML form. The USBD may function as an entry point for access to a fragment (e.g., S-TSID, MPD, and/or MMTP) included in other SLS. That is, the USBD may include information required to access to the fragment included in the SLS. The USBD may identify an ATSC3.0 service and include basic information on a service, such as a service name or a service language. Each USBD may include information on one service represented by userServiceDescription (USD).

XML Diff may indicate a difference between two XML files. The XML Diff may correspond to an XML signaling instance and/or an XML signaling template generated by a sender and transmitted to the receiver. The receiver may apply the XML Diff to local copy of a template owned by the receiver in order to acquire a signaling instance. An XML Diff mechanism may be a method that replaces a compression rule (e.g., Gzip) used to compress SLS data transmitted through a broadcast network and may be provided by a broadcast system.

The hierarchical signaling structure of the broadcast system according to the present embodiment may support streaming of two or more different service transmitting methods. That is, the proposed hierarchical signaling structure may provide integrated signaling for transmitting a service of DASH through ROUTE and transmission of a service of a MPU through MMTP.

As described above, Low Level Signaling and Service Level Signaling may be separated. The Low Level Signaling may be transmitted via Link Layer Signaling. The Low Level Signaling may include the aforementioned FIT (or SLT).

The SLS may be transmitted through a broadcast network and, in this case, may be processed according to a protocol of ROUTE/UDP/IP. In addition, the SLS may be transmitted through a broadband and, in this case, may be processed according to a protocol of HTTP(s)/TCP/IP.

The SLS may include USBD and/or S-TSID as a signaling structure (or fragment) including information for signaling about a general service.

The SLS may include MPD as a signaling structure (or fragment) including signaling information required for content streaming.

The SLS may further include a signaling structure (or fragment) for providing a service (content or event) performed based on an application.

Referring to the drawing, when a service is provided based on ROUTE through a broadcast network, the receiver may access the SLS using information of the LLS and acquire DASH representation (or component) for a service using information in the MPD included in the SLS.

When a service is provided based on the MMT through a broadcast network, the receiver may access the SLS using information of the LLS, acquire an MMT signaling message using the information of the SLS, and acquire a packet for transmitting an MMT asset (component) for a service using information in the MMT signaling message.

When the hierarchical signaling according to the present invention is used, integrated signaling for streaming transmission of ROUTE/DASH and MMTP/MPU may be provided.

When the hierarchical signaling structure is used, integrated signaling for hybrid service transmission through a broadcast network and a broadband network may be provided.

When the hierarchical signaling structure is used, the standard of conventionally used 3 DPP eMBMS and a next generation broadcast standard may be connected to each other so as to acquire connectivity between devices.

When the hierarchical signaling structure is used, entire signaling data may be effectively transmitted/received.

When the hierarchical signaling structure is used, a receiver side may acquire a desired fragment through simple filtering on broadcast signaling.

In addition, when the hierarchical signaling structure is used, two or more compression options for signaling data may be freely used (Gzip and/or XML Diff).

Figure 86:
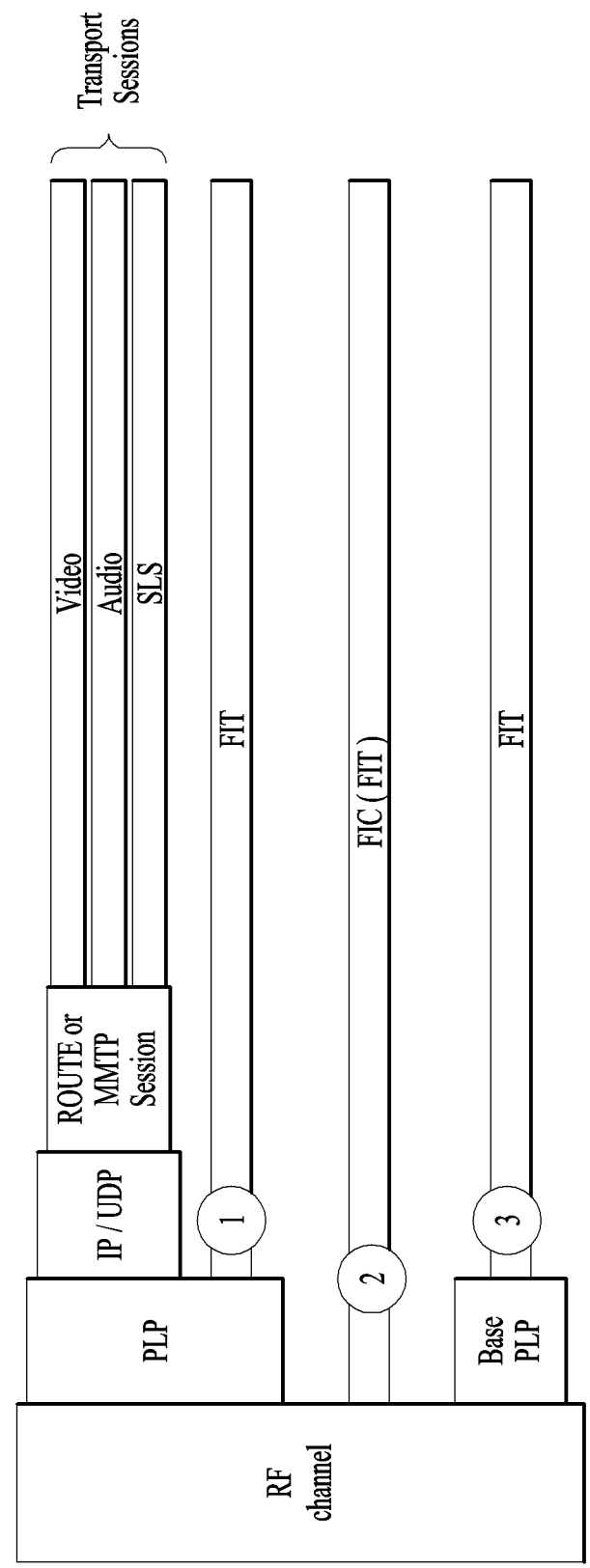
FIG. 86 is a diagram illustrating a transmission path of an FIT according to an embodiment of the present invention.

FIG. 86 is a diagram illustrating a transmission path of an FIT according to an embodiment of the present invention.

A broadcast receiver may begin to access a service from the FIT (or SLT) as a start point in broadcast emission. The FIT may include the aforementioned information items and provide information required to rapidly scan a channel in order to write a list of services receivable by the receiver. In addition, the FIT may include information (bootstrap information) required to access the SLS by the receiver. The bootstrap information may include source IP address information of a packet for transmitting the SLS, destination IP address information, destination port information, TSI information of an LCT session for transmitting the SLS, and/or ID information of a PLP for transmitting the SLS, as described above. However, the PLP ID information as information for identifying the PLP for transmitting the SLS may be included in the aforementioned first hierarchical signaling (i.e., physical layer signaling or L1 signaling).

The FIT may include ID information for identifying one broadcast stream and the ID information for identifying the broadcast stream may be used as information for identifying a broadcasting station. That is, the FIT may be separately provided every broadcasting station.

The FIT may include a service loop including information for each service provided through a broadcast stream identified according to each ID information item.

The service loop may include service ID information for uniquely identifying a service within a range of a broadcast area, short name information indicating a short name of a service, provider ID information (e.g., information for identifying broadcast using a portion of a broadcast stream when a broadcast stream is shared by a plurality of broadcasting stations) for identifying a provider of each service, and/or bootstrap information as information for acquiring the SLS for each service.

A detailed description of the above information items to be included in the FIT has been given above or will be substituted with a description to be given below.

With reference to the drawing, (1) an FIT may be transmitted in a PLP for transmitting components included in a service, (2) a dedicated channel for transmitting of the FIT in the physical layer may be defined and the FIT may be transmitted to a corresponding channel, or (3) the PLP for transmitting important data such as the FIT and signaling may be defined, a method of identifying the corresponding PLP may be prepared, and the FIT may be transmitted to the corresponding PLP.

Figure 87:
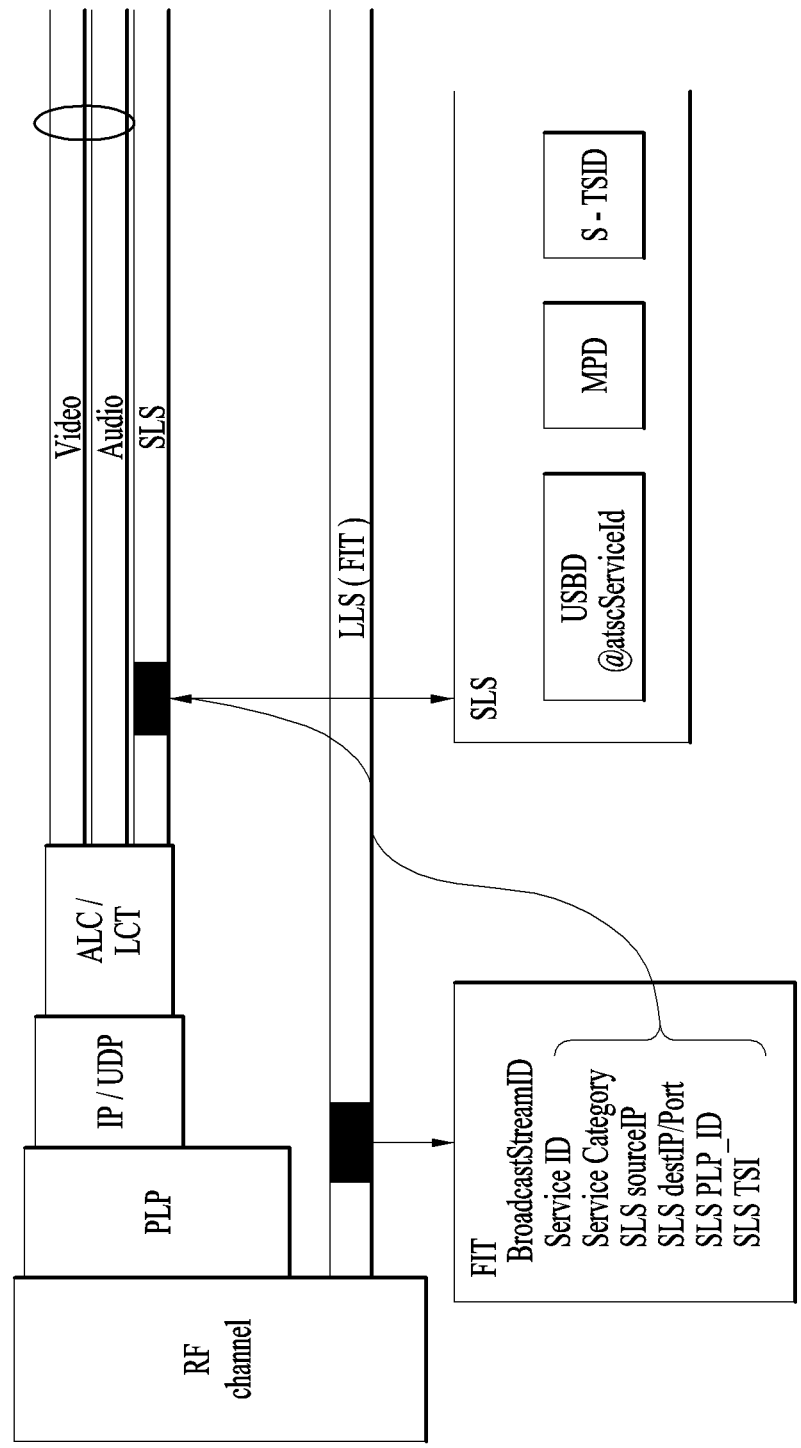
FIG. 87 is a diagram illustrating a procedure of bootstrapping an SLS using an FIT according to an embodiment of the present invention.

FIG. 87 is a diagram illustrating a procedure of bootstrapping an SLS using an FIT according to an embodiment of the present invention.

A receiver may acquire an FIT transmitted using the aforementioned method via an RF channel (physical layer signal). The drawing illustrates the case in which an LLS (FIT) is transmitted through a dedicated channel from a broadcast signal.

The receiver may search for a region of the broadcast signal, for transmitting an SLS of a service that is desired to be accessed by the receiver using Service ID information, Service Category information, SLS source IP address information, SLS destination IP address, SLS destination port number information, SLS PLP ID information, and/or SLS TSI information, included in the FIT. The SLS may be transmitted to an ROUTE session. That is, the receiver may access a specific session in the ROUTE session for transmitting the SLS and acquire the SLS using the above information included in the FIT.

The receiver may acquire data and signaling information required to present a service using USBD, MPD, and/or S-TSID included in the acquired SLS.

The SLS may be defined for each service level and may include information for describing access to a service and attribute. For example, the information included in the SLS may include information for listing content components included in a service, information required to acquire corresponding components, and information for identifying capability required for a receiver in order to present a corresponding component or service.

The SLS may be defined in the form of XML. A dedicated LCT session may be defined for transmission of the SLS.

The SLS may further include a fragment including signaling information required to provide an application based service in addition to a USBD fragment, an MPD fragment, and an S-TSID fragment. The SLS may provide transmission session description information including information for access to the ROUTE session and/or the MMTP session as described above.

Figure 88:
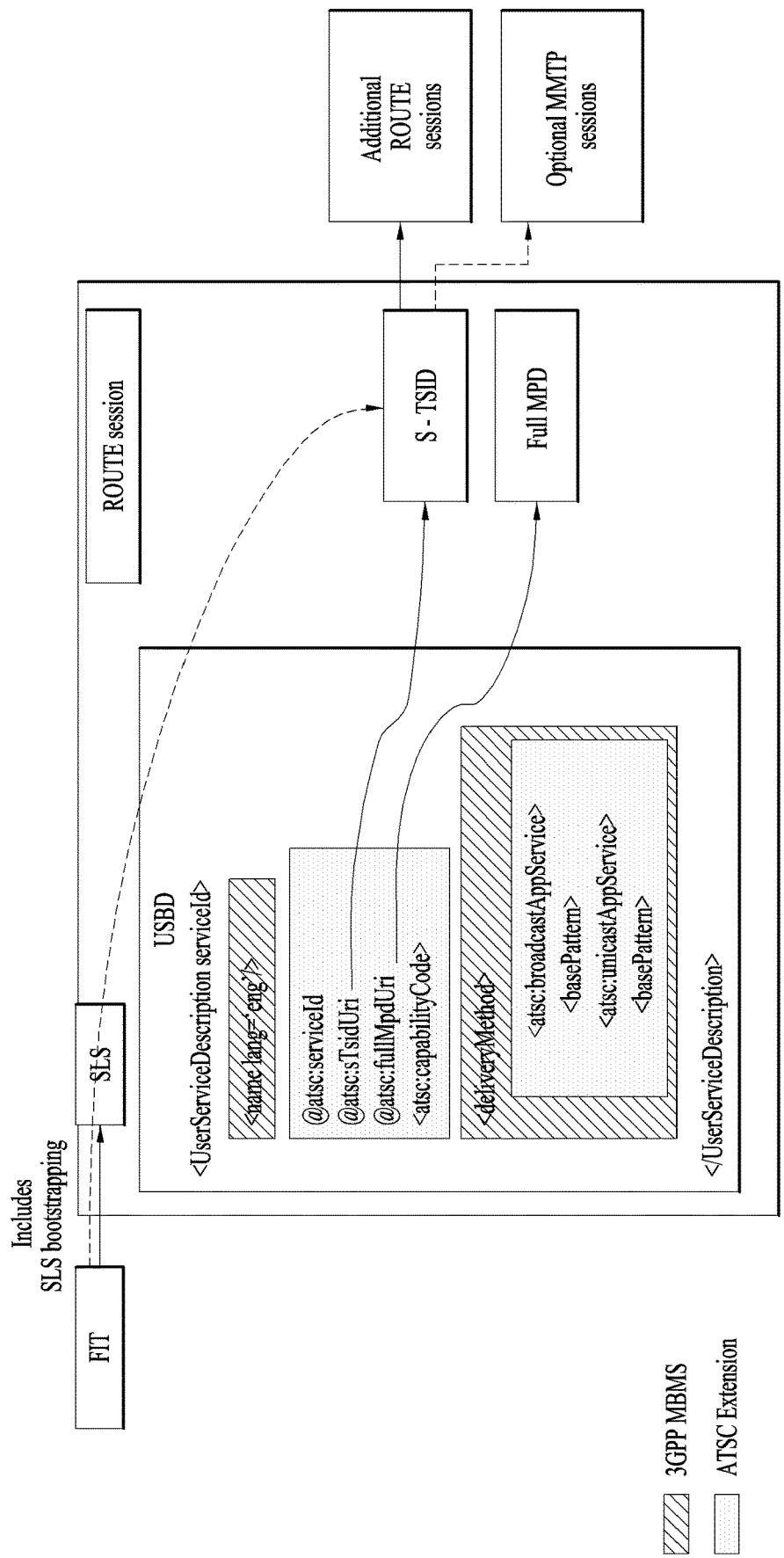
FIG. 88 is a diagram illustrating extension of 3 DPP MBMS signaling for a broadcast system according to an embodiment of the present invention.

FIG. 88 is a diagram illustrating extension of 3 DPP MBMS signaling for a broadcast system according to an embodiment of the present invention.

In a signaling structure for a broadcast system, an SLS may include a USBD fragment and the USBD fragment may use a formed defined in the 3GPP MBMS. In this case, signaling information required for a broadcast system needs to be further added to a USBD defined in the 3GPP MBMS.

The information that needs to be further added to the USBD for the broadcast system may include @atsc:serviceId information, @atsc:sTsidUri information, @atsc:fullMpdUri information, a <atsc:capabilityCode> element, a <atsc:broadcastAppService> element, a <basePattern> element, a <atsc:unicastAppService> element, and/or a <basePattern> element.

The @atsc:serviceId information may be information for identifying a broadcast service.

The @atsc:sTsidUri information may be information for connection with a S-TSID in a USBD. The @atsc:sTsidUri information may be information on a region for transmitting a S-TSID.

The @atsc:fullMpdUri information may be information for connection with a MPD in a USBD. The @atsc:fullMpdUri information may be information on a region for transmission of an MPD.

The <atsc:capabilityCode> element may include information for identifying capability required by a receiver in order for the receiver to meaningfully present a service or a component.

The <atsc:broadcastAppService> element may include signaling information on an application-based service transmitted through a broadcast network and a <basePattern> element included below the element may indicate a base pattern of a URI required to a corresponding application based service.

The <atsc:unicastAppService> element may include signaling information on an application-based service transmitted through unicast network and a <basePattern> element included below the element may indicate a base pattern of a URI required to acquire a corresponding application based service.

The @atsc:serviceId information may have 16 bits and may be used for a link with a service ID included in an FIT.

The USD may include a service level description that cannot be included in an FIT. Since the FIT has a limited capacity, the FIT cannot include unlimited signaling information of a service level and, thus, the signaling information of the service level, which cannot be included in the FIT, may be included in the USD. The information may include information indicating service names represented with different languages, information for identifying whether each service component is transmitted through a broadcast network or a broadband network (or a method of transmitting a component is determined by a base Pattern element used as a matching pattern corresponding a segment URL required by a DASH client), information for identifying capability required for a receiver, Content Advisory related information, Caption Description information, and/or information that needs to be extended for an ATSC3.0 broadcast system.

The S-TSID may include an entire session description of transmission session(s) for transmitting a content component of an ATSC service.

For transmission of a broadcast network of a linear service that does not include application-based enhancement, the S-TSID may include information for describing an LCT session (when service components are transmitted through an ROUTE) and/or information for describing an MMTP session (when service components are transmitted through an MMTP). Application-based enhancement may be provided alone as an event, content, and/or a service based on an application and may be used together with a linear service in order to provide an additional service/content/event of the linear service.

When service components are streamed through an ROUTE, the S-TSID may include file metadata for transmitting an object transmitted by an LCT session of a service or an object flow, and/or additional information on content components transmitted by LCT sessions and a payload format.

The SLS may be transmitted through an ALC/LCT session of a ROUTE session. A fragment (service signaling fragment) included in the SLS may be encapsulated in the form of metadata envelope defined in the 3GPP MBMS and this form may include identification information, version information, update information, and/or compression information of a fragment. A receiver may use a filter scheme that employs a structured TOI of an LCT packet including a filtering parameter for an effective packet combination.

The service signaling fragment may be compressed using Gzip and/or template/Diff-based compression method. When the template/Diff-based compression method is used, the size of signaling may be reduced and signaling may be changed, e.g., updated, thereby obtaining efficiency in terms of data transmission and data processing of the receiver, as described above.

When the service signaling fragment is compressed via template/Diff-based compression, a signaling template may be pre-shared by a transmitting end and a receiving end. In this case, the signaling template may be compared with a signaling instance that needs to be transmitted by the transmitting end to generate Diff. The transmitting end may transmit the Diff to a client. The receiving end may apply the Diff to acquire the signaling instance. In this manner, when a difference between the template and a complete fragment is very small, a broadcast system may be effectively operated in terms of data transmission and data processing compared with a compression method such as Gzip.

Figure 89:
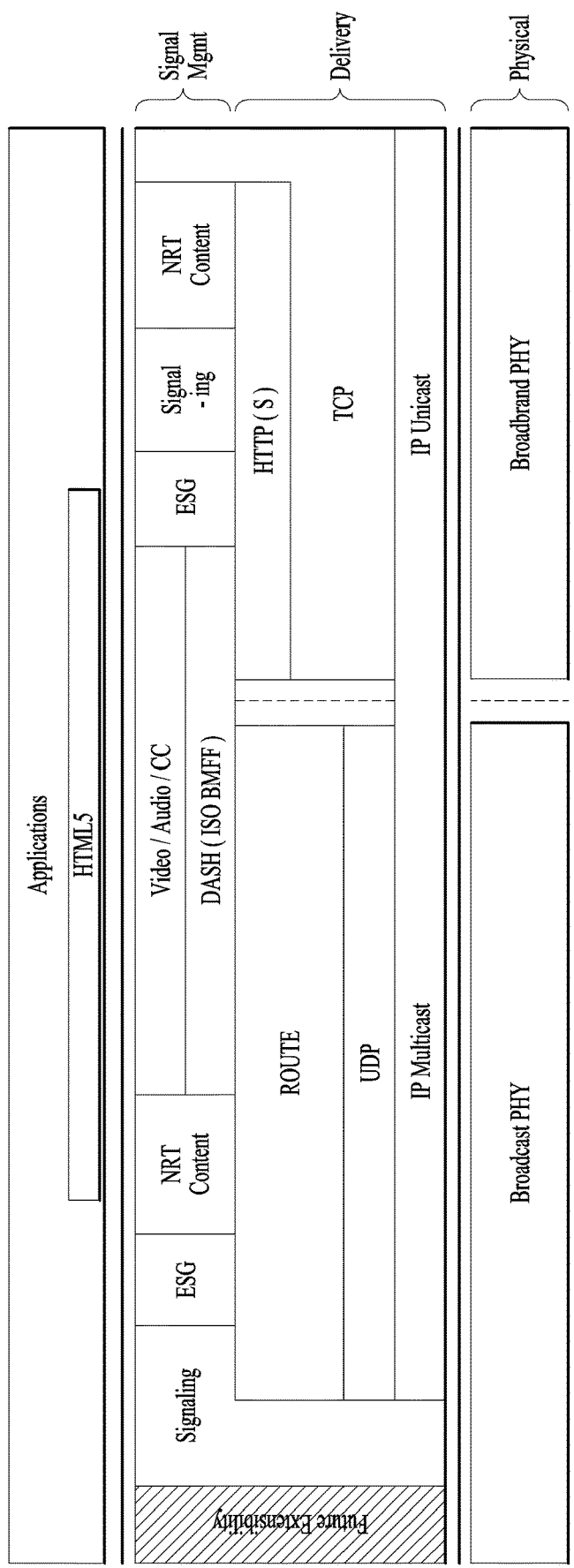
FIG. 89 is a diagram illustrating a protocol stack of a broadcast system according to an embodiment of the present invention.

FIG. 89 is a diagram illustrating a protocol stack of a broadcast system according to an embodiment of the present invention.

An ATSC3.0 service may be transmitted using three functional layers. The functional layers may include a physical layer, a transmission layer, and a service management layer. The physical layer may provide a mechanism for transmitting signaling, service announcement, and IP packets through a broadcast physical layer and/or a broadband physical layer. The transmission layer may provide a function of transmitting an object and an object flow. That is, the transmission layer may perform an operation in a ROUTE protocol and UDP/IP multicast through a broadcast physical layer and perform an operation in a HTTP protocol and TCP/IP unicast through a broadband physical layer. The service management layer may allow any type of service such as a linear TV or an HTML5 application to be transmitted through a transmission layer and a physical layer.

The service signaling may provide service discovery and description. The service signaling may include two functional components. One of them may be bootstrap signaling (FIT—Fast Information Table or SLT—Service List Table)

and the other one may be service layer signaling (SLS—Service Layer Signaling). The service signaling may include information required to discover and acquire user services. The FIT may allow a receiver to generate a basic service list and facilitate bootstrapping for discovery of the SLS for each ATSC3.0 service. The FIT may be transmitted in a link layer or a high layer thereof and may be transmitted to each frame of a physical layer for rapid acquisition. The SLS may allow the receiver to discover and access ATSC3.0 services and content components thereof. When the SLS is transmitted through a broadcast network, the SLS may be transmitted by ROUTE/UDP/IP included in one of LCT transmission sessions including an ROUTE session at a carousel rate appropriate to support rapid channel subscription and switching. When the SLS is transmitted through a broadcast network, the SLS may be transmitted through HTTP(s)/TCP/IP.

Figure 90:
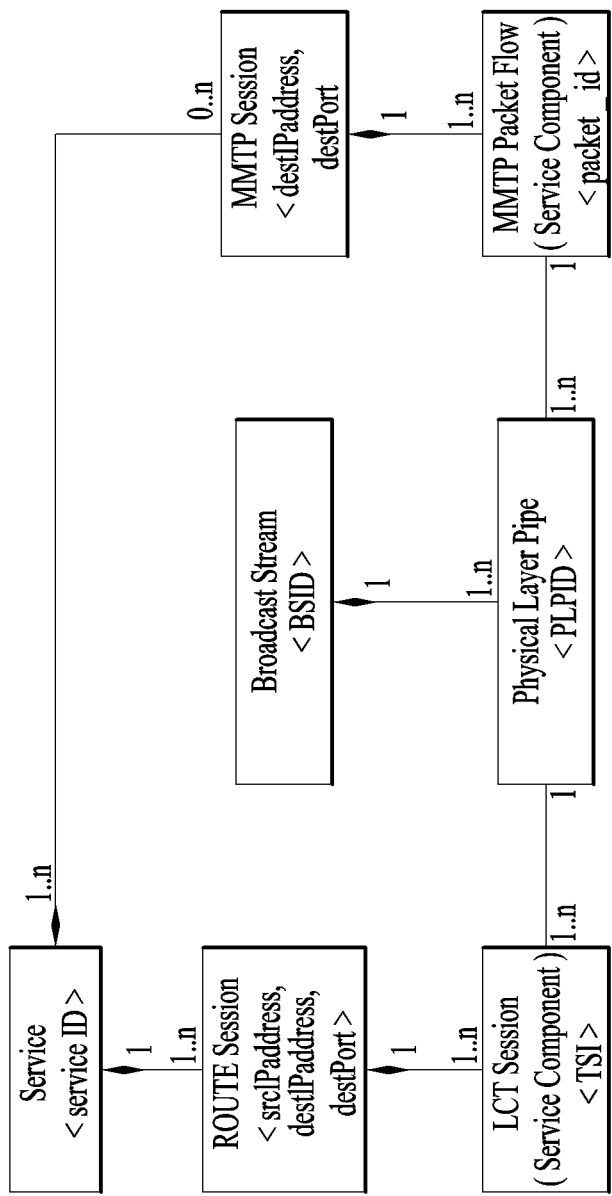
FIG. 90 is a diagram illustrating a relationship between a service management layer, a transmission layer, and physical layer entities according to an embodiment of the present invention.

FIG. 90 is a diagram illustrating a relationship between a service management layer, a transmission layer, and physical layer entities according to an embodiment of the present invention.

In the broadcast system according to the present invention, a ROUTE/LCT session and/or MMTP sessions may be present in order to transmit content components of ATSC3.0 service.

For transmission of a linear service without application based enhancement, content components included in the service may be transmitted through one or more ROUTE/LCT sessions or one or more MMTP sessions.

For transmission of a linear service including application based enhancement through a broadcast network, content components of the service may be transmitted through one or more ROUTE/LCT sessions and 0 or more MMTP sessions. That is, in this case, some of content components included in one service may be transmitted through a ROUTE/LCT session and other some may be transmitted through an MMTP session. For example, content components included in the application based enhancement are transmitted only through a ROUTE and, thus, even if a service that basically uses an MMTP includes application based enhancement, the service may need to use the ROUTE in order to transmit some components. However, for streaming of a media component in the same service, use of both of the MMTP and the ROUTE may not be permitted.

For transmission of an application service through a broadcast network, content components included in the service may be transmitted through one or more ROUTE/LCT sessions.

Each ROUTE session may include one or more LCT sessions for transmitting all or some of content components constituting an ATSC3.0 service. In streaming service transmission, one LCT session may transmit one separate component of a user service such as audio, video, or a closed caption stream. The streaming media may be formatted and transmitted in the form of DASH segments of MPEG DASH.

Each MMTP session may transmit all or some of content components or may include one or more MMTP packet flows for transmitting an MMTP signaling message. One MMTP packet flow may transmit an MPU type of component of MMT or an MMT signaling message. In order to transmit an NRT user service or system metadata, an LCT session may transmit a file-based content item. Files included in the content may include a media component of a continuous or time-based or discrete or non-time-based NRT service or include metadata items such as service signaling or ESG fragment.

The broadcast stream may be a concept for an RF channel and may be defined as a term of a center carrier frequency in a specific bandwidth. The broadcast stream may be identified by a geographical area and a frequency. Along with a pair of a geographical area and frequency information, a broadcast stream ID (BSID) of the pair may be defined and managed by administrative power. A PLP may correspond to a portion of an RF channel. Each PLP may have a specific modulation and coding parameter. The PLP may b identified by a unique PLP ID in a broadcast stream to which the PLP belongs.

Each service may be identified by two types of service IDs. One of them may be a compact type of service ID that is used in an FIT and is unique only to a broadcast area or a broadcast stream and the other one may be a service ID that is used in SLS and ESG and is globally unique. One ROUTE session may be identified by a source IP address, a destination IP address, and a destination port number. One LCT session (which is related to a service component for transmitting the same) may be identified by a unique Transport Session Identifier (TSI) within a range of an ROUTE to which the LCT session belongs.

Features common to LCT sessions and specific features unique to each LCT session may be given in a ROUTE signaling structure that is referred to as Service-based Transport Session Instance Description (S-TSID). The S-TSID may be a portion of Service Level Signaling. Each LCT session may be transmitted through one PLP. Different LCT sessions of one ROUTE session may or may not be included in different PLPs. Features described in the S-TSID may include a TSI value, a PLP ID for each LCT session, a descriptor for transmission of an object/file, and/or an application layer FEC parameter.

One MTP session may be identified by a destination IP address and a destination port number. One MMTP packet flow (which is related to service components for transmitting the same) may be identified by a unique packet_id within a range of an MMTP session including the MMTP packet flow. Features common to MMTP packet flows and specific features of the MMTP packet flows may be given by the S-TSID. The feature for each MMTP session may be given by an MMT signaling message transmitted in the MMTP session. Each MMTP packet flow may be transmitted through one PLP. Different MMTP packet flows of one MMTP session may or may not be transmitted through different PLPs. Features described in the MMT signaling message may include a packet_id value and/or a PLP ID for each MMTP packet flow.

Information for identifying a PLP to be described to be included in the present service level signaling or FIT (or SLT) may be defined in signaling of a link layer. In this case, upon acquiring signaling transmitted to a link layer, a receiver may identify or access PLP related to IT (or SLT), service level signaling, or a component PLP.

Figure 91:
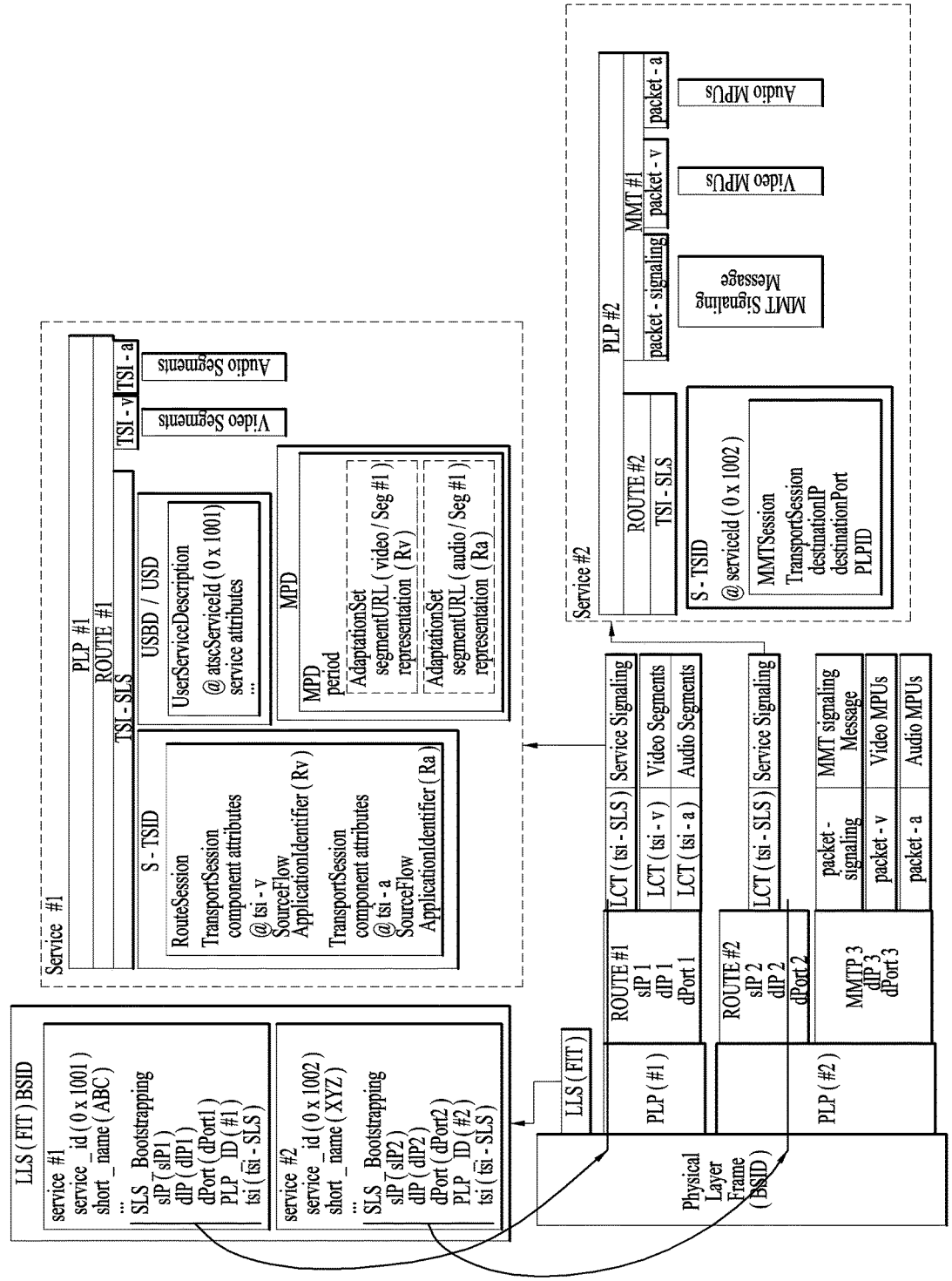
FIG. 91 is a diagram illustrating a signaling structure of a broadcast system according to an embodiment of the present invention.

FIG. 91 is a diagram illustrating a signaling structure of a broadcast system according to an embodiment of the present invention.

Signaling information transmitted through a payload of a link layer (or a high layer thereof) or content of a dedicated channel may be referred to as Link Layer Signaling (LLS) or Low Level Signaling (LLS). The aforementioned FIT (or a service list table (SLT)) may be classified as LLS. The FIT may be functionally similar to a Program Association Table (PAT) defined in an MPEG-2 system or a Fast Information Channel (FIC) defined in the ATSC-MH. When a receiver receives a transmitted broadcast stream, the receiver may process data or a service from FIT as a start point. The FIT may support the receiver to rapidly scan a channel. That is, the FIT may include information required to generate a list of all services to be received by the receiver. The information may include a channel name and/or a channel number. In addition, the FIT may include bootstrap information so as to discover a SLS for each service. The bootstrap information may include TSI information of an LCT session for transmitting an SLS, source IP address of a ROUTE session, a destination IP address, and/or destination poet number information.

A SLS for each service may describe attribute of a service. For example, the SLS may include information on a list of components included in the service and a source from which a corresponding component is obtained and/or information on capability required by a receiver for meaningful presentation of the corresponding service. In a ROUTE/DASH system, the SLS may include User Service Bundle Description (USBD), S-TSID, and DASH Media Presentation Description (MPD). The USBD may be defined based on a service description metadata fragment having the same name as in definition of the 3GPP-MBMS, to have an extended form in a corresponding metadata fragment in order to support a function of the ATSC3.0 system, and to have future compatibility with the 3GPP-MBMS. A description of information to be included in the USBD may be substituted with the above description of a USBD (or USD) or the following description of USBD (or USD).

The service signaling may be concentrated on basic attribute of the service itself. In particular, the service signaling may be concentrated on content of attribute required to acquire a service. A program intended for feature and a viewer of the service may be represented by Service Announcement or ESG data.

A separate type of service signaling for each service may permit acquisition of an appropriate SLS for an interested service without parsing all SLSs transmitted in a broadcast stream.

The service signaling may also be transmitted through a broadband and, in this case, the FIT may include an HTTP URL of a position for acquisition of a service signaling file (a file including service signaling).

When an event such as update in SLS signaling occurs, the corresponding event may be detected by a "SLS version" field to be included in the FIT. Updated signaling may be acquired through a broadcast network or a broadband network.

The drawing illustrates an embodiment in which bootstrap for acquisition of an SLS through LLS is performed and the SLS is used to acquire service components transmitted through a ROUTE/LCT transmission session. The receiver may begin to acquire an FIT transmitted by a Physical Layer Frame in a determined frequency band identified by a broadcast stream ID (BSID). With regard to each service identified according to Service_id, SLS bootstrapping information—PLPID(#1), source IP address (sIP1), destination IP address (dIP1), destination port number (dPort1), and TSI (tsi-SLS) may be provided. The receiver may acquire SLS fragments transmitted through PLP and IP/UDP/LCT sessions. These fragments may include a USBD/USD fragment, an S-TSID fragment, and a MPD fragment. These may be fragments for transmitting metadata related to one service. The USBD/USD fragment may describe features of a service level and provide a URI for connection with and a URI for connection with an MPD fragment. The S-TSID fragment may provide component acquisition information for providing mapping information between DASH representation, which is related to one service and included in the MPD and a TSI corresponding to a component of the corresponding service, and a TSI corresponding to a component of the corresponding service. The S-TSID may provide an ID of a PLP for transmitting DASH segments related to DASH representation and component acquisition information in the form of a related DASH representation ID. The receiver may collect audio/video components of a service, begin buffering with respect to DASH media segments, and perform an appropriate decoding procedure using PLPID and TSI values.

A hierarchical signaling structure including two separated S-TSID fragments for providing access information for LCT sessions for transmitting contents of one separate service will be described below.

The service signaling may provide discovery information and bootstrap for a current "on-the-air" broadcast service. The current "on-the-air" broadcast service may correspond to, for example, a Linear TV service. The ESG may provide user service announcement indicating a list of contents and available ATSC3.0 user services along with detailed information including capability required by a device, content rating, and presentation schedule. The information may be information that is presented to a user in order to permit selection of a service or content or is required by an ESG client in the receiver in order to determine whether a related service or content is formed to be shown to a user. Connection between a service of an ESG and a service of a SLS may be performed by a service ID. In particular, the service ID may be a key for identifying service attributes including transmission related attributes in signaling and may also be a key for identifying service attributes in the ESG.

Link layer signaling may be operated in an IP level or less. A receiving end may rapidly acquire the link layer signaling compared with IP level signaling (e.g., service layer signaling). The link layer signaling may be acquired prior to establishment of a session.

One of objectives of the link layer signaling may be effective transmission of information required for rapid channel scan and service acquisition. The information may mainly include information for binding ATSC3.0 service layer signaling and PLPs. The link layer signaling may further include signaling related to emergency alert. The link layer signaling may correspond to signaling that is encapsulated through a protocol of a link layer and is to be acquired when the protocol of the link layer is executed.

The link layer signaling may be referred to as low level signaling. Although the link layer signaling has been described as signaling to be acquired in a lower level than an IP level, when a dedicated channel for corresponding dedicated channel for corresponding signaling is generated in a broadcast signal, the link layer signaling may be defined in a high level of the IP level. In this case, the receiver may pre-access link layer signaling compared with service layer signaling using a UDP port number and/or an IP address allocated to a corresponding dedicated channel.

The service layer signaling (or which is referred to as service level signaling (SLS)) may include USBD and S-TSID metadata fragment. The service signaling fragments may be applied to both a linear service and an application-based service. The USBD fragment may include a service ID, device capability information, information for referring to other SLS fragments required to access a service and a media component included in the service, and/or metadata for permitting the receiver to determine a transmission mode (broadcast network transmission and/or broadcast network transmission) of service components. The S-TSID fragment referred to by the USBD may include a transmission session description for one or more ROUTE/LCT sessions or MMTP sessions and a description of transmission objects transmitted through LCT sessions.

A component (fragment) for signaling streaming content in the SLS may correspond to an MPD fragment. The MPD may be generally streaming content and may be related to a linear service for transmission of DASH segments. The MPD fragment is used to support application based services and needs to be associated with DASH format of content components. The MPD may include information items required to control reproduction of contents. The MPD may provide a resource ID for separate media components of a linear or streaming service in the form of a segment URL and provide context of resources identified in media presentation.

The application based enhancement signaling may include information for transmission of application based enhancement components such as an application logic file, an NRT media file, an on-demand content component, or a notification stream. The application may acquire NRT data through broadband connection.

For synchronization between services, between components, or between events, a sequence of accurate wall clock references may be transmitted by a physical layer.

Service signaling of a service may be transmitted in an ALC/LCT session of a ROUTE session. The service signaling fragment may be encapsulated in the form of metadata envelope defined in the 3 DPP MBMS. This type of encapsulation may permit identification, versioning, and update of an included fragment. The metadata envelope and a fragment included therein may be compressed via Gzip. In addition, the receiver may use a template-based compression method.

The receiver may signal the type and version of a signaling fragment of the service layer signaling fragment and perform filtering on the signaling fragment. Prior to acquisition of an entire service layer signaling fragment from packets using this method, a target LCT packet for transmitting an expected type of service layer signaling fragment may be rapidly filtered. This method may be performed by defining a TOI configuration of an LCT header, which will be described below.

FIG. 92 is a diagram illustrating an FIT according to an embodiment of the present invention.

In the present invention, the FIT may use the term of an FIC, an SLT, or low level signaling (LLS). Alternatively, the FIT may be defined as one signaling configuration included in the LLS. In this case, some of the information items included in the FIT disclosed in an embodiment of the present invention may be included in the LLS. The LLS may correspond to signaling information transmitted through a payload of an IP packet having a well-known address/port in a broadcast system.

The illustrated FIT may correspond to a signaling configuration for supporting broadcast service scan and acquisition in the receiver. To this end, the FIT may include sufficient information or a channel number for presentation of a meaningful service list to a viewer and sufficient information for supporting selection of a service for up/down zapping. In addition, the FIT may include sufficient information for locating service layer signaling of a service through a broadcast network or a broadband network according to a location in which signaling is capable of being used.

A broadcast service and/or content that are generated in one or more broadcasting stations may be transmitted in a specific frequency. In this case, information required during this procedure may be signaled through an FIT such that the receiver may rapidly and easily scan a broadcasting station present in a corresponding frequency and/or a service and/or content of the corresponding broadcasting station.

When the signaling structure proposed according to the present invention is used, the receiver may scan a service and seed for acquiring the service by the receiver may be reduced. Although the illustrated FIT is illustrated in the form of syntax, information included in the FIT may be represented in other format such as XML.

In the present invention, a Fast Information Table (FIT) may be transmitted to a fast information channel (FIC) as a separate channel in a physical layer transport frame. The FIT may be transmitted through a common DP for transmitting information to be shared between data pipes of a Physical layer. Information included in the FIT may be transmitted through a path for transmitting link layer signaling in the link layer or the link layer signaling. Alternatively, the FIT may be transmitted through a service signaling channel for transmitting service signaling, a transport session of an application layer, or the like.

An FIT according to an embodiment of the present invention may include FIT_protocol_version information, Broadcast_stream_id information, FIT_section_number information, total_FIT_section_number information, FIT_section_version information, FIT_section_length information, num_services information, service_id information, SLS_data_version information, service_category information, short_service_name_length information, short_service_name_byte_pair( ) element, provider_id information, service_status information, sp_indicator information, num_service_level_descriptor information, a service_level_descriptor( ) element, a num_FIT_level_descriptor information, and/or a FIT_level_descriptor( ) element.

The FIT_protocol_version information may indicate a version of an FIT configuration.

The Broadcast_stream_id information may identifier an entire broadcast stream.

The FIT_section_number information may indicate a section of the section. The FIT may include a plurality of FIT sections.

The total_FIT_section_number information may indicate the number of all FIT sections of the FIT including the section as a part. The information may be the same as the FIT_section_number information with a highest value.

The FIT_section_version information may indicate a version number of an FIT section. A value of the information may be increased on a one by one basis when information in the FIT section is changed. When a value of the information is reached to a maximum value, the value of the information may be returned back to 0.

The FIT_section_length information may indicate a byte number of an FIT section including information items subsequent to the information.

The num_services information may indicate the number of services described by an instance of the FIT. Each broadcast stream may include services having at least one component.

The service_id information may indicate a number that uniquely identifies a service within a range of a broadcast area.

A value of the SLS_data_version information may be increased at a time point in which any one of signaling tables for a service transmitted through service layer signaling is changed or a time point in which a service entry for services in the FIT is changed. The information may allow the receiver to observe the FIT and to recognize that signaling for a service is changed in the case of change in signaling of the service.

The service_category information may identify a category of a service. When a value of the information is '0x00', this may indicate that the category of the service is n to identified by the information, when the value of the information is '0x01', this may b indicate an Audio/Video service, when the value is '00x02', this may indicate the service corresponds to an audio service, when the value is '0x03, the service is an application based service, when the value is '0x01' and the value is '0x08, the service may guide (or service announcement). Values to be allocated except for values of the information may be reserved for future use.

The provider_id information may identify a provider for broadcasting a service.

The short_service_name_length information may indicate the number of types in the short_service_name_byte_pair( ) element. When a short name for a service is not provided, a value of the information may be 0.

The short_service_name_byte_pair( ) element may indicate a short name of a service. Each document may be encoded I the form of UTF-8. When a byte of odd number is present in the Short name, a second byte of a last byte pair may include 0x00 for every pair count identified according to the short_service_name_length information.

The service_status information may indicate a state of a service (active/inactive and/or hidden/shown). An uppermost bit of the information may indicate whether a service is active (when a value is set to '1') or inactive (when a value is set to '0') and a lowermost bit may indicate whether a service is hidden (when a value is set to '1') or shown (when a value is set to '0').

The sp_indicator information may identify whether one or more components required for meaningful presentation are protected when a value of the information is set. When the value of the information is set to '0', the information may indicate that there is not component to be protected among the components required for meaningful presentation of the service.

The num_service_level_descriptor information may indicate the number of service level descriptors for a service.

The service_level_descriptor( ) element may include 0 or more service level descriptors for providing additional information for a service.

The num_FIT_level_descriptor information may indicate the number of FIT level descriptors for an FIT.

The FIT_level_descriptor( ) element may include 0 or more descriptors for providing additional information for an FIT.

FIG. 93 is a diagram illustrating a location of a descriptor to be included in signaling for a broadcast system according to an embodiment of the present invention.

0 or more descriptions for providing additional information for a service or an FIT may be included in a signaling configuration.

The descriptor illustrated in the drawing may indicate the name and location of a descriptor to be included as an FIT level descriptor or a service level descriptor in an FIT.

The FIT may include broadcast_signaling_location_descriptor( ), inet_signaling_location_descriptor, and/or capability_descriptor( ).

The broadcast_signaling_location_descriptor( ) may be included in a region for signaling information on a location or service included in the service level descriptor of the FIT.

The inet_signaling_location_descriptor( ) may be included in a location including a service level descriptor of an FIT or a location including an FIT level descriptor.

The capability_descriptor may be included in a region for signaling information on a location or service including the service level descriptor of the FIT.

FIG. 94 is a diagram illustrating broadcast_signaling_location_descriptor( ) according to an embodiment of the present invention.

The broadcast_signaling_location_descriptor( ) may include information for bootstrapping an address of service layer signaling for each service. A receiver may acquire an SLS transmitted through a broadcast network in a corresponding address.

The broadcast_signaling_location_descriptor( ) may include descriptor_tag information, descriptor_length information, IP_version_flag information, SLS_source_IP_address_flag information, SLS_source_IP_address information, SLS_destination_IP_address information, SLS_destination_UDP_port information, SLS_TSI information, and/or SLS_PLP_ID information.

The descriptor_tag information may identify a descriptor.

The descriptor_length information may be included in a descriptor and may indicate the size (length) of information items subsequent to the information.

The IP_version_flag information may indicate a version of an IP used in an IP address transmitted in the present descriptor. When a value of the information is set to '0', the SLS_source_IP_address information and the SLS_destination_IP_address information may indicate an IPv4 address, and when the value of the information is set to '1', the SLS_source_IP_address information and the SLS_destination_IP_address information may indicate an IPv6 address.

The SLS_source_IP_address_flag information may identify whether SLS_source_IP_address information is present.

The SLS_source_IP_address information may indicate a source IP address of packets for transmitting an SLS.

The SLS_destination_IP_address information may indicate a destination IP address of packets for transmitting an SLS.

The SLS_destination_UDP_port information may indicate a port number of a destination of packets for transmitting an SLS.

The SLS_TSI information may identify a transmission session for transmitting an SLS.

The SLS_PLP_id information may identify a location/region for transmitting an SLS. The SLS_PLP_id information may identify a PLP including a SLS. The SLS_PLP_id information may be transmitted in link layer signaling. As necessary, the information may be transmitted in signaling transmitted in the link layer.

FIG. 95 is a diagram illustrating meaning of inet_signaling_location_descriptor( ) and URL_type information according to an embodiment of the present invention.

The inet_signaling_location_descriptor( ) may include a URL indicating an entity of receiving data of a type requested from an external server through a broadband by a receiver. The receiver may use one URL included in the present descriptor as a query term for acquisition of a signaling description through a broadband.

The inet_signaling_location_descriptor( ) may include descriptor_tag information, descriptor_length information, provider_id information, URL_type information, and/or URL_bytes( ) information.

The descriptor_tag information may identify the descriptor.

The descriptor_length information may be included in a descriptor and indicate a size (length) of information items subsequent to the information.

The provider_id information may identify a provider for broadcasting a service.

The URL_type information may indicate a type of a URL represented according to the URL_bytes( ). When a value of the information is "0x00", the URL is a URL of a signaling server for providing signaling and, when the value of the information is "0x01", the URL is a URL of an ESG server for providing ESG data.

The URL_bytes( ) information may indicate a Uniform Resource Location (URL) and each character included in the URL may be encoded in a UTF-8 manner. The URL may be used as a query term and a base URL may be extended by the query term in order to indicate a resource.

When resources are available through a broadband network, the inet_signaling_location_descriptor( ) may provide URL information on these resources.

FIG. 96 is a diagram illustrating a query term using URL_bytes information of inet_signaling_location_descriptor( ) according to an embodiment of the present invention.

The inet_signaling_location_descriptor( ) may be positioned in a FIT level and a URL may be used as a query term indicating a type of a resource requested by the URL. when the resource type is an SLS, a URL indicating a resource of the SLS through a broadband for all services described in an FIT by the receiver may be included in the inet_signaling_location_descriptor( ). In this case, optionally, (svc) string may be used and added to a last portion of a query term and, thus, the receiver may request an SLS for a specific service. A response to the query term may have an SLS fragment encapsulated by a multipart.

When a resource type is an ESG, a URL indicating a resource of an ESG through a broadband for all provider described in an FIT by the receiver may be included in the inet_signaling_location_descriptor( ). In this case, optionally, (prv) string may be used and added to a last portion of a query term and, thus, the receiver may request an ESG for a specific provider.

The inet_signaling_location_descriptor( ) may be transmitted through a loop for a service level descriptor and, in this case, the inet_signaling_location_descriptor( ) may indicate a URL of a location in which service layer signaling included in a service is obtained through a broadband. When the service_category information indicates that a category of the service is an A/V service, the URL may be used as a query term for indicating a desired signaling description. When a broadcasting station provides different SLS URL for respective services, such as query term may be used and, in this case, a query term in which (svc) string is added may not be used. A response to the query term may have an SLS fragment encapsulated by a multipart.

An upper part of the drawing illustrates a query term using URL_bytes information when the inet_signaling_location_descriptor( ) is positioned in an FIT level according to an embodiment of the present invention. A lower part of the drawing illustrates a query term using URL_bytes information when the inet_signaling_location_descriptor( ) is positioned in a service level.

The query term according to an embodiment of the present invention may be used as SLS Set—query for requesting all SLSs, SLS Diff—query for requesting Diff data of SLSs, SLS Template—query for requesting an SLS template, USD—query for requesting USD, S-TSID—query for requesting S-TSID, and/or ESG—query for requesting ESG.

FIG. 97 is a diagram illustrating capability_descriptor( ) according to an embodiment of the present invention.

The capability_descriptor( ) may provide a list of "capability" (e.g., a download protocol, an FEC algorithm, a wrapper/archive format, a compression algorithm, and a media type) used for one service. A receiver may parse and receive the capability_descriptor( ) and when the receiver is not capable of supporting required capability identified by information in the capability_descriptor( ), the receiver may avoid requirement for a corresponding service.

The capability_descriptor( ) may include descriptor_tag information, descriptor_length information, and/or capabilities_bytes( ) element.

The descriptor_tag information may identify the descriptor.

The descriptor_length information may be included in the descriptor and may indicate a size (length) of information items subsequent to the information.

The capabilities_bytes( ) element may indicate information on capability of a string type. The capabilities_bytes( ) element may include information to be included in the aforementioned capability_descriptor.

FIG. 98 is a diagram illustrating an FIT defined in XML according to an embodiment of the present invention.

The FIT defined in XML may include @bsid information, @fitSectionNumber information, @totalFitSectionNumber information, @fitSectionVersion information, Service element, @serviceId information, @providerId information, @serviceCategory information, @spIndicator information, @serviceStatus information, @shortServiceName information, @SLSVersion information, capabilityCode element, inetSignalingLocation element, @urlType information, @url information, broadcastSignalingLocation element, @IPVersion information, @sourceIPAddress information, @destinationIPAddress information, @destinationUdpPort information, @TSI information, @PLPID information, inetSignalingLocation element, @providerId information, @urlType information, and/or @url information.

The @bsid information may identify a broadcast stream.

The @fitSectionNumber information may indicate a number of the section. The FIT may include a plurality of FIT sections.

The @totalFitSectionNumber information may indicate the number of all FIT sections of the FIT including the section as a part. The information may be the same as FIT_section_number information having a highest value.

The @fitSectionVersion information may indicate a version number of an FIT section. A value of the information may be increased on a one by one basis when information transmitted in the FIT section is changed. When a value of the information is reached to a maximum value, the value of the information may be returned back to 0.

The Service element may be an ATSC3.0 service entry. The Service element may include information related to the ATSC3.0 service.

The @serviceId information may indicate a number that uniquely identifies a service within a range of a broadcast area.

The @providerId information may identify a provider for broadcasting a service.

The @serviceCategory information may identify a category of a service. When a value of the information is '0x00', this may indicate that the category of the service is not identified by the information, when the value is '0x01', this may indicate that the service corresponds to an audio/video (AN) service, when the value is '0x02', this may indicate that the service corresponds to an audio service, when the value is '0x03', this may indicate that the service is an application-based service, and when the value is '0x01' and '0x08', this may indicate that the service is a service guide (service announcement). Other values to which the information is to be allocated may be reserved for future use.

The @spIndicator information may identify whether one or more components required for meaningful presentation are protected when a value of the information is set. When a value of the information is set to '0', this may indicate that the information there is no component to be protected among components required for meaningful presentation of a service.

The @serviceStatus information may indicate a service state (active/inactive and/or hidden/shown). The information may indicate whether a service is active (when a value is set to '1'), inactive (when a value is set to '0'), hidden (when a value is set to '3'), or shown (when a value is set to '2').

The @shortServiceName information may indicate a short name of a service.

A value of the @SLSVersion information may be increased at a time point in which any one of signaling tables for a service transmitted through service layer signaling is changed or a time point in which a service entry for services in an FIT is changed. The information may allow the receiver to observe the FIT and to recognize change in signaling for a service when the signaling for the service is changed.

The capabilityCode element may include information indicating a capability group and capability required by the receiver in order to generate meaningful presentation of content of an ATSC3.0 service. The element may include all or some of information items included in the aforementioned capability_descriptor.

The inetSignalingLocation element may include a URL indicating an entity that receives a data of a type requested from an external server through a broadband by a receiver. The inetSignalingLocation element may include all or some of information items included in the aforementioned inet_signaling_location_descriptor( ).

The @urlType information may indicate a type of a URL. When a value of the information is "0x00", this may indicate that a presented URL is a URL of a signaling server for providing signaling, and when the value of the information is "0x01", this may indicate that a presented URL is a URL of an ESG server for providing ESG data.

The @url information may indicate a URL of a location for acquiring service layer signaling that belongs to a service. When a category of a service is not an ESG service, the URL may be used as a query term indicating a desired signaling fragment. When a broadcaster provides different SLS URLs for respective services, a corresponding URL may be used and (svc) string may not be used in a query term. A base URL may be extended by one or more query terms in order to indicate desired resources, and an embodiment thereof is the same as the above embodiment. When a category of a service is an ESG service, the URL may indicate an Internet server for acquiring an ESG.

The broadcastSignalingLocation element may include information for bootstrapping an address of service layer signaling for each service. The receiver may acquire an SLS transmitted through a broadcast network in a corresponding address.

The @IPVersion information may indicate a version of an IP used in an IP address. According to setting of a value of the information, whether SLS_source_IP_address information and SLS_destination_IP_address information are an IPv4 address and an IPv6 address may be indicated.

The @sourceIPAddress information may indicate a source IP address of packets for transmitting an SLS.

The @destinationIPAddress information may indicate a destination IP address of packets for transmitting an SLS.

The @destinationUdpPort information may indicate a port number of a destination of packets for transmitting an SLS.

The @TSI information may identify a transmission session for transmitting an SLS.

The @PLPID information may identify a position/region for transmitting an SLS. The @PLPID information may identify a PLP including an SLS. The @PLPID information may be transmitted in link layer signaling. As necessary, the information may be transmitted in signaling transmitted in a link layer.

The inetSignalingLocation element may include a URL indicating an entity that receives data of a type requested from an external server through a broadband by a receiver. The inetSignalingLocation element may include all or some of information items included in the aforementioned inet_signaling_location_descriptor( ).

The @providerId information may identify a provider for broadcasting the service.

The @urlType information may indicate a type of a URL. When a value of the information is "0x00", this may indicate that a presented URL is a URL of a signaling server for providing signaling and when the value of the information is "0x01", this may indicate the presented URL is a URL of an ESG server for providing ESG data.

The @url information may indicate a URL of a location for acquisition of service layer signaling belonging to a service. A description of the @url information may be the same as a description of URL_bytes information of the inet_signaling_location_descriptor( ).

According to an embodiment of the present invention, LLS may include Emergency Alert Description (EAD) and/or Rating Region Description (RRD).

The EAD may be referred to as an Emergency Alert Table (EAT) and may include information for emergency alert.

The RRD may be referred to as a Rating Region Table (RRT) and may include information related to viewing restriction.

Figure 99:
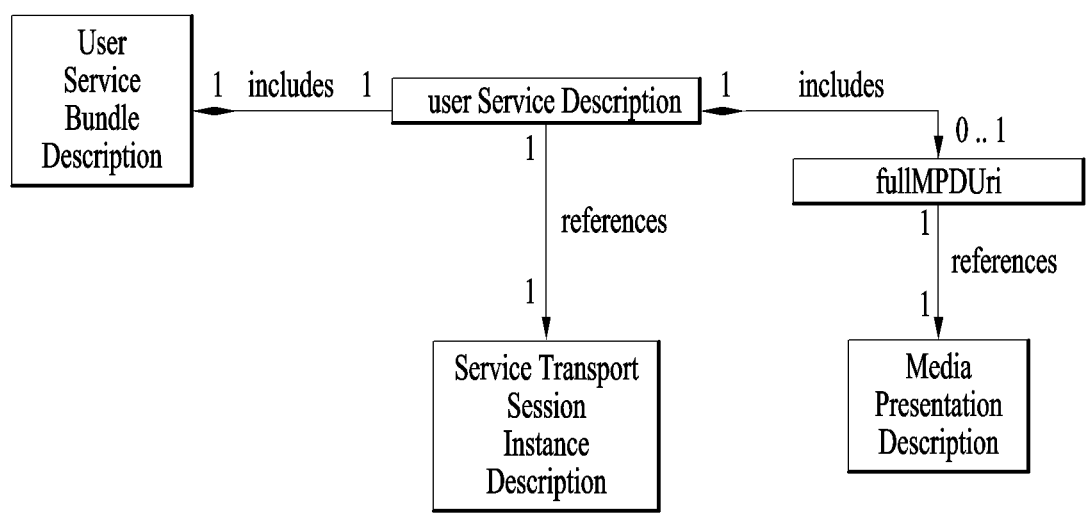
FIG. 99 is a diagram illustrating a data model of service layer signaling for a linear service according to an embodiment of the present invention.

FIG. 99 is a diagram illustrating a data model of service layer signaling for a linear service according to an embodiment of the present invention.

Service layer signaling (SLS) may provide technological information required to discover and access ATSC3.0 user services and content components thereof by a receiver. The service layer signaling may include a set of metadata fragments coded in the form of XML to be transmitted through a dedicated LCT session. The LCT session for transmitting the SLS may be acquired using bootstrapping information included in the FIT, as described above FIT. The SLS may be defined for each service level and may describe access information and attribute of a service such as a list of content components of a service and a method of acquiring components. In addition, the SLS may include information on receiver capability required to generate meaningful presentation of a service. In an ROUTE/DASH system, the SLS may include USBD, S-TSID, and/or MPD for transmission of a linear service. The SLS fragments may be transmitted through a dedicated LCT transmission session having a well known TSI value.

Referring to the drawing, the USBD may include a USD and the USD may include fullMPDUri information as information for acquiring the MPD. The receiver may acquire the MPD using the fullMPDUri information. The USD may include information for connection with S-TSID related to a specific service, and the receiver may acquire information of the corresponding S-TSID in order to present a specific service using the information.

FIG. 100 is a diagram illustrating a User Service Bundle Description (USBD) according to an embodiment of the present invention.

The USBD may be an uppermost level fragment or an entry point of an SLS fragment. The USBD may comply with basic content of the USD defined in the 3GPP MBMS and include the following extension for an ATSC3.0 service.

The USBD may include atsc:serviced information, atsc:fullMPDUri information, atsc:sTSIDUri information, and atsc:capabilityCode information as a child element below userServiceDescription element.

The USBD may include atsc:broadcastAppService information as a child element and include broadcast stream ID (BSID) and/or basePattern element as a child attribute thereof below deliveryMethod element.

The USBD may include atsc:unicastcastAppService and information as a child element and/or include basePattern element as a child element thereof below deliveryMethod element.

The USBD may include bundleDescription root element. The bundleDescription root element may have userServiceDescription element. The userServiceDescription element may be an instance of one service The userServiceDescription element may include @serviceId, @atsc:serviceId, @atsc:fullMPDUri, @atsc:sTSIDUri, name, serviceLanguage, atsc:capabilityCode, and/or deliveryMethod.

The @serviceId may be a globally unique service ID.

The @atsc:serviced may a reference to a corresponding service entry in an LLS (FIT or SLT). A value of corresponding attribute may be the same as a value of serviceId assigned to a corresponding entry defined in the LLS.

The @atsc:fullMPDUri may be information for reference to (or connection with) a MPD fragment containing a description of a content component of a service delivered over broadband and optionally, also over broadband.

The @atsc:sTSIDUri may be information for reference to (or connection with) an S-TSID fragment for providing access related parameters to a transmission session carrying content of a corresponding service.

The name may indicate a name of a service given by the lang attribute. The name element may include the lang attribute indicating a language of the service name. The language may be specified according to a type of XML data.

The serviceLanguage may indicate an available language of a service. The language may be specified according to an XML data type.

The atsc:capabilityCode may specify capability required to generate meaningful presentation of content of a corresponding service. In some embodiments, the current field may specify a predefined capability group. Here, the capability group may be a group of values of capability attributes for meaningful presentation. The current field may be omitted in some embodiments.

The deliveryMethod may be a container of a transport related to information pertaining to content of a service over broadcast and (optionally) broadband mode of access. With regard to data included in a corresponding service, when the number of the data items is N, delivery methods of each data item may be described by the element. The deliveryMethod element may include atsc:broadcastAppService element and atsc:unicastAppService element. Each lower element may include basePattern element as a low element.

The atsc:broadcastAppService may be DASH representation delivered over broadcast, in multiplexed or non-multiplexed form, containing a corresponding media component belonging to a service, across all periods of the affiliated media presentation. That is, each current field may be DASH representation delivered through a broadcast network.

The atsc:unicastAppService may be DASH representation delivered over broadband, in multiplexed or non-multiplexed form, containing a constituent media content component belong to a service, across all periods of the affiliated media presentation. That is, each current field may be DASH representation delivered over broadband.

The basePattern may be a character pattern for used by a receiver to match against any portion of the segment URL used by a DASH client to request media segments of parent representation under its containing period. The match may imply that the corresponding requested media segment is carried over broadcast transport. With regard to a URL address for receiving DASH representation represented by the atsc:broadcastAppService element and atsc:unicastAppService element, a portion of the URL may have a specific pattern and the pattern may be described by the current field. Some data items may be segmented according to the information. Proposed default values may be changed in some embodiments. The illustrated column of use may be related to each field. In this regard, M may be a mandatory field, O may be an optional field, OD may be an optional field with a default value, and CM may be a conditionally mandatory field. 0 . . . 1 to 0 . . . N may refer to available number of corresponding fields.

FIG. 101 is a diagram illustrating a S-TSID according to an embodiment of the present invention.

The S-TSID may be a SLS XML fragment for providing overall session description information on a transmission session for delivery of a content component of a service. The S-TSID may be SLS metadata segment including overall transmission session description information on a constituent LCT session and 0 or more ROUTE sessions for delivery of a media content component of a service. The S-TSID may include file metadata of a delivery object or an object flow delivered in an LCT session of a service as well as additional information on a content component delivered in an LCT and payload format.

Each case of the S-TSID fragment may be referenced by the USBD fragment according to @atsc:sTSIDUri attribute of userServiceDescription element. The S-TSID may be represented in the form of binary format or XML document.

The illustrated S-TSID may have an S-TSID root element. The S-TSID root element may include @serviceId, RS, and/or MS.

The @serviceID may be reference corresponding to a service element in an LLS (FIT). A value of corresponding attribute may reference a service in the FIT with a corresponding value of service_id. The information may be present when an MMTP session is used for broadcast delivery of a linear service without USD and without an ROUTE session.

The RS element may have information on an ROUTE session for delivery of corresponding service data items. Service data and service components are delivered through a plurality of ROUTE sessions and, thus, the number of the current elements may be 1 to N.

The RS element may include @bsid, @sIpAddr, @dIpAddr, @dport, @PLPID, and/or LS.

The @bsid may be an ID of a broadcast stream within which a content component of the broadcastAppService is carried. When corresponding attribute is not present, a PLP of a default broadcast stream may deliver a SLS fragment of a corresponding service. The value may be the same as broadcast_stream_id in a FIT (SLT).

The @sIpAddr may be a source IP address. Here, the source IP address may be a source IP address of an ROUTE session for delivery of a service component included in a corresponding service. As described above, service components of one service may be delivered through a plurality of ROUTE sessions. Accordingly, the service component may be transmitted to another ROUTE session but not the ROUTE session for delivery of the corresponding S-TSID. Accordingly, the current field may be used in order to indicate a source IP address of the ROUTE session. A default value of the current field may be a source IP address of a current ROUTE session. When another ROUTE session for delivery of a service component needs to be indicated, a value of the current field may be a source IP address of the ROUTE session. In this case, the current field may be M, i.e., a mandatory field.

The @dIpAddr may be a destination IP address. Here, the destination IP address may be a destination IP address of a ROUTE session for delivery of a service component included in a corresponding service. For the same case as in the description of the @sIpAddr, the current field may indicate a destination IP address of an ROUTE session for delivery of a service component. A default value of the current field may be a destination IP address of a current ROUTE session. When another ROUTE session for delivery of a service component needs to be indicated, a value of the current field may be a destination IP address value of the ROUTE session. In this case, the current field may be M, i.e., a mandatory field.

The @dport may indicate a destination port. Here, the destination port may be a destination port of a ROUTE session for delivery of a service component included in a corresponding service. For the same case as in the description of the @sIpAddr, the current field may indicate a destination port of a ROUTE session for delivery of a service component. A default value of the current field may be a destination port number of a current ROUTE session. When another ROUTE session for delivery of a service component needs to be indicated, a value of the current field may be a destination port number of the ROUTE session. In this case, the current field may be M, i.e., a mandatory field.

The @PLPID may be an ID of a PLP for an ROUTE session represented by RS. A default value may be an ID of a PLP of an LCT session including a current S-TSID. In some embodiments, the current field may have an ID value of a PLP for an LCT session for delivery of an S-TSID in a corresponding ROUTE session and have ID values of all PLPs for a corresponding ROUTE session. Information such as the @PLPID may be transmitted to a receiver in signaling transmitted through a link layer.

The LS element may have information on an LCT session for delivery of corresponding service data items. Service data and service components may be delivered through a plurality of LCT sessions and, thus, the number of the current elements may be 1 to N.

The LS element may include @tsi, @PLPID, @bw, @startTime, @endTime, SrcFlow, and/or RprFlow.

The @tsi may indicate a TSI value of an LCT session for delivery of a service component of a corresponding service.

The @PLPID may have ID information for a PLP for a corresponding LCT session. This value may override a default ROUTE session value.

The @bw may indicate a maximum bandwidth value. The @startTime may indicate start time of a corresponding LCT session. The @endTime may indicate end time of the corresponding LCT session. The SrcFlow element may describe a source flow of ROUTE. The RprFlow element may describe a repair flow of ROUTE.

Proposed default values may be changed in some embodiments. The illustrated column of use may be related to each field. In this regard, M may be a mandatory field, O may be an optional field, OD may be an optional field with a default value, and CM may be a conditionally mandatory field. 0 . . . 1 to 0 . . . N may refer to available number of corresponding fields.

The MS element may include @versionNumber information, @bsid information, @sIpAddr information, @dIpAddr information, @dport information, @packetId information, @PLPID information, @bw information, @startTime information, and/or @endTime information.

The MS element may include information for an MMTP session. Information included in the MS element may be transmitted in an MMT signaling message.

The @versionNumber information may indicate a version number of an MMTP protocol used in an MMTP session.

The @bsid information may indicate an ID of a broadcast stream for transmitting content components.

The @sIpAddr information may indicate a source IP address of a packet for transmitting content components.

The @dIpAddr information may indicate a destination IP address of a packet for transmitting content components.

The @dport information may indicate a destination port number of a packet for transmitting content components.

The @packetId information may indicate MMTP packet_id for transmitting an MMT signaling message of an MMTP session.

The @PLPID information may identify a PLP for an MMTP session. The @PLPID information may be included in signaling transmitted through a link layer.

The @bw information may indicate a maximum bandwidth allocated for an MMTP session.

The @startTime information may indicate start time of an MMTP session.

The @endTime information may indicate end time of an MMTP session.

Hereinafter, Media Presentation Description (MPD) for ROUTE/DASH will be described.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for fragment and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 102 is a diagram illustrating ATSC_physical_layer_pipe_identifier_descriptor(according to an embodiment of the present invention.

When MMTP sessions are used in order to transmit an ATSC3.0 streaming service, an MMT signaling message may be transmitted by the MMTP according to a signaling message mode defined in the ISO/IEC 23008-1. Each MMTP session may transmit an MMT signaling message and components and packets for transmitting the MMT signaling message may be signaled by an MS element in the S-TSID fragment.

As defined in the ISO/IEC 23008-1, the MMT signaling message may include PA, MPI, MPT, and HRBM messages and an MP table in the MMT signaling message may transmit asset location information for ATSC3.0 service components. In this case, the illustrated ATSC_physical_layer_pipe_identifier_descriptor( ) may be transmitted as asset_descriptor( ) of the MP table. When the ATSC_physical_layer_pipe_identifier_descriptor( ) is not indicated, asset may be transmitted through the same PLP as a PLP indicated by MS@PLPID information in the S-TSID fragment.

The ATSC_physical_layer_pipe_identifier_descriptor( ) may include descriptor_tag information, descriptor_length information, and/or PLP_id information.

The descriptor_tag information may identify the descriptor.

The descriptor_length information may be included in a descriptor and indicate a size (length) of information items subsequent to the information.

The PLP_id information may indicate an ID of a PLP including MMTP packets for asset described by the descriptor.

Figure 103:
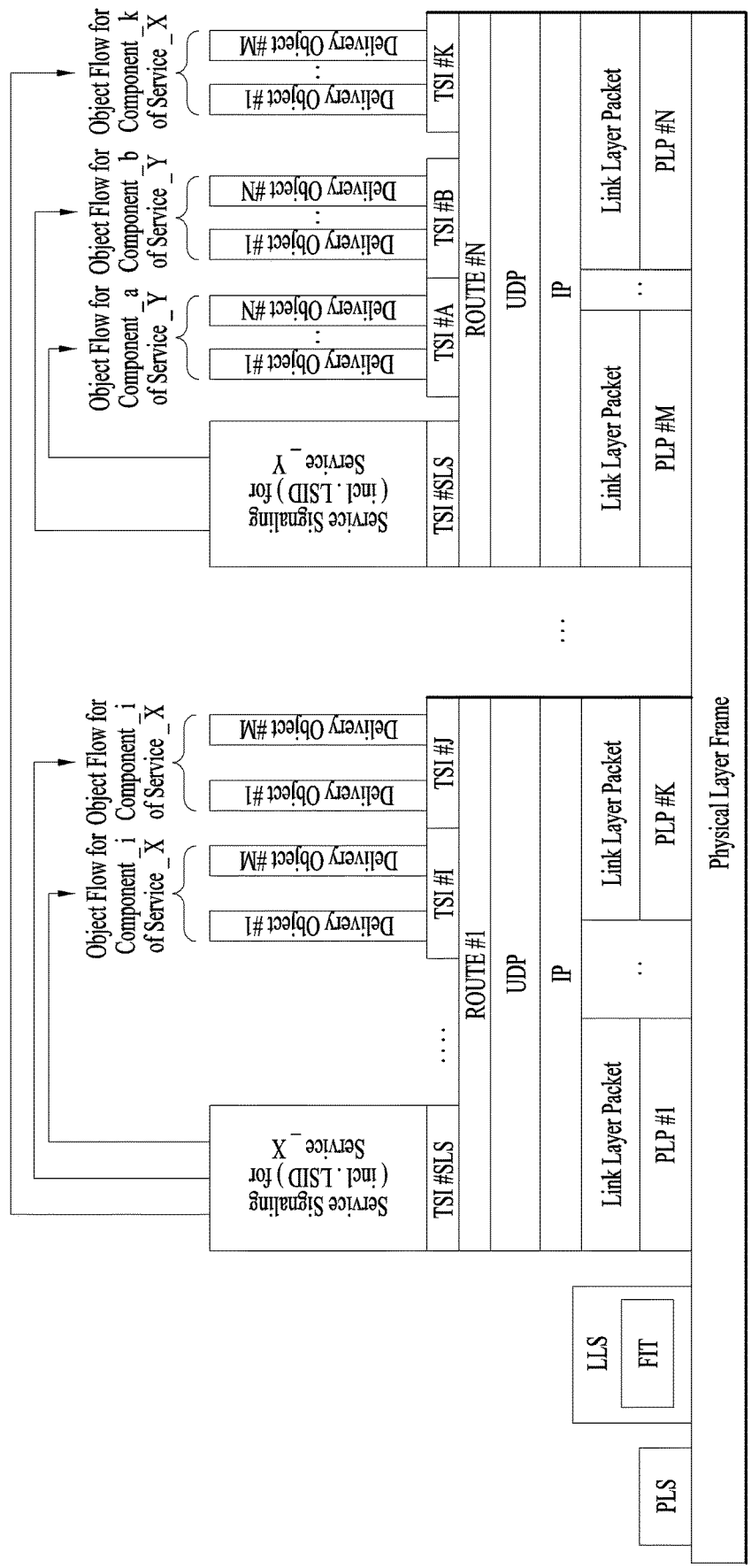
FIG. 103 is a diagram illustrating a structure of hierarchical signaling of an ATSC3.0 system according to an embodiment of the present invention.

FIG. 103 is a diagram illustrating a structure of hierarchical signaling of an ATSC3.0 system according to an embodiment of the present invention.

The drawing illustrates the case in which two S-TSID instances are transmitted through ROUTE. A first S-TSID may provide access information for LCT sessions included in ROUTE session #1. ROUTE session #1 may transmit content components of service_X. A second S-TSID may provide access information for LCT sessions included in ROUTE session # N and ROUTE session # N may transmit content components of service_Y.

The receiver may acquire LCT sessions for transmitting components for each service using information items included in the aforementioned S-TSID fragment.

Prior to the above acquisition of a component of a service, the receiver may scan services.

Figure 104:
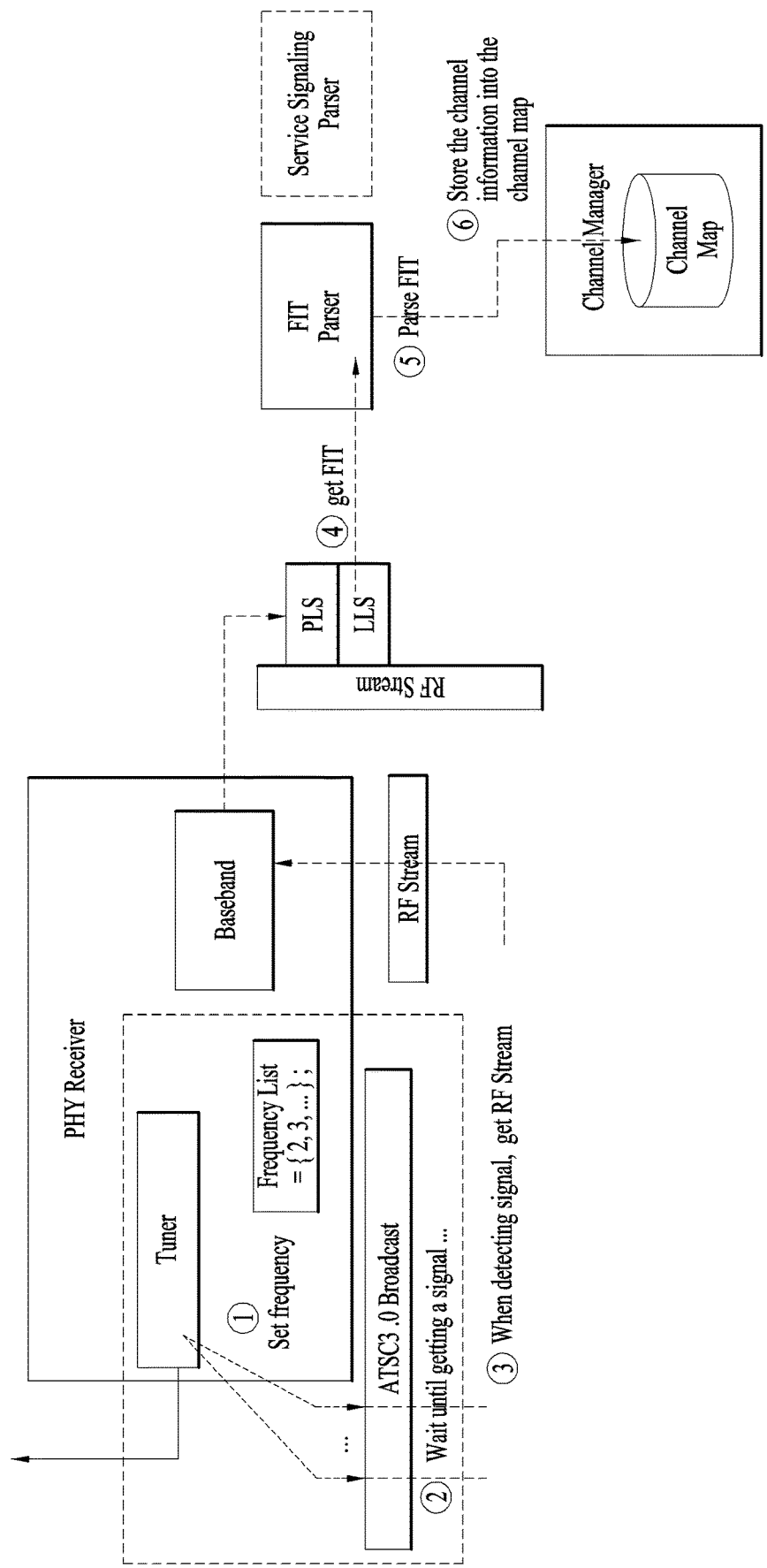
FIG. 104 is a diagram illustrating a flow of a rapid channel scan operation according to an embodiment of the present invention

FIG. 104 is a diagram illustrating a flow of a rapid channel scan operation according to an embodiment of the present invention.

According to an order of numbers indicated in the drawing, the rapid channel scan operation may be performed below.

First, a tuner in a receiver may scan frequencies using a predefined frequency list.

Second, the tuner may wait to receive a signal for each frequency.

Third, when a signal is detected from one frequency, a baseband processor may extract an FIT and transmit the FIT to a middleware module.

Fourth, the middleware module may transmit the FIT to a FIT parser.

Fifth, the FIT parser may parse data of the FIT to extract information. Even if an FIT having the same version number is present in the receiver in a last scan procedure, re-parsing of the receiver may be a best processing procedure in terms of stability. This is because there is the possibility that increase in version number exceeds a maximum value and the version number returns to a first version number, and an FIT having the same version number as a previous number is accidently transmitted. In a scenario in which an FIT is not updated, the receiver may perform a procedure of initializing a version number of the FIT.

Sixth, the information extracted from the FIT may be stored in a channel map (database or storage).

Figure 105:
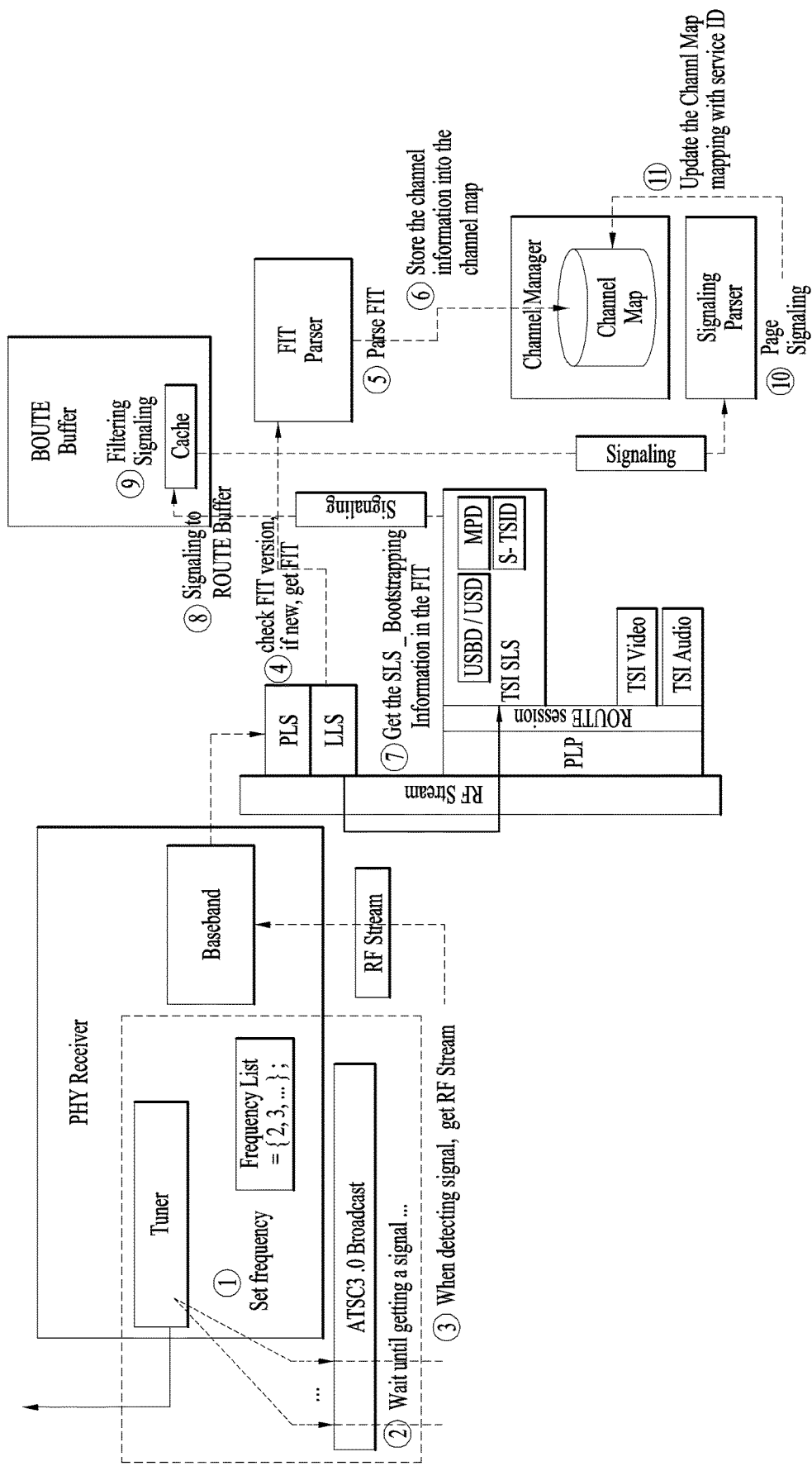
FIG. 105 is a diagram illustrating a flow of a whole channel scan operation according to an embodiment of the present invention.

FIG. 105 is a diagram illustrating a flow of a whole channel scan operation according to an embodiment of the present invention.

When a receiver performs whole scan on service signaling (USBD or USD) for each service, the receiver may store or acquire sufficient information if possible. For example, the receiver may acquire a long service name from the USD if possible, match the USD with a service_id value in the FIT, and store the USD matched with the service_id value as a name of a corresponding service in a channel map.

According to an order of numbers indicated in the drawing, the whole channel scan operation may be performed below.

First, a tuner in a receiver may scan frequencies using a predefined frequency list.

Second, the tuner may wait to receive a signal for each frequency.

Third, when a signal is detected from one frequency, a baseband processor may extract an FIT and transmit the FIT to a middleware module.

Fourth, the receiver may check whether the FIT_version is new or not. Even if an FIT having the same version number is present in the receiver in a last scan procedure, re-parsing of the receiver may be a best processing procedure in terms of stability. This is because there is the possibility that increase in version number exceeds a maximum value and the version number returns to a first version number, and an FIT having the same version number as a previous number is accidently transmitted. When the version is new, the middleware module may collect an FIT and transmit the FIT to an FIT parser.

Fifth, the FIT parser may parse data of the FIT to extract information. Even if an FIT having the same version number is present in the receiver in a last scan procedure, re-parsing Sixth, the information extracted from the FIT may be stored in a channel map (database or storage).

Seventh, the receiver may acquire SLS bootstrapping information from the FIT.

Eighth, the receiver may transmit the SLS bootstrapping information to an ROUTE client.

Ninth, the receiver may perform signaling filtering and acquire and store a USD in order to extract the USD from the SLS.

Tenth, the signaling parser may parse the USD. Here, even if an SLS having the same version number is present in the receiver in a last scan procedure, re-parsing of the receiver may be a best processing procedure in terms of stability. This is because there is the possibility that increase in version number exceeds a maximum value and the version number returns to a first version number, and an SLS having the same version number as a previous number is accidently transmitted.

Eleventh, the receiver may perform mapping with the service_id to update a channel map.

Figure 106:
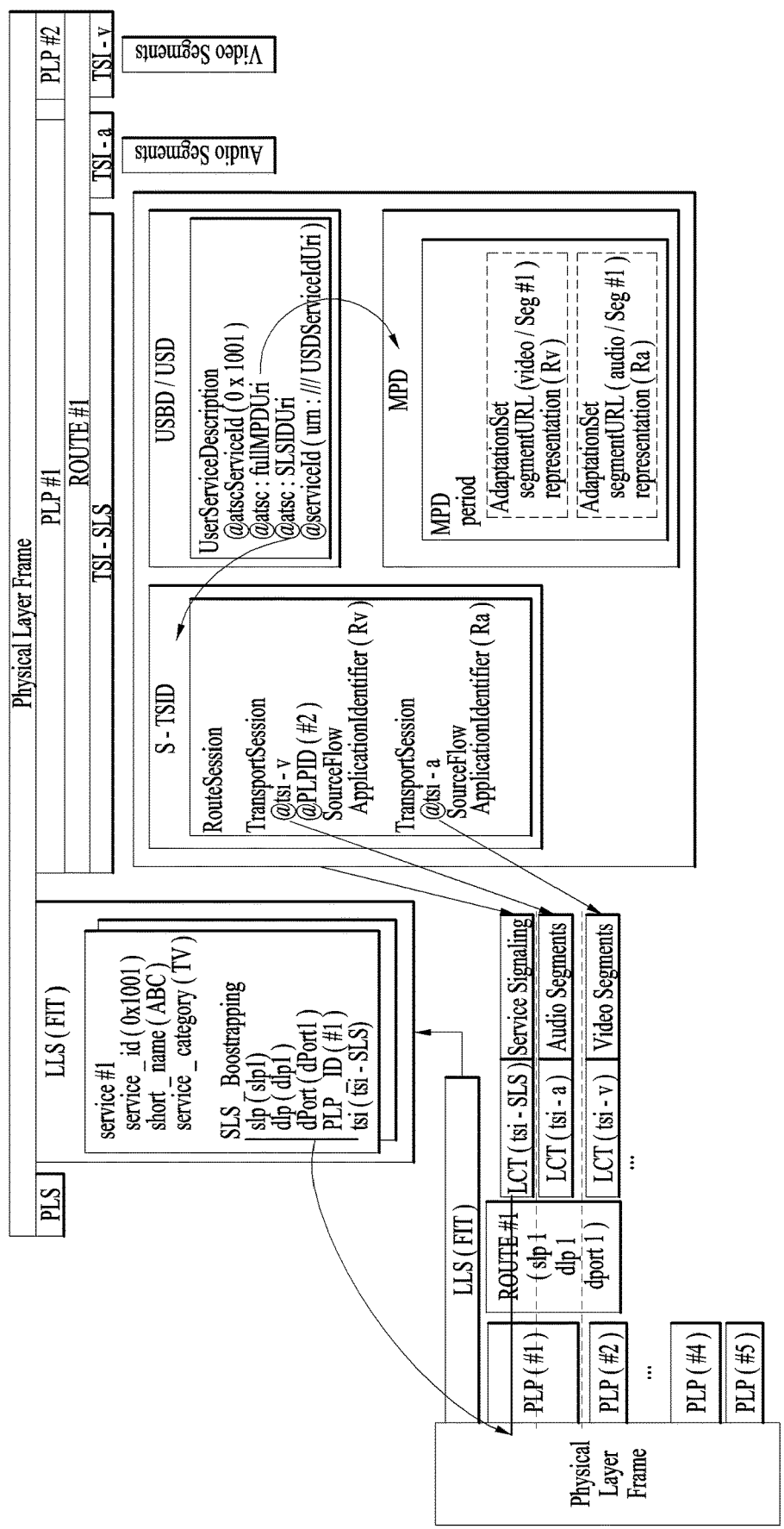
FIG. 106 is a diagram illustrating a procedure of acquiring a service in pure broadcast according to an embodiment of the present invention.

FIG. 106 is a diagram illustrating a procedure of acquiring a service in pure broadcast according to an embodiment of the present invention.

When a video and audio segment is transmitted through pure broadcast with one ROUTE session, acquisition of a service using service signaling may be performed at the following order.

First, USD, S-TSID, and MPD may be acquired together and parsed. All tables are required to acquire a service.

Then, representation for presentation may be selected. In this case, in order to determine representations to be transmitted through a broadcast network, the S-TSID needs to be checked.

Then, the receiver may transmit information to a segment acquisition module for providing user preference using corresponding signaling from signaling (USD, S-TSID, and MPD). For example, the user may prefer Spanish audio to English audio language. In this case, information related to user preference may be stored in the receiver, and a component of a service provided as Spanish preferred by the user may be selected using the information and information related to an audio language in the USD, the S-TSID, and/or the MPD.

Then, the segment acquisition module may acquire whether a component transmitted through a broadcast stream is acquired using information described in the USD. The segment acquisition module may acquire a source from which the component is acquired, using the USD. When a DASH client requests one segment from an internal proxy server, the internal proxy server needs to recognize whether the server makes a request for a corresponding segment a remote broadband server or waits for the corresponding segment in a broadcast stream (when a corresponding segment is not present). The USD may describe multicast "base patterns" and unicast "base patterns" in deliveryMethod element. The proxy server may check whether the unicast base pattern or the multicast base pattern is substring to a URL proposed by a DASH player and operate according to the check result.

Then, in the case of pure broadcast, the receiver may recognize a source from which components are to be acquired without any deliveryMethod element in the USD.

Figure 107:
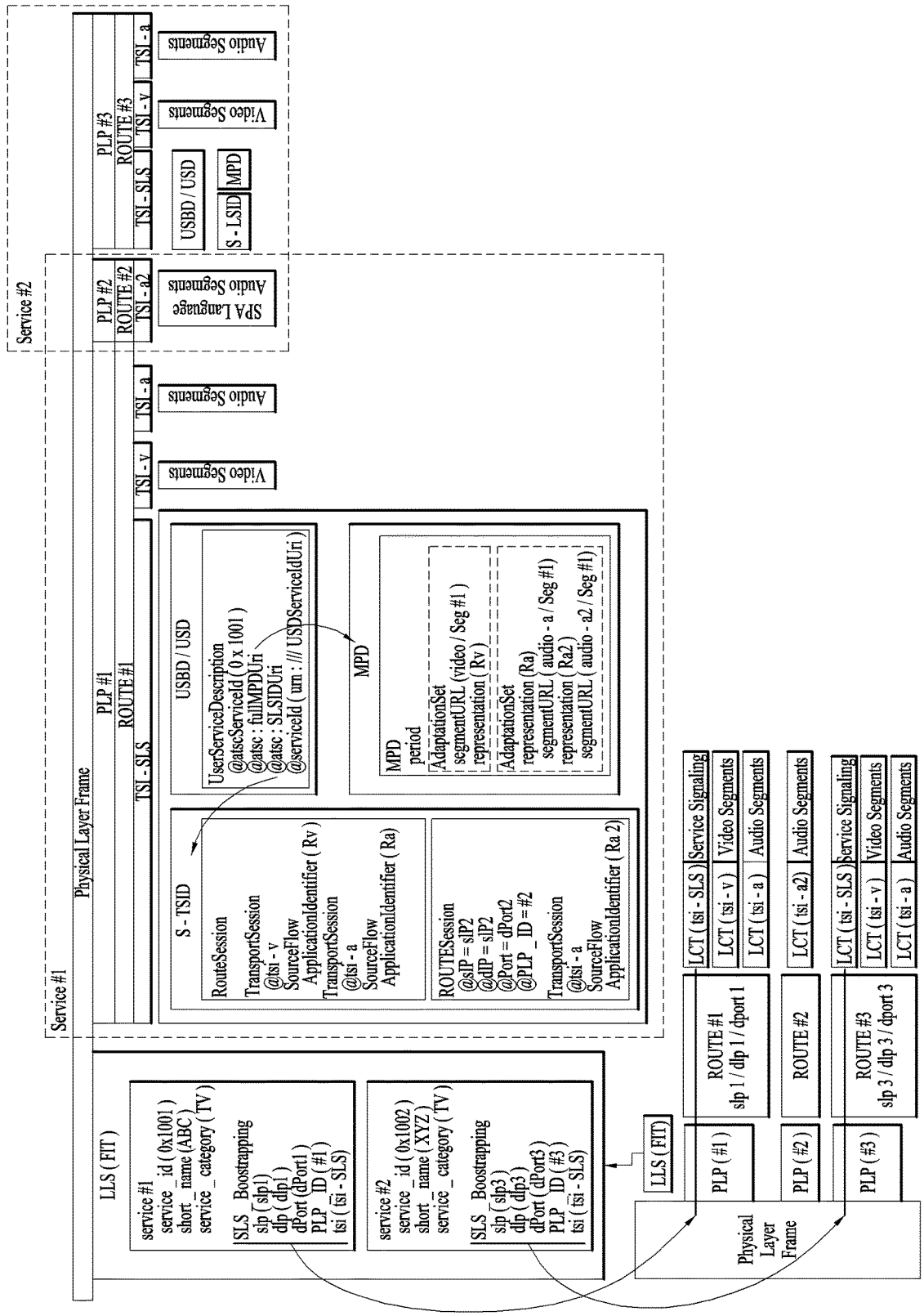
FIG. 107 is a diagram illustrating a procedure of acquiring a service through a plurality of ROUTE sessions in a pure broadcast according to an embodiment of the present invention.

FIG. 107 is a diagram illustrating a procedure of acquiring a service through a plurality of ROUTE sessions in a pure broadcast according to an embodiment of the present invention.

The plurality of ROUTE sessions may be used to transmit data or component included in one service. In this case, the S-TSID may include additional ROUTE session information required to access all representations by the receiver.

Referring to the drawing, the receiver may receive an FIT and acquire an SLS for a specific service. The receiver may acquire an S-TSID for providing information on allocated ROUTE session/LCT session of a corresponding service with reference to information of the USD in the acquired SLS. The S-TSID may indicate that transmission of components of service #1 is performed by ROUTE session #1 and ROUTE session #2. The receiver may refer to information on ROUTE session #2 as well as information on ROUTE session #1 to be included in the S-TSID in order to acquire components of service #1.

Figure 108:
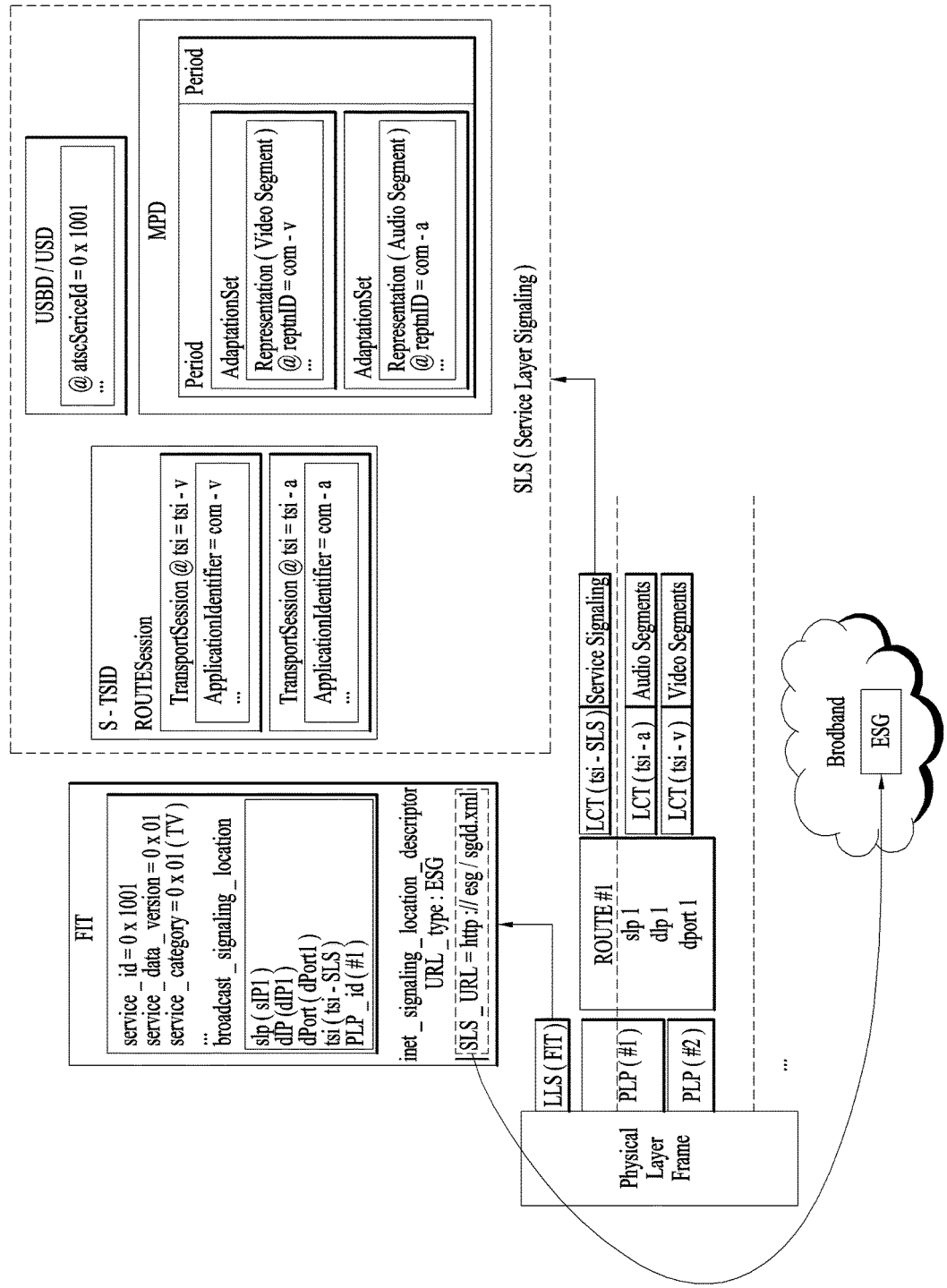
FIG. 108 is a diagram illustrating a procedure of bootstrapping electronic service guide (ESG) through a broadband network according to an embodiment of the present invention.

FIG. 108 is a diagram illustrating a procedure of bootstrapping electronic service guide (ESG) through a broadband network according to an embodiment of the present invention.

The bootstrapping of the ESG through a broadband may be signaled in the FIT. Referring to the embodiment, all ESG data items may be transmitted through a broadband. Accordingly, the ESG broadcast bootstrapping information in the FIT may be substituted with ESG broadband bootstrapping information. For example, a URL_type of inet_signaling_location_descriptor( ) may indicate whether a type of a URL is an ESG or not.

Referring to the drawing, the receiver may first acquire the FIT and parse inet_signaling_location_descriptor( ) in the FIT. The inet_signaling_location_descriptor( ) may provide a URL of a server for providing the ESG and the receiver may access the URL to acquire ESG data through a broadband, as described above.

Figure 109:
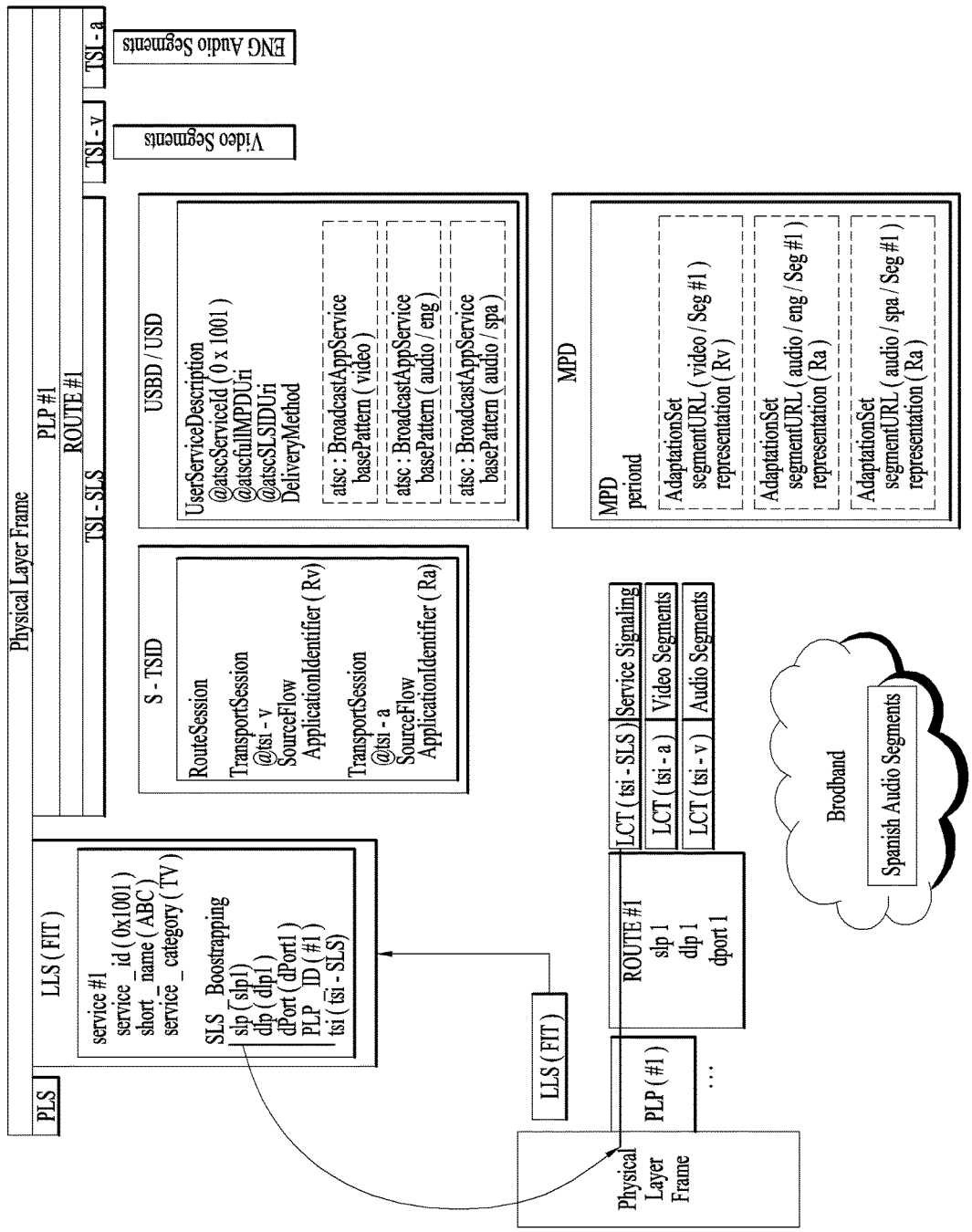
FIG. 109 is a diagram illustrating a procedure of acquiring a service through broadcast and broadband according to an embodiment of the present invention.

FIG. 109 is a diagram illustrating a procedure of acquiring a service through broadcast and broadband according to an embodiment of the present invention.

When two or more audio components of different languages are transmitted through different paths, one component may be transmitted through a broadcast network and the other one may be transmitted through a broadband network. In this case, the S-TSID may include information for describing all broadcast components so as to acquire components desired by a ROUTE client. In addition, when the DASH client makes a request for a segment, the USD may include URL patterns for a broadcast network and URL patterns for a broadband network such that a receiver middleware describes segments and paths for transmitting the segments. In this case, the middleware may recognize a segment to be requested from a remote broadband server and recognize a segment to be discovered in a broadcast network.

Referring to the drawing, the receiver may acquire an FIT from broadcast signal and receive an SLS of a specific service using information in the FIT. The receiver may recognize that each component is transmitted through a broadcast network and a broadband network for a corresponding service using information in USD (or USBD) in the SLS. For example, an English audio component for a corresponding service may be transmitted through a broadcast network and a Spanish audio component may be transmitted through a broadband network. The USD may include base pattern information used to acquire the English audio component transmitted through a broadcast network and may also include base pattern information used to acquire the Spanish audio component transmitted through a broadband network. The English audio component may be acquired using the information in the USD and information in the S-TSID and the Spanish audio component may be received from an external source using the information in the USD. The receiver may perform a switching operation between the English audio component and the Spanish audio component using the information of the MPD.

Figure 110:
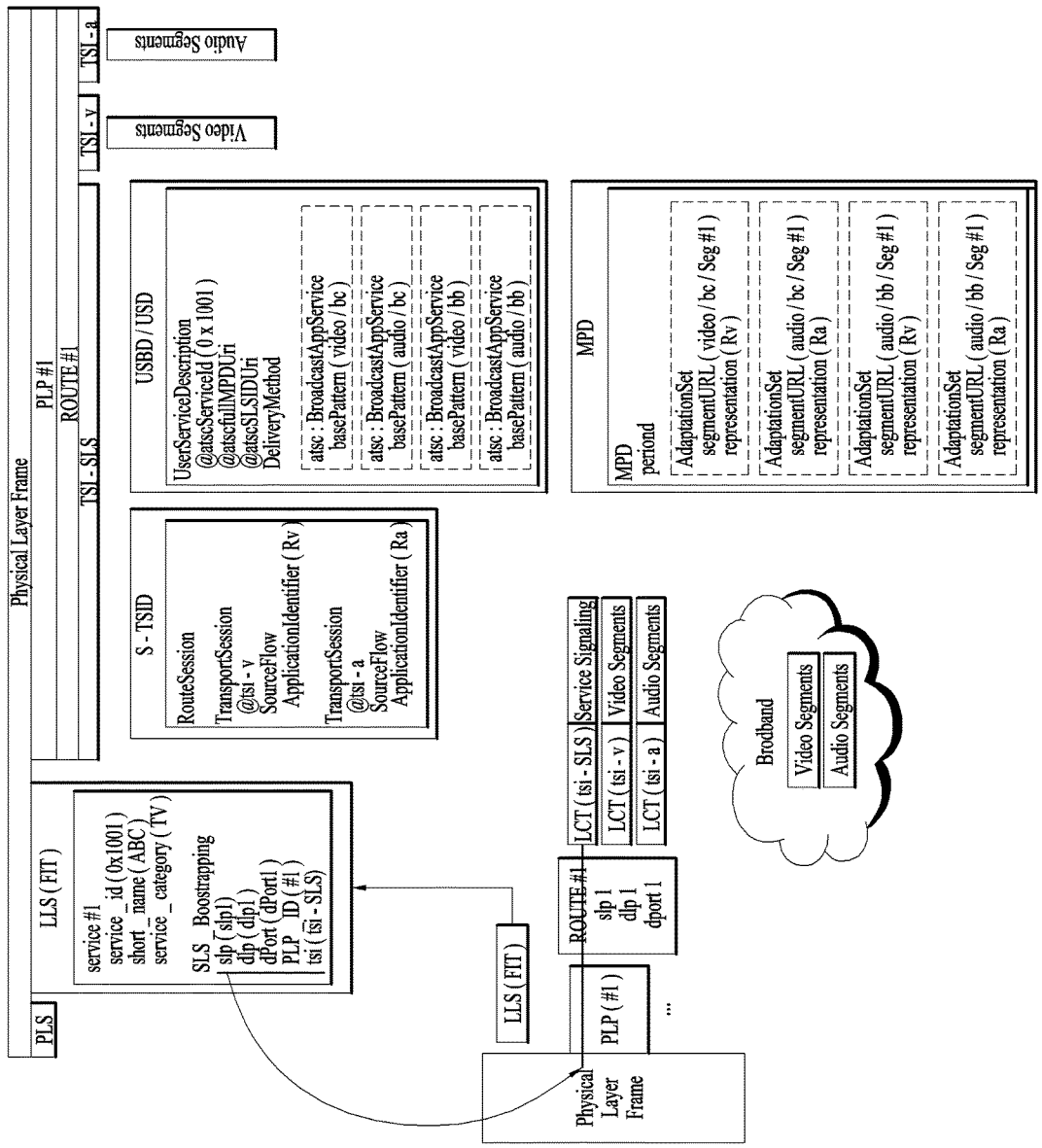
FIG. 110 is a diagram illustrating signaling for an operation of changing a reception of a service between broadcast and broadband according to an embodiment of the present invention.

FIG. 110 is a diagram illustrating signaling for an operation of changing a reception of a service between broadcast and broadband according to an embodiment of the present invention.

The receiver may change reception to a broadband network from a broadcast network or to a broadcast network from a broadband network. The receiver may use signaling information included in the USD during this procedure. The USD may include information indicating components to be transmitted through a broadcast network or a broadband network. The receiver middleware may receive a component through a broadcast network if possible or may acquire a component through a broadband network when there is a problem in terms of reception through a broadcast network.

Referring to the drawing, the receiver may acquire an FIT and an SLS and parse the USD in the SLS. The USD may indicate that a video component and audio component in a service are transmitted through a broadcast network and a broadband network and may include base pattern information required to receive a corresponding component through each of the broadcast network and the broadband network. The receiver may acquire a component through any one of a broadcast network and broadband network connected to the receiver according to the quality of the broadcast network or the broadband network using information in the USD. Change between components transmitted through each of the broadcast network and the broadband network may be performed by the receiver using information in the MPD.

Figure 111:
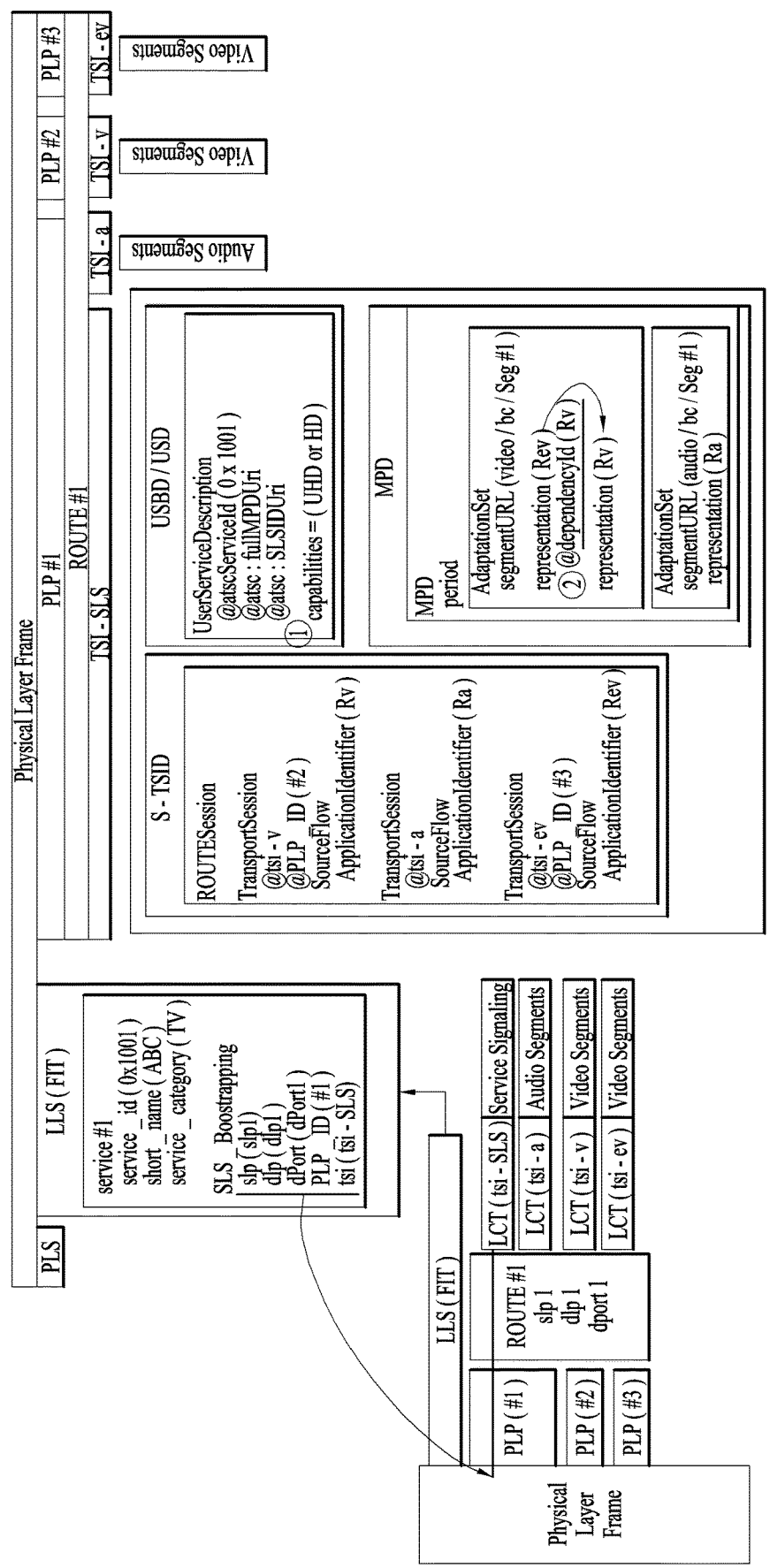
FIG. 111 is a diagram illustrating signaling of receiver capability information according to an embodiment of the present invention.

FIG. 111 is a diagram illustrating signaling of receiver capability information according to an embodiment of the present invention.

As described above, all or some of fragments of the SLS may include information indicating capability of a receiver required to meaningfully present a specific service or components.

According to an embodiment of the present invention, a scalable coding method may be applied to a service or a component, and the receiver needs to process data to which the scalable coding is applied.

First, according to an embodiment of the present invention, the USD may include information on capability required to render a service. For example, in order to decode video, video resolution may be required capability. To this end, the USD may have a capability value of "HD" or "UHD". This may indicate that a current service or program is provided with HD or UHD. In addition, the USD may also include information indicating capability for processing other components such as audio, closed caption, and an available application.

Then, the receiver may recognize a component to be provided in order to render a UHD service or a HD service using information in the MPD. That is, referring to the drawing, @dependencyId in the MPD may include information for identifying representation dependent upon representation of video. The receiver may provide HD video using basic video representation (Rv) and provide UHD video by further using enhanced video representation (Rev).

FIG. 112 is a diagram illustrating meaning of an LCT Transport Object Identifier (TOI) field for filtering of a signaling fragment and information included in the field according to an embodiment of the present invention.

The LCT TOI field may be divided into three parts such that the receiver rapidly filters a signaling fragment as a target.

A first part may be a Fragment Type part and may be allocated to the TOI field in order to identify a type of the signaling fragment.

A second part may be a Fragment Type Extension part and may be allocated to the TOI field in order to identify a sub type of the fragment. According to an embodiment for allocating a sub type, when a plurality of fragments is transmitted, a type of a fragment of a bitmap format included in an object may be identified in order to filter a separate fragment. According to another embodiment for allocating a sub type, when a plurality of instances of signaling fragments with the same fragment type is transmitted (e.g., when a plurality of MPDs is present at a program boundary), the part may indicate an ID of an instance.

A third part may be a version part and may be allocated to a TOI field in order to indicate a version of an object identified by the fragment type extension part and the fragment type part.

The LCT TOI field according to the present embodiment may be divided into a fragment type part, a fragment type extension part, and/or a version part.

The fragment type part may include a value for identifying a type of service layer signaling transmitted by a current object. For example, when a value of the fragment type part is '0x00' this may indicate that a bundle of SLSs is transmitted through the object, when the value of the fragment type part is '0x01', this may indicate that USBD/USD of the SLS is transmitted through the object, when the value of the fragment type part is '0x02', this may indicate that the S-TSID of the SLS is transmitted through the object, and when the value of the fragment type part is '0x03', this may indicate that the MPD of the SLS is transmitted through the object.

The fragment type extension part may be a bitmap indicating a fragment included in an object when the object includes a plurality of fragments. When an object includes one fragment, values for identifying a sub type of a service signaling fragment for more detailed filtering may be allocated to the part. Referring to the drawing, when the fragment type part indicates that a bundle of SLSs is transmitted through one object, whether a specific fragment corresponds to USBD/USD, S-TSID, or MPD according to a value of the fragment type extension part. When the fragment type part identifies a signaling fragment included in one object (when a value of the fragment type part is '0x01' to '0x03'), the fragment type extension part may have a 16-bit hashed value extracted from the URL of the service layer signaling fragment and the part may be used to filter a fragment with an instance URL before a client assembles an LCT packet.

The version part may indicate a version number of all objects. When the object includes one fragment, the part may include a version number of a corresponding fragment. When the object includes a set of fragments, the part may include a version number for an object. Accordingly, the case in which a fragment included in the object is changed may be identified. The version number of the object may be increased on a one by one basis whenever a fragment in the object is changed.

When a value of a TOI is 0 or 1, the TOI may be reserved for transmission of the EFDT. In this case, information of the TOI field may not be used to filter the EFDT. An LCT Codepoint may be identified for a payload type and the receiver may use the field in order to determine a type of a payload transmitted through the LCT session, but not the TOI value.

FIG. 113 is a diagram illustrating XML form of MetadataEnvelope for applying template-based compression to signaling according to an embodiment of the present invention.

The XML signaling fragments described in the present invention may be compressed using a compression tool such as Gzip but may be compressed using other method such as Diff and Patch tool. During the Diff and Patch procedures, an XML signaling template may be pre-shared between a sender and a receiver. This procedure may include comparing two XML files, i.e., XML signaling template and XML signaling instance and generating output indicating a difference between these by a sender side.

Here, the signaling template may be used as a term indicating a basic structure of a signaling fragment.

Here, the signaling instance may correspond to the aforementioned signaling fragment and may be used as a term indicating a signaling fragment including information for a feature service, content, and so on. For example, when an S-TSID is a signaling fragment defined for one service, the S-TSID fragment transmitted for a specific service may be referred to as an S-TSID instance.

The Diff may be encapsulated by a metadata envelope element such as a general XML signaling instance. When the Diff is generated by the sender side, the Diff may be encapsulated in content in an update element and then encapsulated in the metadata envelope. The metadata envelope may be transmitted to a plurality of receivers through a signaling channel. The receiver may receive and check the metadata envelope and check whether the metadata envelope element includes a diffUpdate element. When the diffUpdate element is included in the metadata envelope element, the receiver may recognize that the diffUpdate element needs to be processed in the compression mode.

The receiver may search for a signaling template of metadataURI attribute (SignalingTemplateID) optionally together with version attribute (SignalingTemplateVersion) from pre-shared and stored signaling templates. When the receiver does not discover the corresponding signaling template, the receiver may attempt to acquire a signaling template having a URL of the SignalingTemplateID via a GET procedure.

The receiver may apply the transmitted Diff to the acquired signaling template to acquire a signaling instance. The signaling fragment may have a pair of version attribute (SignalingInstanceVersion) and metadataURI attribute (SignalingInstanceID). It may be necessary to transmit only a difference (e.g., an element or an attribute value added to the element, or changed or deleted content) as an update part of a template instead of a complete file. The receiver may apply the difference to the signaling template to acquire signaling fragment (patch procedure). When a fragment with a very small difference needs to be transmitted via comparison with an original complete fragment, if compression is performed via Diff and Patch procedures instead of a typical compression method, very high efficiency may be achieved in terms of transmission and processing of data.

As described in the 3GPP-MBMS, the metadata envelope and the metadata fragment may be compressed using Gzip. Even if there is no update content in a server side, a diff message without Diff may be transmitted to a client such that a client generates a signaling fragment at a location that requires instantiation of the signaling fragment. The diff message without Diff may be periodically transmitted Diff and, thus, the receiver may periodically check signaling fragments.

The Diff may be defined in the form of XML and may include content of a changed part of the information and/or element of the aforementioned signaling fragment. The metadata envelope including the Diff may include information for identifying signaling fragment to which corresponding Diff needs to be applied and/or information indicating a version of signaling fragment to which corresponding Diff is applied. The receiver may check signaling fragment to which Diff is applied using information for identifying signaling fragment in the metadata envelope and check whether the Diff needs to be applied using information indicating a version of the signaling fragment to which the Diff is applied. In the case of different versions, the receiver may apply content of the Diff to the corresponding signaling fragment to update the corresponding signaling fragment and store the signaling fragment.

Figure 114:
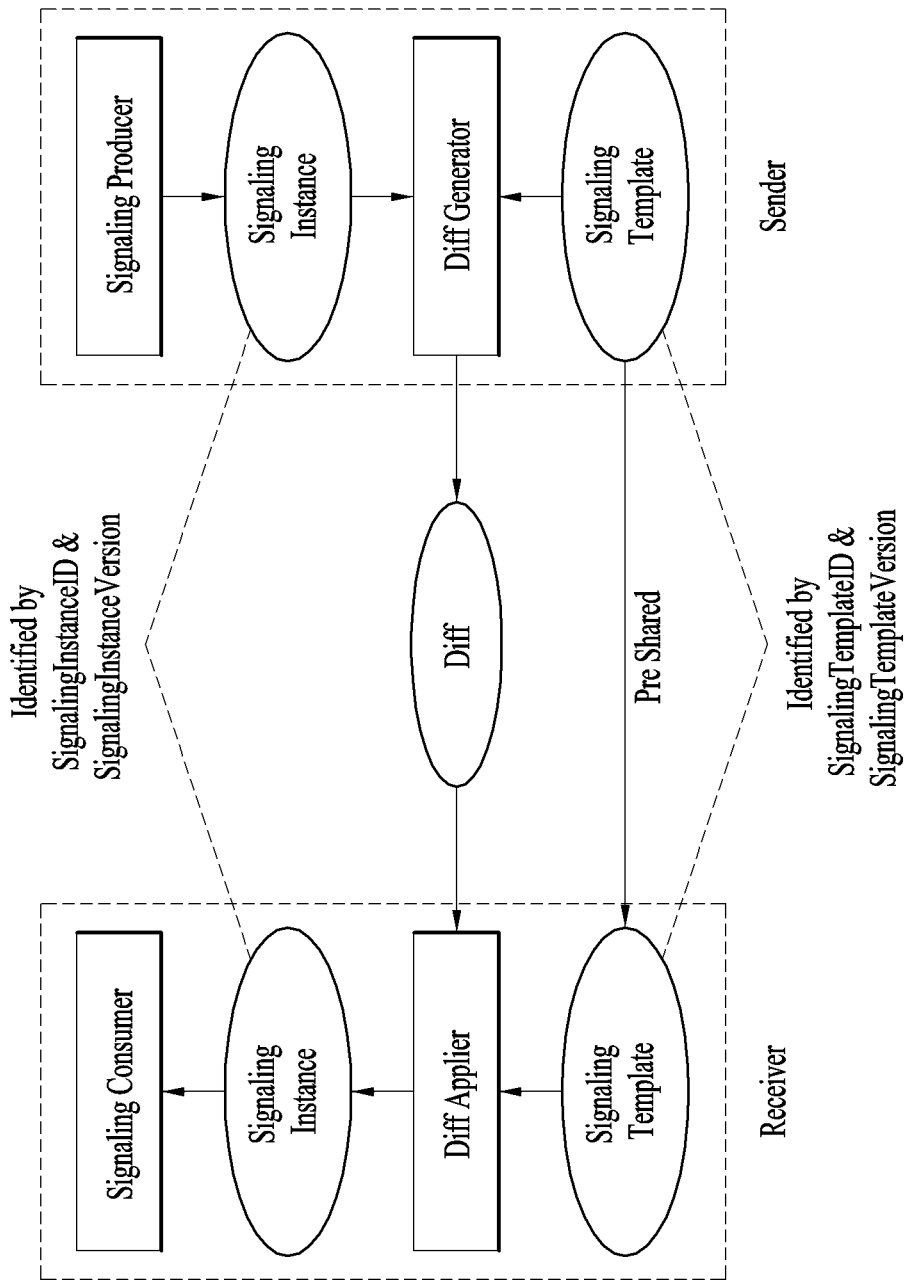
FIG. 114 is a diagram illustrating a compression procedure of a template-based signaling fragment according to an embodiment of the present invention.

FIG. 114 is a diagram illustrating a compression procedure of a template-based signaling fragment according to an embodiment of the present invention.

The signaling template fragment may identify a URL included in content of the templateID element. The template itself may be fetched and pre-shared through HTTP(s) over broadband. Upon first acquiring a diff message, a receiver may store the diff message for future use. The template may correspond to a fragment instance at a specific time point, and a signaling fragment may be generated as a method applied to generate an instance followed by a diff message. In this case, information for identifying a mode in which a fixed template is used or a mode in which a template is provided as a fragment instance may be included in the signaling.

Referring to the drawing, the sender side may generate signaling and generate a signaling instance (the aforementioned signaling fragment). A sender may compare the generated signaling instance with a pre-transmitted (or pre-stored) signaling instance to generate a diff message including Diff. During a procedure of generating the diff message, the signaling template may be used. The sender may transmit the generated diff message to a receiver side.

The receiver side may receive the diff message and apply the Diff included in the corresponding diff message to the signaling template to complete a signaling instance. As described above, according to a mode, the signaling template may be pre-shared or a signaling fragment that is first received by the receiver may be used as a template. The receiving side may acquire the aforementioned signaling fragments using the completed signaling instance in the present invention. The receiver side may acquire the aforementioned service using the acquired signaling fragments.

FIG. 115 is a diagram illustrating Signaling_on_inet_descriptor( ) according to another embodiment of the present invention.

The Signaling_on_inet_descriptor( ) may correspond to a descriptor defined for the same function/objective despite a different terms from the aforementioned inet_signaling_location_descriptor( ). A description of the Signaling_on_inet_descriptor( ) may be substituted with or supplemented by a description of the inet_signaling_location_descriptor( ).

The Signaling_on_inet_descriptor( ) may include descriptor_tag information, descriptor_length information, provider_id information, URL_type_mask information and/or URL_bytes( ) element.

The descriptor_tag information may identify the descriptor.

The descriptor_length information may be included in the descriptor and may indicate a size (length) of information items subsequent to the information.

The provider_id information may identify a provider for broadcasting a service.

The URL_type_mask information may indicate a type of a URL. The URL_type_mask information may be coded with a bit mask and the meaning indicated by setting of each bit may be illustrated in the drawing. That is, an uppermost bit of the URL_type_mask information may indicate that a URL indicated by the URL_bytes( ) information is used as reference for access to a server for providing signaling and that a next bit (b6) of the uppermost bit may indicate a URL indicated by the URL_bytes( ) information is used as reference for access to a server for providing an ESG.

The URL_bytes( ) information may indicate a Uniform Resource Location (URL) and each character included in the URL may be encoded using a UTF-8 method. The URL may be used as a query term and a base URL may be extended by the query term in order to indicate a resource.

FIG. 116 is a diagram illustrating an FIT defined in XML according to another embodiment of the present invention.

The FIT according to another embodiment of the present invention may include @bsid information, @fitSectionNumber information, @totalFitSectionNumber information, @fitSectionVersion information, Service element, @serviceId information, @providerId information, @serviceCategory information, @spIndicator information, @serviceStatus information, @shortServiceName information, @SLSSimpleservice information, @SLSVersion information, capabilityCode element, signallingOnInet element, @urlType information, @url information, signalingBroadcast element, @IPVersion information, @sourceIPAddress information, @destinationIPAddress information, @destinationUdpPort information, @TSI information, @PLPID information, signallingOnInet element, @providerId information, @urlType information, and/or @url information.

The @SLSSimpleservice information may identify whether service layer signaling for a service is provided in a simple form. The @SLSSimpleservice information may identify whether signaling replacing an SLS is transmitted in a layer for transmitting an FIT. For example, in the case of a specific service, a receiver may configure a signal so as to access a corresponding service using only information included in the FIT prior to use of information of the SLS. In this case, the SLS_simpleservice information may identify whether the receiver is able to access the service using only the information in the FIT. The SLS_simpleservice information may identify whether the service is a simple broadcast service. In addition, the SLS_simpleservice information may identify whether all components included in a service are transmitted through a broadcast network or some components are transmitted through a broadband network. That is, the SLS_simpleservice information may identify whether the receiver needs to access a broadband network in order to effectively present one or more broadcast services.

A description of the signallingOnInet element may be substituted with a description of the aforementioned inetSignalingLocation element.

A description of the signalingBroadcast element may be substituted with a description of the aforementioned broadcastSignalingLocation element.

A description of other information and/or elements included in the FIT may be the same as a description of the aforementioned information and/or elements having the same or similar term.

FIG. 117 is a diagram illustrating meaning indicated by URL_type information according to an embodiment of the present invention.

The aforementioned URL_type information may be included in the FIT and may indicate a location of a server or provider via a URL.

For example, when a value of the URL_type information is '0x00', this may identify that the URL information indicates a URL of a server for providing an SLS, when the value of the URL_type information is '0x01', this may identify that the URL information indicates a URL of a server for providing an ESG, and when the value of the URL_type information is '0x02', this may identify that the URL information indicates a URL of a server for providing a signaling template.

FIG. 118 is a diagram illustrating a section of a Service List Table (SLT) according to an embodiment of the present invention.

The service list table may include predetermined information on each service in a broadcast stream so as to support rapid channel scan and service acquisition. The information included in the service list table may include information required to support channel number and/or channel up/down selection and to present a meaningful service list and/or information required to recognize a location of service level signaling (SLS) for each of the listed services.

The service list table according to an embodiment of the present invention may include table_id information, SLT_section_version information, SLT_section_length information, SLT_protocol_version information, broadcast_stream_id information, SLT_section_number information, last_SLT_section_number information, num_services information, information, service_id information, protected information, rep_service_flag information, major_channel_number information, minor_channel_number information, service_category information, short_service_name_length information, short_service_name( ) element, SLS_protocol_type information, SLS_PLP_ID information, TSID information, broadcast_components_present information, SLS_source_IP_address_present information, SLS_PLP_ID information, SLS_destination_IP_address information, SLS_destination_UDP_port information, SLS_source_IP_address information, ROUTE_version information, MMTP_version information, num_service_level_descriptors information, service_level_descriptor( ) element, num_SLT_level_descriptors information, and/or SLT_level_descriptor( ) element.

The table_id information may identify a table. The table_id information may have a value for identifying that a current table is a service list table.

The SLT_section_version information may indicate a version number of a service list table. A value of the a SLT_section_version information may be increased on a one by one basis whenever information transmitted by a service list table section is changed. When a value of the SLT_section_version information is reached to a maximum value of '1111b', next increase thereof may restore the value of the SLT_section_version information back to '0'.

The SLT_section_length information may indicate the number of bytes of an instance of a service list table started from information subsequent to the SLT_section_length information.

The SLT_protocol_version information may indicate a version of a structure of the service list table. Upper four bits of the SLT_protocol_version information may indicate a major version and lower four bits may indicate a minor version.

The broadcast_stream_id information may identify an entire broadcast stream. The broadcast_stream_id information may have a unique value within a range of a geographical area (e.g., North America).

The SLT_section_number information may indicate a section number from 0. The service list table may include a plurality of SLT sections.

The last_SLT_section_number information may identify a section having a highest value among values of the SLT_section_number information of a service list table to which a current section belongs. For example, when a value of the last_SLT_section_number information is '0010b', the service list table may include a total of three sections and include the SLT_section_number information having a value of '0000b', '0001b', or '0010b'.

The num_services information may indicate the number of services described by a service list table section.

The service_id information may uniquely identify a service within a range of a broadcast area or broadcast stream.

The protected information may identify whether one or more components required for meaningful presentation are protected. When a value of the information is set to '0', this may indicate that there is no component to which protection is applied among components required for meaningful presentation of a service.

The rep_service_flag information may identify whether a service corresponds to a representative service of one broadcaster that consumes an RF frequency for service transmission.

The major_channel_number information may indicate a 'major' channel number related to a service defined in a service element. Each service may be associated with a major channel number and a minor channel number. Along with the minor channel number, the major channel number may correspond to a reference number for a virtual channel. A value of the major_channel_number information may be set such that a pair of major_channel_number information and minor_channel_number information does not overlap in a service list.

The minor_channel_number information may indicate a 'minor' or 'sub' channel number. Along with the major_channel_number information, the minor_channel_number information may configure a 2-part channel number and the minor_channel_number information may represent a right part or a second part of the 2-part channel number.

The service_category information may indicate a category of a service. For example, when a value of the service_category information is '0x00', this may indicate that the category of the service is not identified, when the value of the service_category information is '0x01', this may indicate that the service corresponds to an A/V service, when the value of the service_category information is '0x02', this may indicate that the service corresponds to an audio service, when the value of the service_category information is '0x03', this may indicate that the service corresponds to an application-based service, and when the value of the service_category information is '0x04' to '0x0F', the field may be reserved for future use.

The short_service_name_length information may indicate a length of the short_service_name( ) element as the number of bytes. When the short_service_name( ) element is not provided, the short_service_name_length information may be set to '0'.

The short_service_name( ) element may include information indicating a short name of a service. Each characteristic of the short name of the service may be encoded in UTF-8.

The SLS_protocol_type information may indicate a type of a protocol of a service layer signaling channel. When the SLS_protocol_type information is not known or is not supported, the receiver may discard the received service list table section. For example, when a value of the SLS_protocol_type information is '0x00' and '0x04' to '0x0F', the field may be reserved for future use, when the value of the SLS_protocol_type information is '0x01', this may indicate service layer signaling is transmitted to an ATSC 1.0 MPEG-2 TS, when the value of the SLS_protocol_type information is '0x02', this may indicate that the service layer signaling is transmitted according to a ROUTE protocol, and when the value of the SLS_protocol_type information is '0x03', this may indicate that the service layer signaling may transmitted according to a MMTP protocol.

The SLS_PLP_ID information may indicate an ID of a PLP including service layer signaling for the service. In general, the PLP may correspond to a robust PLP compared with other pipes used in the service. The SLS_PLP_ID information may be transmitted through the aforementioned link layer signaling. In this case, the receiver may first identify a PLP for transmitting an SLS prior to acquisition of an SLT.

The TSID information may identify a transmission session for transmitting service layer signaling or describe the transmission session.

As illustrated in the drawing, when a value of the broadcast_components_present information is set to '1', whether changed information items are present may be identified according to a value of the SLS_protocol_type to the MMTP_version information from the SLS_PLP_ID information below the broadcast_components_present information, and when the value is set to '0', this may indicate that above information items are not present.

When a value of the SLS_source_IP_address_present information is set to '1', this may indicate that the SLS_source_IP_address information is present and when the value is set to '0', this may indicate that the SLS_source_IP_address information is not present in an instance of a current service list table section.

The SLS_destination_IP_address information may indicate a destination IP address of service layer signaling for the service. For example, the IP address may use 32 bits of IPv4.

The SLS_destination_UDP_port information may indicate a destination UDP port number of service layer signaling for the service.

The SLS_source_IP_address information may indicate a source IP address of service layer signaling for the service. For example, the IP address may use IPv4.

The ROUTE_version information may indicate a version of ROUTE used to provide an SLS for the service. Uppermost 4 bits of the ROUTE_version information may indicate a major version number of a ROUTE protocol and lowermost 4 bits may indicate a minor version number of the ROUTE protocol. In embodiments of the present invention, a major version number indicated by the ROUTE_version information may be '0x1' and a minor version number may be '0x0'. A ROUTE service labeled by a higher major version number than a version number designed to be supported by a receiver may not be provided by the receiver. The minor version number may not be used as a reference for determination of whether a service is provided to a user. The receiver may use a minor version number in order to determine whether transmission including data elements defined in a future version is present.

The MMTP_version information may indicate a version of an MMTP protocol for providing an SLS for a service.

The num_service_level_descriptors information may indicate the number of service level descriptors for a service. 0 or more descriptors for providing additional information for the service may be included in an SLT. When a value of the information is 0, this may indicate that the service level descriptor is not present.

The service_level_descriptor( ) element may include a service level descriptor.

The num_SLT_level_descriptors information may identify the number of SLT level descriptors in the service list table section. 0 or more descriptors for providing additional information for an SLT may be included in the SLT.

The SLT_level_descriptor( ) element may include an SLT level descriptor.

FIG. 119 is a diagram illustrating a descriptor included in an SLT and a location thereof according to an embodiment of the present invention. The TSID information may identify a transport stream for transmitting service signaling (e.g., PSI/PSIP).

The SLT may include inet_signaling_location_descriptor( ), service_language_descriptor( ), representative_service_descriptor( ), service_group_descriptor( ), and/or service_provider_descriptor( ).

The inet_signaling_location_descriptor( ) may be included in a signaling region of a service level or an SLT level in an SLT. The inet_signaling_location_descriptor( ) may include a URL indicating an entity for receiving data of a type requested from an external server through a broadband by a receiver. The receiver may use one URL included in the present descriptor as a query term for acquisition of a signaling description through a broadband. A description of information included in the inet_signaling_location_descriptor( ) and a query term for the inet_signaling_location_descriptor( ) may refer to the above description.

The service_language_descriptor( ) may include a signaling region of a service level or an SLT level in an SLT.

The representative_service_descriptor( ) may be included in a signaling region of an SLT level in an SLT.

The service_group_descriptor( ) may be included in a signaling region of an SLT level in an SLT.

The service_provider_descriptor( ) may be included in a signaling region of a service level in an SLT.

FIG. 120 is a diagram illustrating service_language_descriptor( ) and representative_service_descriptor( ) according to an embodiment of the present invention.

The service_language_descriptor( ) may include descriptor_tag information, descriptor_length information, and/or language information.

The descriptor_tag information may identify a descriptor. The descriptor_tag information may indicate that the descriptor corresponds to the service_language_descriptor( ).

The descriptor_length information may indicate a length from information subsequent to the information to last information/element of the descriptor as the number of bytes.

The language information may identify a language of a service. The language information may be encoded to three character language codes according to the ISO 639.2/B. Character may be coded to 8 bits according to the ISO 8859-1 and may be sequentially included in a field of 24 bits.

The representative_service_descriptor( ) may include descriptor_tag information, descriptor_length information, num_provider information, and/or rep_service_id information.

The descriptor_tag information may identify a descriptor. The descriptor_tag information may indicate that the descriptor corresponds to the representative_service_descriptor( ).

The descriptor_length information may indicate a length from information subsequent to the information to last information/element of the descriptor as the number of bytes.

The num_provider information may indicate the number of broadcasters or providers.

The rep_service_id information may identify a representative service among services signaled by an SLT. Each broadcaster or provider may have a representative service and the rep_service_id information may have the same value as the service_id information of a corresponding representative service. The representative service may correspond to an ESG service included in a broadcast stream for each broadcaster.

FIG. 121 is a diagram illustrating service_group_descriptor( ) according to an embodiment of the present invention.

The service_group_descriptor( ) may include lists of services included in one broadcaster. In every broadcaster, one service_group_descriptor( ) instance may be present. The service_group_descriptor( ) may be used when one RF frequency is shared by a plurality of broadcasters. An SLT may include information for listing of services provided through one RF frequency or broadcast stream and, in general, one RF frequency may be used by one broadcaster. However, in some situations, one RF frequency may be shared by a plurality of broadcasters and, in this case, it may be necessary to list services provided by respective broadcasters. In this case, the receiver may separately list services provided by respective broadcasters using the present descriptor or information included in the present descriptor.

The service_group_descriptor( ) may include descriptor_tag information, descriptor_length information, num_service information, and/or service_id information.

The descriptor_tag information may identify a descriptor. The descriptor_tag information may indicate that the descriptor corresponds to the service_group_descriptor( ).

The descriptor_length information may indicate a length from information subsequent to the information to last information/element of the descriptor as the number of bytes.

The num_service information may indicate the number of services described by the service_group_descriptor( ).

The service_id information may have the same value as a value of the service_id information in a service loop of an SLT and identify each service.

FIG. 122 is a diagram illustrating service_group_descriptor( ) according to another embodiment of the present invention.

The service_group_descriptor may include descriptor_tag information, descriptor_length information, num_broadcaster information, num_service information, and/or service_id information.

The descriptor_tag information may identify a descriptor. The descriptor_tag information may indicate that the descriptor corresponds to the service_group_descriptor( ).

The descriptor_length information may indicate a length from information subsequent to the information to last information/element of the descriptor as the number of bytes.

The num_broadcaster information may indicate the number of broadcasters described by the service_group_descriptor( ).

The num_service information may indicate the number of services belonging to a broadcaster identified by the num_broadcaster information.

The service_id information may have the same value as a value of the service_id information in a service loop of an SLT and identify each service.

FIG. 123 is a diagram illustrating service_group_descriptor( ) according to another embodiment of the present invention.

The service_group_descriptor( ) may include descriptor_tag information, descriptor_length information, num_provider information, provider_id information, num_service information, and/or service_id information.

The descriptor_tag information may identify a descriptor. The descriptor_tag information may indicate that the descriptor corresponds to the service_group_descriptor( ).

The descriptor_length information may indicate a length from information subsequent to the information to last information/element of the descriptor as the number of bytes.

The num_provider information may indicate the number of broadcasters described by the descriptor.

The provider_id information may indicate an ID of each broadcaster.

The num_service information may indicate the number of services belonging to a broadcaster identified by the provider_id information.

The service_id information may have the same value as a value of the service_id information in a service loop of an SLT and identify each service.

FIG. 124 is a diagram illustrating service_provider_descriptor( ) according to an embodiment of the present invention.

The service_provider_descriptor( ) may include information for describing each provider when services described by an SLT are provided by a plurality of broadcasters.

The service_provider_descriptor( ) may include descriptor_tag information, descriptor_length information, and/or provider_id information.

The descriptor_tag information may identify a descriptor. The descriptor_tag information may indicate that the descriptor corresponds to the service_group_descriptor( ).

The descriptor_length information may indicate a length from information subsequent to the information to last information/element of the descriptor as the number of bytes.

The provider_id may indicate an ID of each broadcaster.

FIG. 125 is a diagram illustrating a service list table defined in the form of XML according to an embodiment of the present invention.

The service list table in the form of XML according to an embodiment of the present invention may include @bsid information, @sltSectionVersion information, @sltSectionNumber information, @totalSltSectionNumbers information, @language information, @providerId information, InetSigLocation element, RepresentativeService element, ServiceGroup element, Service element, @serviceId information, @protected information, @representative information, @majorChannelNo information, @minorChannelNo information, @serviceCategory information, @shortServiceName information, @SLSProtocolType information, @slsPlpId information, @slsDestinationIpAddress information, @slsDestinationUdpPort information, @slsSourceIpAddress information, @mmtpVersion information, @routeVersion information, @service_language information, InetSigLocation element, and/or ServiceProvider element.

The @bsid information may identify a broadcast stream.

The @sltSectionVersion information may indicate a version number of a service list table section.

The @sltSectionNumber information may indicate a number of a service list table section.

The @totalSltSectionNumbers information may indicate a total number of sections of a service list table to which the section belongs.

The @language information may indicate a character indicating a main language of services in a service list table instance.

The @providerId information may identify a provider for providing services described by an SLT when one provider provides one SLT.

The InetSigLocation element may provide URL information for acquisition of data of a type requested by an external server through broadband. The InetSigLocation element may include all or some of information items included in the aforementioned inet_signaling_location_descriptor( ).

The RepresentativeService element may include information for describing a representative service among services provided from one broadcaster. The RepresentativeService element may include all or some of information items included in the aforementioned representative_service_descriptor( ).

The ServiceGroup element may include information for a list of services provided from one broadcaster. The ServiceGroup element may include all or some of information items included in the aforementioned service_group_descriptor( )

The Service element may include information for describing a service. The Service element may correspond to a service entry.

The @serviceId information may uniquely identify a service within a range of a broadcast area or a broadcast stream.

The @protected information may identify whether one or more components required for meaningful presentation are protected. When a value of the information is set to 'false', this may indicate there is no component to which protection is applied among components required for meaningful presentation of a service.

The @representative information may identify whether a service corresponds to a representative service of one broadcaster that consumes an RF frequency for service transmission.

The @majorChannelNo information may indicate a 'major' channel number related to a service defined in a service element.

The @minorChannelNo information may indicate a 'minor' channel number.

The @serviceCategory information may indicate a category of a service. For example, when a value of the service_category information is '0x00', this may indicate that the category of the service is not identified, when the value of the service_category information is '0x01', this may indicate that the service corresponds to an A/V service, when the value of the service_category information is '0x02', this may indicate that the service corresponds to an audio service, and when the value of the service_category information is '0x03', this may indicate that the service corresponds to an application based service. When the value of the service_category information is '0x04' to '0x0F', the field may be reserved for future use.

The @shortServiceName information may include information indicating a short name of a service.

The @SLSProtocolType information may indicate a type of a protocol of a service layer signaling channel. When the SLS_protocol_type information is not known or is not supported, the receiver may discard the received service list table section. For example, when a value of the SLS_protocol_type information is '0x00' and'0x04' to'0x0F', the field may be reserved for future use, when the value of the SLS_protocol_type information is '0x01', this may indicated that service layer signaling is transmitted to an ATSC 1.0 MPEG-2 TS, when the value of the SLS_protocol_type information is '0x02', this may indicate that service layer signaling is transmitted according to a ROUTE protocol, and when the value of the SLS_protocol_type information is '0x03', this may indicate that service layer signaling is transmitted according to a MMTP protocol.

The @slsPlpId information may indicate an ID of a PLP including service layer signaling for the service. In general, the PLP may correspond to a robust PLP compared with other pipes used in the service. The SLS_PLP_ID information may be transmitted through the aforementioned link layer signaling. In this case, the receiver may first identify a PLP for transmitting an SLS prior to acquisition of an SLT.

The @slsDestinationIpAddress information may indicate a destination IP address of packets for transmitting data for service layer signaling for the service. For example, the IP address may use 32 bits of IPv4.

The @slsDestinationUdpPort information may indicate a destination UDP port number of packets for transmitting data for service layer signaling for the service.

The @slsSourceIpAddress information may indicate a source IP address of packets for transmitting data for service layer signaling for the service. For example, the IP address may use IPv4.

The @mmtpVersion information may indicate a version of an MMTP protocol for providing an SLS for the service.

The @routeVersion information may indicate a version of ROUTE used to provide an SLS for the service.

The @service_language information may indicate three characters encoded according to ISO 639.2/B, indicating a main language of a service.

The InetSigLocation element may provide URL information for acquisition of data of a type requested by an external server through a broadband. The InetSigLocation element may include all or some of information items included in the aforementioned inet_signaling_location_descriptor( ).

The ServiceProvider element may include information for providing an ID of a provider for providing a service. The ServiceProvider element may include all or some of information items included in the aforementioned service_provider_descriptor( ).

FIG. 126 is a diagram illustrating InetSigLocation element, Representative Service element, ServiceGroup element, and Service Provider element according to an embodiment of the present invention.

The InetSigLocation element may include information indicating a URL of a location for acquisition of a type of data requested from an external server through a broadband by a receiver.

The InetSigLocation element may include @urlType information and/or @url information.

The @urlType information may indicate a type of a URL represented by the @url information. When a value of the information is "0x00", this may indicate that the represented URL is a URL of a signaling server for providing the signaling, and when the value of the information is "0x01", this may indicate that the represented URL is a URL of an EGS server for providing ESG data.

The @url information may indicate a Uniform Resource Location (URL) and each character included in the URL may be encoded in a UTF-8 manner. The URL may be used as a query term and a base URL may be extended by the query term in order to indicate a resource. A description of the query term is the same as the above description.

A description of the InetSigLocation element may be supplemented by the above description of the aforementioned inet_signaling_location_descriptor( ).

The Representative Service element may include information for a representative service list of broadcasters that share one RF frequency.

The Representative Service element may include RepServiceId information.

The RepServiceId information may have the same value as serviceId information included in a service element of an SLT and a service indicated by the RepServiceId information may be identified as a representative service of a corresponding broadcaster.

A description of the Representative Service element may be supplemented by the above description of the aforementioned representative_service_descriptor( ).

The ServiceGroup element may include information for a service group list of broadcasters that share one RF frequency.

The ServiceGroup element may include Provider element, @broadcaster_id information, and/or serviceId information.

A description of the ServiceGroup element may be supplemented by the above description of the aforementioned service_group_descriptor( ).

The Provider element may include information on a broadcaster that consumes an RF frequency.

The @broadcaster_id information may indicate an ID of a broadcaster.

The serviceId information may have the same value as serviced information included in a service element of an SLT and identify a service provided by a broadcaster identified by the @broadcaster_id information.

The Service Provider element may include @id information.

The @id information may identify a provider.

A description of the Service Provider element may be supplemented by the above description of the aforementioned service_provider_descriptor( ).

Figure 127:
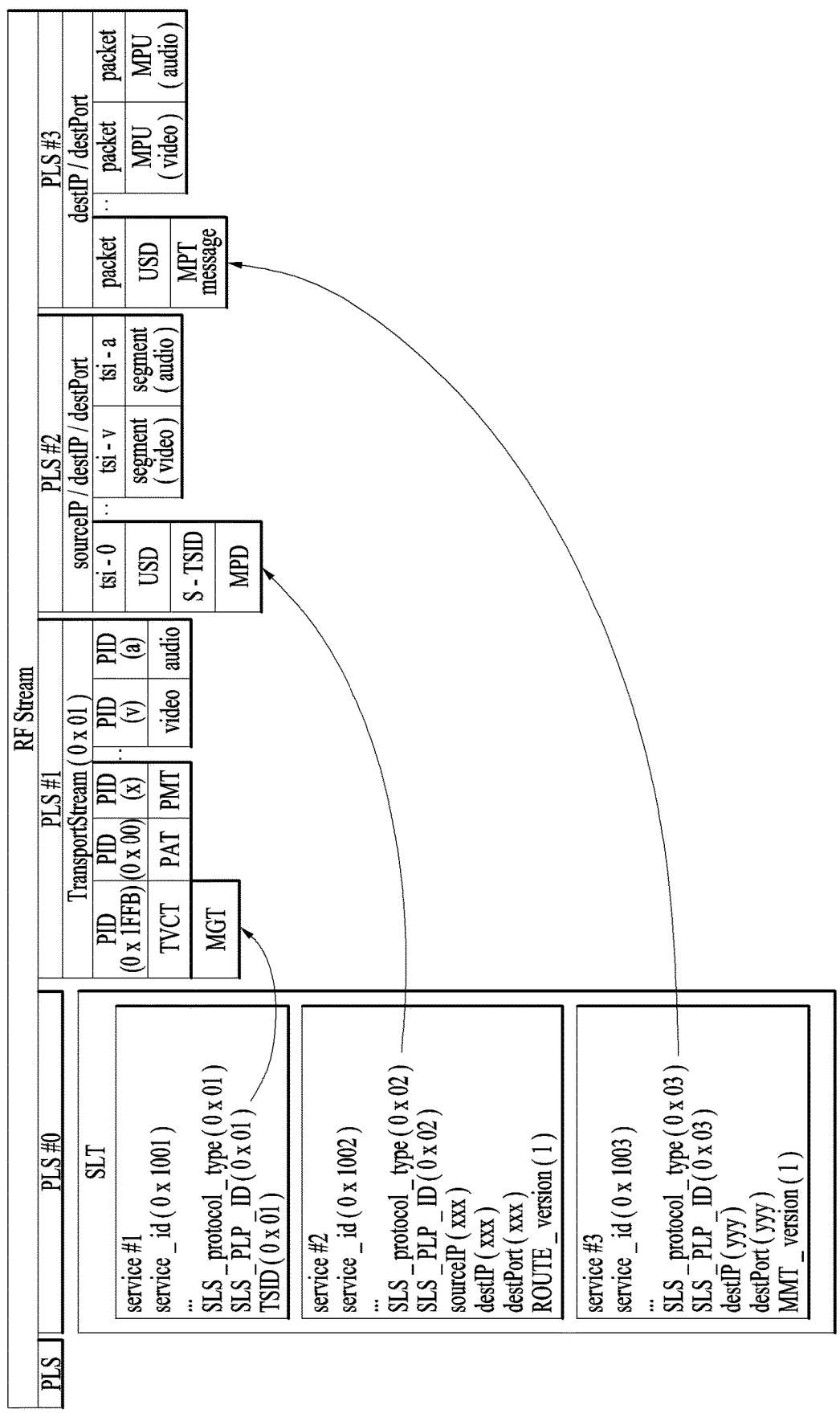

FIG. 127 is a diagram illustrating signaling by a service list table during conversion into a next-generation broadcast system from a typical broadcast system, according to an embodiment of the present invention.

During conversion of a broadcast system into a next-generation broadcast system (e.g., ATSC 3.0) from a typical broadcast system (e.g., ATSC 1.0), there may be a period in which the typical broadcast system and the next-generation broadcast system coexist. In this case, the receiver needs to also acquire information provided through a signaling system of the typical broadcast system using an SLT.

One physical layer stream may be divided for other versions of ATSC broadcasts (e.g., ATSC1.0 and ATSC 3.0 using the MPEG2-TS). In the ATSC 1.0, Program-specific information (PSI)/Program and System Information Protocol (PSIP) may be used as signaling.

Referring to the drawing, service #1 among services listed by the SLT may be provided via signaling of the ATSC1.0. SLS_protocol_type information on the service #1 may indicate that transmission of the SLS is performed according to the MPEG2-TS. The receiver may acquire service signaling (e.g., PSI/PSIP) for the service #1 using SLS_protocol_type information, SLS_PLP_ID information and/or TSID information and access the service #1 using the service signaling.

Service #2 is provided using ROUTE of the ATSC3.0 and, thus, the receiver may acquire information for acquisition of an SLS in an SLT and access the service #2 using the SLS using the aforementioned method.

Service #3 is provided using MMT of the ATSC3.0 and, thus, the receiver may acquire information for acquisition of an SLS in an SLT and access the service #3 using the SLS using the aforementioned method.

Figure 128:
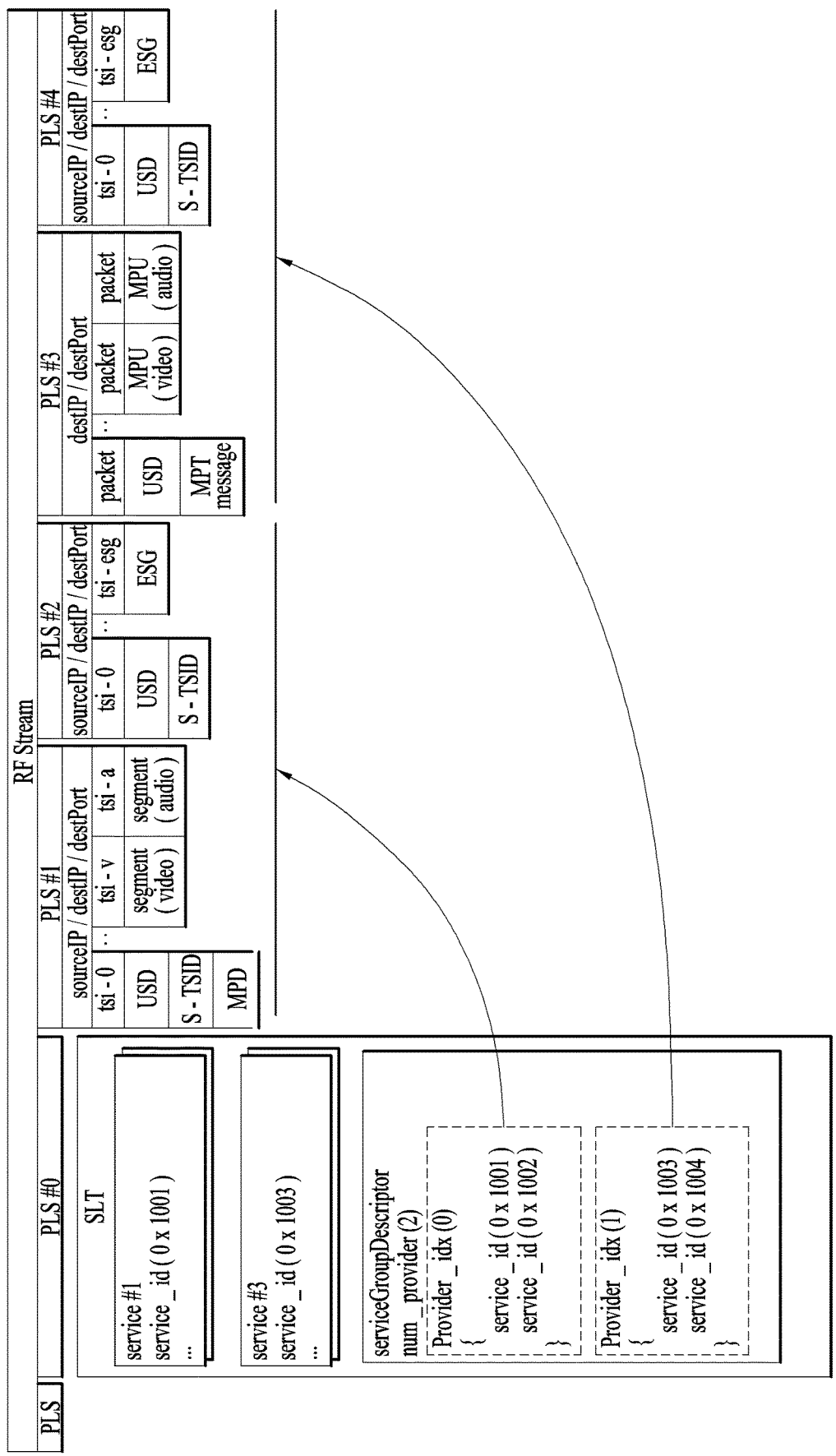

FIG. 128 is a diagram illustrating signaling using service_group_descriptor( ) included in a service list table when a plurality of broadcasters share a frequency according to an embodiment of the present invention.

Referring to the drawing, the service_group_descriptor ( ) may indicate that there are two broadcasters that share one RF frequency (num_provider information), and information (provider_id information) for identifying each broadcaster and service_id information included therebelow may be acquired to differentiate services provided by each broadcaster.

A presentation procedure of a service identified according to the service_id information may include acquiring an SLS by a receiver and acquiring and presenting a corresponding service using USD, S-TSID, and MPD fragments included in the SLS.

The next-generation broadcast system may provide a set of integrated media components to a user, the components may correspond to a plurality of media types, a service may be continuous or intermittent, the service may be a realtime service or a non-realtime service, and the realtime service may include a sequence of a TV program.

The SLT may be used using various methods.

A main object of an SLT may be support of channel scan and may indicate service level signaling (SLS). Accordingly, the SLT may not include signaling indicating a location of components of a service and the information may be included in the SLS. One service may include 0 or more components transmitted over broadband, the components may include all media components of a service transmitted over broadband, and the SLS may include signaling information indicating a location of the components. The SLT may include static information used for service scan. The SLT may be a unique entry point for describing SLS bootstrapping information.

The SLT may not be frequently changed. The SLT may not be changed between new programs or programs. For one service, components provided in broadcast streaming may be transmitted according to one transmission protocol at a given time point. That is, at the same time, one service may not include components transmitted via ROUTE and MMT. However, the transmission protocol used for one service may be converted into the MMT from the ROUTE or the converse may be possible.

When the receiver is first set up or is moved from one DMA to other places, channel scan using an SLT may be performed.

When a service is added or removed, for example, when a new service is transmitted in an RF band or a service is disconnected in the corresponding RF band, a version of the SLT may be changed. During a procedure of providing a component of a service to a broadcast stream, when a signaling protocol is changed, the version of the SLT may also be changed. When a location of an SLS for one service is changed, the version of the SLT may be changed. In addition, when a structure of the SLT is changed, the version of the SLT may also be changed.

Through one RF band, two or more broadcasters may provide a service. In this case, the broadcasters may together generate and use one SLT or the broadcasters may generate and use SLTs, respectively.

Components included in one service may be transmitted through one or more RF bands. In this case, the receiver may receive two or more SLTemfdmf provided by one broadcaster that consumes a plurality of RF bands, each SLT may be allocate service_id of the same value for the same service, and a location of components included in the corresponding service may be defined by each SLS bootstrapped according to each SLT.

Figure 129:
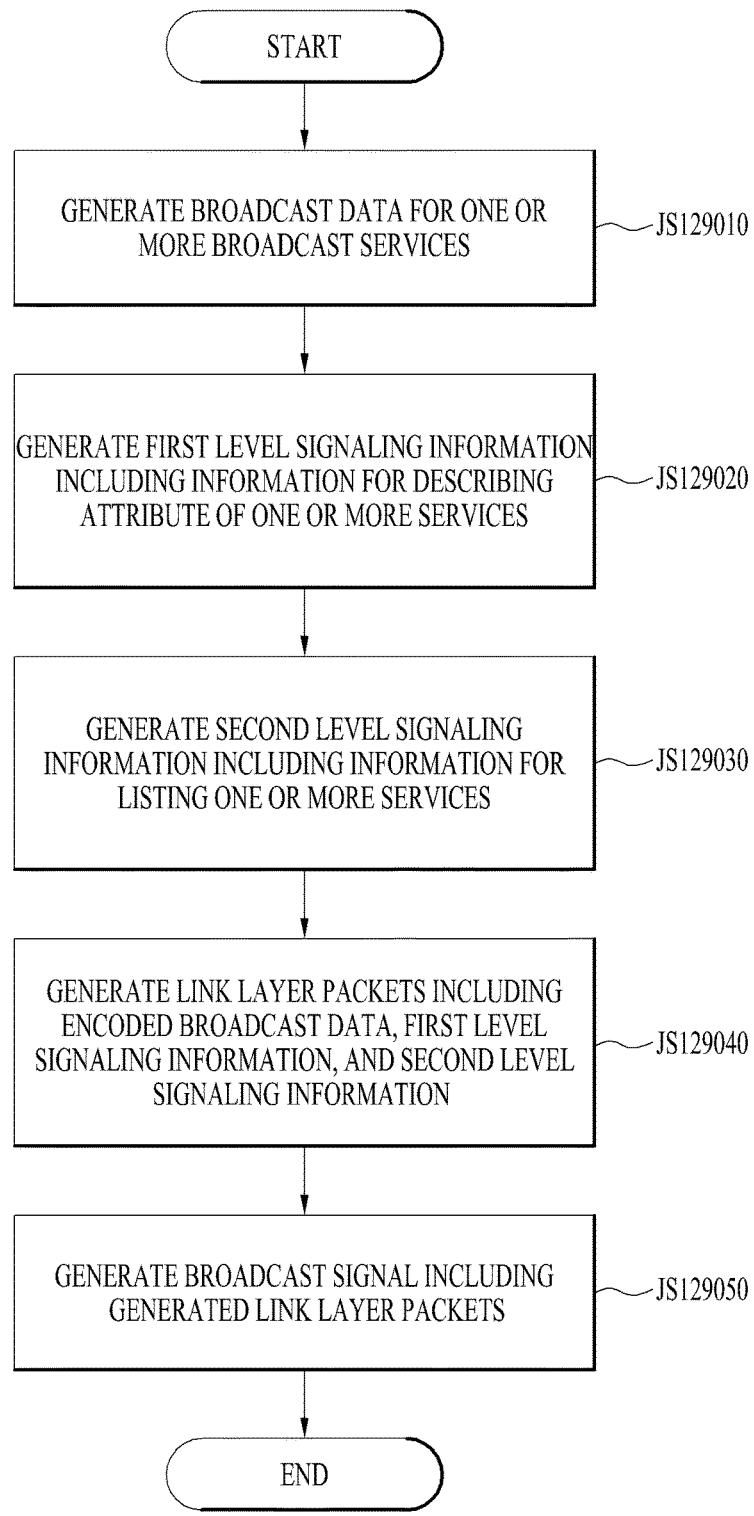

FIG. 129 is a flowchart illustrating of processing transmission of a broadcast signal according to an embodiment of the present invention.

According to an embodiment of the present invention, a transmitter may generate broadcast data for one or more broadcast services (JS129010).

The transmitter may generate first level signaling information including information for describing attribute of one or more broadcast services (JS129020).

The transmitter may generate second level signaling information including information for listing one or more broadcast services (JS129030).

The transmitter may generate link layer packets including the encoded broadcast data, the first level signaling information, and the second level signaling information (JS129040).

The transmitter may generate a broadcast signal including the generated link layer packet (JS129050).

Here, the generated link layer packets may further include third level signaling information that is transmitted in a lower layer than an Internet protocol (IP) and is acquirable before the receiver acquires the first level signaling information and the second level signaling information. Here, the generated link layer packets may include packet type information for identifying a type of data included in the link layer packets, the packet type information may identify a link layer packet including the third level signaling information among the link layer packets, and the third level signaling information may include first information for identifying a Physical Layer Pipe (PLP) for transmitting the first level signaling information.

The second level signaling information may include service level signaling protocol type information for identifying whether a Real time Object delivery over Unidirectional Transport (ROUTE) protocol or a MPEG Media Transport (MMT) protocol is used in order to transmit the first level signaling information for each broadcast service of the one or more broadcast services.

The second level signaling information may further include URL information indicating a URL required to access a server for providing the first level signaling information transmitted through a broadband network or a server providing an Electronic Service Guide (ESG) service.

The second level signaling information may further include URL type information for identifying whether the URL indicated by the URL information is a URL for access to a server for providing the first level signaling information or a URL for access to a server for providing the Electronic Service Guide (ESG) service.

The second level signaling information may further include provider identification information for identifying a broadcaster for providing the one or more broadcast services, and representative service ID information for identifying a representative broadcast service of the broadcaster among the one or more broadcast services provided by the broadcaster identified by the provider identification information.

The second level signaling information may further include broadcaster number information indicating the number of two or more broadcasters that share one RF frequency, and service group information for listing broadcast services provided by each of the two or more broadcasters.

The generated broadcast signal may further include fourth level signaling information including a transmission layer parameter required to transmit data included in the generated broadcast signal, and the fourth level signaling information may include second information for identifying a PLP for transmitting the second level signaling information.

Figure 130:
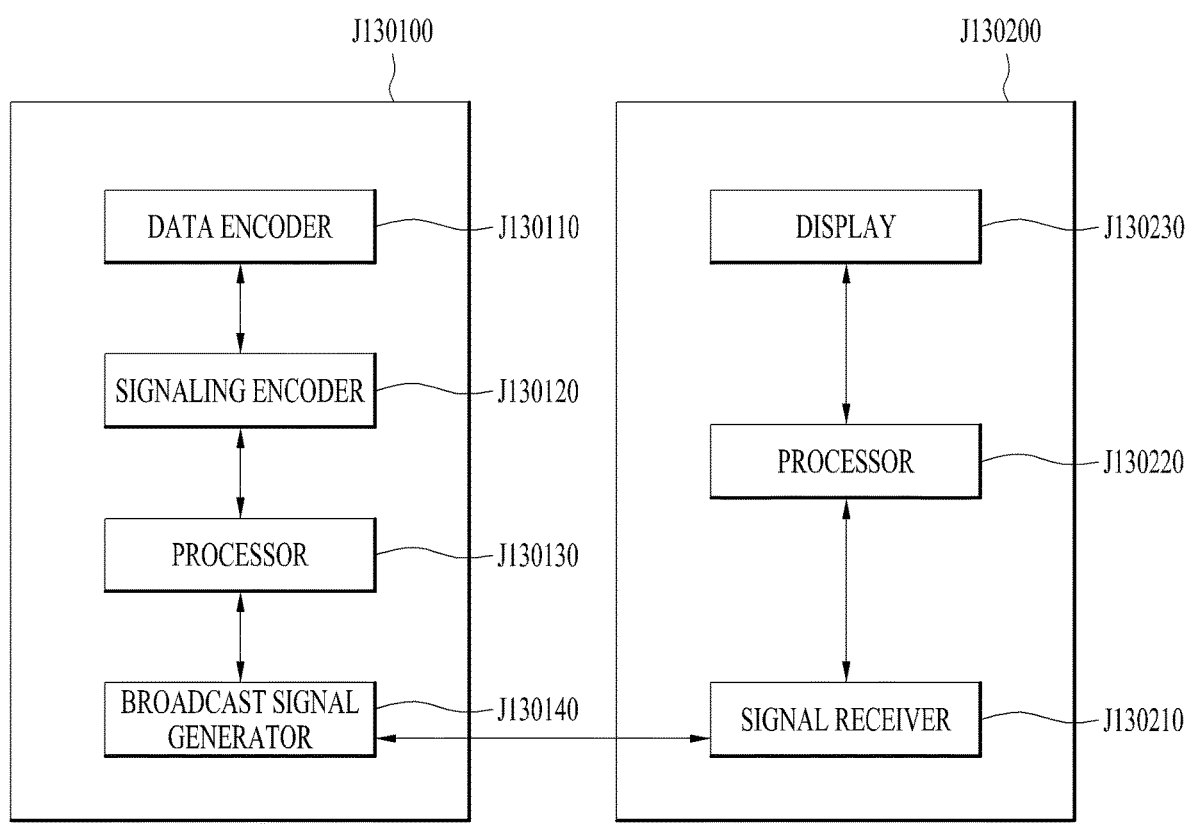

FIG. 130 is a diagram illustrating a broadcast system according to an embodiment of the present invention.

The broadcast system according to an embodiment of the present invention may include a transmitter J130100 and/or a receiver J130200.

The transmitter J130100 may include a data encoder J130110, a signaling encoder J130120, a processor J130130 and/or a broadcast signal generator J130140.

The data encoder J130110 may generate broadcast data for one or more broadcast services.

The signaling encoder J130120 may generate first level signaling information including information for describing attribute of one or more broadcast services and generate second level signaling information including information for listing one or more broadcast services. The signaling encoder J130120 may include one or more low singling encoders for generating signaling of one or more layers.

The processor J130130 may generate link layer packets including the encoded broadcast data, the first level signaling information, and the second level signaling information.

The broadcast signal generator J130140 may generate a broadcast signal including the generated link layer packets.

Here, the generated link layer packets may further include third level signaling information that is transmitted in a lower layer than an Internet protocol (IP) and is acquirable before the receiver acquires the first level signaling information and second level signaling information. Here, the generated link layer packets may include packet type information for identifying a type of data included in the link layer packet, the packet type information may identify a link layer packet including the third level signaling information from the link layer packets, and the third level signaling information may include first information for identifying a Physical Layer Pipe (PLP) for transmitting the first level signaling information.

The receiver J130200 may include a signal receiver J130210, a processor J130220, and/or a display J130230.

The signal receiver J130210 may receive a signal. The signal receiver J130210 may include a broadcast signal receiver for receiving a broadcast signal and/or a network interface for receiving a broadband signal.

The processor J130220 may process a series of data in the receiver. The processor J130220 may process the data according to each protocol of the hierarchical structure described in the present specification.

The display J130230 may reproduce media of the processed data.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

MODE FOR INVENTION

Various embodiments have been described in the best mode for carrying out the invention.

INDUSTRIAL APPLICABILITY

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A method of processing a broadcast signal in a broadcast transmitter, the method comprising:
   encoding service data for a service;
   encoding service list table (SLT) information providing information for rapid channel scans and service acquisition;
   encoding service layer signaling (SLS) information providing information for discovery and acquisition of the service; and
   transmitting the broadcast signal comprising the service data, the SLT information, and the SLS information,
   wherein the SLS information is delivered by one of a Real time Object delivery over Unidirectional Transport (ROUTE) protocol or a MPEG Media Transport (MMT) protocol,
   wherein the SLT information includes service identification information for identifying the service, channel number information of the service, protection information for indicating whether the service data is protected, protocol type information for identifying which one of the ROUTE protocol or the MMT protocol is used to deliver the SLS information, and bootstrapping information to bootstrap a discovery of the SLS information,
   wherein information included in the bootstrapping information varies according to the protocol type information,
   wherein the bootstrapping information includes source Internet Protocol (IP) address information, first destination IP address information and first port number information of packets carrying the SLS information for the service in response to the protocol type information identifying that the SLS information is delivered using the ROUTE protocol, and wherein the bootstrapping information includes second destination IP address information and second port number information of packets carrying the SLS information for the service in response to the protocol type information identifying that the SLS information is delivered using the MMT protocol.

2. The method according to claim 1, wherein the SLT information further includes version information of a protocol identified by the protocol type information.

3. The method according to claim 1, wherein the SLT information further includes Uniform Resource Locator (URL) information to access a server providing the SLS information delivered through a broadband network or a server providing Electronic Service Guide (ESG) data.

4. The method according to claim 3, wherein the SLT information further includes type information for identifying whether the URL information is a URL for access to the server providing the SLS information or a URL for access to the server providing the ESG data.

5. An apparatus for processing a broadcast signal, the apparatus comprising:
  a processor configured to encode service data for a service, service list table (SLT) information, and service layer signaling (SLS) information, the SLT information providing information for rapid channel scans and service acquisition and the SLS information providing information for discovery and acquisition of the service; and
  a transmitter configured to transmit the broadcast signal including the service data, the SLT information, and the SLS information,
  wherein the SLS information is delivered by one of a Real time Object delivery over Unidirectional Transport (ROUTE) protocol or a MPEG Media Transport (MMT) protocol,
  wherein the SLT information includes service identification information for identifying the service, channel number information of the service, protection information for indicating whether the service data is protected, protocol type information for identifying which one of the ROUTE protocol or the MMT protocol is used to deliver the SLS information, and bootstrapping information to bootstrap a discovery of the SLS information,
  wherein information included in the bootstrapping information varies according to the protocol type information,
  wherein the bootstrapping information includes source Internet Protocol (IP) address information, first destination IP address information and first port number information of packets carrying the SLS information for the service in response to the protocol type information identifying that the SLS information is delivered using the ROUTE protocol, and
  wherein the bootstrapping information includes second destination IP address information and second port number information of packets carrying the SLS information for the service in response to the protocol type information identifying that the SLS information is delivered using the MMT protocol.

6. The apparatus according to claim 5, wherein the SLT information further includes version information of a protocol identified by the protocol type information.

7. The apparatus according to claim 5, wherein the SLT information further includes Uniform Resource Locator (URL) information to access a server providing the SLS information delivered through a broadband network or a server providing Electronic Service Guide (ESG) data.

8. The apparatus according to claim 7, wherein the SLT information further includes type information for identifying whether the URL information is a URL for access to the server providing the SLS information or a URL for access to the server providing the ESG data.

9. A method of processing a broadcast signal in a broadcast receiver, the method comprising:
  receiving the broadcast signal including service data for a service, service list table (SLT) information and service layer signaling (SLS) information, the SLT information providing information for rapid channel scans and service acquisition and the SLS information providing information for discovery and acquisition of the service;
  decoding the SLT information;
  decoding the SLS information; and
  decoding the service data,
  wherein the SLS information is delivered by one of a Real time Object delivery over Unidirectional Transport (ROUTE) protocol or a MPEG Media Transport (MMT) protocol,
  wherein the SLT information includes service identification information for identifying the service, channel number information of the service, protection information for indicating whether the service data is protected, protocol type information for identifying which one of the ROUTE protocol or the MMT protocol is used to deliver the SLS information, and bootstrapping information to bootstrap a discovery of the SLS information,
  wherein information included in the bootstrapping information varies according to the protocol type information,
  wherein the bootstrapping information includes source Internet Protocol (IP) address information, first destination IP address information and first port number information of packets carrying the SLS information for the service in response to the protocol type information identifying that the SLS information is delivered using the ROUTE protocol, and
  wherein the bootstrapping information includes second destination IP address information and second port number information of packets carrying the SLS information for the service in response to the protocol type information identifying that the SLS information is delivered using the MMT protocol.

10. The method according to claim 9, wherein the SLT information further includes version information of a protocol identified by the protocol type information.

11. The method according to claim 9, wherein the SLT information further includes Uniform Resource Locator (URL) information to access a server providing the SLS information through a broadband network or a server providing Electronic Service Guide (ESG) data.

12. The method according to claim 11, wherein the SLT information further includes type information for identifying whether the URL information is a URL for access to the server providing the SLS information or a URL for access to the server providing the ESG data.

13. An apparatus for processing a broadcast signal, the apparatus comprising:
  a receiver configured to receive the broadcast signal including service data for a service, service list table (SLT) information and service layer signaling (SLS) information, the SLT information providing information for rapid channel scans and service acquisition and the SLS information providing information for discovery and acquisition of the service; and a processor configured to decode the SLT information, the SLS information, and the service data, wherein the SLS information is delivered by one of a Real time Object delivery over Unidirectional Transport (ROUTE) protocol or a MPEG Media Transport (MMT) protocol, wherein the SLT information includes service identification information for identifying the service, channel number information of the service, protection information for indicating whether the service data is protected, protocol type information for identifying which one of the ROUTE protocol or the MMT protocol is used to deliver the SLS information, and bootstrapping information to bootstrap a discovery of the SLS information, wherein information included in the bootstrapping information varies according to the protocol type information, wherein the bootstrapping information includes source Internet Protocol (IP) address information, first destination IP address information and first port number information of packets carrying the SLS information for the service in response to the protocol type information identifying that the SLS information is delivered using the ROUTE protocol, and wherein the bootstrapping information includes second destination IP address information and second port number information of packets carrying the SLS information for the service in response to the protocol type information identifying that the SLS information is delivered using the MMT protocol.

14. The apparatus according to claim 13, wherein the SLT information further includes version information of a protocol identified by the protocol type information.

15. The apparatus according to claim 13, wherein the SLT information further includes Uniform Resource Locator (URL) information to access a server providing the SLS information through a broadband network or a server providing Electronic Service Guide (ESG) data.

16. The apparatus according to claim 15, wherein the SLT information further includes type information for identifying whether the URL information is a URL for access to the server providing the SLS information or a URL for access to the server providing the ESG data.

* * * * *